US010627670B2

(12) United States Patent
Robinson et al.

(10) Patent No.: US 10,627,670 B2
(45) Date of Patent: *Apr. 21, 2020

(54) REFLECTIVE OPTICAL STACK FOR PRIVACY DISPLAY

(71) Applicant: RealD Spark, LLC, Beverly Hills, CA (US)

(72) Inventors: Michael G. Robinson, Boulder, CO (US); Graham J. Woodgate, Henley-on-Thames (GB); Jonathan Harrold, Leamington Spa (GB); Robert A. Ramsey, Boulder, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,574

(22) Filed: Apr. 17, 2019

(65) Prior Publication Data
US 2020/0026125 A1    Jan. 23, 2020

Related U.S. Application Data

(63) Continuation of application No. 16/256,120, filed on Jan. 24, 2019.

(Continued)

(51) Int. Cl.
*G02F 1/1335* (2006.01)
*G02B 5/30* (2006.01)
(Continued)

(52) U.S. Cl.
CPC ..... *G02F 1/133536* (2013.01); *G02B 5/3025* (2013.01); *G02F 1/1323* (2013.01);
(Continued)

(58) Field of Classification Search
CPC ............ G02F 1/1323; G02F 1/133536; G02F 2203/12; G02F 1/1393; G02F 1/13471
See application file for complete search history.

(56) References Cited

U.S. PATENT DOCUMENTS

| 4,914,553 A | 4/1990 | Hamada et al. |
| 5,528,720 A | 6/1996 | Winston et al. |

(Continued)

FOREIGN PATENT DOCUMENTS

| CN | 1910399 A | 2/2007 |
| CN | 2872404 | 2/2007 |

(Continued)

OTHER PUBLICATIONS

AU-2011329639 Australia Patent Examination Report No. 1 dated Mar. 6, 2014.

(Continued)

*Primary Examiner* — Jia X Pan
(74) *Attorney, Agent, or Firm* — Penny L. Lowry; Neil G. J. Mothew

(57) ABSTRACT

A privacy display comprises a polarised output spatial light modulator, reflective polariser, plural polar control retarders and a polariser. In a privacy mode of operation, on-axis light from the spatial light modulator is directed without loss, whereas off-axis light has reduced luminance. Further, display reflectivity is reduced for on-axis reflections of ambient light, while reflectivity is increased for off-axis light. The visibility of the display to off-axis snoopers is reduced by means of luminance reduction and increased frontal reflectivity to ambient light. In a public mode of operation, the liquid crystal retardance is adjusted so that off-axis luminance and reflectivity are unmodified.

17 Claims, 80 Drawing Sheets

Related U.S. Application Data

(60) Provisional application No. 62/699,906, filed on Jul. 18, 2018, provisional application No. 62/699,914, filed on Jul. 18, 2018, provisional application No. 62/673,576, filed on May 18, 2018, provisional application No. 62/673,359, filed on May 18, 2018, provisional application No. 62/641,657, filed on Mar. 12, 2018, provisional application No. 62/634,168, filed on Feb. 22, 2018, provisional application No. 62/622,001, filed on Jan. 25, 2018.

(51) Int. Cl.
*G02F 1/1337* (2006.01)
*G02F 1/13* (2006.01)

(52) U.S. Cl.
CPC ...... *G02F 1/1337* (2013.01); *G02F 1/133528* (2013.01); *G02F 2001/133531* (2013.01); *G02F 2203/12* (2013.01)

(56) References Cited

U.S. PATENT DOCUMENTS

| | | | |
|---|---|---|---|
| 5,727,107 | A | 3/1998 | Umemoto et al. |
| 5,959,664 | A | 9/1999 | Woodgate |
| 5,971,559 | A | 10/1999 | Ishikawa et al. |
| 6,014,164 | A | 1/2000 | Woodgate et al. |
| 6,061,489 | A | 5/2000 | Ezra et al. |
| 6,075,557 | A | 6/2000 | Holliman et al. |
| 6,108,059 | A | 8/2000 | Yang |
| 6,199,995 | B1 | 3/2001 | Umemoto et al. |
| 6,232,592 | B1 | 5/2001 | Sugiyama |
| 6,305,813 | B1 | 10/2001 | Lekson et al. |
| 6,335,999 | B1 | 1/2002 | Winston et al. |
| 6,422,713 | B1 | 7/2002 | Fohl et al. |
| 6,464,365 | B1 | 10/2002 | Gunn et al. |
| 6,663,254 | B2 | 12/2003 | Ohsumi |
| 6,731,355 | B2 | 5/2004 | Miyashita |
| 6,847,488 | B2 | 1/2005 | Travis |
| 6,870,671 | B2 | 3/2005 | Travis |
| 6,883,919 | B2 | 4/2005 | Travis |
| 7,052,168 | B2 | 5/2006 | Epstein et al. |
| 7,058,252 | B2 | 6/2006 | Woodgate et al. |
| 7,073,933 | B2 | 7/2006 | Gotoh et al. |
| 7,101,048 | B2 | 9/2006 | Travis |
| 7,215,415 | B2 | 5/2007 | Maehara et al. |
| 7,410,286 | B2 | 8/2008 | Travis |
| 7,430,358 | B2 | 9/2008 | Qi et al. |
| 7,528,893 | B2 | 5/2009 | Schultz et al. |
| 7,545,429 | B2 | 6/2009 | Travis |
| 7,587,117 | B2 | 9/2009 | Winston et al. |
| 7,614,777 | B2 | 11/2009 | Koganezawa et al. |
| 7,660,047 | B1 | 2/2010 | Travis et al. |
| 7,750,981 | B2 | 7/2010 | Shestak et al. |
| 7,750,982 | B2 | 7/2010 | Nelson et al. |
| 7,944,428 | B2 | 5/2011 | Travis |
| 7,970,246 | B2 | 6/2011 | Travis et al. |
| 7,976,208 | B2 | 7/2011 | Travis |
| 8,016,475 | B2 | 9/2011 | Travis |
| 8,216,405 | B2 | 7/2012 | Emerton et al. |
| 8,325,295 | B2 | 12/2012 | Sugita et al. |
| 8,354,806 | B2 | 1/2013 | Travis et al. |
| 8,477,261 | B2 | 7/2013 | Travis et al. |
| 8,534,901 | B2 | 9/2013 | Panagotacos et al. |
| 8,714,804 | B2 | 5/2014 | Kim et al. |
| 9,519,153 | B2 | 12/2016 | Robinson et al. |
| 10,054,732 | B2 | 8/2018 | Robinson et al. |
| 10,126,575 | B1 * | 11/2018 | Robinson ............ G02F 1/1323 |
| 10,303,030 | B2 * | 5/2019 | Robinson ............ G02F 1/1393 |
| 2003/0137738 | A1 | 7/2003 | Ozawa et al. |
| 2004/0042233 | A1 | 3/2004 | Suzuki et al. |
| 2004/0109303 | A1 | 6/2004 | Olczak |
| 2004/0170011 | A1 | 9/2004 | Kim et al. |
| 2005/0135116 | A1 | 6/2005 | Epstein et al. |
| 2005/0180167 | A1 | 8/2005 | Hoelen et al. |
| 2005/0190326 | A1 * | 9/2005 | Jeon ............ G02F 1/133634 349/117 |
| 2005/0190329 | A1 * | 9/2005 | Okumura ............ G02F 1/1323 349/123 |
| 2005/0190345 | A1 | 9/2005 | Dubin et al. |
| 2005/0237488 | A1 | 10/2005 | Yamasaki et al. |
| 2005/0264717 | A1 | 12/2005 | Chien et al. |
| 2005/0276071 | A1 | 12/2005 | Sasagawa et al. |
| 2006/0139447 | A1 | 6/2006 | Unkrich |
| 2006/0221642 | A1 | 10/2006 | Daiku |
| 2006/0244884 | A1 * | 11/2006 | Jeon ............ G02F 1/133634 349/119 |
| 2006/0269213 | A1 | 11/2006 | Hwang et al. |
| 2006/0291053 | A1 | 12/2006 | Robinson et al. |
| 2006/0291243 | A1 | 12/2006 | Niioka et al. |
| 2007/0025680 | A1 | 2/2007 | Winston et al. |
| 2007/0035964 | A1 | 2/2007 | Olczak |
| 2007/0115551 | A1 | 5/2007 | Spilman et al. |
| 2007/0115552 | A1 | 5/2007 | Robinson et al. |
| 2007/0188667 | A1 | 8/2007 | Schwerdtner |
| 2007/0223252 | A1 | 9/2007 | Lee et al. |
| 2008/0084519 | A1 | 4/2008 | Brigham et al. |
| 2008/0086289 | A1 | 4/2008 | Brott |
| 2008/0225205 | A1 | 9/2008 | Travis |
| 2008/0297459 | A1 | 12/2008 | Sugimoto et al. |
| 2008/0304282 | A1 | 12/2008 | Mi et al. |
| 2008/0316768 | A1 | 12/2008 | Travis |
| 2009/0016057 | A1 | 1/2009 | Rinko |
| 2009/0067156 | A1 | 3/2009 | Bonnett et al. |
| 2009/0140656 | A1 | 6/2009 | Kohashikawa et al. |
| 2009/0160757 | A1 | 6/2009 | Robinson |
| 2009/0174843 | A1 * | 7/2009 | Sakai ............ G02F 1/13471 349/74 |
| 2009/0225380 | A1 | 9/2009 | Schwerdtner et al. |
| 2009/0278936 | A1 | 11/2009 | Pastoor et al. |
| 2010/0053771 | A1 | 3/2010 | Travis et al. |
| 2010/0091254 | A1 | 4/2010 | Travis et al. |
| 2010/0177387 | A1 | 7/2010 | Travis et al. |
| 2010/0188438 | A1 | 7/2010 | Kang |
| 2010/0188602 | A1 | 7/2010 | Feng |
| 2010/0214135 | A1 | 8/2010 | Bathiche et al. |
| 2010/0220260 | A1 | 9/2010 | Sugita et al. |
| 2010/0231498 | A1 | 9/2010 | Large et al. |
| 2010/0277575 | A1 | 11/2010 | Ismael et al. |
| 2010/0278480 | A1 | 11/2010 | Vasylyev |
| 2010/0300608 | A1 | 12/2010 | Emerton et al. |
| 2011/0032483 | A1 | 2/2011 | Hruska et al. |
| 2011/0043142 | A1 | 2/2011 | Travis et al. |
| 2011/0044056 | A1 | 2/2011 | Travis et al. |
| 2011/0187293 | A1 | 8/2011 | Travis |
| 2011/0188120 | A1 | 8/2011 | Tabirian et al. |
| 2011/0216266 | A1 | 9/2011 | Travis |
| 2011/0242298 | A1 | 10/2011 | Bathiche et al. |
| 2011/0255303 | A1 | 10/2011 | Nichol et al. |
| 2011/0285927 | A1 | 11/2011 | Schultz et al. |
| 2011/0310232 | A1 | 12/2011 | Wilson et al. |
| 2012/0002295 | A1 | 1/2012 | Dobschal et al. |
| 2012/0127573 | A1 | 5/2012 | Robinson et al. |
| 2012/0243204 | A1 | 9/2012 | Robinson |
| 2014/0340728 | A1 | 11/2014 | Taheri |
| 2015/0177563 | A1 * | 6/2015 | Cho ............ G02F 1/133536 349/96 |
| 2016/0238869 | A1 | 8/2016 | Osterman et al. |
| 2016/0357046 | A1 | 12/2016 | Choi et al. |
| 2018/0052346 | A1 * | 2/2018 | Sakai ............ G02F 1/1347 |
| 2018/0113334 | A1 * | 4/2018 | Fang ............ G02F 1/13363 |
| 2018/0210243 | A1 * | 7/2018 | Fang ............ G02F 1/137 |
| 2018/0321553 | A1 | 11/2018 | Robinson et al. |
| 2018/0329245 | A1 | 11/2018 | Robinson et al. |
| 2019/0086706 | A1 | 3/2019 | Robinson et al. |
| 2019/0196236 | A1 * | 6/2019 | Chen ............ G02F 1/1323 |

FOREIGN PATENT DOCUMENTS

| | | |
|---|---|---|
| CN | 101364004 A | 2/2009 |
| EP | 0830984 A2 | 3/1998 |
| EP | 0860729 A2 | 8/1998 |

(56) References Cited

FOREIGN PATENT DOCUMENTS

| | | |
|---|---|---|
| EP | 0939273 A1 | 9/1999 |
| EP | 2003394 A2 | 12/2008 |
| JP | H08211334 | 8/1996 |
| JP | H08254617 | 10/1996 |
| JP | H08340556 | 12/1996 |
| JP | 2000200049 A | 7/2000 |
| JP | 2001093321 A | 4/2001 |
| JP | 2002049004 A | 2/2002 |
| JP | 2003215349 A | 7/2003 |
| JP | 2003215705 A | 7/2003 |
| JP | 2004319364 A | 11/2004 |
| JP | 2005135844 A | 5/2005 |
| JP | 2005183030 A | 7/2005 |
| JP | 2005259361 A | 9/2005 |
| JP | 2006004877 A | 1/2006 |
| JP | 2006031941 A | 2/2006 |
| JP | 3968742 B2 | 8/2007 |
| JP | 2007273288 A | 10/2007 |
| JP | 2008204874 A | 9/2008 |
| JP | 2013540083 | 10/2013 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| TW | M537663 U | 3/2017 |
| WO | 1999011074 A1 | 3/1999 |
| WO | 2001061241 A1 | 8/2001 |
| WO | 2011022342 A2 | 2/2011 |

OTHER PUBLICATIONS

AU-2015258258 Australian Office Action of Australian Patent Office dated Jun. 9, 2016.
CA-2817044 Canadian office action dated Jul. 14, 2016.
CN-201180065590.0 Office first action dated Dec. 31, 2014.
CN-201180065590.0 Office fourth action dated Jan. 4, 2017.
CN-201180065590.0 Office second action dated Oct. 21, 2015.
CN-201180065590.0 Office Third action dated Jun. 6, 2016.
CN-201480023023.2 Office first action dated Aug. 12, 2016.
EP-11842021.5 Office Action dated Dec. 17, 2014.
EP-11842021.5 Office Action dated Oct. 2, 2015.
EP-11842021.5 Office Action dated Sep. 2, 2016.
JP-2013540083 Notice of reasons for rejection dated Jun. 30, 2015.
JP-2013540083 Notice of reasons for rejection with translation dated Jun. 21, 2016.
Kalantar, et al. "Backlight Unit With Double Surface Light Emission," J. Soc. Inf. Display, vol. 12, Issue 4, pp. 379-387 (Dec. 2004).
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2013/041548 International search report and written opinion of international searching authority dated Aug. 27, 2013.
PCT/US2013/041619 International search report and written opinion of international searching authority dated Aug. 27, 2013.
PCT/US2013/041655 International search report and written opinion of international searching authority dated Aug. 27, 2013.
PCT/US2013/041683 International search report and written opinion of international searching authority dated Aug. 27, 2013.
PCT/US2013/041697 International search report and written opinion of international searching authority dated Aug. 23, 2013.
PCT/US2013/041703 International search report and written opinion of international searching authority dated Aug. 27, 2013.
PCT/US2013/063125 International search report and written opinion of international searching authority dated Jan. 20, 2014.
PCT/US2013/063133 International search report and written opinion of international searching authority dated Jan. 20, 2014.
PCT/US2013/077288 International search report and written opinion of international searching authority dated Apr. 18, 2014.
PCT/US2014/017779 International search report and written opinion of international searching authority dated May 28, 2014.
RU-2013122560 First office action dated Jan. 22, 2014.
RU-2013122560 Second office action dated Apr. 10, 2015.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Gass, et al. "Privacy LCD Technology for Cellular Phones", Sharp Laboratories of Europe Ltd, Mobile LCD Group, Feb. 2007, pp. 45-49.
Weindorf et al., "Active Circular Polarizer OLED E-Mirror", Proceedings of the Society for Information Display 25th Annual Symposium on Vehicle Displays, Livonia, MI, pp. 225-237, Sep. 25-26, 2018.

* cited by examiner

Transmission

Reflectivity

Transmission

Transmission

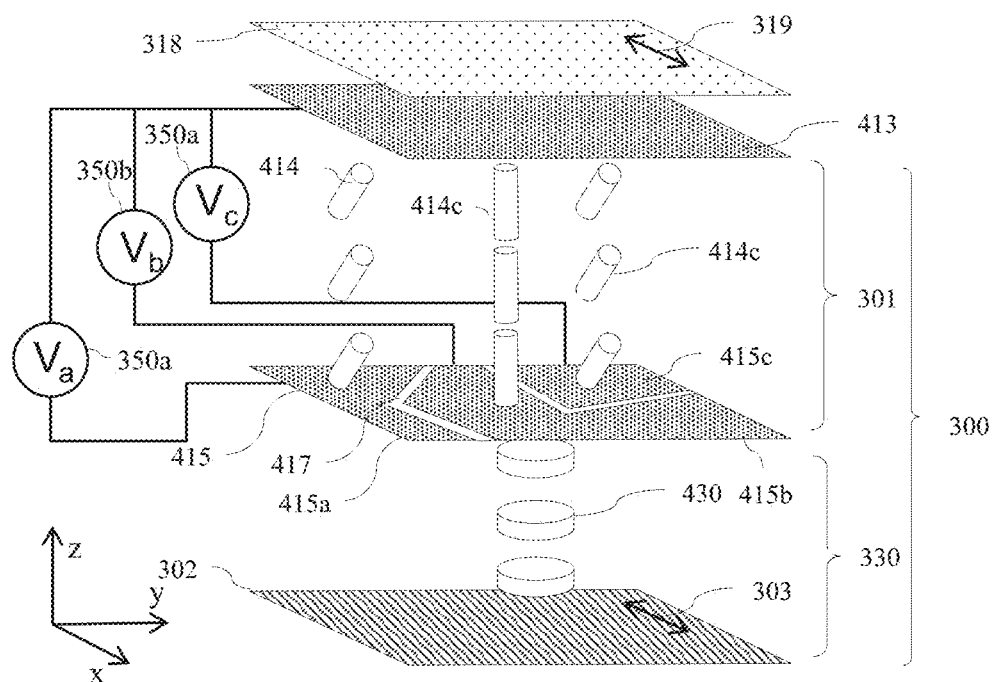
FIG. 26A
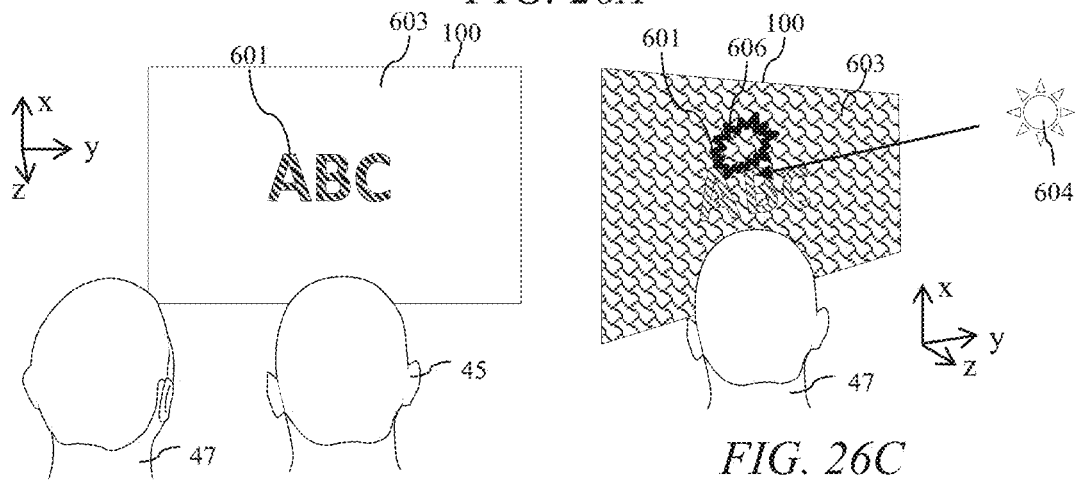
FIG. 26B
FIG. 26C
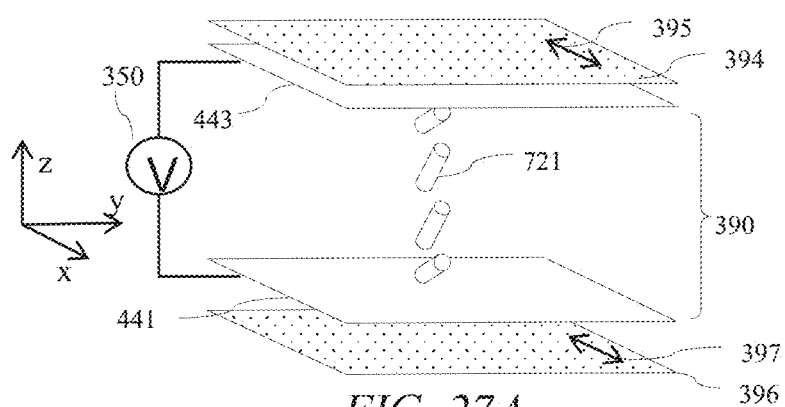
FIG. 27A

REFLECTIVE OPTICAL STACK FOR PRIVACY DISPLAY

TECHNICAL FIELD

This disclosure generally relates to illumination from light modulation devices, and more specifically relates to reflective optical stacks for use in a display including a privacy display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit a high luminance from a display in an on-axis direction with low luminance in off-axis positions, however such films are not switchable, and thus the display is limited to privacy only function.

Switchable privacy displays may be provided by control of the off-axis optical output.

Control may be provided by means of luminance reduction, for example by means of switchable backlights for a liquid crystal display (LCD) spatial light modulator (SLM). Display backlights in general employ waveguides and light sources arranged along at least one input edge of the waveguide. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

Control of off-axis privacy may further be provided by means of contrast reduction, for example by adjusting the liquid crystal bias tilt in an In-Plane-Switching LCD.

BRIEF SUMMARY

According to a first aspect of the present disclosure there is provided a display device for use in ambient illumination comprising: a SLM arranged to output light; wherein the SLM comprises an output polariser arranged on the output side of the SLM, the output polariser being a linear polariser; an additional polariser arranged on the output side of the output polariser, the additional polariser being a linear polariser; a reflective polariser arranged between the output polariser and the additional polariser, the reflective polariser being a linear polariser; and at least one polar control retarder arranged between the reflective polariser and the additional polariser, wherein the at least one polar control retarder is capable of simultaneously introducing no net relative phase shift to orthogonal polarisation components of light passed by the reflective polariser along an axis along a normal to the plane of the at least one polar control retarder and introducing a relative phase shift to orthogonal polarisation components of light passed by the reflective polariser along an axis inclined to a normal to the plane of the at least one polar control retarder.

The at least one polar control retarder may be arranged to introduce no phase shift to polarisation components of light passed by the reflective polariser along an axis along a normal to the plane of the at least one polar control retarder and/or to introduce a phase shift to polarisation components of light passed by the reflective polariser along an axis inclined to a normal to the plane of the at least one polar control retarder.

Advantageously a directional display may be provided which provides high reflectivity and low luminance for off-axis viewing positions; and low reflectivity and high luminance for on-axis viewing positions. Such increased reflectivity and reduced luminance provides enhanced privacy performance including increased visual security level (VSL) for off-axis viewers of the display in an ambiently illuminated environment. A privacy display may be provided with low visibility of images for an off-axis snooper viewing the display in ambient conditions. The on-axis viewer may observe a substantially unmodified display. A low stray light display may be provided with low image visibility for some viewers and high image visibility for other viewers. The display may be used in an automotive vehicle to prevent visibility to passengers or drivers.

The at least one polar control retarder may comprise a switchable liquid crystal (LC) retarder comprising a layer of LC material, wherein the at least one polar control retarder may be arranged, in a switchable state of the switchable LC retarder, simultaneously to introduce no net relative phase shift to orthogonal polarisation components of light passed by the reflective polariser along an axis along a normal to the plane of the at least one polar control retarder and to introduce a net relative phase shift to orthogonal polarisation components of light passed by the reflective polariser along an axis inclined to a normal to the plane of the at least one polar control retarder.

Advantageously a display may be switched between a privacy or low stray mode with high reflectivity and low luminance to a snooper; and a wide viewing angle mode with increased luminance and reduced reflectivity for off-axis users achieving high contrast images for multiple display users. The primary user may observe the display with substantially the same high luminance and low reflectivity in both modes of operation.

The at least one polar control retarder may further comprise at least one passive retarder which may be arranged to introduce no net relative phase shift to orthogonal polarisation components of light passed by the reflective polariser along an axis along a normal to the plane of the at least one passive retarder and to introduce a net relative phase shift to orthogonal polarisation components of light passed by the reflective polariser along an axis inclined to a normal to the plane of the at least one passive retarder.

Advantageously the polar region over which high VSL may be achieved may be substantially increased in comparison to displays with a switchable LC polar control retarder and no passive polar control retarders.

Where the at least one polar control retarder comprises a switchable LC retarder, in one alternative the switchable LC retarder may comprise two surface alignment layers disposed adjacent to the LC material on opposite sides thereof and each arranged to provide homeotropic alignment at the adjacent LC material. The layer of LC material of the switchable LC retarder may comprise a LC material with a negative dielectric anisotropy. The layer of LC material may have a retardance for light of a wavelength of 550 nm in a range from 500 nm to 1000 nm, preferably in a range from 600 nm to 900 nm and most preferably in a range from 700 nm to 850 nm.

Where two surface alignment layers providing homeotropic alignment are provided, the at least one polar control retarder may further comprise a passive retarder having an optical axis perpendicular to the plane of the retarder, the passive retarder having a retardance for light of a wavelength of 550 nm in a range from −300 nm to −900 nm, preferably in a range from −450 nm to −800 nm and most preferably in a range from −500 nm to −725 nm.

Alternatively, where two surface alignment layers providing homeotropic alignment are provided, the at least one polar control retarder further comprises a pair of passive retarders which have optical axes in the plane of the retarders that are crossed, each passive retarder of the pair of passive retarders having a retardance for light of a wavelength of 550 nm in a range from 300 nm to 800 nm, preferably in a range from 500 nm to 700 nm and most preferably in a range from 550 nm to 675 nm. Advantageously, in this case high transmission and low reflectivity may be provided over a wide field of view with no voltage applied. Further a narrow field of view may be provided in a lateral direction in a privacy mode of operation, with low power consumption.

Where the at least one polar control retarder comprises a switchable LC retarder, in another alternative the switchable LC retarder may comprise two surface alignment layers disposed adjacent to the layer of LC material and on opposite sides thereof and each arranged to provide homogeneous alignment in the adjacent LC material. Advantageously in comparison to homeotropic alignment on opposite sides of the LC, increased resilience to the visibility of flow of LC material during applied pressure may be achieved.

The layer of LC material of the switchable LC retarder may comprise a LC material with a positive dielectric anisotropy. The layer of LC material may have a retardance for light of a wavelength of 550 nm in a range from 500 nm to 900 nm, preferably in a range from 600 nm to 850 nm and most preferably in a range from 700 nm to 800 nm.

Where two surface alignment layers providing homogeneous alignment are provided, the at least one polar control retarder may further comprise a passive retarder having an optical axis perpendicular to the plane of the retarder, the passive retarder having a retardance for light of a wavelength of 550 nm in a range from −300 nm to −700 nm, preferably in a range from −350 nm to −600 nm and most preferably in a range from −400 nm to −500 nm.

Alternatively, where the two surface alignment layers providing homogeneous alignment are provided, the at least one polar control retarder may further comprise a pair of passive retarders which have optical axes in the plane of the retarders that are crossed, each passive retarder of the pair of passive retarders having a retardance for light of a wavelength of 550 nm in a range from 300 nm to 800 nm, preferably in a range from 350 nm to 650 nm and most preferably in a range from 450 nm to 550 nm.

The field of view using a pair of passive retarders which have optical axes in the plane of the retarders that are crossed may have improved reduction of luminance and increase of reflectivity in privacy mode of operation.

Where the at least one polar control retarder comprises a switchable LC retarder, in another alternative the switchable LC retarder may comprise two surface alignment layers disposed adjacent to the layer of LC material and on opposite sides thereof, one of the surface alignment layers being arranged to provide homeotropic alignment in the adjacent LC material and the other of the surface alignment layers being arranged to provide homogeneous alignment in the adjacent LC material.

When the surface alignment layer arranged to provide homogeneous alignment is between the layer of LC material and the polar control retarder, the layer of LC material may have a retardance for light of a wavelength of 550 nm in a range from 700 nm to 2000 nm, preferably in a range from 1000 nm to 1500 nm and most preferably in a range from 1200 nm to 1500 nm.

When the surface alignment layer arranged to provide homogeneous alignment is between the layer of LC material and the polar control retarder, the at least one polar control retarder may further comprise a passive retarder having its optical axis perpendicular to the plane of the retarder, the at least one passive retarder having a retardance for light of a wavelength of 550 nm in a range from −400 nm to −1800 nm, preferably in a range from −700 nm to −1500 nm and most preferably in a range from −900 nm to −1300 nm.

When the surface alignment layer arranged to provide homogeneous alignment is between the layer of LC material and the polar control retarder, the at least one polar control retarder may further comprise a pair of passive retarders which have optical axes in the plane of the retarders that are crossed, each retarder of the pair of retarders having a retardance for light of a wavelength of 550 nm in a range from 400 nm to 1800 nm, preferably in a range from 700 nm to 1500 nm and most preferably in a range from 900 nm to 1300 nm. Advantageously increased resilience to the visibility of flow of LC material during applied pressure may be achieved.

When the surface alignment layer arranged to provide homeotropic alignment is between the layer of LC material and the polar control retarder, the layer of LC material may have a retardance for light of a wavelength of 550 nm in a range from 500 nm to 1800 nm, preferably in a range from 700 nm to 1500 nm and most preferably in a range from 900 nm to 1350 nm.

When the surface alignment layer arranged to provide homeotropic alignment is between the layer of LC material and the polar control retarder, the at least one polar control retarder may further comprise a passive retarder having its optical axis perpendicular to the plane of the retarder, the at least one passive retarder having a retardance for light of a wavelength of 550 nm in a range from −300 nm to −1600 nm, preferably in a range from −500 nm to −1300 nm and most preferably in a range from −700 nm to −1150 nm.

When the surface alignment layer arranged to provide homeotropic alignment is between the layer of LC material and the polar control retarder, the at least one polar control retarder may further comprise a pair of passive retarders which have optical axes in the plane of the retarders that are crossed, each retarder of the pair of retarders having a retardance for light of a wavelength of 550 nm in a range from 400 nm to 1600 nm, preferably in a range from 600 nm to 1400 nm and most preferably in a range from 800 nm to 1300 nm. Advantageously in comparison to homeotropic alignment on opposite sides of the LC, increased resilience to the visibility of flow of LC material during applied pressure may be achieved.

Each alignment layer may have a pretilt having a pretilt direction with a component in the plane of the layer of LC material that is parallel or anti-parallel or orthogonal to the electric vector transmission direction of the reflective polariser. Advantageously high luminance may be achieved for head-on viewing positions.

Each alignment layer may have a pretilt having a pretilt direction with a component in the plane of the layer of LC material that is parallel or anti-parallel or orthogonal to the electric vector transmission direction of the reflective polariser.

Where the at least one polar control retarder comprises a switchable LC retarder, the at least one passive retarder may further comprise two passive retarders, the switchable LC retarder being provided between the two passive retarders. The display device may further comprise a transmissive electrode and LC surface alignment layer formed on a side of each of the two passive retarders adjacent the switchable LC retarder. The display device may further comprise first and second substrates between which the switchable LC retarder is provided, the first and second substrates each comprising one of the two passive retarders. The two passive retarders may each comprise a passive retarder having an optical axis perpendicular to the plane of the retarder with a total retardance for light of a wavelength of 550 nm in a range from −300 nm to −700 nm, preferably in a range from −350 nm to −600 nm and most preferably in a range from −400 nm to −500 nm. Each of the two passive retarders may have an optical axis in the plane of the passive retarder, wherein the optical axes are crossed, and each passive retarder of the pair of passive retarders having a retardance for light of a wavelength of 550 nm in a range from 150 nm to 800 nm, preferably in a range from 200 nm to 700 nm and most preferably in a range from 250 nm to 600 nm. Advantageously thickness, cost and complexity may be reduced.

The switchable LC retarder may further comprise transmissive electrodes arranged to apply a voltage for controlling the layer of LC material. The transmissive electrodes may be on opposite sides of the layer of LC material. The display device may further comprise a control system arranged to control the voltage applied across the electrodes of the switchable LC retarder. Advantageously the display may be controlled to switch between privacy and public modes of operation.

The electrodes may be patterned to provide at least two pattern regions. Advantageously a camouflage pattern may be applied in privacy mode for luminance and reflectivity, and head-on luminance and reflectivity may be substantially unmodified.

The at least one polar control retarder may comprise at least one passive retarder which is arranged to introduce no net relative phase shift to orthogonal polarisation components of light passed by the reflective polariser along an axis along a normal to the plane of the at least one passive retarder and to introduce a net relative phase shift to orthogonal polarisation components of light passed by the reflective polariser along an axis inclined to a normal to the plane of the at least one passive retarder. Advantageously thickness and cost may be reduced and efficiency may be increased if no switchable LC polar control retarder is provided.

The at least one polar control retarder may comprise at least one passive retarder. The at least one passive retarder may comprise at least two passive retarders with at least two different orientations of optical axes. Advantageously a low cost privacy display and low stray light display may be provided.

In one alternative, the at least one passive retarder may comprise a retarder having an optical axis perpendicular to the plane of the retarder. Advantageously thickness may be reduced.

In another alternative, the at least one passive retarder may comprise a pair of passive retarders which have optical axes in the plane of the retarders that are crossed. Advantageously the cost of the passive retarder may be reduced and high uniformity stretched films used for the passive retarder.

The pair of retarders may have optical axes that extend at 45° and at 135°, respectively, with respect to an electric vector transmission direction of the output polariser.

The display device may further comprise an additional pair of passive retarders disposed between the first-mentioned pair of passive retarders and which have optical axes in the plane of the passive retarders that are crossed. Advantageously a privacy display or low stray light display may be provided for both landscape and portrait orientations. In an automotive vehicle, reflections from windscreens and other glass surfaces can be reduced.

The additional pair of passive retarders may have optical axes that each extend at 0° and at 90°, respectively, with respect to an electric vector transmission direction that is parallel to the electric vector transmission of the output polariser. Advantageously high VSL may be provided in polar regions with some rotational symmetry.

In another alternative, the at least one passive polar control retarder may comprise a retarder having an optical axis that is oriented with a component perpendicular to the plane of the retarder and a component in the plane of the retarder. The component in the plane of the passive retarder may extend at 0°, with respect to an electric vector transmission direction that is parallel or perpendicular to the electric vector transmission of the display polariser. The at least one passive polar control retarder may further comprise a passive retarder having an optical axis perpendicular to the plane of the passive retarder or a pair of passive retarders which have optical axes in the plane of the passive retarders that are crossed.

Advantageously a privacy display may be provided that achieves reduction of luminance and increase of reflections in the lateral direction with low cost and complexity. A mobile display may be rotated about a horizontal axis while achieving comfortable image visibility for a primary user.

The display device may further comprise at least one further polar control retarder arranged between the output polariser and the reflective polariser. Advantageously further modification of the field-of-view profile may be provided for transmitted light. Luminance may be reduced to a snooper while the primary user may observe a substantially the same luminance.

The display device may further comprise a backlight arranged to output light, wherein the SLM is a transmissive SLM arranged to receive output light from the backlight wherein the backlight provides a luminance at polar angles to the normal to the SLM greater than 45 degrees that is at most 30% of the luminance along the normal to the SLM, preferably at most 20% of the luminance along the normal to the SLM, and most preferably at most 10% of the luminance along the normal to the SLM. Advantageously a high VSL may be provided with low thickness and low cost. Further the VSL may be high in environments with reduced ambient illuminance.

A further additional polariser may be arranged between the further polar control retarder and the reflective polariser. The display device may further comprise at least one further polar control retarder and a further additional polariser, wherein the at least one further polar control retarder is arranged between the first-mentioned additional polariser and the further additional polariser. Advantageously luminance may be reduced to a snooper.

The at least one further polar control retarder may comprise at least one further passive retarder. Advantageously the increase in thickness and cost may be small.

The first-mentioned at least one polar control retarder may comprise a first switchable LC retarder comprising a first layer of LC material, and the at least one further polar control retarder may comprise a second switchable LC retarder comprising a second layer of LC material. The further switchable LC retarder may comprise at least one surface alignment layer disposed adjacent the LC material having a pretilt having a pretilt direction with a component in the plane of the layer of LC material that is aligned parallel or antiparallel or orthogonal to the reflective polariser.

Advantageously the field of view in the public mode of operation may be substantially unmodified while further modification of the field-of-view profile may be provided for transmitted light in the privacy mode of operation. Luminance may be reduced to a snooper while the primary user may observe a substantially the same luminance. The first and second LC retarders may have retardances that are different. Chromatic variations with viewing angle may be reduced.

The electric vector transmission direction of the reflective polariser may be parallel to the electric vector transmission direction of the additional polariser and/or parallel to the electric vector transmission direction of the output polariser.

The layers of LC material of each of the first and second switchable LC retarders may have a retardance for light of a wavelength of 550 nm in a range from 450 nm to 850 nm, preferably in a range from 500 nm to 750 nm and most preferably in a range from 550 nm to 650 nm. VSL at high polar viewing angles may be increased.

The first-mentioned at least one polar control retarder further comprises a pair of passive retarders which have optical axes in the plane of the retarders that are crossed, wherein the first of the pair of passive retarders has an optical axis that extends at 45° and 135°, respectively, with respect to an electric vector transmission direction of the output polariser, and the second of the pair of passive retarders has an optical axis that extends at 135° with respect to the electric vector transmission direction of the output polariser; and the at least one further polar control retarder comprises a further pair of passive retarders which have optical axes in the plane of the retarders that are crossed, wherein the first of the further pair of passive retarders has an optical axis that extends at 45° and 135°, respectively with respect to an electric vector transmission direction of the output polariser; and the optical axes of the one of the first-mentioned pair of passive retarders and the one of the further pair of passive retarders that are closest to each other extend in the same direction.

Advantageously the colour appearance of reflected and transmitted light to an off-axis snooper may be symmetric for positive and negative lateral viewing angles. The minimum VSL may be increased.

Each passive retarder of the first-mentioned pair of passive retarders, and each passive retarder of the further pair of passive retarders, has a retardance for light of a wavelength of 550 nm in a range from 300 nm to 800 nm, preferably in a range from 350 nm to 650 nm and most preferably in a range from 400 nm to 550 nm. VSL at high polar viewing angles may be increased.

The display device may further comprise: a backlight arranged to output light, wherein the SLM is a transmissive SLM arranged to receive output light from the backlight, and the SLM further comprises an input polariser arranged on the input side of the SLM, the input polariser being a linear polariser; and a further additional polariser arranged on the input side of the input polariser, the further additional polariser being a linear polariser; and at least one further polar control retarder arranged between the further additional polariser and the input polariser. Advantageously the thickness increase between the SLM and viewer is reduced. Increased image fidelity may be provided and diffusion may be increased to reduce the appearance of specular front surface reflections to the head-on user. The number of lamination steps may be reduced, and VSL may be increased. A public mode may be provided with wide viewing angle.

The display device may further comprise a control system arranged to control apply a common voltage across the first and second switchable LC retarders, and wherein the LC material of the first LC retarder is different from the LC material of the second LC retarder. Advantageously the cost of the control system may be reduced. Chromatic variations with viewing angle may be reduced.

The reflective polariser and the output polariser may have electric vector transmission directions that are parallel. The reflective polariser and the additional polariser may have electric vector transmission directions that are parallel. The reflective polariser and the additional polariser may have electric vector transmission directions that are not parallel, and the display device may further comprise a rotator retarder arranged between the reflective polariser and the additional polariser, the rotator retarder being arranged to rotate a polarisation direction of polarised light incident thereon between the electric vector transmission directions of the display polariser and the additional polariser. Advantageously high efficiency may be provided. The additional polariser may be aligned with an electric vector transmission direction to transmit light through polarised sunglasses for typical user orientations. SLMs with non-parallel output electric vector transmission directions such as TN-LCD may be used.

According to a second aspect of the present disclosure there is provided a view angle control optical element for application to the output side of a display device for use in ambient illumination comprising a SLM arranged to output light; wherein the SLM comprises an output polariser arranged on the output side of the SLM; the view angle control optical element comprising an additional polariser; a reflective polariser arranged between the output polariser and the additional polariser on application of the view angle control optical element to the display device; and at least one polar control retarder arranged between the reflective polariser and the additional polariser, wherein the at least one polar control retarder is capable of simultaneously introducing no net relative phase shift to orthogonal polarisation components of light passed by the reflective polariser along an axis along a normal to the plane of the at least one polar control retarder and introducing a relative phase shift to orthogonal polarisation components of light passed by the reflective polariser along an axis inclined to a normal to the plane of the at least one polar control retarder.

Advantageously an after-market element may be attached to displays by display users. The element does not require complex alignment. Moiré beating between the element and the pixels of the display is not present and selection of the component with regards to pixel pitch is not required.

Inventory cost is reduced. Alternatively, the view angle control optical element may be conveniently factory fitted into display modules.

The various features and alternatives set out above with respect to the first aspect of the present disclosure may similarly be applied to the second aspect of the present disclosure.

According to a third aspect of the present disclosure there is provided a display device comprising: a SLM; a display polariser arranged on at least one side of the SLM, the display polariser being a linear polariser; and a first additional polariser arranged on the same side of the SLM as one of the at least one display polarisers, the first additional polariser being a linear polariser; and first plural polar control retarders arranged between the first additional polariser and the one of the at least one display polarisers; a further additional polariser arranged on the same side of the SLM as said one of the at least one display polarisers, outside the first additional polariser, the further additional polariser being a linear polariser; and a further plural polar control retarders arranged between the further first additional polariser and the one of the at least one display polarisers further additional polariser; wherein the first-mentioned plural polar control retarders comprise a pair of passive retarders which have optical axes in the plane of the retarders that are crossed, wherein the first of the pair of passive retarders has an optical axis that extends at 45° with respect to an electric vector transmission direction of the output polariser, and the second of the pair of passive retarders has an optical axis that extends at 135° with respect to the electric vector transmission direction of the display polariser that is an output polariser and extend at 45° and 135°, respectively, with respect to an electric vector transmission direction of the output polariser, and wherein the further plural polar control retarders comprise a further pair of passive retarders which have optical axes in the plane of the retarders that are crossed, wherein the first of the further pair of passive retarders has an optical axis that extends at 135° with respect to an electric vector transmission direction of the output polariser, and the second of the further pair of passive retarders has an optical axis that extends at 45° with respect to the electric vector transmission direction of the display polariser that is the output polariser and extend at 45° and 135°, respectively with respect to an electric vector transmission direction of the output polariser, and the optical axes of the one of the first pair of passive polar control retarders and the one of the further pair of passive polar control retarders that are closest to each other extend in the same direction.

Advantageously a switchable privacy display may be provided with high image visibility over a wide field of view in a public mode of operation. A wide angle backlight may be provided, with reduced cost and higher ruggedness in comparison to collimated backlights. In a privacy mode of operation, high VSLs may be achieved over a wide field of view in which an off-axis snooper may be positioned, with low display reflectivity. The retarders and additional polarisers may be arranged between the backlight and the SLM so that diffusers with surface roughness may be arranged on the front surface of the display to minimise the visibility of frontal reflections while achieving high pixel fidelity. Chromaticity and luminance roll-offs may be symmetric.

According to a fourth aspect of the present disclosure there is provided a transmissive SLM arranged to receive output light from the backlight; an input polariser arranged on the input side of the SLM and an output polariser arranged on the output side of the SLM, the input polariser and the output polariser being linear polarisers; a first additional polariser arranged on the output side of output polariser, the first additional polariser being a linear polariser; and first polar control retarders arranged between the first additional polariser and the output polariser; a further additional polariser arranged between the backlight and input polariser, the further additional polariser being a linear polariser; and further polar control retarders arranged between the first additional polariser and the input polariser; wherein the first polar control retarders comprise a pair of passive retarders which have optical axes in the plane of the retarders that are crossed and extend at 45° and 135°, respectively, with respect to an electric vector transmission direction of the output polariser, the further polar control retarders comprise a further pair of passive retarders which have optical axes in the plane of the retarders that are crossed and extend at 45° and 135°, respectively with respect to an electric vector transmission direction of the output polariser, and the optical axes of the one of the first pair of passive polar control retarders and the one of the further pair of passive polar control retarders that are closest to each other extend in the same direction.

Advantageously a switchable privacy display may be provided with high image visibility over a wide field of view in a public mode of operation. A wide angle backlight may be provided, with reduced cost and higher ruggedness in comparison to collimated backlights. In a privacy mode of operation, high VSLs may be achieved over a wide field of view in which an off-axis snooper may be positioned, with low display reflectivity. Some of the retarders and additional polarisers may be arranged between the backlight and the SLM so that diffusers with surface roughness may be arranged on the front surface of the display to minimise the visibility of frontal reflections while achieving high pixel fidelity and high image contrast. Chromaticity and luminance roll-offs may be symmetric. Scatter from the SLM may not impact the light that transmits through one of the retarders and the additional polariser so that VSL may be increased.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 26A is a diagram illustrating in perspective side view an arrangement of a switchable retarder in a privacy mode comprising a negative C-plate passive retarder and homeotropically aligned switchable LC retarder further comprising a patterned electrode layer;

FIG. 26B is a diagram illustrating in perspective front view illumination of a primary viewer and a snooper by a camouflaged luminance controlled privacy display;

FIG. 26C is a diagram illustrating in perspective side view illumination of a snooper by a camouflaged luminance controlled privacy display;

FIG. 27A is a diagram illustrating in perspective side view an arrangement of a homogeneously aligned switchable LC retarder;

FIG. 32C is a graph illustrating an iso-luminance field-of-view polar plot for the display apparatus of FIG. 32A;

FIG. 33A is a diagram illustrating in perspective view illumination of a retarder layer by off-axis light:

FIG. 33B is a diagram illustrating in perspective view illumination of a retarder layer by off-axis light of a first linear polarization state at 0 degrees:

FIG. 33C is a diagram illustrating in perspective view illumination of a retarder layer by off-axis light of a first linear polarization state at 90 degrees;

FIG. 33D is a diagram illustrating in perspective view illumination of a retarder layer by off-axis light of a first linear polarization state at 45 degrees:

FIG. 34A is a diagram illustrating in perspective view illumination of a C-plate retarder by off-axis polarised light with a positive elevation:

FIG. 34B is a diagram illustrating in perspective view illumination of a C-plate retarder by off-axis polarised light with a negative lateral angle;

FIG. 34C is a diagram illustrating in perspective view illumination of a C-plate retarder by off-axis polarised light with a positive elevation and negative lateral angle;

FIG. 34D is a diagram illustrating in perspective view illumination of a C-plate retarder by off-axis polarised light with a positive elevation and positive lateral angle;

FIG. 34E is a graph illustrating the variation of output transmission with polar direction for transmitted light rays in FIGS. 34A-D;

FIG. 35A is a diagram illustrating in perspective view illumination of crossed A-plate retarder layers by off-axis polarised light with a positive elevation:

FIG. 35B is a diagram illustrating in perspective view illumination of crossed A-plate retarder layers by off-axis polarised light with a negative lateral angle;

Figure 35A:
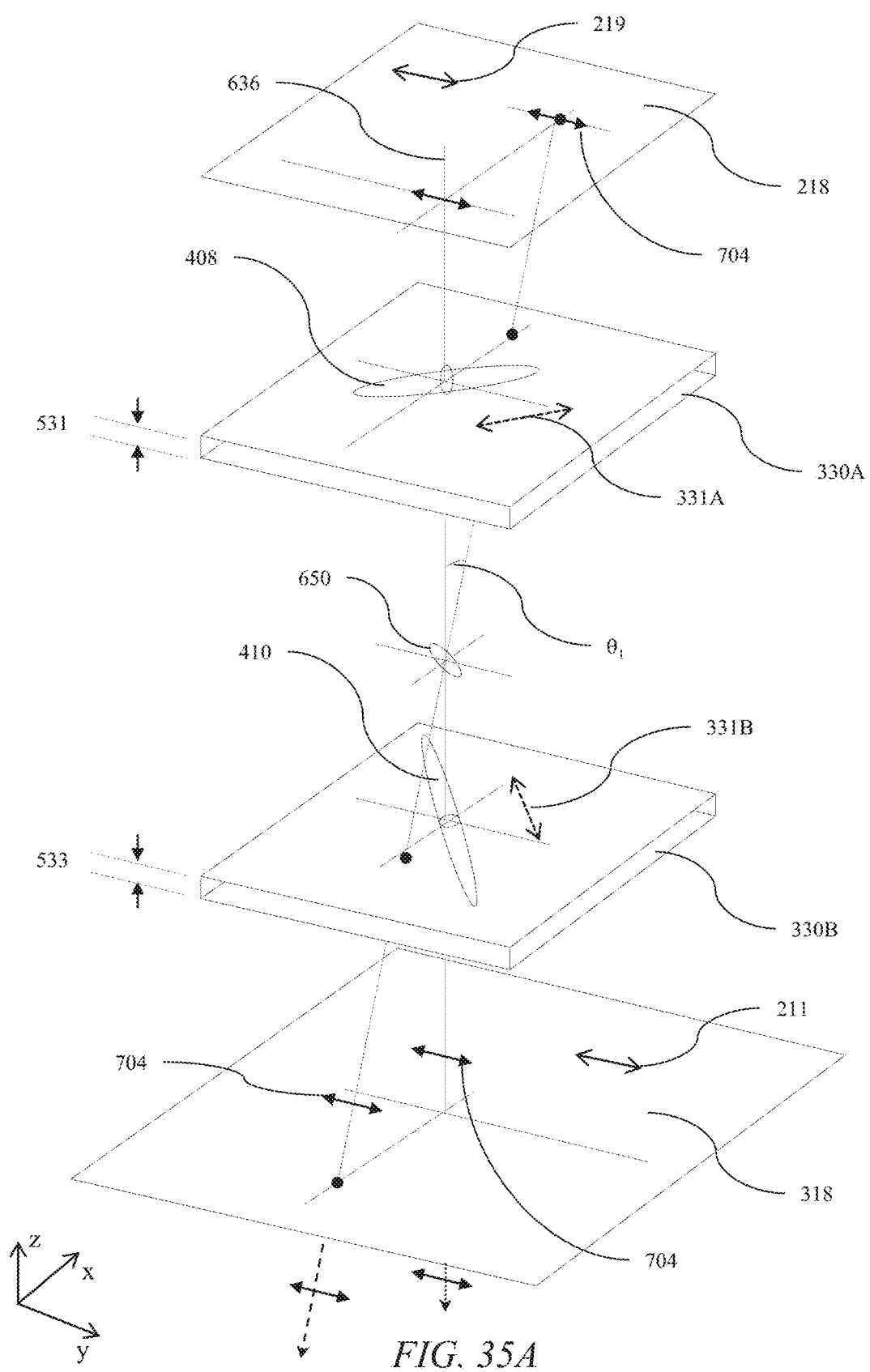
Figure 35B:
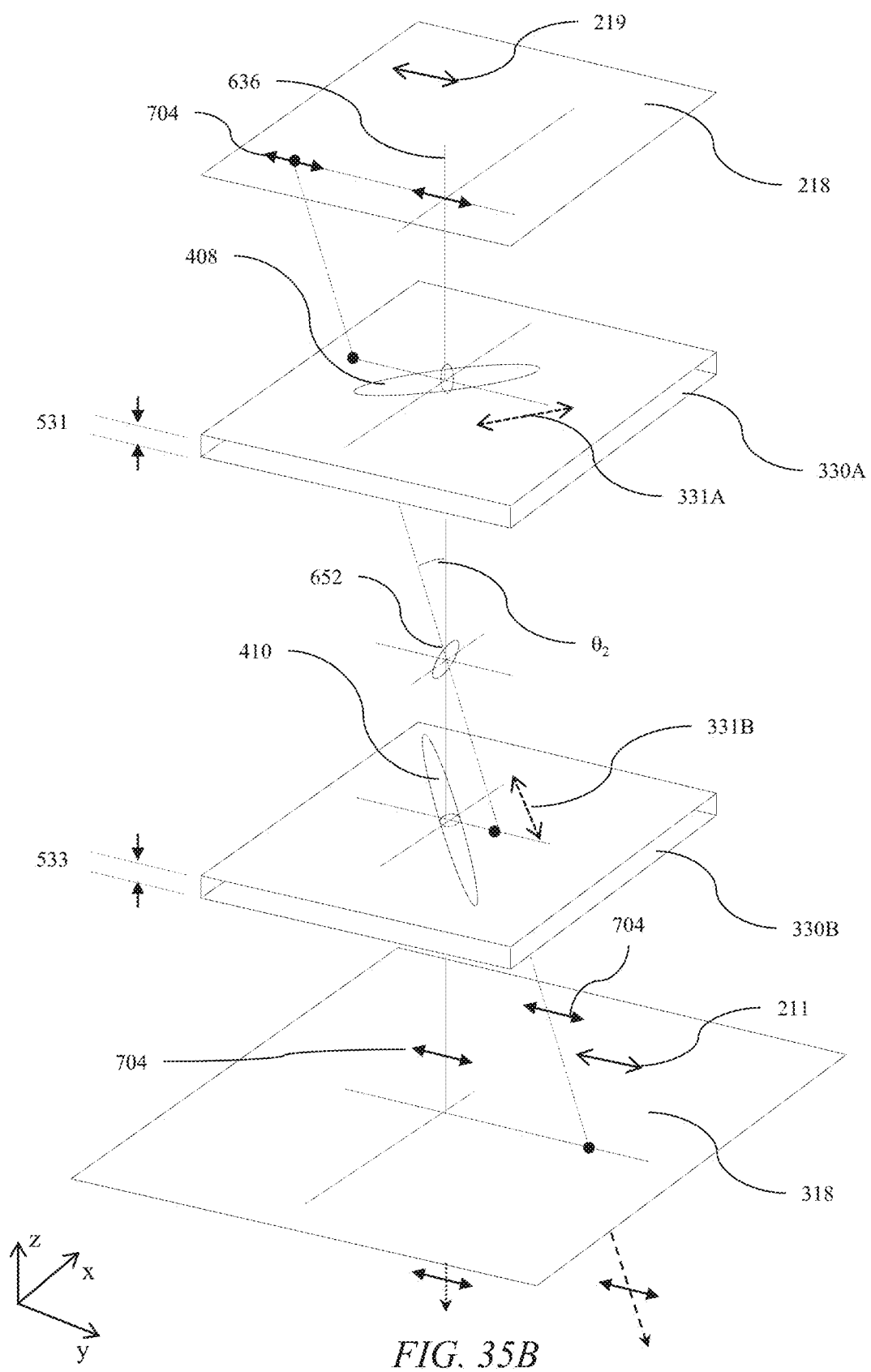
Figure 35C:
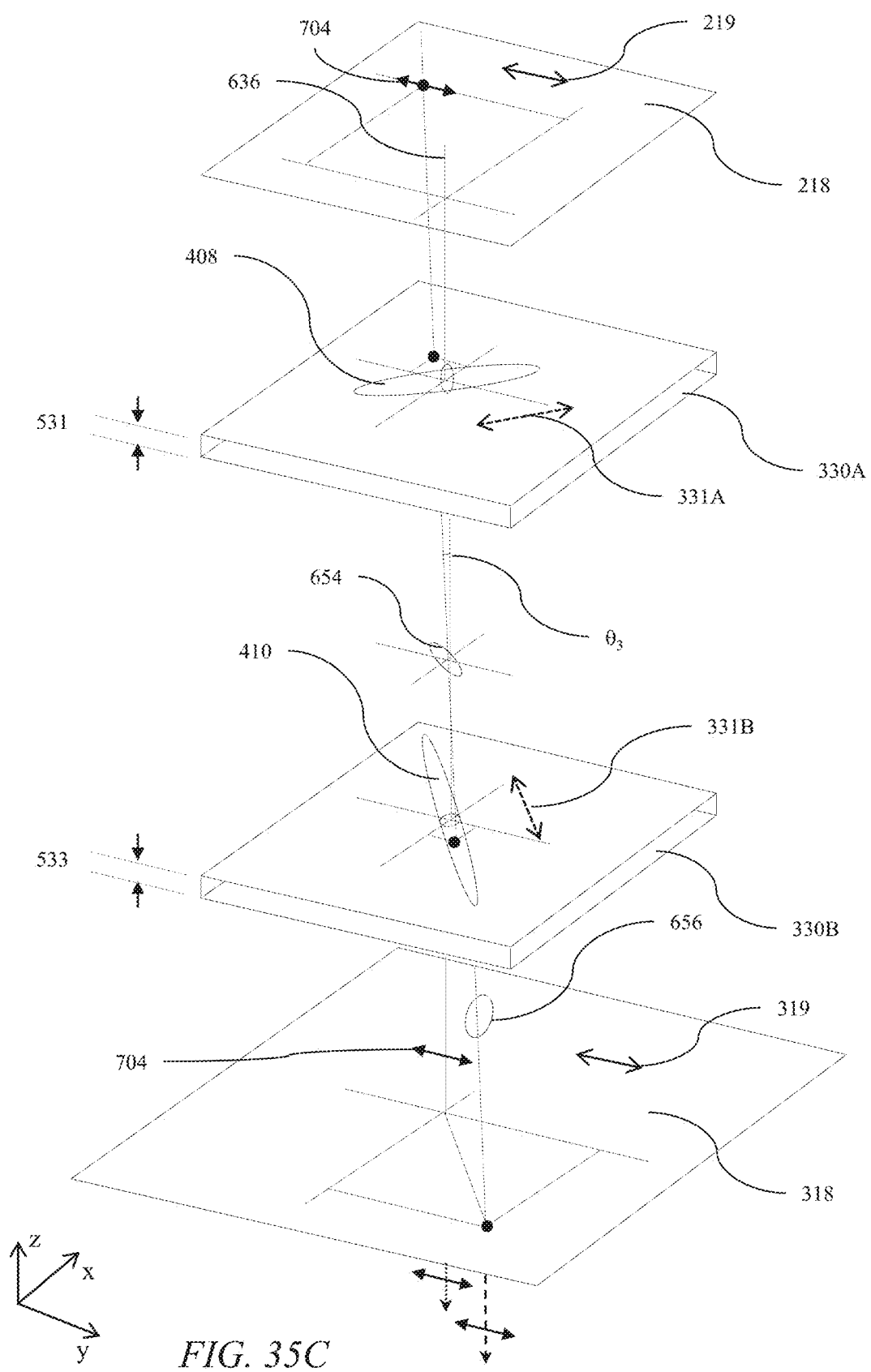
Figure 35D:
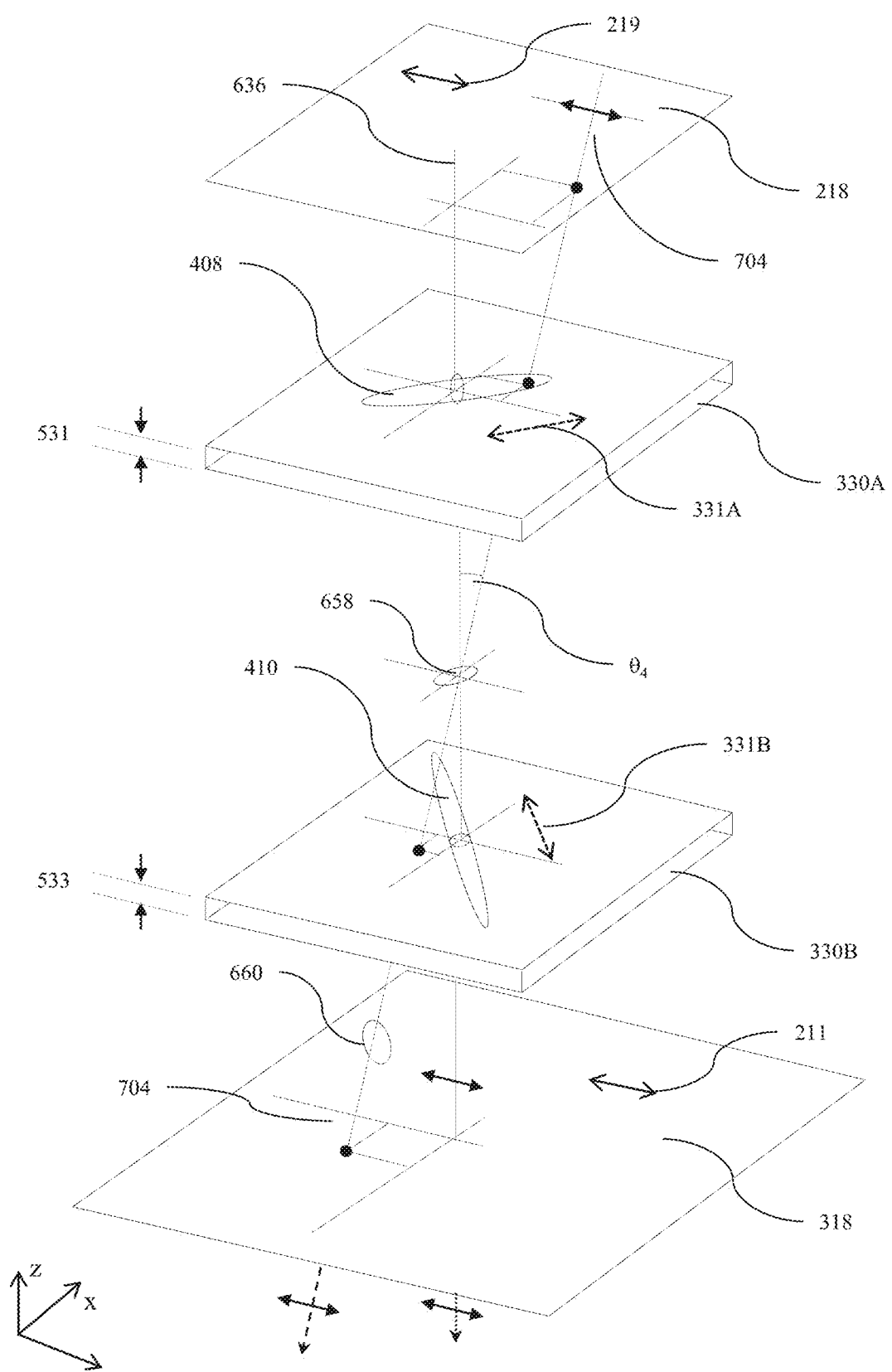
Figure 35E:
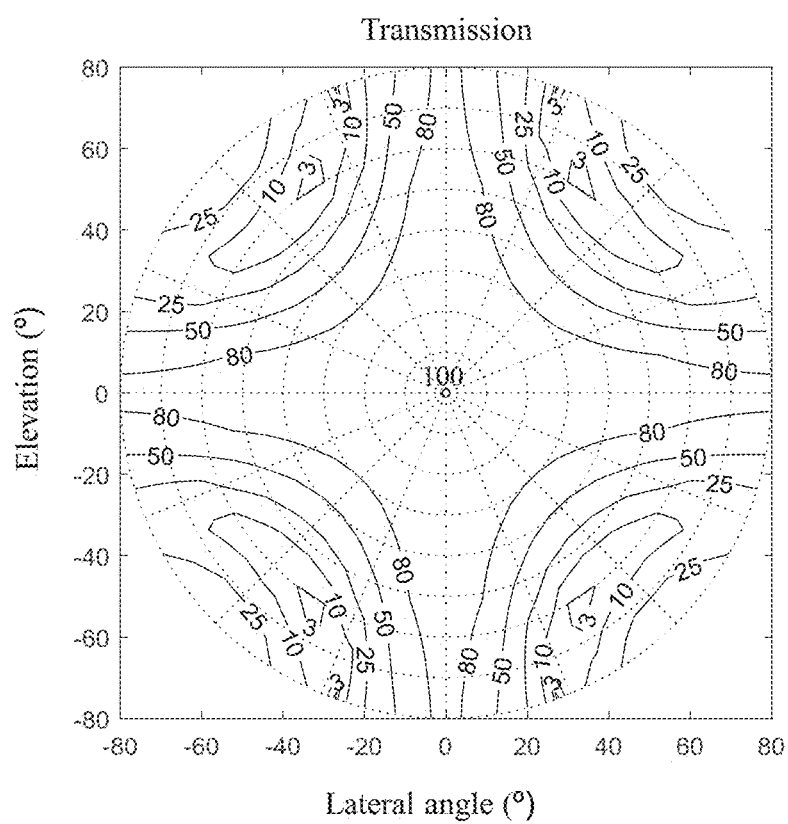

FIG. 35C is a diagram illustrating in perspective view illumination of crossed A-plate retarder layers by off-axis polarised light with a positive elevation and negative lateral angle;

FIG. 35D is a diagram illustrating in perspective view illumination of crossed A-plate retarder layers by off-axis polarised light with a positive elevation and positive lateral angle; and FIG. 35E is a graph illustrating the variation of output transmission with polar direction for transmitted light rays in FIGS. 35A-D.

DETAILED DESCRIPTION

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a relative phase shift between two orthogonal polarization components of the light wave incident thereon and is characterized by the amount of relative phase, $\Gamma$, that it imparts on the two polarization components. In some contexts, the term "phase shift" is used without the word "relative" but still meaning relative phase shift. The relative phase shift is related to the birefringence $\Delta n$ and the thickness d of the retarder by:

$$\Gamma = 2 \cdot \pi \cdot \Delta n \cdot d / \lambda_0 \qquad \text{eqn. 1}$$

In eqn. 1, $\Delta n$ is defined as the difference between the extraordinary and the ordinary index of refraction, i.e.

$$\Delta n = n_e - n_o \qquad \text{eqn. 2}$$

For a half-wave retarder, the relationship between d, $\Delta n$, and $\lambda_0$ is chosen so that the phase shift between polarization components is $\Gamma = \pi$. For a quarter-wave retarder, the relationship between d, $\Delta n$, and $\lambda_0$ is chosen so that the phase shift between polarization components is $\Gamma = \pi/2$.

The term half-wave retarder herein typically refers to light propagating normal to the retarder and normal to the spatial light modulator (SLM).

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek. Reflective linear polarisers may further comprise cholesteric reflective materials and a quarter waveplate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive $\Delta n$. A 'negative C-plate' refers to a negatively birefringent C-plate, i.e. a C-plate with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with a retardance $\Delta n \cdot d$ that varies with wavelength $\lambda$ as $$\Delta n \cdot d / \lambda = \kappa \qquad \text{eqn. 3}$$

where $\kappa$ is substantially a constant.

Examples of suitable materials include modified polycarbonates from Teijin Films. Achromatic retarders may be provided in the present embodiments to advantageously minimise color changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable LCDs where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in SLMs typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in equation 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive SLMs may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$\mathrm{VSL} = (Y+R)/(Y-K) \qquad \text{eqn. 4}$$

where VSL is the visual security level, Y is the luminance of the white state of the display at a snooper viewing angle, K is the luminance of the black state of the display at the snooper viewing angle and R is the luminance of reflected light from the display.

Panel contrast ratio is given as:

$$C = Y/K \qquad \text{eqn. 5}$$

For high contrast optical LCD modes, the white state transmission remains substantially constant with viewing angle. In the contrast reducing liquid crystal modes of the present embodiments, white state transmission typically reduces as black state transmission increases such that $$Y + K \sim P \cdot L \qquad \text{eqn. 6}$$

The visual security level may then be further given as:

$$\mathrm{VSL} = \frac{(C + I \cdot \rho/\pi \cdot (C+1)/(P \cdot L))}{(C-1)} \qquad \text{eqn. 7}$$

where off-axis relative luminance, P is typically defined as the percentage of head-on luminance, L at the snooper angle and the display may have image contrast ratio C and the surface reflectivity is $\rho$.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades. VSL increases and a private image is perceived.

For typical liquid crystal displays the panel contrast C is above 100:1 for almost all viewing angles, allowing the visual security level to be approximated to:

$$\mathrm{VSL} = 1 + I \cdot \rho/(\pi \cdot P \cdot L) \qquad \text{eqn. 8}$$

In comparison to privacy displays, desirably wide angle displays are easily observed in standard ambient illuminance conditions. One measure of image visibility is given by the contrast sensitivity such as the Michelson contrast which is given by:

$$M = (I_{max} - I_{min})/(I_{max} + I_{min}) \qquad \text{eqn. 9}$$

and so:

$$M = ((Y+R) - (K+R))/((Y+R) + (K+R)) = (Y-K)/(Y+K+2 \cdot R) \qquad \text{eqn. 10}$$

Thus the visual security level (VSL), is equivalent (but not identical to) 1/M. In the present discussion, for a given off-axis relative luminance, P the wide angle image visibility, W is approximated as $$W = 1/\mathrm{VSL} = 1/(1 + I \cdot \rho/(\pi \cdot P \cdot L)) \qquad \text{eqn. 11}$$

Switchable directional display apparatuses for use in privacy display for example and comprising plural retarders arranged between a display polariser and an additional polariser are described in U.S. Pat. No. 10,126,575 and in U.S. patent application Ser. No. 16/131,419 titled "Optical stack for switchable directional display", filed Sep. 14, 2018, both of which are herein incorporated by reference in their entireties. Directional display apparatuses further comprising reflective polarisers arranged between the display polariser and retarders are described in U.S. Patent Publ. No. 2018-0329245, which is herein incorporated by reference in its entirety. Directional display polarisers comprising passive retarders arranged between a display polariser and an additional polariser are described in U.S. Patent Publ. No. 2018-0321553, which is herein incorporated by reference in its entirety.

The structure and operation of various switchable display devices will now be described. In this description, common elements have common reference numerals. It is noted that the disclosure relating to any element applies to each device in which the same or corresponding element is provided. Accordingly, for brevity such disclosure is not repeated.

Figure 1A:
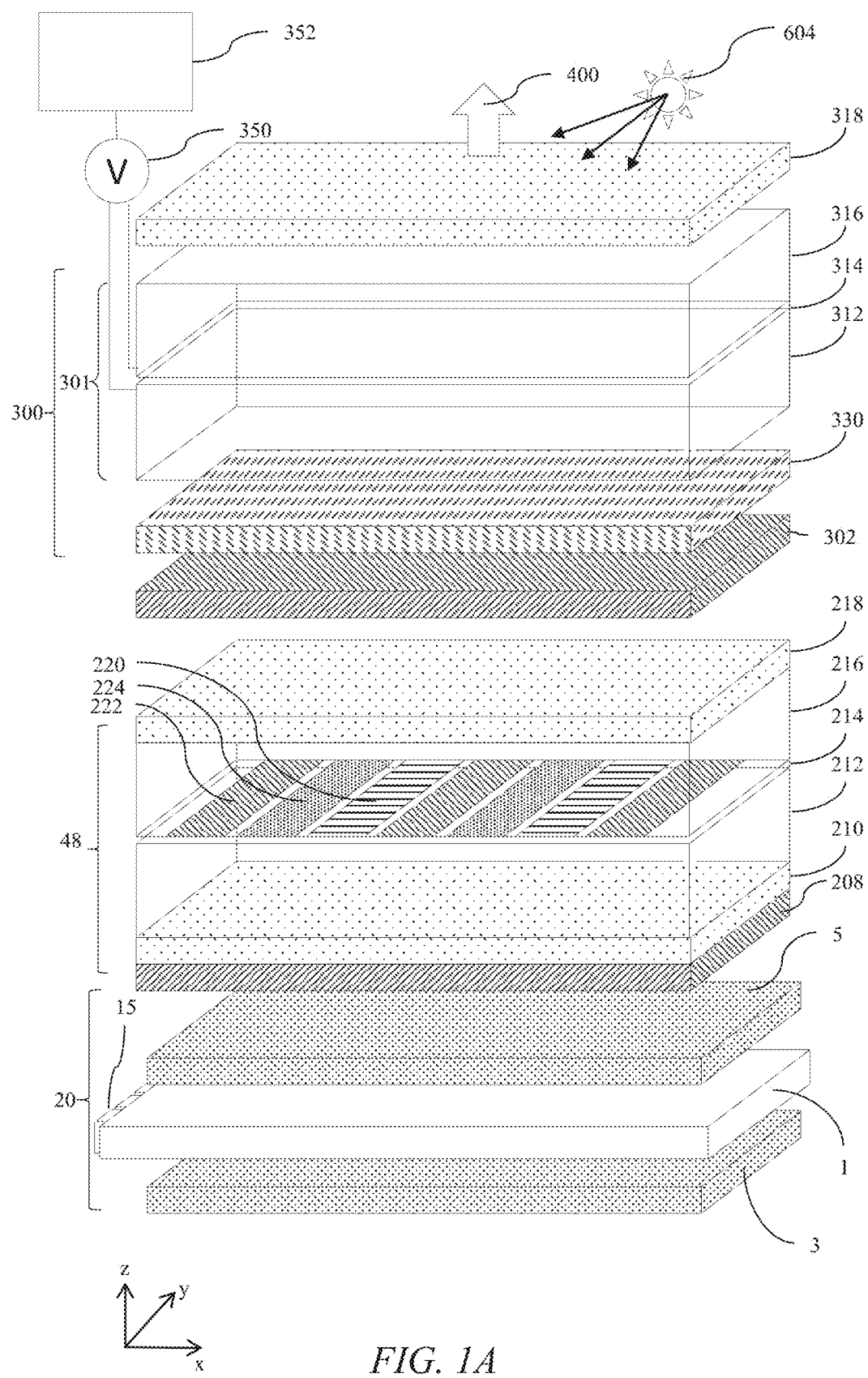
FIG. 1A is a diagram illustrating in side perspective view a switchable privacy display for use in ambient illumination comprising a transmissive SLM, reflective polariser and compensated switchable retarder.
Figure 1B:
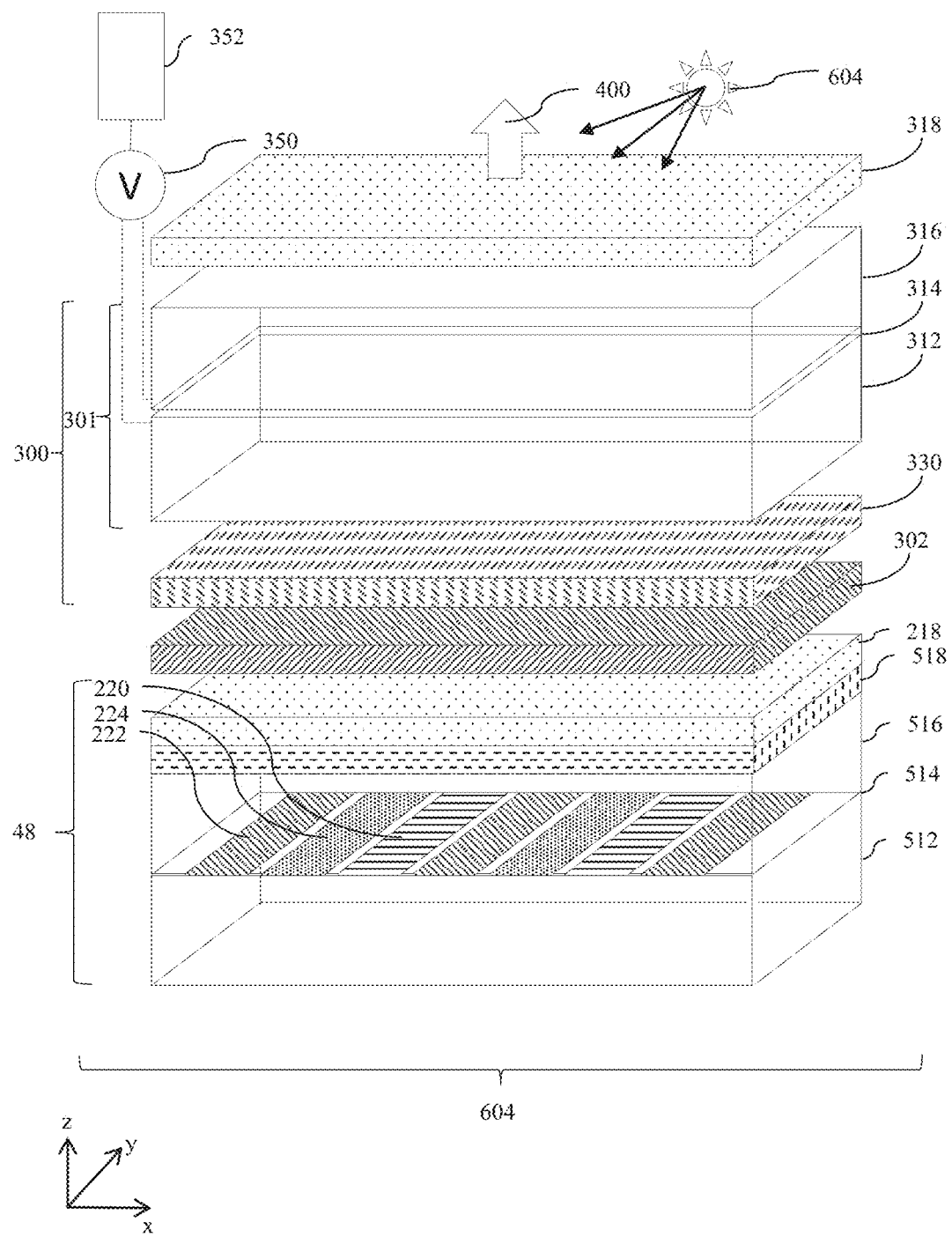
FIG. 1B is a diagram illustrating in side perspective view a switchable privacy display for use in ambient illumination comprising an emissive SLM and compensated switchable retarder.
Figure 2A:
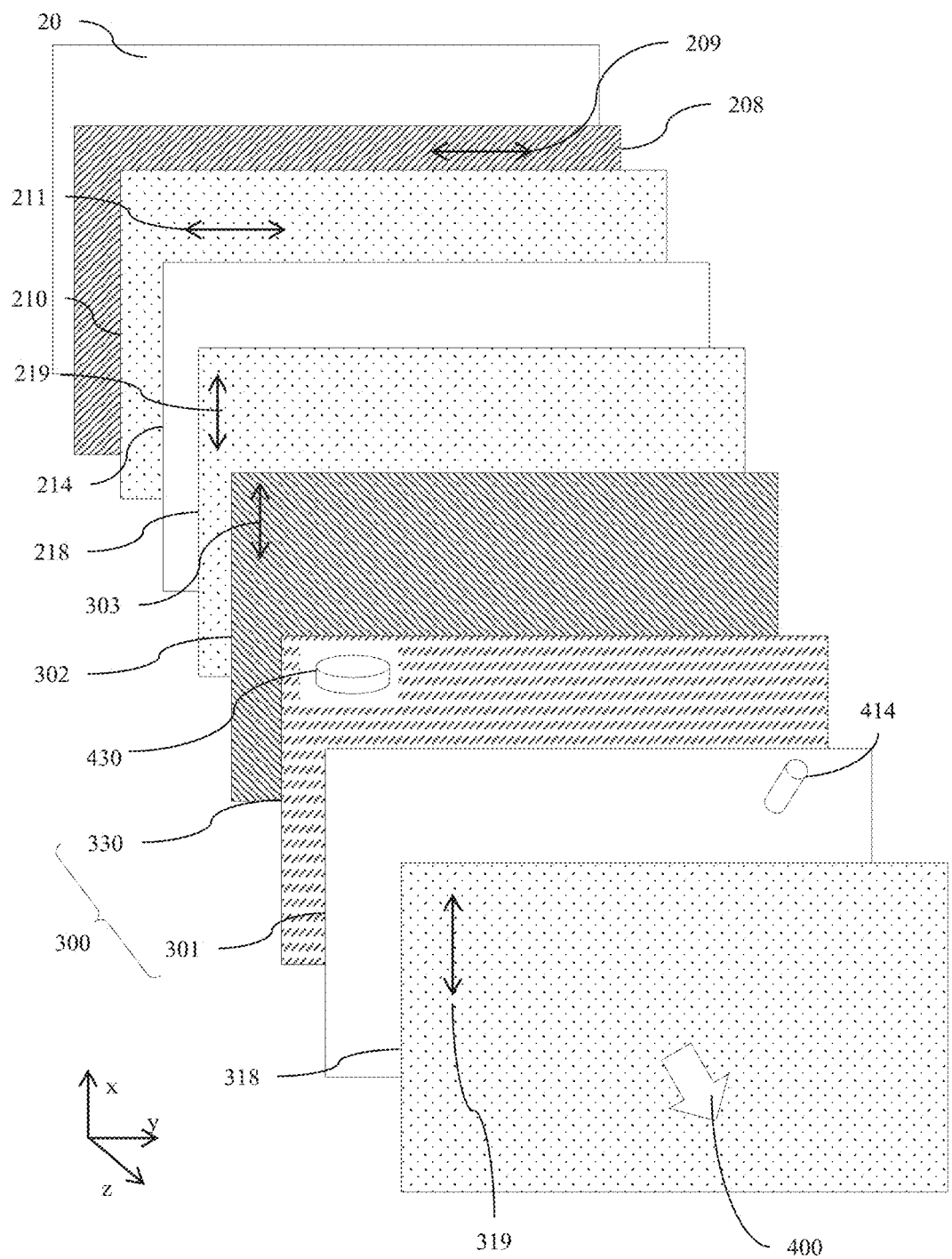
FIG. 2A is a diagram illustrating in front view alignment of optical layers in the optical stack of FIG. 1A.

FIG. 1A is a schematic diagram illustrating in side perspective view an optical stack of a display device for use in ambient illumination; FIG. 1B is a schematic diagram illustrating in side perspective view a switchable privacy display for use in ambient illumination comprising an emissive spatial light modulator (SLM) and compensated switchable retarder; and FIG. 2A is a schematic diagram illustrating in front view alignment of optical layers in the optical stack of FIG. 1.

A display device 100 for use in ambient illumination 604 comprises: a SLM 48 arranged to output light 400; wherein the SLM 48 comprises an output polariser 218 arranged on the output side of the SLM 48, the output polariser 218 being a linear polariser; an additional polariser 318 arranged on the output side of the output polariser 218, the additional polariser 318 being a linear polariser; and a reflective polariser 302 arranged between the output polariser 218 and the additional polariser 318, the reflective polariser 302 being a linear polariser. Typical polarisers 210, 218, 318 may be polarisers such as dichroic polarisers.

At least one polar control retarder 300 is arranged between the reflective polariser 302 and the additional polariser 318. The electric vector transmission direction 303 of the reflective polariser 302 is parallel to the electric vector transmission direction 319 of the additional polariser 318. The electric vector transmission direction 303 of the reflective polariser 302 is parallel to the electric vector transmission direction 219 of the output polariser 218.

Thus a display device for use in ambient illumination 604 comprises a SLM 48 arranged to output light 400. In the present disclosure, SLM 48 may comprise a liquid crystal display comprising input polariser 210, output polariser 218 with substrates 212, 216, liquid crystal layer 214 and red, green and blue pixels 220, 222, 224. Backlight 20 may be arranged to illuminate the SLM 48 and may comprise input light sources 15, waveguide 1, rear reflector 3 and optical stack 5 comprising diffusers, light turning films and other known optical backlight structures. Asymmetric diffusers, that may comprise asymmetric surface relief features for example, may be provided in the optical stack 5 with increased diffusion in the elevation direction in comparison to the lateral direction may be provided. Advantageously image uniformity may be increased.

The structure and operation of backlights 20 for use in privacy display are further described with reference to FIGS. 30A-32C below. In an illustrative embodiment of FIG. 1A, the luminance at polar angles to the normal to the SLM greater than 45 degrees may be at most 18%.

The display may further comprise a reflective recirculation polariser 208 arranged between the backlight 20 and SLM 48. The reflective recirculation polariser 208 is different to the reflective polariser 302 of the present embodiments. Reflective recirculation polariser 208 provides reflection of polarised light from the backlight that has a polarisation that is orthogonal to the electric vector transmission direction of the dichroic input polariser 210. Reflective recirculation polariser 208 does not reflect ambient light 604 to a snooper.

As illustrated in FIG. 1B, the SLM 48 may alternatively be provided by other display types that provide output light 400 by emission, such as organic LED displays (OLED), with output polariser 218. Output polariser 218 may provide reduction of luminance for light reflected from the OLED pixel plane by means of one of more retarders 518 inserted between the output display polariser 218 and OLED pixel plane. The one or more retarders 518 may be a quarter waveplate and is different to the retarder 330 of the present disclosure.

Thus the SLM 48 comprises an output polariser 218 arranged on the output side of the SLM 48. The output polariser 218 may be arranged to provide high extinction ratio for light from the pixels 220, 222, 224 of the SLM 48 and to prevent back reflections from the reflective polariser 302 towards the pixels 220, 222, 224.

Polar control retarder 300 is arranged between the reflective polariser 302 and the additional polariser 318. In the embodiment of FIGS. 1A-1B, the polar control retarder 300 comprises passive polar control retarder 330 and switchable liquid crystal retarder 301, but in general may be replaced by other configurations of at least one retarder, some examples of which are present in the devices described below.

The at least one polar control retarder 300 is capable of simultaneously introducing no net relative phase shift to orthogonal polarisation components of light passed by the reflective polariser 302 along an axis along a normal to the plane of the at least one polar control retarder 300 and introducing a relative phase shift to orthogonal polarisation components of light passed by the reflective polariser 302 along an axis inclined to a normal to the plane of the at least one polar control retarder 300. The polar control retarder 300 does not affect the luminance of light passing through the reflective polariser 302, the polar control retarder 300 and the additional polariser 318 along an axis along a normal to the plane of the polar control retarder 300 but the polar control retarder 300 does reduce the luminance of light passing therethrough along an axis inclined to a normal to the plane of the polar control retarder 300, at least in one of the switchable states of the switchable retarder 301. The principles leading to this effect are described in greater detail below with reference to FIGS. 33A-35E and arises from the presence or absence of a phase shift introduced by the polar control retarder 300 to light along axes that are angled differently with respect to the liquid crystal material of the polar control retarder 300. A similar effect is achieved in all the devices described below.

Polar control retarder 300 comprises a switchable liquid crystal retarder 301 comprising a layer 314 of liquid crystal material, and substrates 312, 316 arranged between the reflective polariser 302 and the additional polariser 318. Thus at least one polar control retarder 300 comprises a switchable liquid crystal retarder 301 comprising a layer 314 of liquid crystal material 414, wherein the at least one polar control retarder 300 is arranged, in a switchable state of the switchable liquid crystal retarder 301, simultaneously to introduce no net relative phase shift to orthogonal polarisation components of light passed by the reflective polariser 302 along an axis along a normal to the plane of the at least one polar control retarder 300 and to introduce a net relative phase shift to orthogonal polarisation components of light passed by the reflective polariser 302 along an axis inclined to a normal to the plane of the at least one polar control retarder.

As illustrated in FIG. 2A in the case when the SLM 48 is a liquid crystal display, the input electric vector transmission direction 211 at the input polariser 210 provides an input polarisation component that may be transformed by the liquid crystal layer 214 to provide output polarisation component determined by the electric vector transmission direction 219 of the output polariser 218. The electric vector transmission direction of the reflective polariser 302 is parallel to the electric vector transmission direction of the output polariser 218. Further the electric vector transmission direction 303 of the reflective polariser 302 is parallel to the electric vector transmission direction 319 of the additional polariser 318.

The substrates 312, 316 illustrated in FIG. 1A of the switchable liquid crystal retarder 301 comprise electrodes 413, 415 (illustrated in FIG. 3) arranged to provide a voltage across the layer 314 of liquid crystal material 414. Control system 352 is arranged to control the voltage applied by voltage driver 350 across the electrodes of the switchable liquid crystal retarder 301.

Polar control retarder 300 further comprises a passive polar control retarder 330 as will be described further below. The at least one polar control retarder 300 comprises at least one passive retarder 330 which is arranged to introduce no net relative phase shift to orthogonal polarisation components of light passed by the reflective polariser 302 along an axis along a normal to the plane of the at least one passive retarder and to introduce a net relative phase shift to orthogonal polarisation components of light passed by the reflective polariser 302 along an axis inclined to a normal to the plane of the at least one passive retarder.

Passive polar control retarder 330 may comprise retardation layer with a solid birefringent material 430, while switchable liquid crystal retarder 301 may comprise a layer 314 of liquid crystal material 414, as will be described below.

Figure 2B:
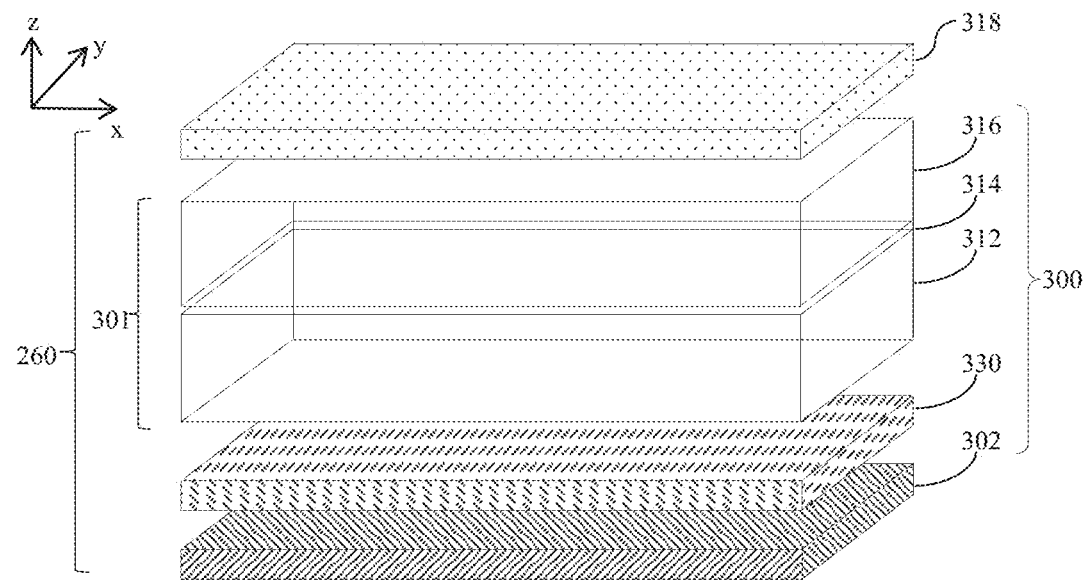
FIG. 2B is a diagram illustrating in side perspective view a view angle control element comprising a reflective polariser, a passive polar control retarder, a switchable LC retarder and an additional polariser.

FIG. 2B is a schematic diagram illustrating in side perspective view a view angle control element 260 comprising a reflective polariser 302; a polar control retarder 300 comprising passive polar control retarder 330, a switchable liquid crystal retarder 301; and an additional polariser. Features of the arrangement of FIG. 2B not discussed in further detail may be assumed to correspond to the features with equivalent reference numerals as discussed above, including any potential variations in the features.

The view angle control optical element 260 is for application to the output side of a display device for use in ambient illumination 604 comprising a SLM 48 arranged to output light; wherein the SLM 48 comprises an output polariser 218 arranged on the output side of the SLM 48; the view angle control optical element 260 comprising an additional polariser 318; a reflective polariser 302 arranged between the output polariser 218 and the additional polariser 318 on application of the view angle control optical element 260 to the display device; and at least one polar control retarder 300 arranged between the reflective polariser 302 and the additional polariser 318; wherein the at least one polar control retarder 300 is capable of simultaneously introducing no net relative phase shift to orthogonal polarisation components of light passed by the reflective polariser 302 along an axis along a normal to the plane of the at least one polar control retarder 300 and introducing a relative phase shift to orthogonal polarisation components of light passed by the reflective polariser 302 along an axis inclined to a normal to the plane of the at least one polar control retarder.

In use, view angle control optical element 260 may be attached by a user or may be factory fitted to a polarised output SLM 48. View angle control optical element 260 may be provided as a flexible film for curved and bent displays. Alternatively the view angle control optical element 260 may be provided on a rigid substrate such as a glass substrate.

Advantageously, an after-market privacy control element and/or stray light control element may be provided that does not require matching to the panel pixel resolution to avoid Moiré artefacts. View angle control optical element 260 may be further provided for factory fitting to SLM 48.

By attaching the view angle control optical element 260 of FIG. 2B to an existing display device, it is possible to form a display device as shown in any of FIGS. 1A-2A.

The arrangement and operation of the polar control retarder 300 comprising a switchable liquid crystal retarder 301 will now be discussed.

Figure 3:
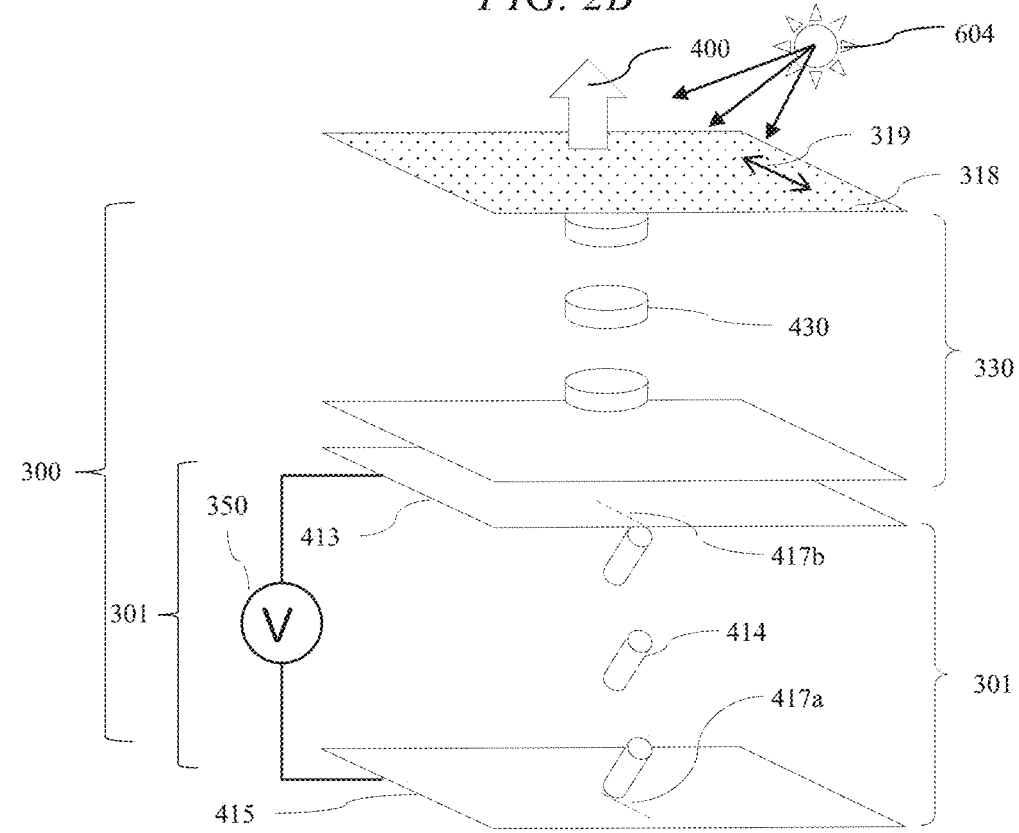
FIG. 3 is a diagram illustrating in perspective side view an arrangement of a switchable LC retarder comprising a passive negative C-plate polar control retarder in a privacy mode.
Figure 3:
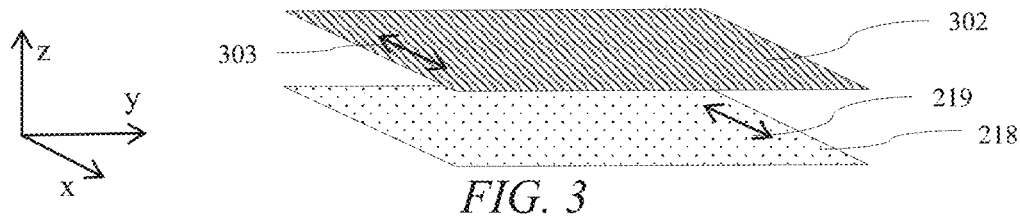

FIG. 3 is a schematic diagram illustrating in perspective side view an arrangement of the polar control retarder 300 in a privacy mode of operation comprising a negative C-plate passive polar control retarder 330 and homeotropically aligned switchable liquid crystal retarder 301 in a privacy mode of operation.

In FIG. 3 and other schematic diagrams below, some layers of the optical stack are omitted for clarity. For example the switchable liquid crystal retarder 301 is shown omitting the substrates 312, 316. Features of the arrangement of FIG. 3 not discussed in further detail may be assumed to correspond to the features with equivalent reference numerals as discussed above, including any potential variations in the features.

The switchable liquid crystal retarder 301 comprises a layer 314 of liquid crystal material 414 with a negative dielectric anisotropy. The passive polar control retarder 330 comprises a negative C-plate having an optical axis perpendicular to the plane of the retarder 330, illustrated schematically by the orientation of the discotic material 430.

The liquid crystal retarder 301 further comprises transmissive electrodes 413, 415 arranged to control the liquid crystal material, the layer of liquid crystal material being switchable by means of adjusting the voltage being applied to the electrodes. The electrodes 413, 415 may be across the layer 314 and are arranged to apply a voltage for controlling the liquid crystal retarder 301. The transmissive electrodes are on opposite sides of the layer of liquid crystal material 414 and may for example by ITO electrodes.

Alignment layers may be formed between electrodes 413, 415 and the liquid crystal material 414 of the layer 314. The orientation of the liquid crystal molecules in the x-y plane is determined by the pretilt direction of the alignment layers so that each alignment layer has a pretilt wherein the pretilt of each alignment layer has a pretilt direction with a component 417a, 417b in the plane of the layer 314 that is parallel or anti-parallel or orthogonal to the electric vector transmission direction 303 of the reflective polariser 302.

Driver 350 provides a voltage V to electrodes 413, 415 across the layer 314 of switchable liquid crystal material 414 such that liquid crystal molecules are inclined at a tilt angle to the vertical, forming an O-plate. The plane of the tilt is determined by the pretilt direction of alignment layers formed on the inner surfaces of substrates 312, 316.

In typical use for switching between a public mode and a privacy mode, the layer of liquid crystal material is switchable between two states, the first state being a public mode so that the display may be used by multiple users, the second state being a privacy mode for use by a primary user with minimal visibility by snoopers. The switching may be by means of a voltage being applied across the electrodes.

In general such a display may be considered having a first wide angle state and a second reduced off-axis luminance state. Such a display may provide a privacy display. In another use or to provide controlled luminance to off-axis observers for example in an automotive environment when a passenger or driver may wish some visibility of the displayed image, without full obscuration, by means of intermediate voltage levels. Stray light may be reduced for night-time operation.

The propagation of polarised light from the output polariser 218 will now be considered for on-axis and off-axis directions.

Figure 4A:
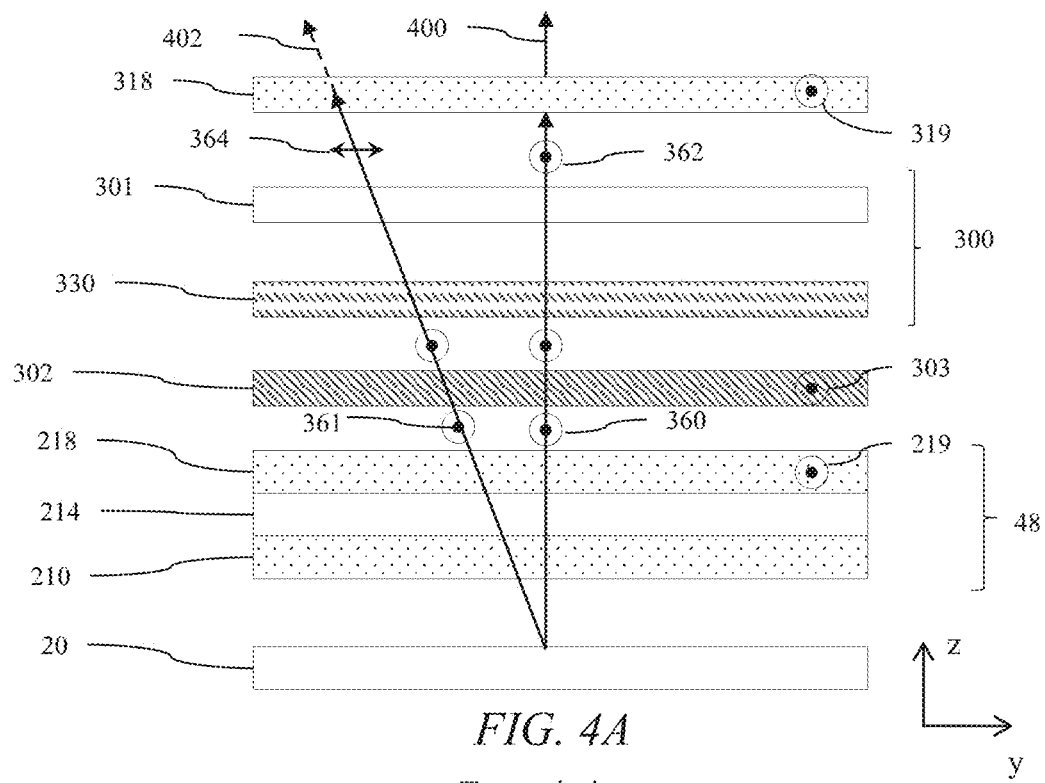
FIG. 4A is a diagram illustrating in side view propagation of output light from a SLM through the optical stack of FIG. 1A in a privacy mode.
Figure 4B:
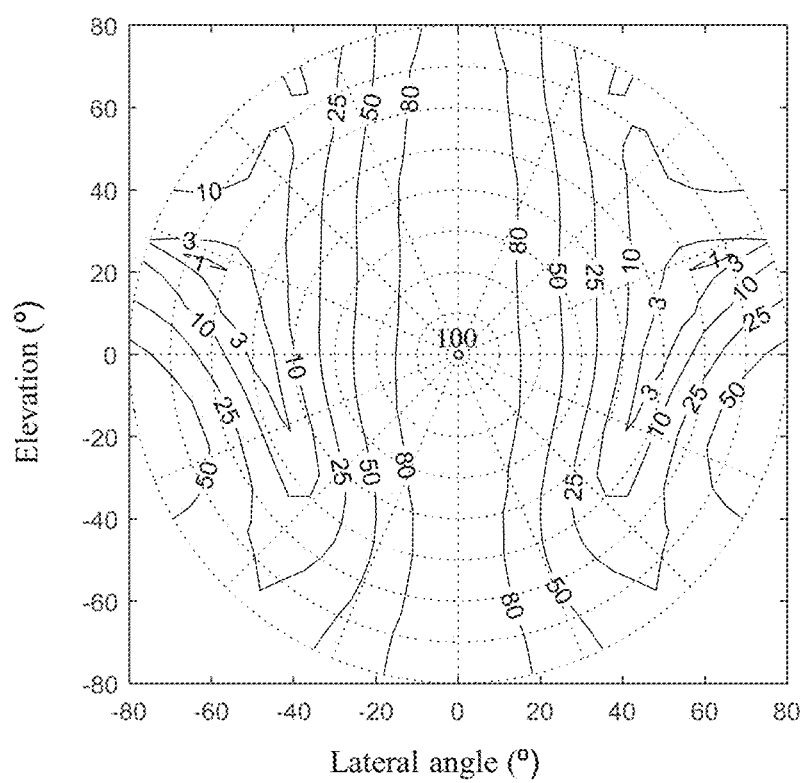
FIG. 4B is a graph illustrating the variation of output luminance with polar direction for the transmitted light rays in FIG. 4A.

FIG. 4A is a schematic diagram illustrating in side view propagation of output light from a SLM through the optical stack of FIG. 1A in a privacy mode of operation and FIG. 4B is a schematic graph illustrating the variation of output luminance with polar direction for the transmitted light rays in FIG. 4A. When the layer 314 of liquid crystal material is in a second state of said two states, the polar control retarder 300 provides no overall transformation of polarisation component 360 to output light rays 400 passing therethrough along an axis perpendicular to the plane of the switchable retarder, but provides an overall transformation of polarisation component 361 to light rays 402 passing therethrough for some polar angles which are at an acute angle to the perpendicular to the plane of the retarders. Features of the arrangement of FIG. 4A not discussed in further detail may be assumed to correspond to the features with equivalent reference numerals as discussed above, including any potential variations in the features.

Polarisation component 360 from the output polariser 218 is transmitted by reflective polariser 302 and incident on retarders 300. On-axis light has a polarisation component 362 that is unmodified from component 360 while off-axis light has a polarisation component 364 that is transformed by the polar control retarder 300. At a minimum, the polarisation component 361 is transformed to a linear polarisation component 364 and absorbed by additional polariser 318. More generally, the polarisation component 361 is transformed to an elliptical polarisation component, that is partially absorbed by additional polariser 318.

Thus in a polar representation of transmission by the polar control retarder 300 and additional polariser 318 in a privacy mode, regions of high transmission and regions of low transmission are provided as illustrated in FIG. 4B.

The polar distribution of light transmission illustrated in FIG. 4B modifies the polar distribution of luminance output of the underlying SLM 48. In the case that the SLM 48 comprises a directional backlight 20 then off-axis luminance may be further be reduced as described above.

Advantageously, a privacy display is provided that has low luminance to an off-axis snooper while maintaining high luminance for an on-axis observer.

The operation of the reflective polariser 302 for light from ambient light source 604 will now be described.

Figure 5A:
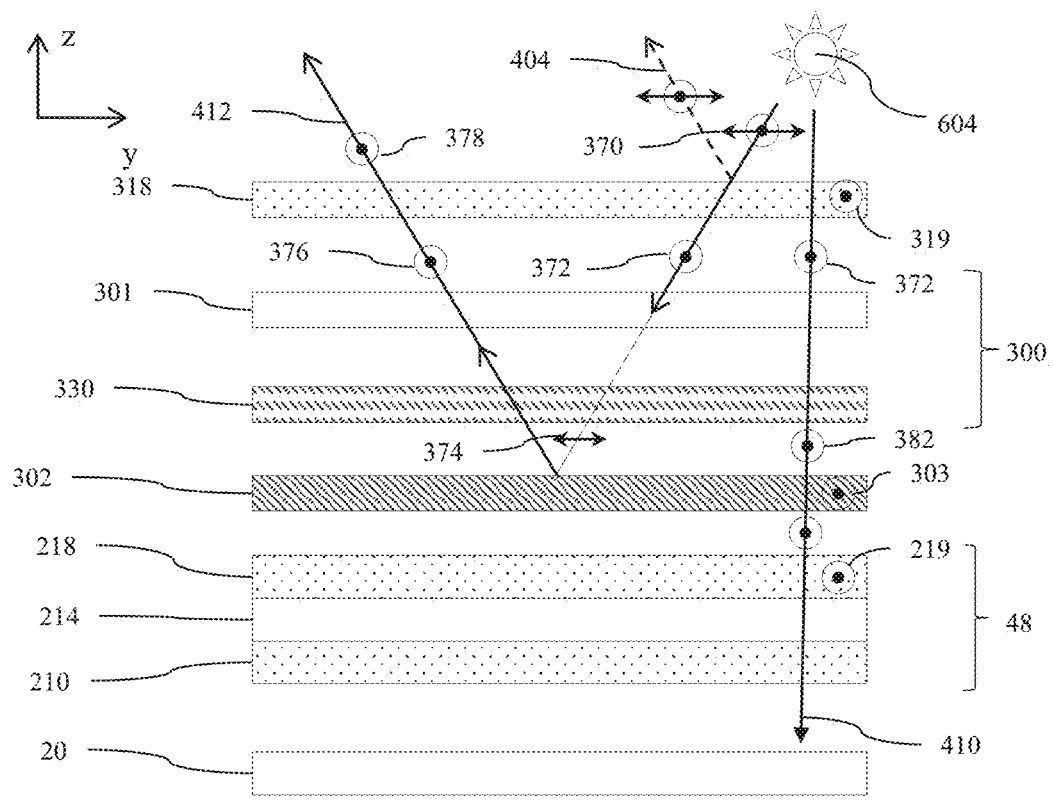
FIG. 5A is a diagram illustrating in top view propagation of ambient illumination light through the optical stack of FIG. 1A in a privacy mode.
Figure 5B:
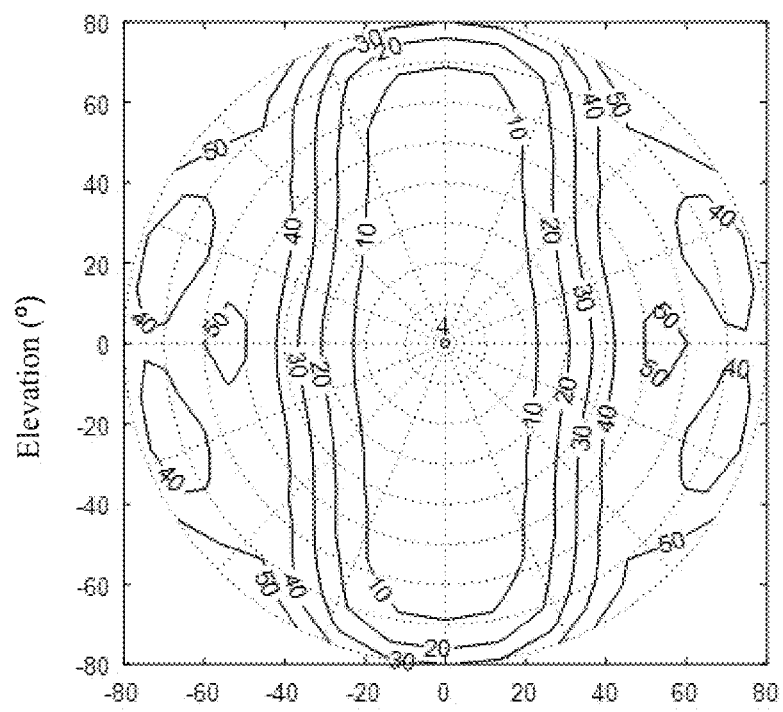
FIG. 5B is a graph illustrating the variation of reflectivity with polar direction for the reflected light rays in FIG. 5A.

FIG. 5A is a schematic diagram illustrating in top view propagation of ambient illumination light through the optical stack of FIG. 1A in a privacy mode of operation; and FIG. 5B is a schematic graph illustrating the variation of reflectivity with polar direction for the reflected light rays in FIG. 5A. Features of the arrangement of FIG. 5A not discussed in further detail may be assumed to correspond to the features with equivalent reference numerals as discussed above, including any potential variations in the features.

Ambient light source 604 illuminates the display 100 with unpolarised light. Additional polariser 318 transmits light ray 410 normal to the display surface with a first polarisation component 372 that is a linear polarisation component parallel to the electric vector transmission direction 319 of the additional polariser 318.

In both states of operation, the polarisation component 372 remains unmodified by the polar control retarder 300 and so transmitted polarisation component 382 is parallel to the transmission axis of the reflective polariser 302 and the output polariser 218, so ambient light is directed through the SLM 48 and lost.

By comparison, for ray 412, off-axis light is directed through the polar control retarder 300 such that polarisation component 374 incident on the reflective polariser 302 may be reflected. Such polarisation component is re-converted into component 376 after passing through retarders 300 and is transmitted through the additional polariser 318.

Thus when the layer 314 of liquid crystal material is in the second state of said two states, the reflective polariser 302 provides no reflected light for ambient light rays 410 passing through the additional polariser 318 and then the polar control retarder 300 along an axis perpendicular to the plane of the polar control retarder 300, but provides reflected light rays 412 for ambient light passing through the additional polariser 318 and then the polar control retarder 300 at some polar angles which are at an acute angle to the perpendicular to the plane of the polar control retarder 300; wherein the reflected light 412 passes back through the polar control retarder 300 and is then transmitted by the additional polariser 318.

The polar control retarder 300 thus provides no overall transformation of polarisation component 380 to ambient light rays 410 passing through the additional polariser 318 and then the polar control retarder 300 along an axis perpendicular to the plane of the switchable retarder, but provides an overall transformation of polarisation component 372 to ambient light rays 412 passing through the absorptive polariser 318 and then the polar control retarder 300 at some polar angles which are at an acute angle to the perpendicular to the plane of the polar control retarder 300.

The polar distribution of light reflection illustrated in FIG. 5B thus illustrates that high reflectivity can be provided at typical snooper locations by means of the privacy state of the polar control retarder 300. Thus, in the privacy mode of operation, the reflectivity for off-axis viewing positions is increased, and the luminance for off-axis light from the SLM is reduced as illustrated in FIG. 4B.

Advantageously, a privacy display is provided that has high reflectivity to an off-axis snooper while maintaining low reflectivity for an on-axis observer. As is described above, such increased reflectivity provides increased visual security level for the display in an ambiently illuminated environment.

In another application such a display may provide a switchable mirror appearance. Such a display may improve the aesthetic appearance of displays that are not in operation. For example in applications to a television in a domestic environment, the display may be provided as a mirror for off-axis viewing, so hiding the 'black hole' that is typical of large area TVs, by reflecting ambient light, advantageously providing perceived expansion of the living space.

Measurements of reflectivity of the arrangement of FIG. 5A will now be described.

Figure 5C:
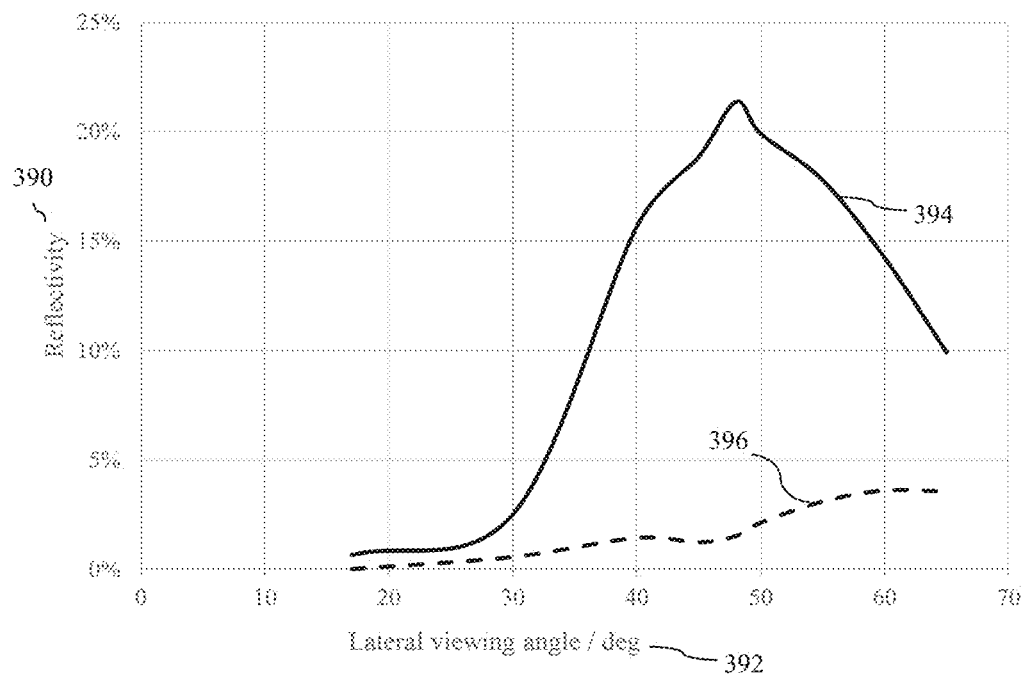
FIG. 5C is a graph illustrating a measurement of the variation of reflectivity with lateral direction for the reflected light rays in FIG. 5A.

FIG. 5C is a schematic graph illustrating a measurement of the variation of reflectivity 390 with lateral viewing angle 392 for some reflected light rays 412. Profile 394 illustrates variation in reflectivity for a display in privacy mode, while profile 396 illustrates variation of reflectivity for a display in public mode.

In comparison to FIG. 5B, the peak reflectivity is approximately 20%, where 50% represents the reflectivity of a perfect reflective polariser 302. Such reduced reflectivity is due to transmission losses from the additional polariser 318, reflective polariser polarisation reflection efficiency, chromatic variation of the tuning point for the polar control retarder 300 and other reflection and scatter losses within the optical stack.

The operation of the privacy mode of the display of FIG. 1A will now be described further.

Figure 6A:
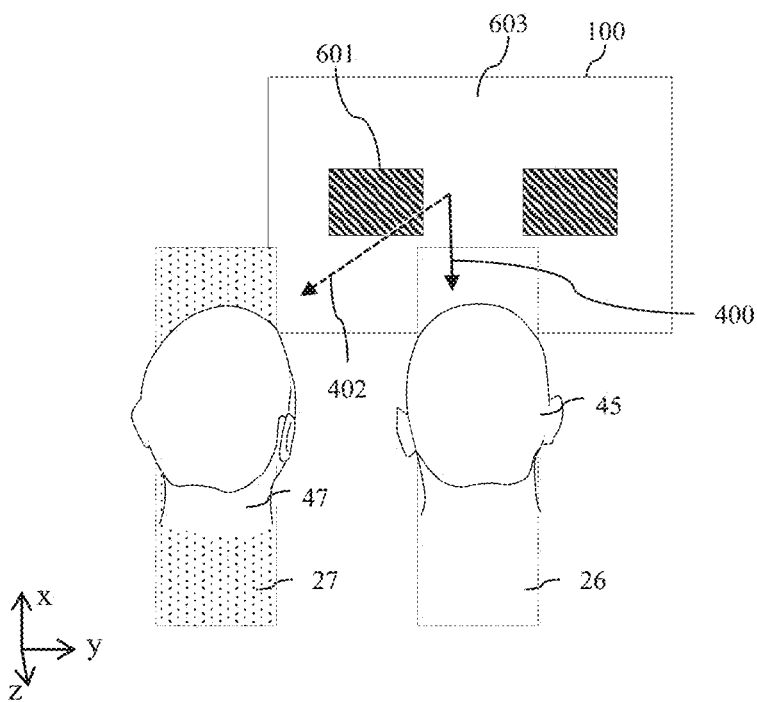
FIG. 6A is a diagram illustrating in front perspective view observation of transmitted output light for a display in privacy mode.

FIG. 6A is a schematic diagram illustrating in front perspective view observation of transmitted output light for a display operating in privacy mode. Display 100 may be provided with white regions 603 and black regions 601. A snooper may observe an image on the display if luminance difference between the observed regions 601, 603 can be perceived. In operation, primary user 45 observes a full luminance images by rays 400 to viewing locations 26 that may be optical windows of a directional display. Snooper 47 observes reduced luminance rays 402 in viewing locations 27 that may for example be optical windows of a directional display comprising an imaging waveguide. Regions 26, 27 further represent on-axis and off-axis regions of polar graphs 4B and 5B.

Figure 6B:
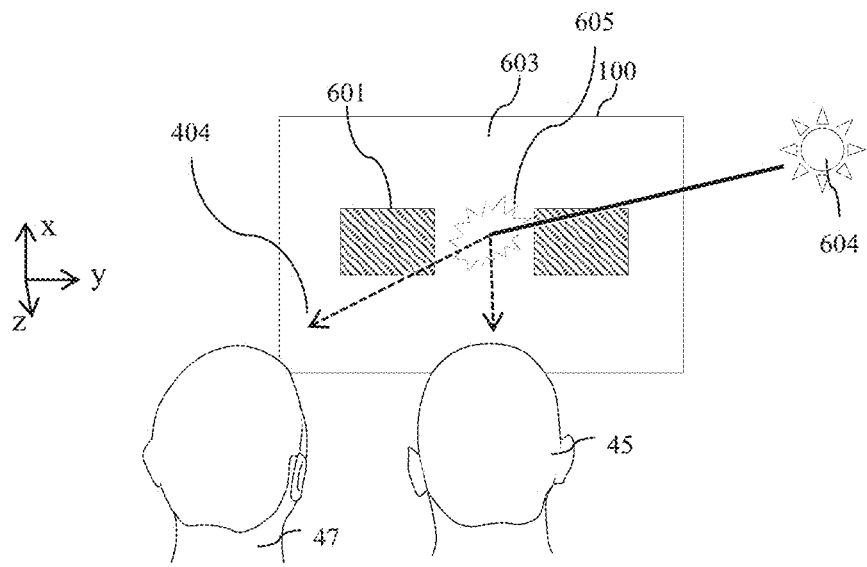
FIG. 6B is a diagram illustrating in front perspective view observation of reflected ambient light from interface surfaces of a display.

FIG. 6B is a schematic diagram illustrating in front perspective view observation of reflected ambient light from interface surfaces of a display. Thus some light rays 404 illustrated in FIG. 5A may be reflected by the front surface of the additional polariser 318 and other surfaces of the display. Typically, such reflectivity may be 4% for a bonded optical stack at normal incidence and approximately 5% for a bonded optical stack for 45 degrees incidence, due to Fresnel reflections at the air-polariser interface. Thus a low luminance reflected image 605 of source 604 may be observed by the snooper on the front of the display 100.

Figure 6C:
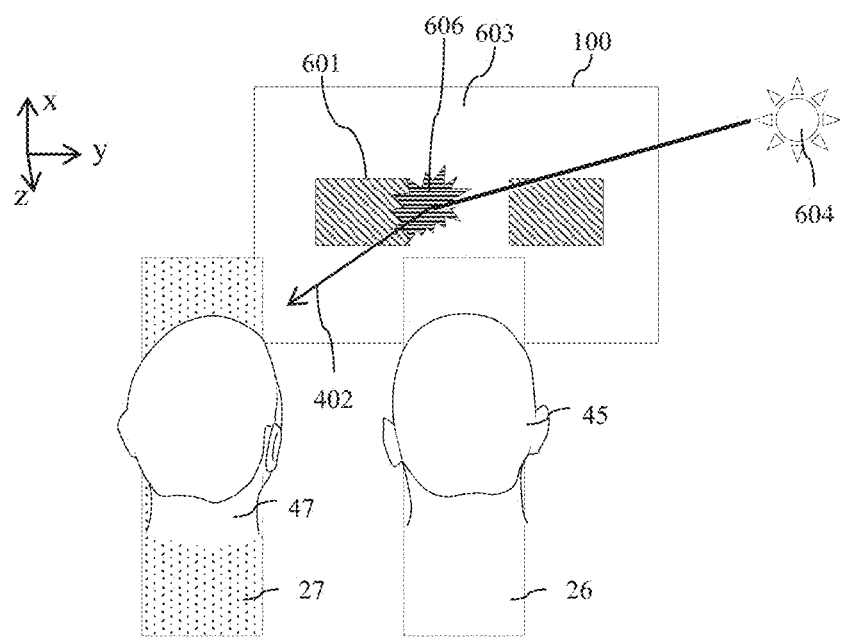
FIG. 6C is a diagram illustrating in front perspective view observation of reflected ambient light for the display of FIG. 1A and FIG. 1B in privacy mode.

FIG. 6C is a schematic diagram illustrating in front perspective view observation of reflected ambient light for the display of FIG. 1A operating in privacy mode. By way of comparison with FIG. 6B, substantially higher reflected luminance is observable from reflection 606 of source 604. Features of the arrangement of FIGS. 6A-C not discussed in further detail may be assumed to correspond to the features with equivalent reference numerals as discussed above, including any potential variations in the features.

The shape and distribution of the reflected image 606 is determined by the ambient light source 604 spatial distribution but may be further determined by diffusion layers, particularly at the output surface of the additional polariser 318.

Figure 7A:
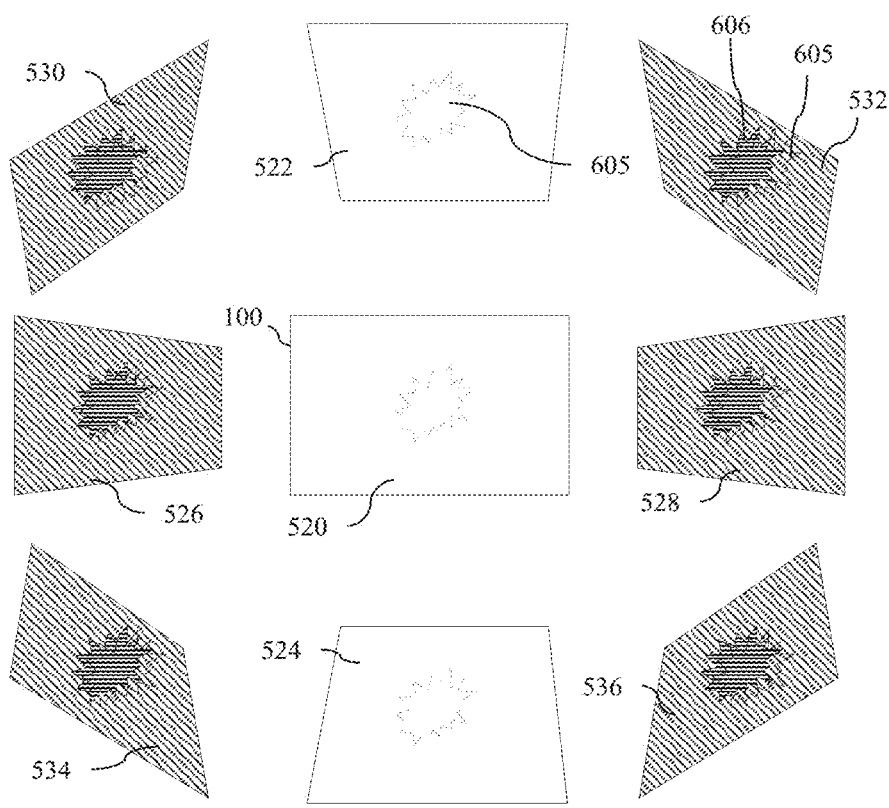
FIG. 7A is a diagram illustrating in front perspective views the appearance of the display of FIG. 1A and FIG. 1B in privacy mode.

FIG. 7A is a schematic diagram illustrating in front perspective views the appearance of the display of FIG. 1A operating in privacy mode 1 with luminance and reflectivity variations as illustrated in FIG. 4B and FIG. 5B from different viewing positions. Thus each of the nine views 520, 522, 524, 526, 528, 530, 532, 534 and 536 correspond to a view from the corresponding viewing position, as shown by the perspectives of those views.

Thus upper viewing quadrant views 530, 532, lower viewing quadrant views 534, 536 and lateral viewing position views 526, 528 provide both reduced luminance and increased reflections 606, 605 of ambient light source 604, whereas up/down central viewing region views 522, 524 and head-on view 520 provides much higher luminance and low reflectivity region 605, with substantially no visibility of reflection from reflective polariser 302.

Figure 7B:
FIG. 7B is a graph illustrating the variation of perceived dynamic range against ambient illuminance for an off-axis snooper of the switchable privacy display of FIG. 1A and FIG. 1B in a privacy mode for arrangements with and without the reflective polariser.

FIG. 7B is a schematic graph illustrating the variation of Visual Security Level 620 against the ratio 622 of ambient illuminance to head-on luminance for an off-axis snooper of the switchable privacy display of FIG. 1A in a privacy mode of operation for arrangements for profile 624 with the reflective polariser 302 and for profile 626 with no reflective polariser 302 and for the illustrative embodiment of TABLE 1.

TABLE 1

|  | Variation 626 | Variation 624 |
|---|---|---|
| Snooper luminance/Head-on luminance | 0.5% | |
| Image Contrast | 500:1 | |
| Head-on luminance/nits | 200 | |
| Reflective polariser 302 & retarders 300 | No | Yes |
| Total display reflectivity | 5.0% | 30% |

FIG. 7B thus illustrates that advantageously visual security level is increased by the reflective polariser 302.

In comparison to the present embodiments, omission of the reflective polariser 302 provides for visual security level, V that is less than 4.0 for typical ambient illuminance. Such visual security levels do not achieve desirable privacy to snooper 27. The present embodiments achieve high visual security levels above 4.0 for a lux/nit ratio of 20% or less. For example, desirable visual security may be achieved for a head-on user 26 observing a 200 nit image in an environment with 40 nit ambient illuminance. As ambient illuminance increases, the visual security level increases.

Figure 7C:
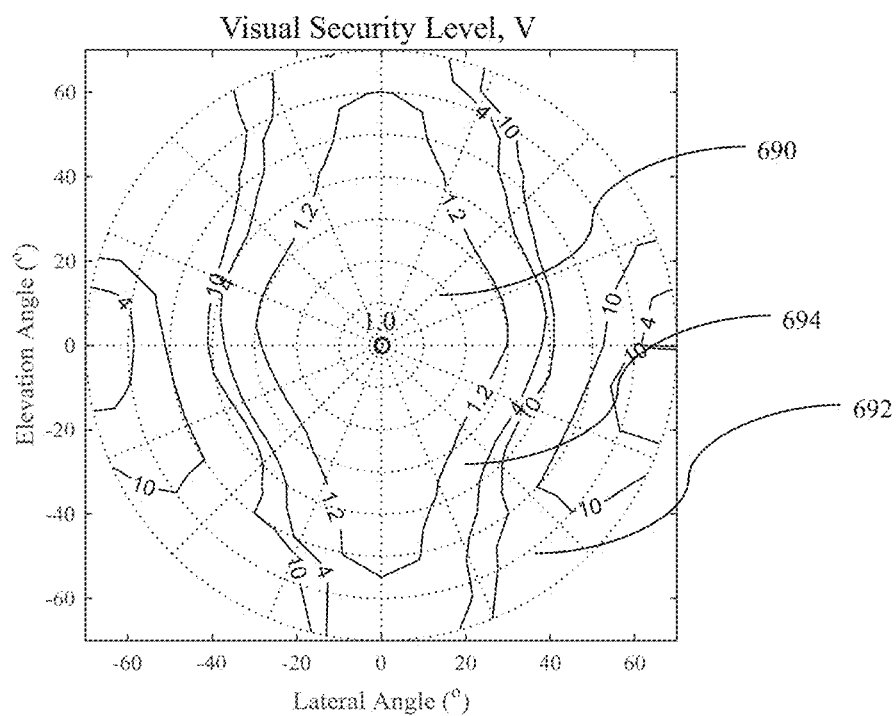
FIG. 7C is a graph illustrating the variation of VSL with polar direction for a display of FIG. 1A comprising a collimated backlight.

FIG. 7C is a schematic graph illustrating the variation of visual security level with polar direction for a display of FIG. 1A comprising a collimated backlight 20 as will be described further below with respect to FIGS. 32A-C and a ratio (lux/nit) of ambient illuminance (lux) to head-on luminance (nits) of 20%.

FIG. 7C illustrates a first polar region 690 for viewing by the primary user 26 wherein a visual security level, V of less than 1.2 is achieved, delivering an image visibility. W of greater than 83%. Advantageously, the display 100 may be conveniently seen with high contrast. In a second polar region 692, the visual security level, V is greater than 4.0 and a snooper's eye positioned in this region will not easily be able to discern information on the display. Polar region 694 is intermediate the regions 690 and 692 and is a region of reduced image visibility although not at desirable levels of visual security. Advantageously the present embodiments achieve a large polar region 690 for the primary user and large polar region 692 for the snooper, and a small transition region 694.

Figure 7D:
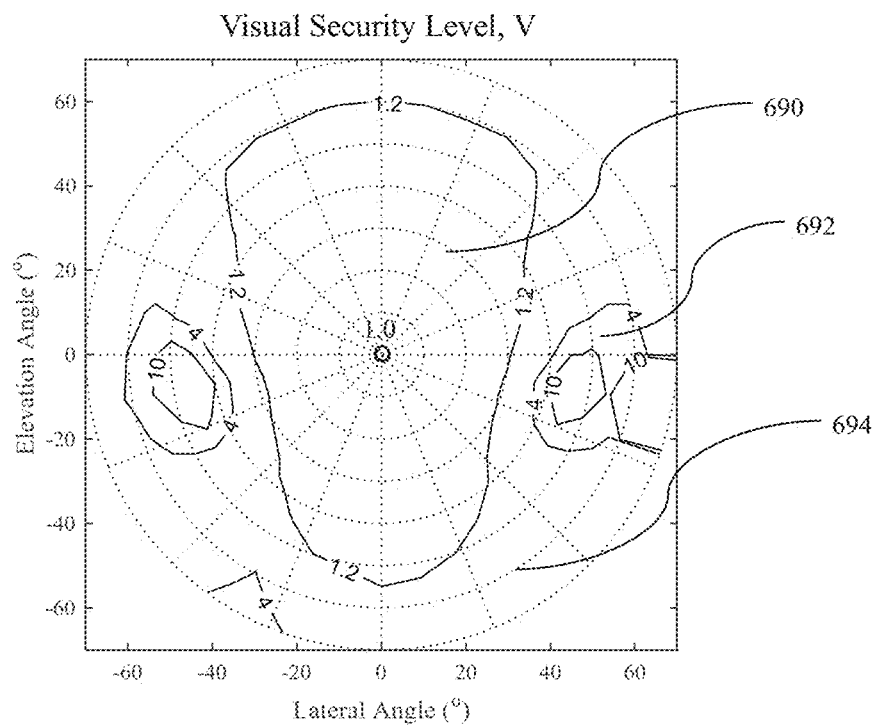
FIG. 7D is a graph illustrating the variation of VSL with polar direction for a display comprising no plural retarders.

FIG. 7D is a schematic graph illustrating the variation of visual security level with polar direction for a display comprising no plural retarders for the same lux/nit ratio as FIG. 7C. In comparison to the present embodiments, the polar region 692 of desirable visual security levelV>4 is significantly reduced and the polar region 694 of reduced image visibility but insufficient visual security level is increased.

Figure 27B:
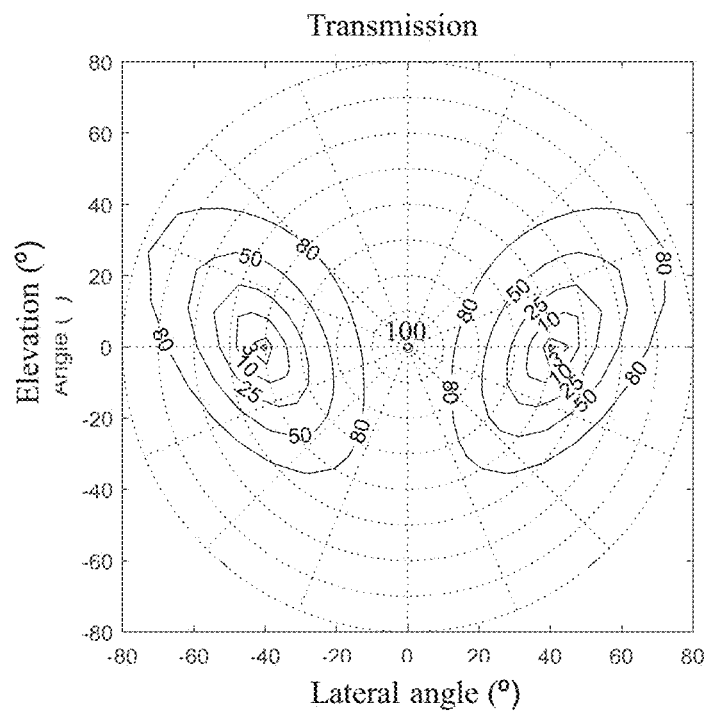
FIG. 27B is a graph illustrating the variation of output transmission with polar direction for transmitted light rays in FIG. 27A for a first applied voltage.

By way of comparison with the present disclosure, single retarders that provide high reflectivity over a narrow angular range (such as 'bulls-eye' patterns typical of single retarder layers, and described for example with reference to FIGS. 27A-B) do not achieve high reflectivity over a wide angular range. In particular, the double pass of reflected light illustrated in FIG. 5A provides a very narrow region of high reflectivity. The reflected light has to pass twice through the retarder with input and output ray directions inverted about the display normal. This multiplies the optical effect and confines high reflectivity to rays with elevation angles close to the design angle (for example +/−45 degrees lateral angle and zero degrees elevation). The underlying extended privacy performance about the horizontal of the present embodiments yield much larger regions of high visual security e.g. polar region 692.

The present plural retarders of the present embodiments provide high reflectivity over a wide angular range and achieve desirable privacy to an off-axis snooper. Further the present retarders may be switched to provide low reflectivity and high image visibility in a public mode of operation. Advantageously the plural retarders achieve significantly increased polar region 692 and significantly reduced polar region 694 while achieving comfortable image visibility to the primary user in polar region 690.

It may be desirable to provide controllable display illumination in an automotive vehicle.

Figure 8A:
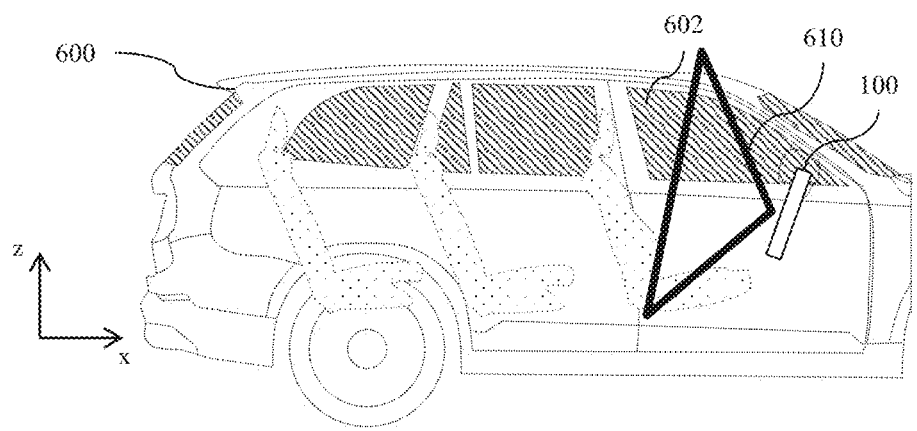
FIG. 8A is a diagram illustrating in side view an automotive vehicle with a switchable directional display arranged within the vehicle cabin for both entertainment and sharing modes.

FIG. 8A is a schematic diagram illustrating in side view an automotive vehicle with a switchable directional display 100 arranged within the vehicle cabin 602 of an automotive vehicle 600 for both entertainment and sharing modes of operation. Light cone 610 (for example representing the cone of light within which the luminance is greater than 50% of the peak luminance) may be provided by the luminance distribution of the display 100 in the elevation direction and is not switchable. Further display reflectivity may be increased compared to head-on reflectivity outside this light cone 610.

Figure 8B:
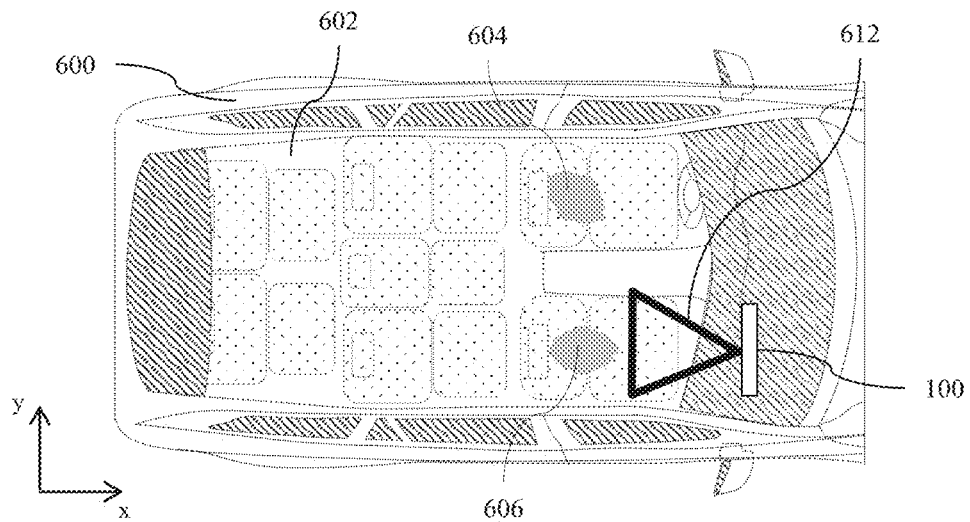
FIG. 8B is a diagram illustrating in top view an automotive vehicle with a switchable directional display arranged within the vehicle cabin in an entertainment mode.

FIG. 8B is a schematic diagram illustrating in top view an automotive vehicle with a switchable directional display 100 arranged within the vehicle cabin 602 in an entertainment mode of operation and operates in a similar manner to a privacy display. Light cone 612 is provided with a narrow angular range such that passenger 606 may see the display 100 whereas driver 604 may not see an image on the display 100 as a consequence of reduced luminance and increased reflectivity. Advantageously entertainment images may be displayed to the passenger 606 without distraction to the driver 604.

Figure 8C:
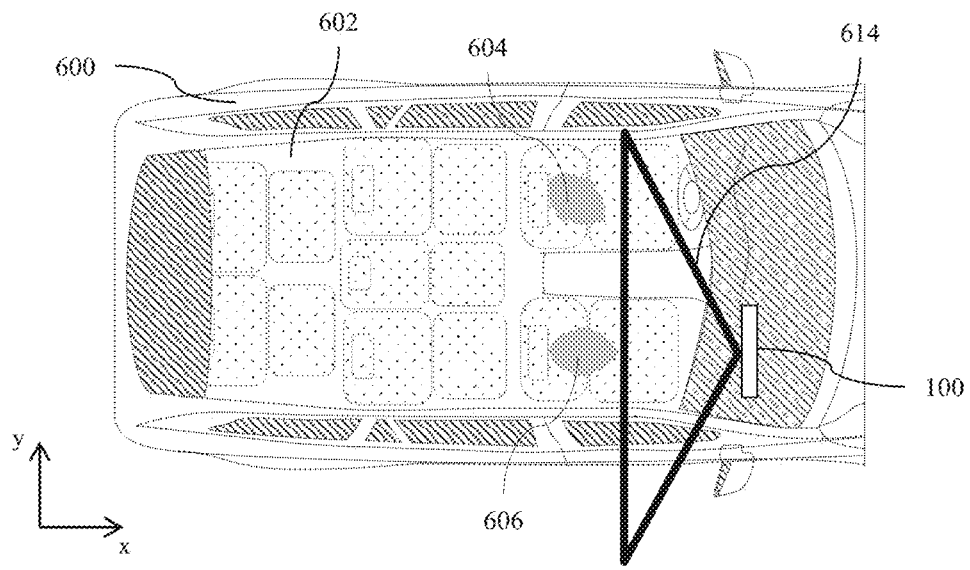
FIG. 8C is a diagram illustrating in top view an automotive vehicle with a switchable directional display arranged within the vehicle cabin in a sharing mode.

FIG. 8C is a schematic diagram illustrating in top view an automotive vehicle with a switchable directional display 100 arranged within the vehicle cabin 602 in a sharing mode of operation. Light cone 614 is provided with a wide angular range such that all occupants may perceive an image on the display 100, for example when the display is not in motion or when non-distracting images are provided.

Figure 8D:
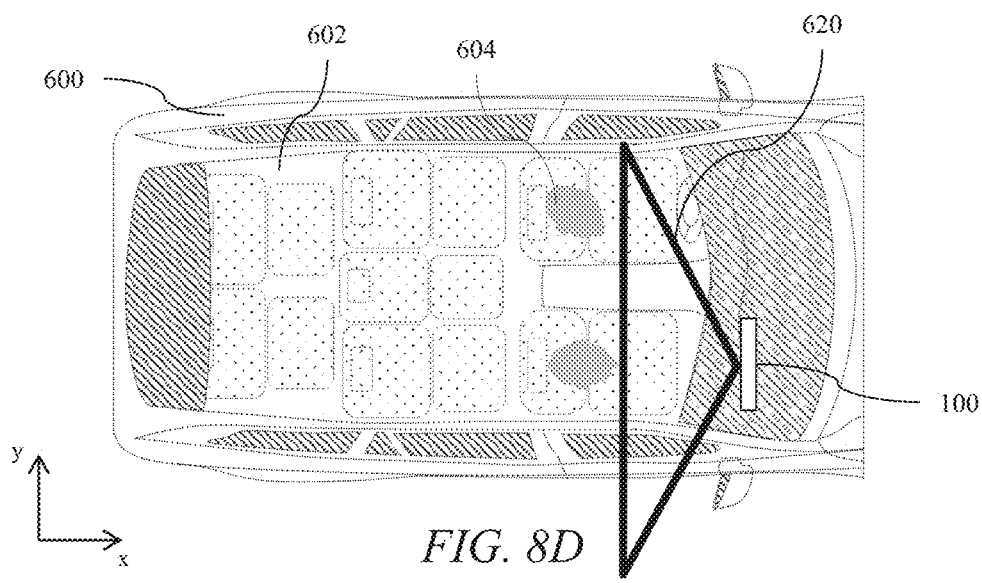
FIG. 8D is a diagram illustrating in top view an automotive vehicle with a switchable directional display arranged within the vehicle cabin for both night-time and day-time modes.

FIG. 8D is a schematic diagram illustrating in top view an automotive vehicle with a switchable directional display 100 arranged within the vehicle cabin 602 for both night-time and day-time modes of operation. In comparison to the arrangements of FIGS. 7C-E, the optical output is rotated so that the display elevation direction is along an axis between the driver 604 and passenger 606 locations. Light cone 620 illuminates both driver 604 and passenger 606 and with low display reflectivity.

Figure 8E:
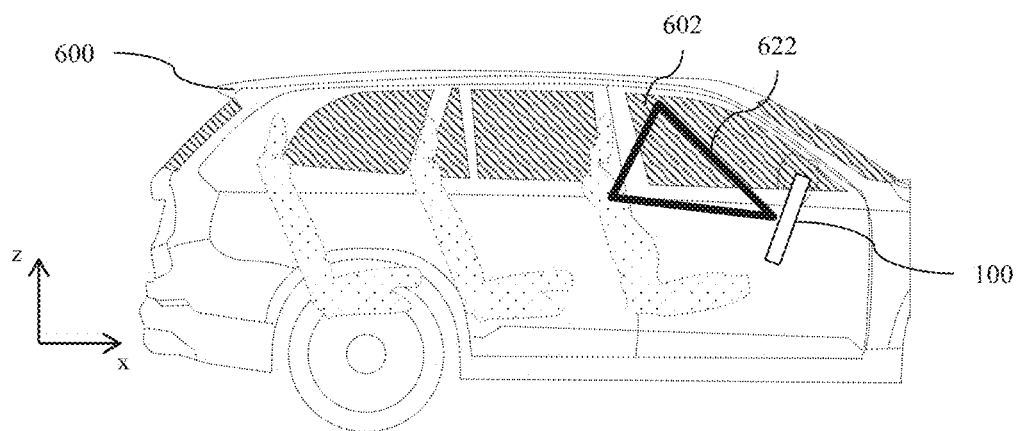
FIG. 8E is a diagram illustrating in side view an automotive vehicle with a switchable directional display arranged within the vehicle cabin in a night-time mode.

FIG. 8E is a schematic diagram illustrating in side view an automotive vehicle with a switchable directional display 100 arranged within the vehicle cabin 602 in a night-time mode of operation. Thus the display may provide a narrow angular output light cone 622. Stray light that illuminates internal surfaces and occupants of the vehicle cabin 602 and cause distraction to driver 604 may advantageously be substantially reduced. Both driver 604 and passenger 606 may advantageously be able to observe the displayed images.

Figure 8F:
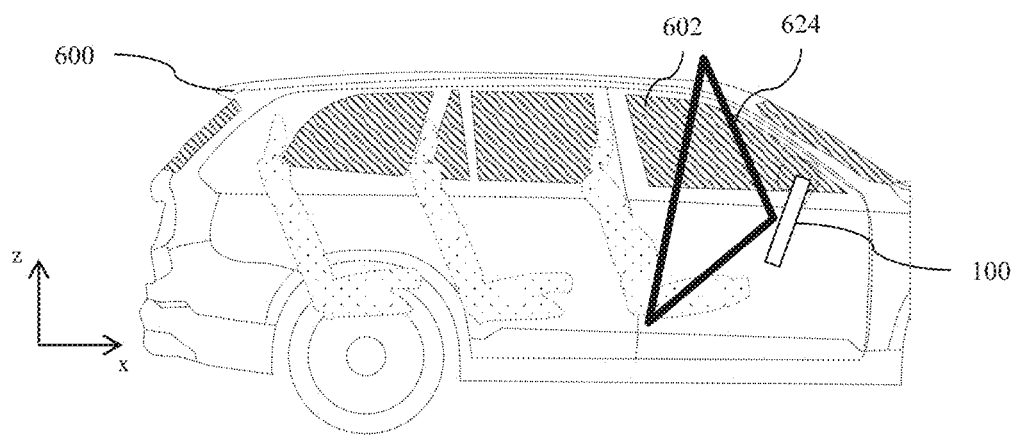
FIG. 8F is a diagram illustrating in side view an automotive vehicle with a switchable directional display arranged within the vehicle cabin in a day-time mode.

FIG. 8F is a schematic diagram illustrating in side view an automotive vehicle with a switchable directional display 100 arranged within the vehicle cabin 602 in a day-time mode of operation. Thus the display may provide a narrow angular output light cone 624. Advantageously the display may be conveniently observed by all cabin 602 occupants.

The displays 100 of FIGS. 8A-F may be arranged at other vehicle cabin locations such as driver instrument displays, centre console displays and seat-back displays.

The operation of the display device 100 in public mode representing a first state will now be described and further details of the polar control retarder 300 illustrated.

Figure 9A:
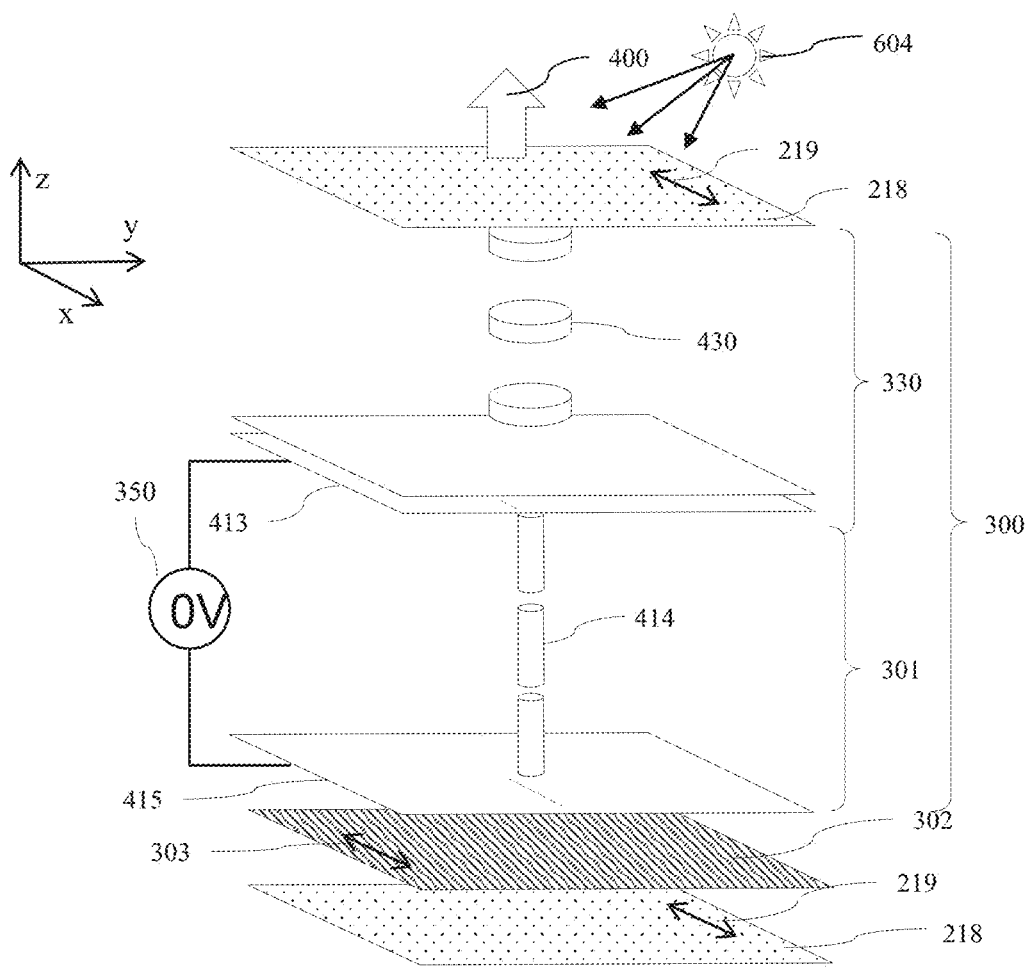
FIG. 9A is a diagram illustrating in perspective side view an arrangement of a switchable retarder in a public mode wherein the switchable retarder comprises a switchable LC layer with homeotropic alignment and a passive C-plate polar control retarder.

FIG. 9A is a schematic diagram illustrating in perspective side view an arrangement of the polar control retarder 300 in a public mode of operation. In the present embodiment, zero volts is provided across the liquid crystal retarder 301; and TABLE 2 describes an illustrative embodiment for the arrangement of FIG. 9A. Features of the arrangement of FIG. 9A not discussed in further detail may be assumed to correspond to the features with equivalent reference numerals as discussed above, including any potential variations in the features.

TABLE 2

| FIG. | Mode | Passive polar control retarder(s) | | Active LC retarder | | | | |
| --- | --- | --- | --- | --- | --- | --- | --- | --- |
| | | Type | Δn.d/ nm | Alignment layers | Pretilt/ deg | Δn.d/ nm | Δε | Voltage/ V |
| 9A, 9C, 9E | Public | Negative C | −700 | Homeotropic | 88 | 810 | −4.3 | 0 |
| 3, 4B, 5B | Privacy | | | Homeotropic | 88 | | | 2.2 |

The switchable liquid crystal retarder 301 comprises two surface alignment layers disposed on electrodes 413, 415 and adjacent to the layer of liquid crystal material 414 and on opposite sides thereof and each arranged to provide homeotropic alignment in the adjacent liquid crystal material 414. The layer of liquid crystal material 414 of the switchable liquid crystal retarder 301 comprises a liquid crystal material with a negative dielectric anisotropy. The liquid crystal molecules 414 may be provided with a pretilt, for example 88 degrees from the horizontal to remove degeneracy in switching.

In the present embodiments, desirable ranges for retardations and voltages have been established by means of simulation of retarder stacks and experiment with display optical stacks. Ranges for retardances will now be described that provide design configurations for various optical layers.

The layer 314 of liquid crystal material has a retardance for light of a wavelength of 550 nm in a range from 500 nm to 1000 nm, preferably in a range from 600 nm to 900 nm and most preferably in a range from 700 nm to 850 nm; and the retarder 330 further comprises a passive retarder having an optical axis perpendicular to the plane of the retarder, the passive retarder having a retardance for light of a wavelength of 550 nm in a range from −300 nm to −900 nm, preferably in a range from −450 nm to −800 nm and most preferably in a range from −500 nm to −725 nm.

Alternatively, the passive polar control retarder 330 may comprise an O-plate retarder having an optical axis that is oriented with a component perpendicular to the plane of the retarder and a component in the plane of the retarder. Such a retarder may provide further compensation for residual tilts of the liquid crystal material 414.

Figure 9B:
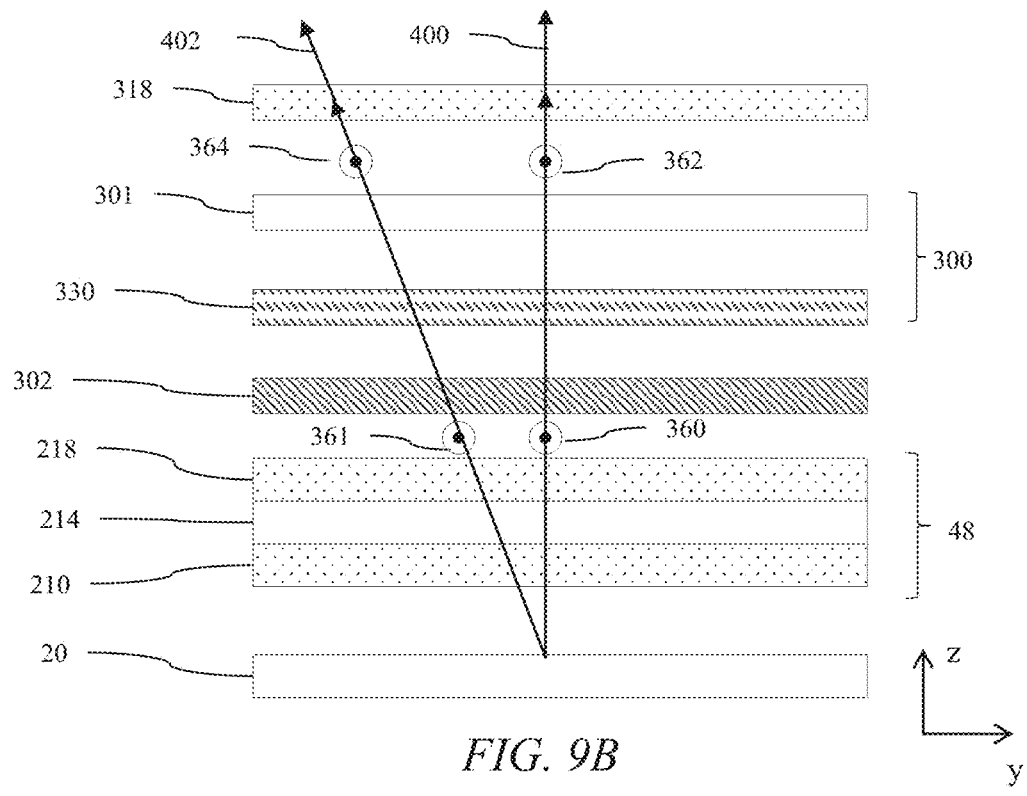
FIG. 9B is a diagram illustrating in side view propagation of output light from a SLM through the optical stack of FIG. 1A in a public mode.
Figure 9C:
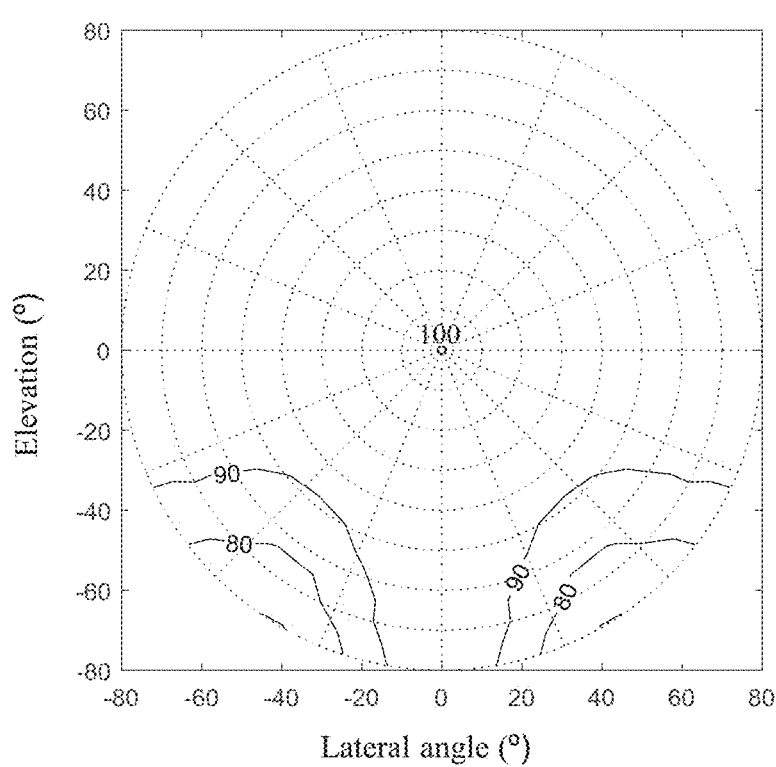
FIG. 9C is a graph illustrating the variation of output luminance with polar direction for the transmitted light rays in FIG. 9B.

FIG. 9B is a schematic diagram illustrating in side view propagation of output light from a SLM through the optical stack of FIG. 1A in a public mode of operation and FIG. 9C is a schematic graph illustrating the variation of output luminance with polar direction for the transmitted light rays in FIG. 9B. Features of the arrangements of FIGS. 9B-C not discussed in further detail may be assumed to correspond to the features with equivalent reference numerals as discussed above, including any potential variations in the features.

Thus when the liquid crystal retarder 301 is in a first state of said two states, the polar control retarder 300 provides no overall transformation of polarisation component 360, 361 to output light passing therethrough perpendicular to the plane of the switchable retarder 301 or at an acute angle to the perpendicular to the plane of the switchable retarder 301. That is polarisation component 362 is substantially the same as polarisation component 360 and polarisation component 364 is substantially the same as polarisation component 361. Thus the angular transmission profile of FIG. 9C is substantially uniformly transmitting across a wide polar region. Advantageously a display may be switched to a wide field of view.

Figure 9D:
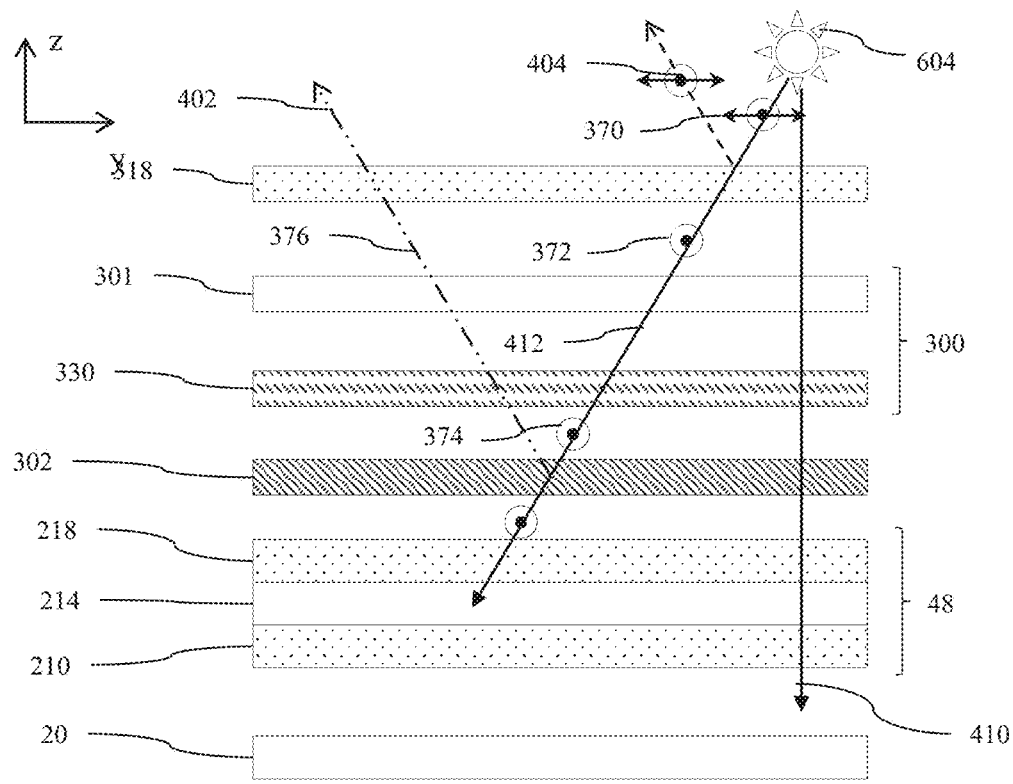
FIG. 9D is a diagram illustrating in top view propagation of ambient illumination light through the optical stack of FIG. 1A in a public mode.
Figure 9E:
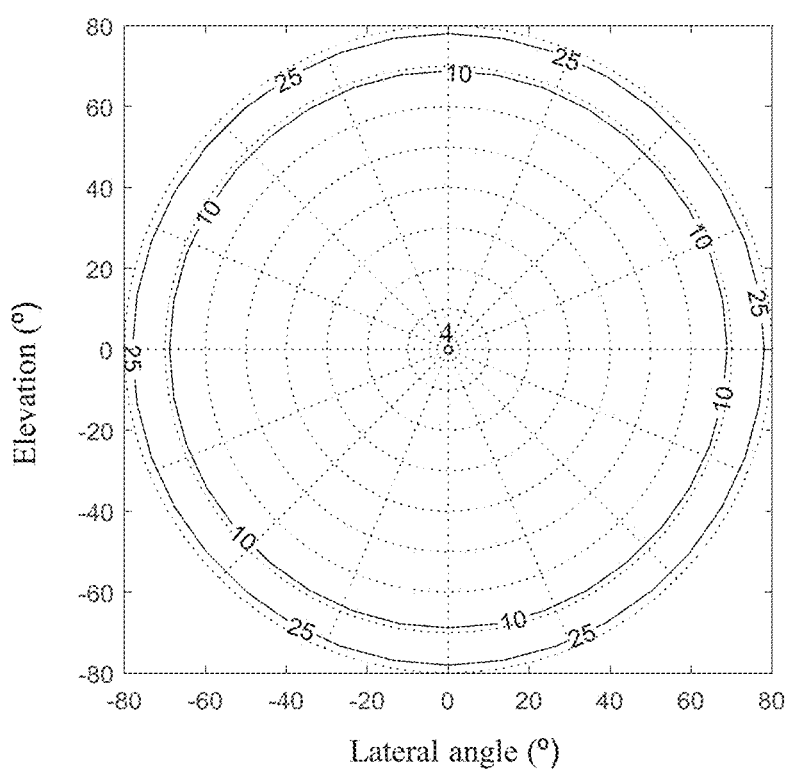
FIG. 9E is a graph illustrating the variation of reflectivity with polar direction for the reflected light rays in FIG. 9D.

FIG. 9D is a schematic diagram illustrating in top view propagation of ambient illumination light through the optical stack of FIG. 1A in a public mode of operation; and FIG. 9E is a schematic graph illustrating the variation of reflectivity with polar direction for the reflected light rays in FIG. 9D. Features of the arrangements of FIG. 9D-E not discussed in further detail may be assumed to correspond to the features with equivalent reference numerals as discussed above, including any potential variations in the features.

Thus when the liquid crystal retarder 301 is in the first state of said two states, the polar control retarder 300 provides no overall transformation of polarisation component 372 to ambient light rays 412 passing through the additional polariser 318 and then the polar control retarder 300, that is perpendicular to the plane of the polar control retarder 300 or at an acute angle to the perpendicular to the plane of the polar control retarder 300.

In operation in the public mode, input light ray 412 has polarisation state 372 after transmission through the additional polariser 318. For both head-on and off-axis directions no polarisation transformation occurs and thus the reflectivity for light rays 402 from the reflective polariser 302 is low. Light ray 412 is transmitted by reflective polariser 302 and lost in the display polarisers 218, 210 or the backlight of FIG. 1A or optical isolator 218, 518 in an emissive SLM 38 of FIG. 1B.

Advantageously in a public mode of operation, high luminance and low reflectivity is provided across a wide field of view. Such a display can be conveniently viewed with high contrast by multiple observers.

The appearance of the display of FIG. 1A in public mode for the first state will now be described.

Figure 10A:
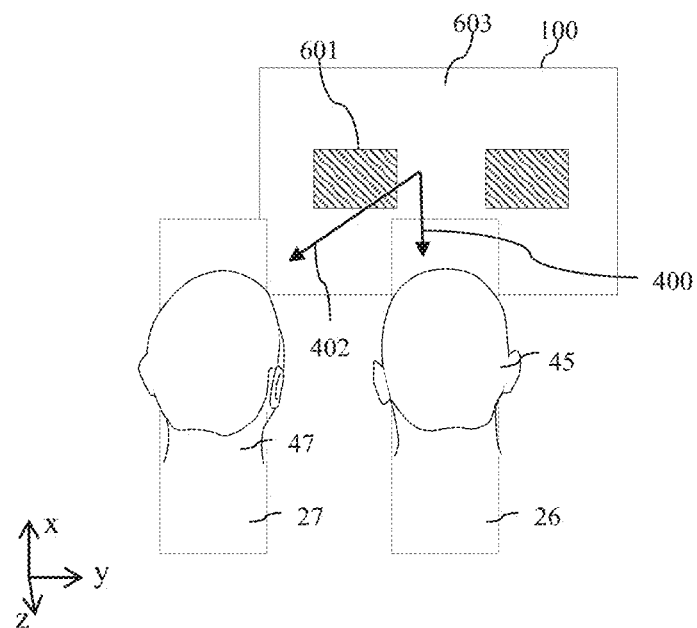
FIG. 10A is a diagram illustrating in front perspective view observation of transmitted output light for a display in public mode.
Figure 10B:
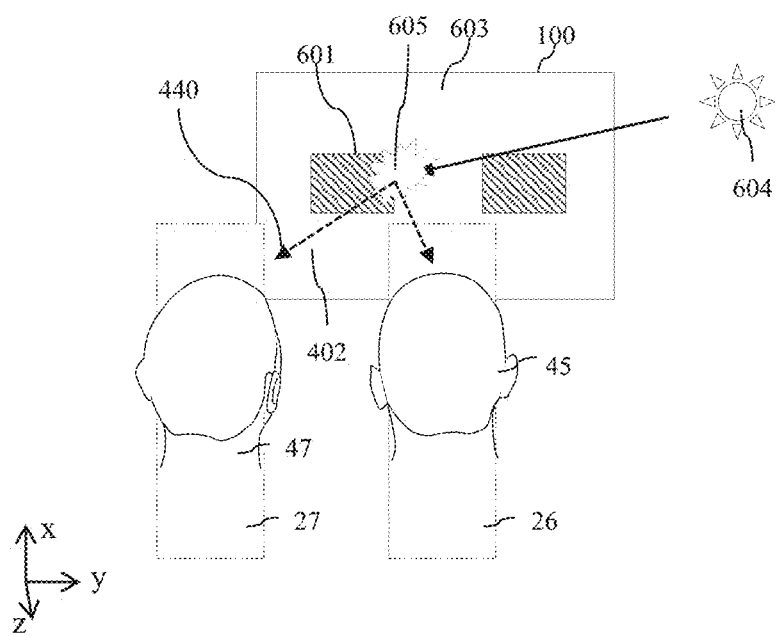
FIG. 10B is a diagram illustrating in front perspective view observation of reflected ambient light from the switchable display of FIG. 1A in public mode.
Figure 10C:
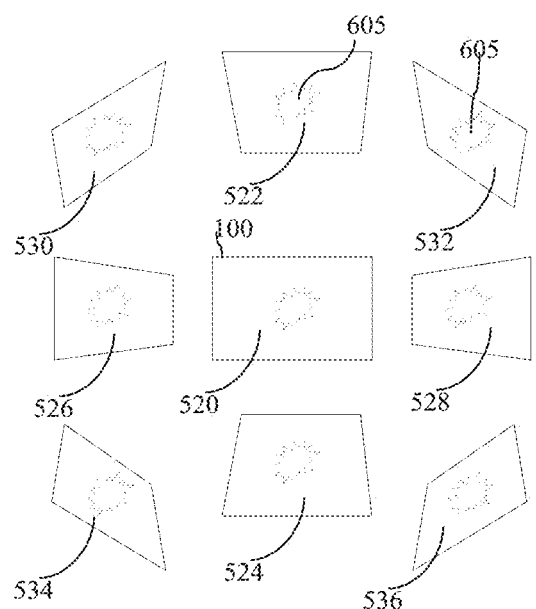
FIG. 10C is a diagram illustrating in front perspective views the appearance of the display of FIG. 1A in public mode.

FIG. 10A is a schematic diagram illustrating in front perspective view observation of transmitted output light for a display operating in public mode; FIG. 10B is a schematic diagram illustrating in front perspective view observation of reflected ambient light from the switchable display of FIG. 1A in public mode; and FIG. 10C is a schematic diagram illustrating in front perspective views the appearance of the display of FIG. 1A operating in public mode.

Thus the desirable off-axis viewing position for user 49 has high display luminance and substantially without reflections from the reflective polariser 302. A high image visibility value can be achieved and display information conveniently resolved by multiple users. Fresnel reflection 605 are still present as in conventional displays, and are at a customary low level. A high performance public mode is provided.

Further arrangements of retarders will now be described.

Figure 11A:
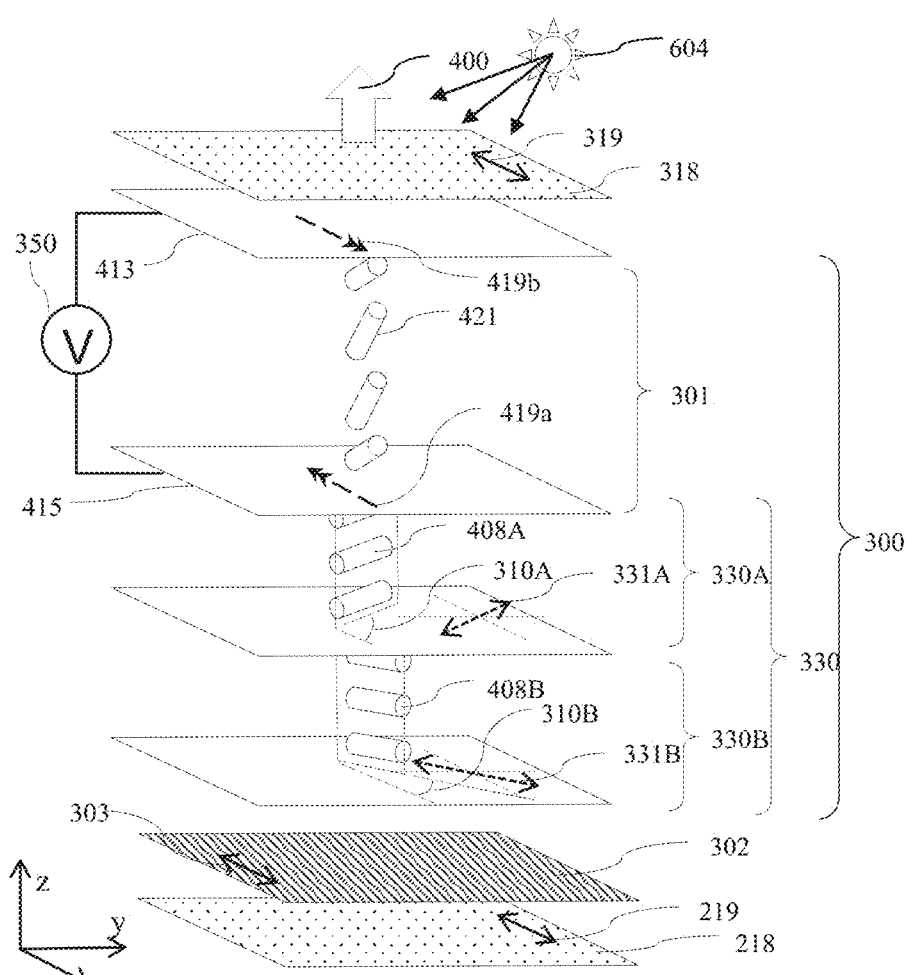
FIG. 11A is a diagram illustrating in perspective side view an arrangement of a switchable retarder in a public mode wherein the switchable retarder comprises a switchable LC layer with homogeneous alignment and crossed A-plate polar control retarders.
Figure 11B:
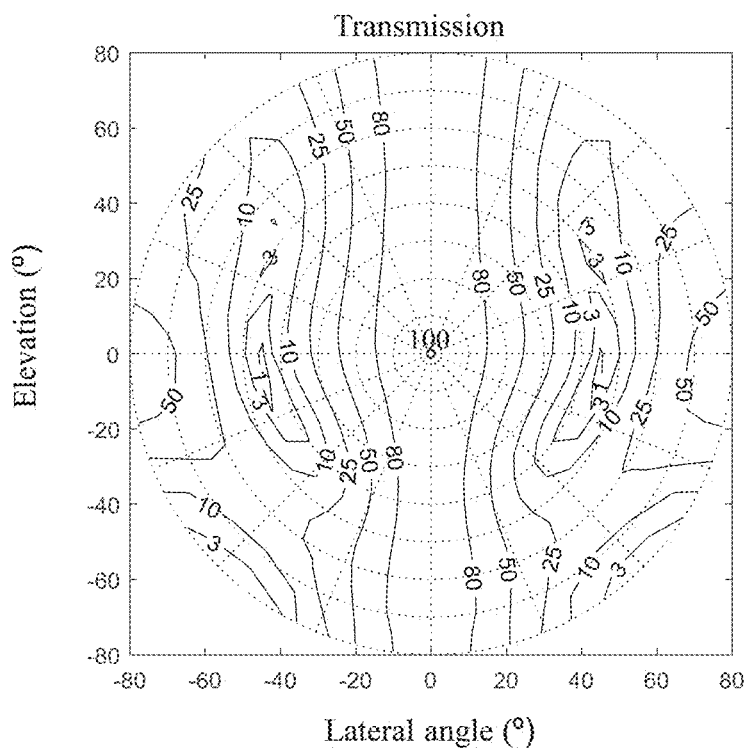
FIG. 11B is a graph illustrating the variation of output luminance with polar direction for transmitted light rays in FIG. 11A in a privacy mode.
Figure 11C:
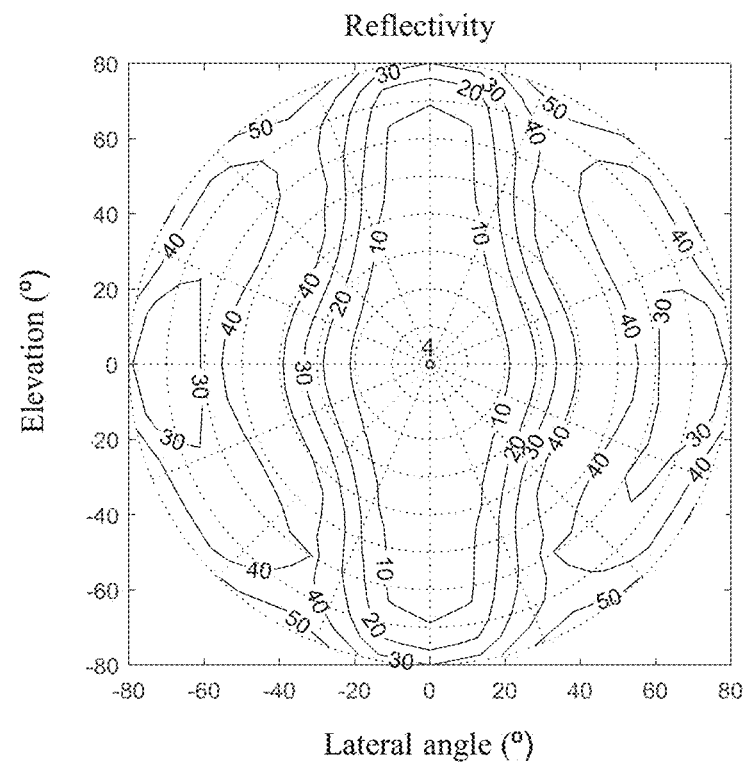
FIG. 11C is a graph illustrating the variation in reflectivity with polar direction for reflected light rays in FIG. 11A in a privacy mode.
Figure 11D:
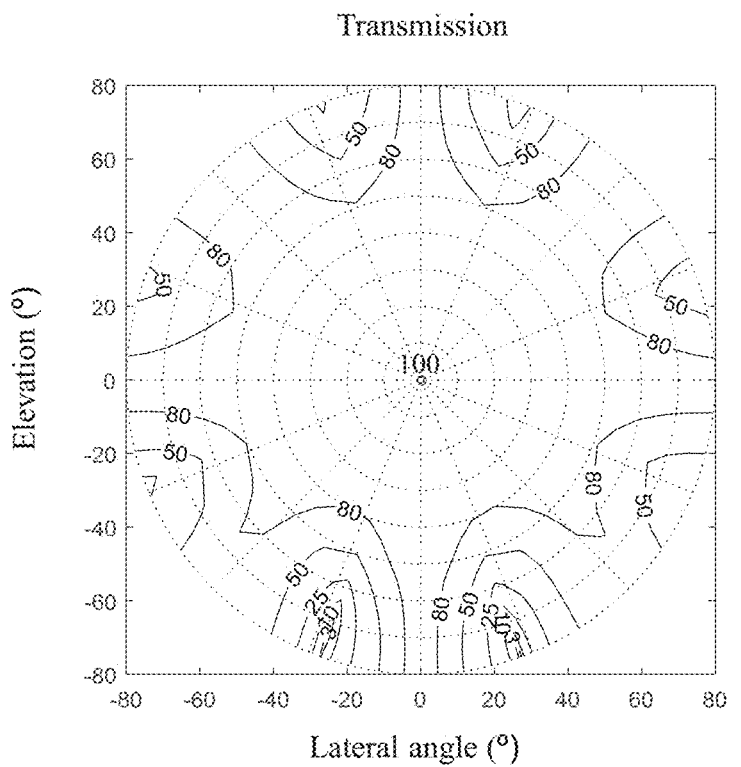
FIG. 11D is a graph illustrating the variation of output luminance with polar direction for transmitted light rays in FIG. 11A in a public mode.
Figure 11E:
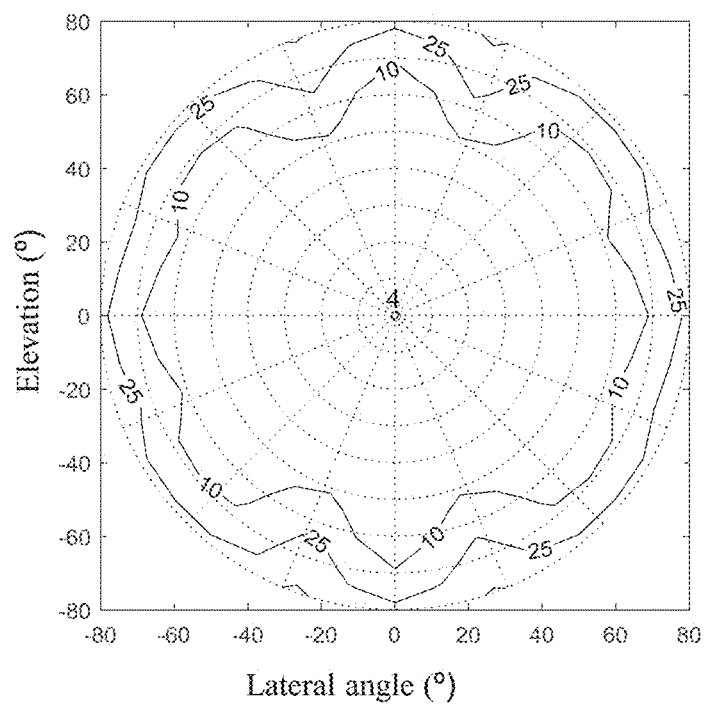
FIG. 11E is a graph illustrating the variation in reflectivity with polar direction for reflected light rays in FIG. 11A in a public mode.

FIG. 11A is a schematic diagram illustrating in perspective side view an arrangement of a switchable retarder in a public mode of operation wherein the switchable retarder comprises a switchable liquid crystal layer with homogeneous alignment and crossed A-plate polar control retarders; FIG. 11B is a schematic graph illustrating the variation of output luminance with polar direction for transmitted light rays in FIG. 11A in a privacy mode of operation; FIG. 11C is a schematic graph illustrating the variation in reflectivity with polar direction for reflected light rays in FIG. 11A in a privacy mode of operation; FIG. 11D is a schematic graph illustrating the variation of output luminance with polar direction for transmitted light rays in FIG. 11A in a public mode of operation; and FIG. 11E is a schematic graph illustrating the variation in reflectivity with polar direction for reflected light rays in FIG. 11A in a public mode of operation comprising the embodiments illustrated in TABLE 3A. Features of the arrangements of FIGS. 11A-E not discussed in further detail may be assumed to correspond to the features with equivalent reference numerals as discussed above, including any potential variations in the features.

TABLE 3A

| | | Passive polar control retarder(s) | | Active LC retarder | | | | |
|---|---|---|---|---|---|---|---|---|
| FIG. | Mode | Type | Δn.d/ nm | Alignment layers | Pretilt/ deg | Δn.d/ nm | Δε | Voltage/ V |
| 11D, 11E | Public | Crossed A | +500 @ 45° | Homogeneous | 2 | 750 | 13.2 | 10 |
| 11A, 11B, 11C | Privacy | | +500 @ 135° | Homogeneous | 2 | | | 2.3 |

The switchable liquid crystal retarder 301 comprises two surface alignment layers 419a, 419b disposed adjacent to the layer of liquid crystal material 421 and on opposite sides thereof and each arranged to provide homogeneous alignment in the adjacent liquid crystal material 421. The layer 314 of liquid crystal material 421 of the switchable liquid crystal retarder 301 comprises a liquid crystal material 421 with a positive dielectric anisotropy. The layer of liquid crystal material 421 has a retardance for light of a wavelength of 550 nm in a range from 500 nm to 900 nm, preferably in a range from 600 nm to 850 nm and most preferably in a range from 700 nm to 800 nm. The retarder 330 further comprises a pair of passive retarders 330A, 330B which have optical axes in the plane of the retarders that are crossed, each passive retarder of the pair of passive retarders having a retardance for light of a wavelength of 550 nm in a range from 300 nm to 800 nm, preferably in a range from 350 nm to 650 nm and most preferably in a range from 450 nm to 550 nm.

In comparison to the embodiments of TABLE 2, the passive polar control retarder 330 is provided by a pair of A-plates 330A, 330B that have crossed axes. In the present embodiments, 'crossed' refers to an angle of substantially 90° between the optical axes of the two retarders in the plane of the retarders. To reduce cost of retarder materials, it is desirable to provide materials with some variation of retarder orientation due to stretching errors during film manufacture for example. Variations in retarder orientation away from preferable directions can reduce the head-on luminance and increase the minimum transmission. Preferably the angle 310A is at least 35° and at most 55°, more preferably at least 400 and at most 50° and most preferably at least 42.5° and at most 47.5°. Preferably the angle 310B is at least 125° and at most 145°, more preferably at least 130° and at most 135° and most preferably at least 132.5° and at most 137.5°.

In comparison to the embodiments of TABLE 2, the liquid crystal retarder alignment is provided by a homogeneous rather than homeotropic alignment. Homogeneous alignment advantageously provides reduced recovery time during mechanical distortion, such as when touching the display.

The passive retarders may be provided using stretched films to advantageously achieve low cost and high uniformity. Further field of view for liquid crystal retarders with homogeneous alignment is increased while providing resilience to the visibility of flow of liquid crystal material during applied pressure.

It may be desirable to provide the additional polariser 318 with a different electric vector transmission direction to the electric vector transmission direction of the output polariser 218 and reflective polariser 302.

Figure 11F:
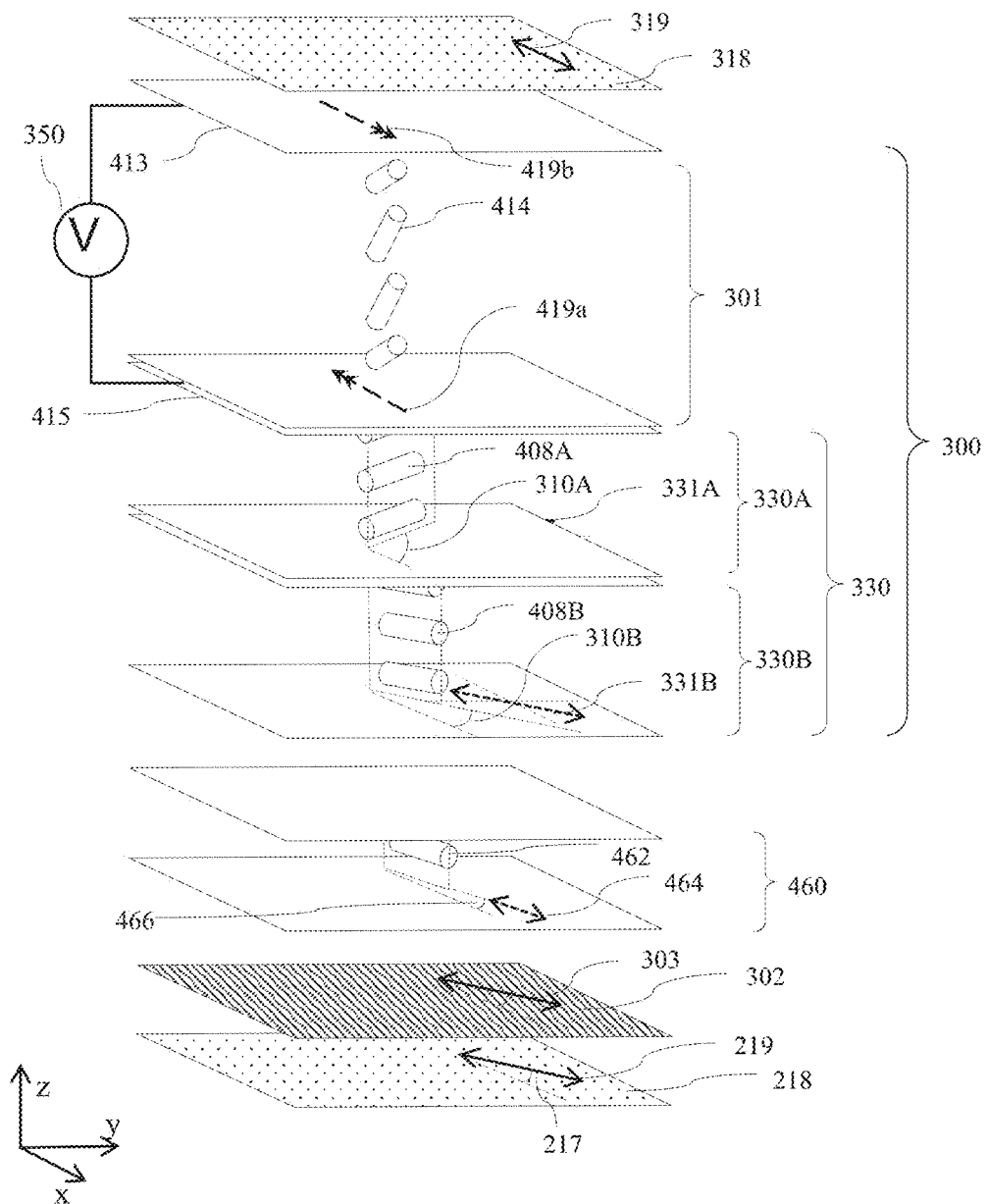
FIG. 11F is a diagram illustrating in perspective side view an arrangement of a switchable compensated retarder in a privacy mode comprising the crossed A-plate passive polar control retarders and homogeneously aligned switchable LC retarder, further comprising a passive rotation retarder.

FIG. 11F is a schematic diagram illustrating in perspective side view an arrangement of retarders 300 in a privacy mode of operation comprising the crossed A-plate passive polar control retarders 330A, 330B and homogeneously aligned switchable liquid crystal retarder 301, further comprising a passive rotation retarder 460 comprising the embodiments illustrated in TABLE 3B. Features of the arrangement of FIG. 11F not discussed in further detail may be assumed to correspond to the features with equivalent reference numerals as discussed above, including any potential variations in the features.

TABLE 3B

| Layer | Orientation/° | Retarder | Retardance/nm |
|---|---|---|---|
| Polariser 218 | 45 | — | — |
| Reflective polariser 302 | 45 | — | — |
| Rotation retarder 460 | 22.5 | A-plate | +275 |
| Polar control retarder 330A | 45 | A-plate | +450 |
| Polar control retarder 330A | 135 | A-plate | +450 |
| Switchable LC 301 | 0 | | See TABLE 7 |
| Polariser 318A | 0 | — | — |

The reflective polariser 302 and the additional polariser 318 have electric vector transmission directions 303, 319 that are not parallel, and the display device 100 further comprises a rotator retarder 406 arranged between the reflective polariser 302 and the additional polariser 318, the rotator retarder 406 being arrange to rotate a polarisation direction of polarised light incident thereon between the electric vector transmission direction of the display polariser 218 and electric vector transmission direction of the additional polariser 318.

The output polariser 218 and reflective polariser 302 may be provided with electric vector transmission directions 219, 303 that may be for example at an angle 317 of 45 degrees in the case of a twisted nematic LCD display. The additional polariser 318 may be arranged to provide vertically polarised light to a user who may be wearing polarising sunglasses that typically transmit vertically polarised light.

The passive rotation retarder 460 is different to the polar control retarder 330 of the present embodiments and its operation will now be described. Passive rotation retarder 460 may comprise a birefringent material 462 and be a half waveplate, with retardance at a wavelength of 550 nm of 275 nm for example. Passive rotation retarder 460 has a fast axis orientation 464 that is inclined at an angle 466 that may be 22.5 degrees to the electric vector transmission direction 319 of the additional polariser 318. The passive rotation retarder 460 thus rotates the polarisation from the output polariser 218 such that the polarisation direction of the light that is incident onto the polar control retarder 330B is parallel to the direction 319.

In operation the passive rotation retarder 460 modifies the on-axis polarisation state, by providing an angular rotation of the polarisation component from the output polariser 218. In comparison to the polar control retarders 330A, 330B together do not modify the on-axis polarisation state. Further, the passive rotation retarder 460 provides a rotation of polarisation that provides only a small variation of output luminance with viewing angle for off-axis directions. In comparison the polar control retarders 330A, 330B provide substantial modifications of output luminance with viewing angle.

Advantageously a display may be provided with an output polarisation direction 319 that is different from the display polariser polarisation direction 219, for example to provide viewing with polarising sunglasses.

In an alternative embodiment the separate retarder 460 may be omitted and the retardance of the retarder 330B of FIG. 11A increased to provide the half wave rotation. To continue the illustrative embodiment, the retardance of retarder 330B at a wavelength of 550 nm may be 275 nm greater than the retardance of retarder 330A. Advantageously the number of layers, complexity and cost may be reduced.

In other embodiments, the passive rotation retarder 460 may be provided between the display output polariser 218 and the reflective polariser 302 such that the electric vector transmission directions 303, 319 of the reflective polariser 302 and additional polariser 318 are parallel.

Figure 12A:
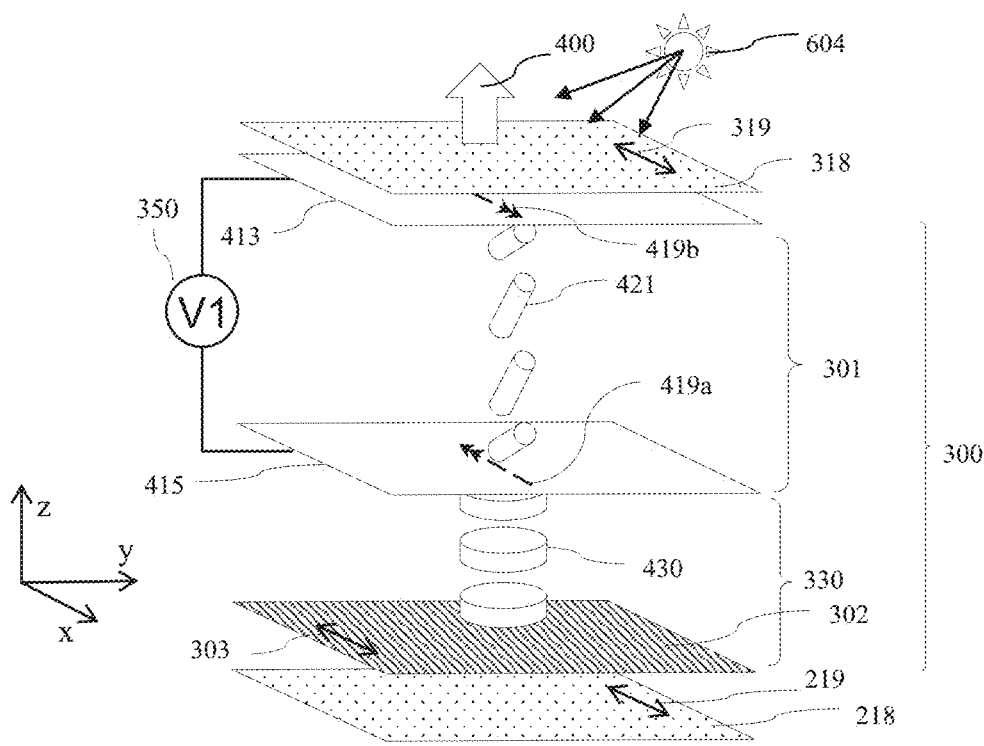
FIG. 12A is a diagram illustrating in perspective side view an arrangement of a switchable retarder in a privacy mode comprising a homogeneously aligned switchable LC retarder and a passive negative C-plate retarder driven with a first voltage.
Figure 12B:
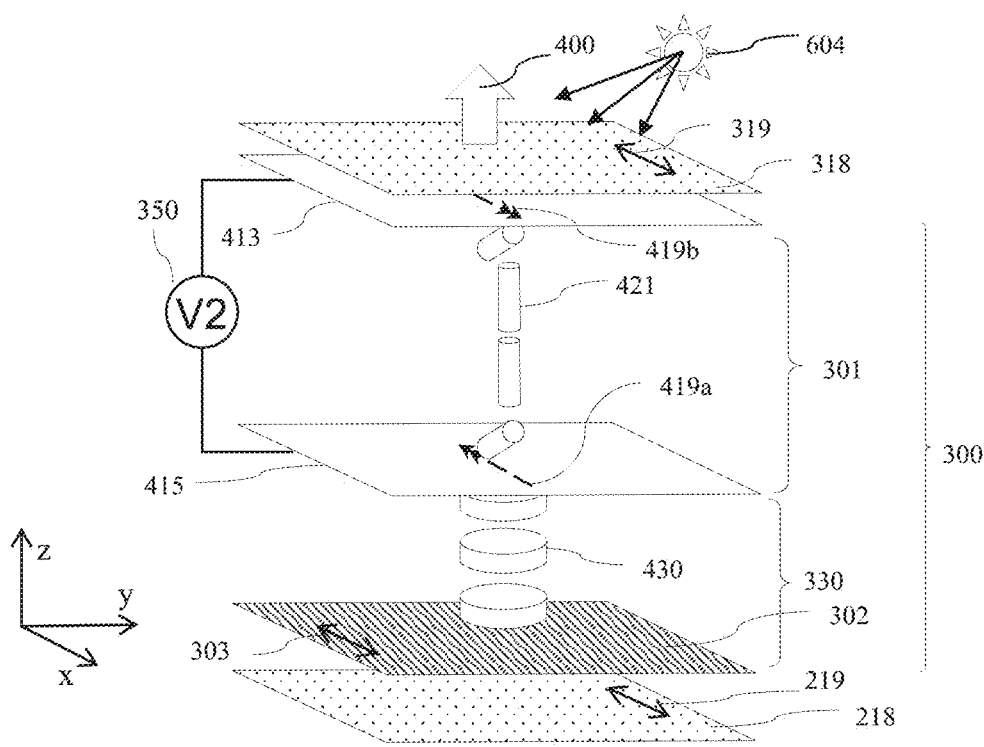
FIG. 12B is a diagram illustrating in perspective side view an arrangement of a switchable retarder in a privacy mode comprising a homogeneously aligned switchable LC retarder and a passive negative C-plate retarder driven with a second voltage different to the first voltage.

FIG. 12A is a schematic diagram illustrating in perspective side view an arrangement of a switchable retarder in a privacy mode of operation comprising a homogeneously aligned switchable liquid crystal retarder comprising liquid crystal 421 and a passive negative C-plate retarder 330 driven with a second voltage V1; and FIG. 12B is a schematic diagram illustrating in perspective side view an arrangement of a switchable retarder in a privacy mode of operation comprising a homogeneously aligned switchable liquid crystal retarder and a passive negative C-plate retarder driven with a second voltage V2 different to the first voltage V1. Features of the arrangements of FIGS. 12A-B not discussed in further detail may be assumed to correspond to the features with equivalent reference numerals as discussed above, including any potential variations in the features.

In comparison to the arrangement of FIG. 12A, the drive voltage V2 is increased to provide increased tilt for the molecules of the liquid crystal material 414 in the centre of the layer 314 of the liquid crystal retarder. Such increased tilt changes the retardation of the switchable liquid crystal retarder 301 between the privacy and public modes.

Figure 12C:
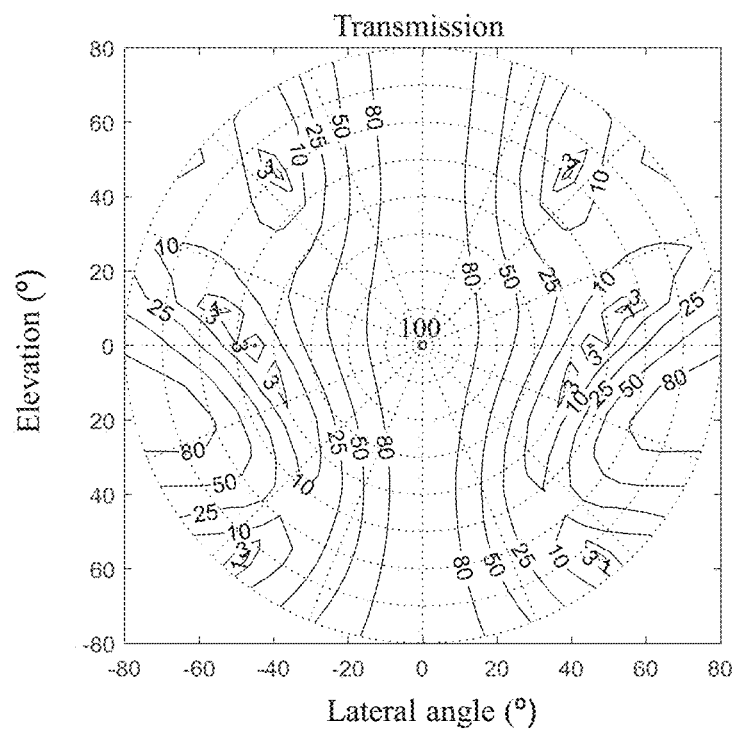
FIG. 12C is a graph illustrating the variation of output luminance with polar direction for transmitted light rays in FIG. 12A in a privacy mode.
Figure 12D:
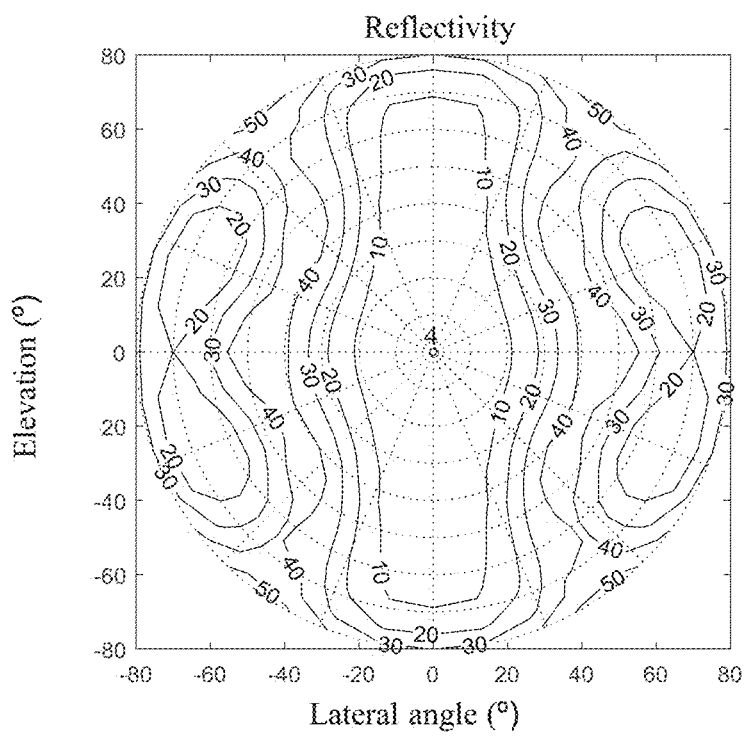
FIG. 12D is a graph illustrating the variation in reflectivity with polar direction for reflected light rays in FIG. 12A in a privacy mode.
Figure 12E:
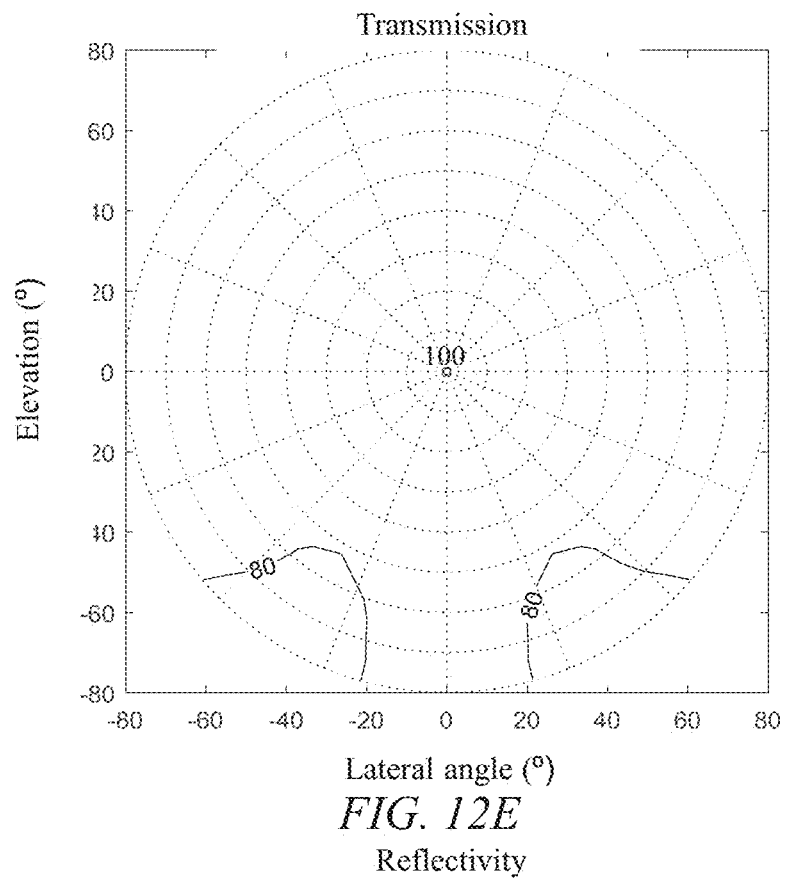
FIG. 12E is a graph illustrating the variation of output luminance with polar direction for transmitted light rays in FIG. 12B in a public mode.
Figure 12F:
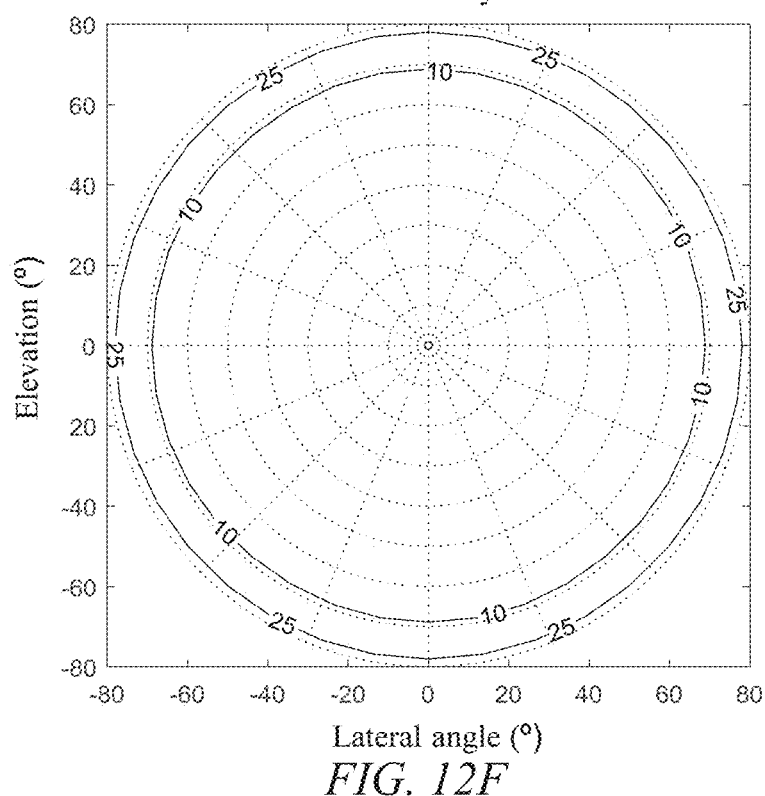
FIG. 12F is a graph illustrating the variation in reflectivity with polar direction for reflected light rays in FIG. 12B in a public mode.

FIG. 12C is a schematic graph illustrating the variation of output luminance with polar direction for transmitted light rays in FIG. 12A in a privacy mode of operation; and FIG. 12D is a schematic graph illustrating the variation in reflectivity with polar direction for reflected light rays in FIG. 12A in a privacy mode of operation. FIG. 12E is a schematic graph illustrating the variation of output luminance with polar direction for transmitted light rays in FIG. 12B in a public mode of operation; and FIG. 12F is a schematic graph illustrating the variation in reflectivity with polar direction for reflected light rays in FIG. 12B in a public mode of operation. Illustrative embodiments of the arrangement of homogeneous alignment in combination with passive retarders are shown in TABLE 4A.

TABLE 4A

| FIG. | Mode | Passive polar control retarder(s) | | Active LC retarder | | | | |
|---|---|---|---|---|---|---|---|---|
| | | Type | Δn.d/ nm | Alignment layers | Pretilt/ deg | Δn.d/ nm | Δε | Voltage/ V |
| 12E, 12F | Public | Negative C | −500 | Homogeneous | 2 | 750 | +13.2 | 10.0 |
| 12C, 12D | Privacy | | | Homogeneous | 2 | | | 3.8 |

The switchable liquid crystal retarder 301 comprises two surface alignment layers disposed adjacent to the layer of liquid crystal material and on opposite sides thereof and each arranged to provide homogeneous alignment in the adjacent liquid crystal material 414. The layer 314 of liquid crystal material 414 of the switchable liquid crystal retarder 301 comprises a liquid crystal material 414 with a positive dielectric anisotropy. The layer of liquid crystal material 414 has a retardance for light of a wavelength of 550 nm in a range from 500 nm to 900 nm, preferably in a range from 600 nm to 850 nm and most preferably in a range from 700 nm to 800 nm. The retarder 330 further comprises a passive retarder having an optical axis perpendicular to the plane of the retarder, the passive retarder having a retardance for light of a wavelength of 550 nm in a range from −300 nm to −700 nm, preferably in a range from −350 nm to −600 nm and most preferably −400 nm to −500 nm.

In comparison to FIG. 11A, advantageously thickness and complexity of the retarder 330 may be reduced.

A structure omitting passive polar control retarder 330 will now be described.

Figure 13A:
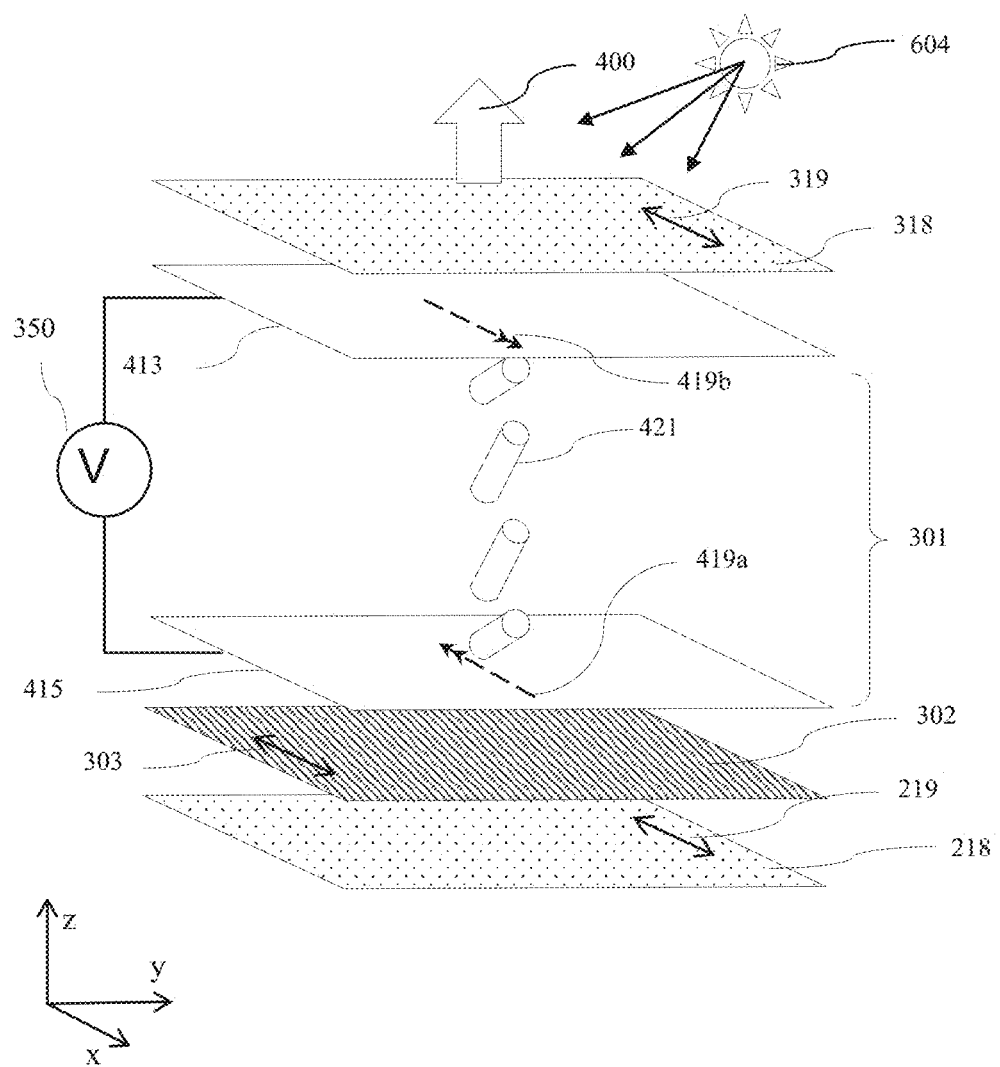
FIG. 13A is a diagram illustrating in perspective side view an arrangement of a switchable retarder in a privacy mode comprising a homogeneously aligned switchable LC retarder.
Figure 13B:
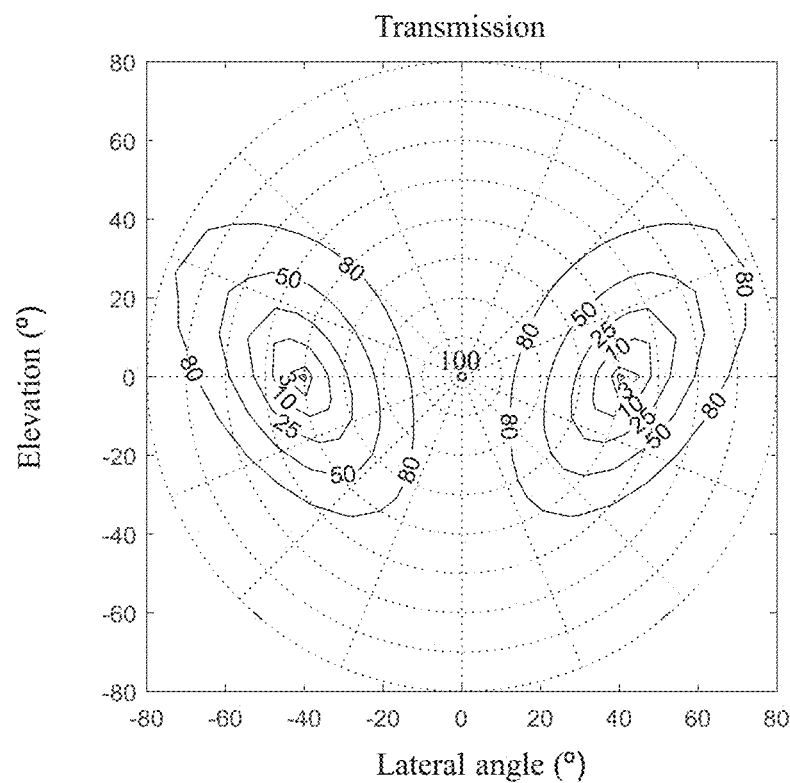
FIG. 13B is a graph illustrating the variation of output luminance with polar direction for transmitted light rays in FIG. 13A in a privacy mode.
Figure 13C:
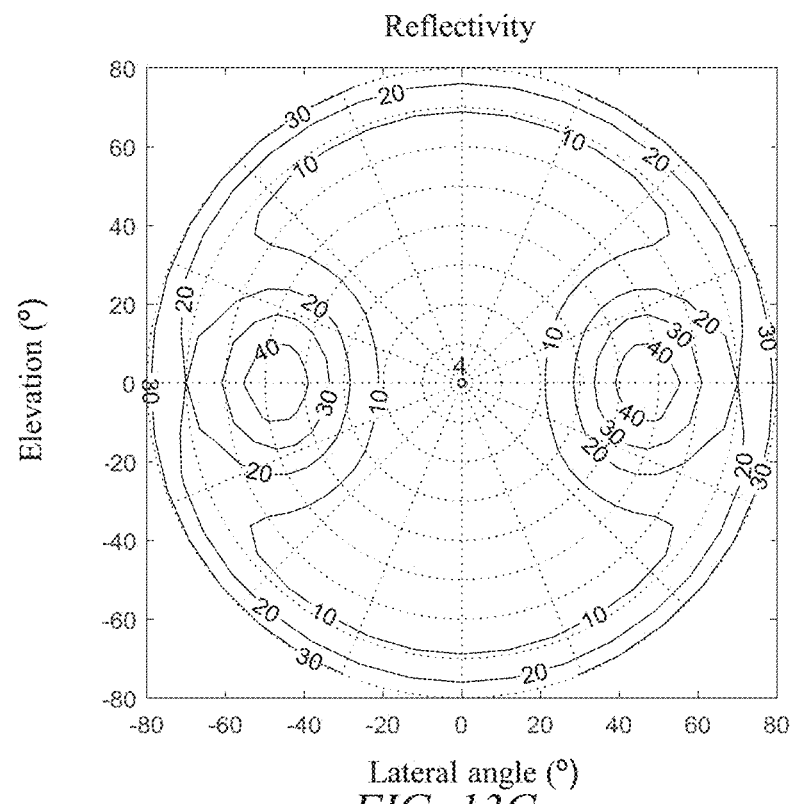
FIG. 13C is a graph illustrating the variation in reflectivity with polar direction for reflected light rays in FIG. 13A in a privacy mode.
Figure 13D:
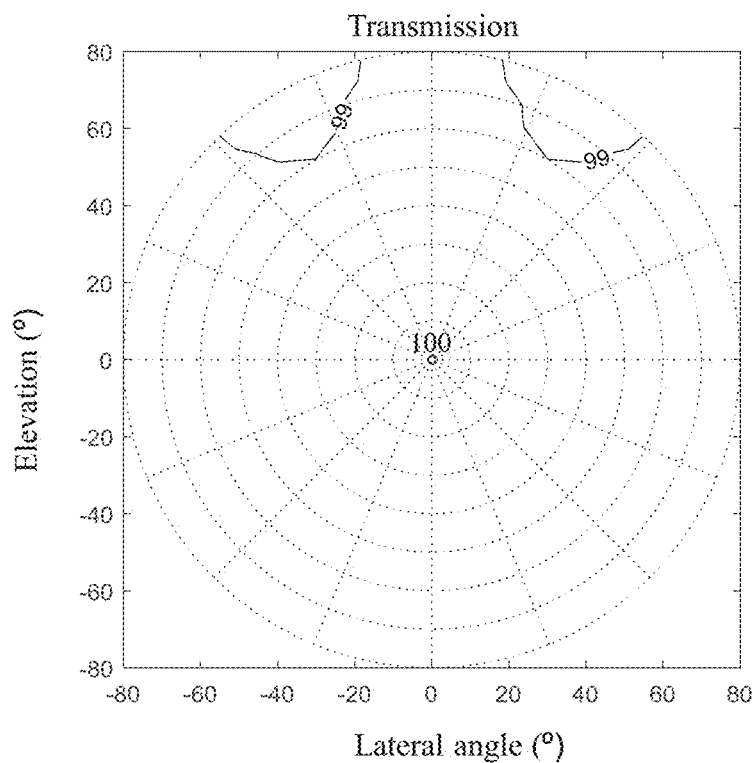
FIG. 13D is a graph illustrating the variation of output luminance with polar direction for transmitted light rays in FIG. 13A in a public mode.
Figure 13E:
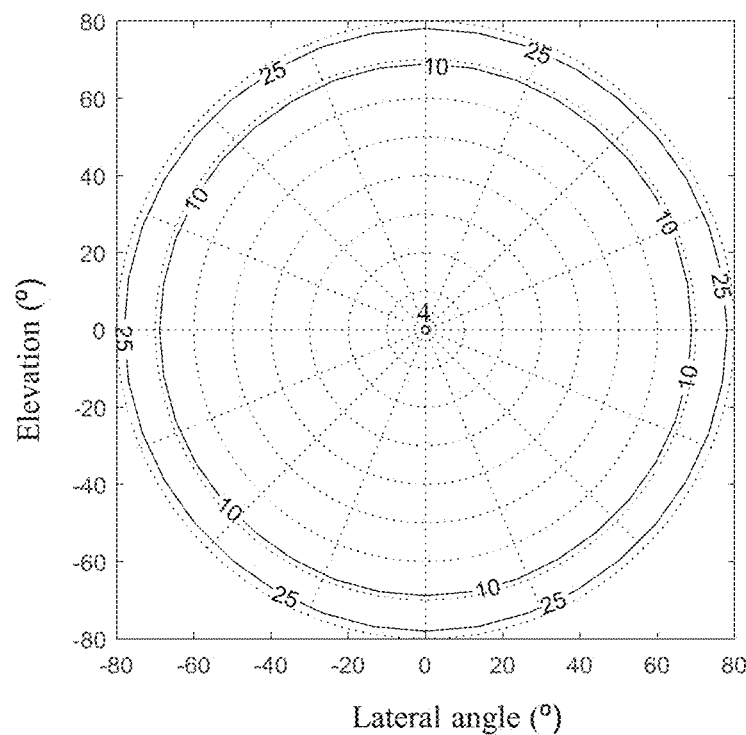
FIG. 13E is a graph illustrating the variation in reflectivity with polar direction for reflected light rays in FIG. 13A in a public mode.

FIG. 13A is a schematic diagram illustrating in perspective side view an arrangement of a switchable retarder in a privacy mode of operation comprising a homogeneously aligned switchable liquid crystal retarder 301 in a privacy mode of operation. The switchable liquid crystal retarder 301 comprises surface alignment layers 419a, 419b disposed adjacent to the layer of liquid crystal material 421 and arranged to provide homogeneous alignment at the adjacent liquid crystal material 421. FIG. 13B is a schematic graph illustrating the variation of output luminance with polar direction for transmitted light rays in FIG. 13A in a privacy mode of operation; FIG. 13C is a schematic graph illustrating the variation in reflectivity with polar direction for reflected light rays in FIG. 13A in a privacy mode of operation, FIG. 13D is a schematic graph illustrating the variation of output luminance with polar direction for transmitted light rays in FIG. 13A in a public mode of operation; and FIG. 13E is a schematic graph illustrating the variation in reflectivity with polar direction for reflected light rays in FIG. 13A in a public mode of operation.

An illustrative embodiment of the arrangement of FIG. 13A is given in TABLE 4B.

crystal material of the switchable liquid crystal retarder comprises a liquid crystal material with a positive dielectric anisotropy. The liquid crystal retarder 301 may have a retardance for light of a wavelength of 550 nm in a range from 500 nm to 1500 nm, preferably in a range from 700 nm to 1200 nm and most preferably in a range from 800 nm to 1000 nm.

The embodiments of FIGS. 13A-E advantageously achieve reduced cost and complexity as no passive retarder is provided. Further the public mode may be an undriven state of the liquid crystal material of the layer 314 and a relatively low voltage is used in the privacy mode. Further, in comparison to homeotropic alignment, homogeneous alignment layers may advantageously provide reduced visibility of liquid crystal material flow that arises from handling of the display surface, for example when a touch panel is used.

Figure 13F:
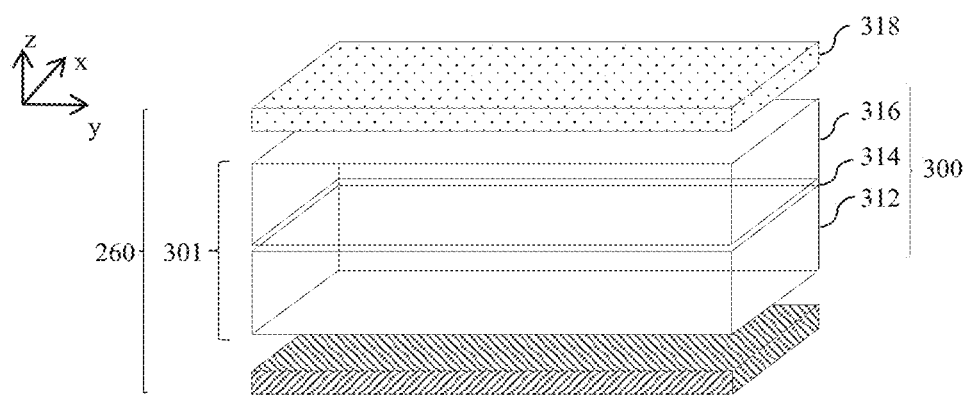
FIG. 13F is a diagram illustrating in side perspective view a view angle control element comprising a reflective polariser, a switchable LC retarder and an additional polariser.

FIG. 13F is a schematic diagram illustrating in side perspective view a view angle control element comprising a reflective polariser, a switchable liquid crystal retarder and an additional polariser. A low cost switchable after-market layer may be provided that provides privacy with a switchable 'bulls-eye' field-of-view profile.

Further arrangements of switchable retarders 300 will now be described.

Figure 14A:
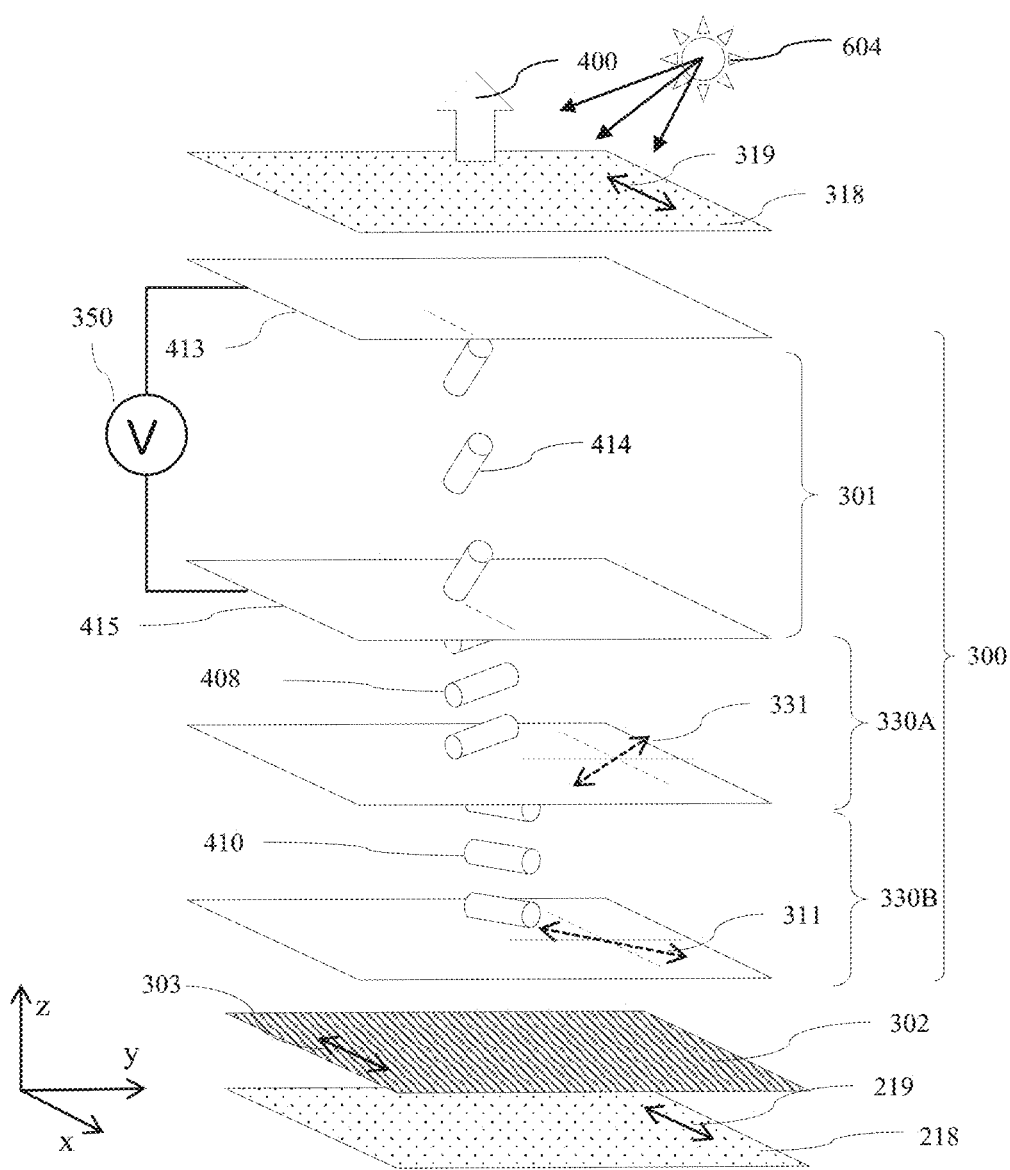
FIG. 14A is a diagram illustrating in perspective side view an arrangement of a switchable retarder in a privacy mode comprising crossed A-plate passive retarders and homeotropically aligned switchable LC retarder.
Figure 14B:
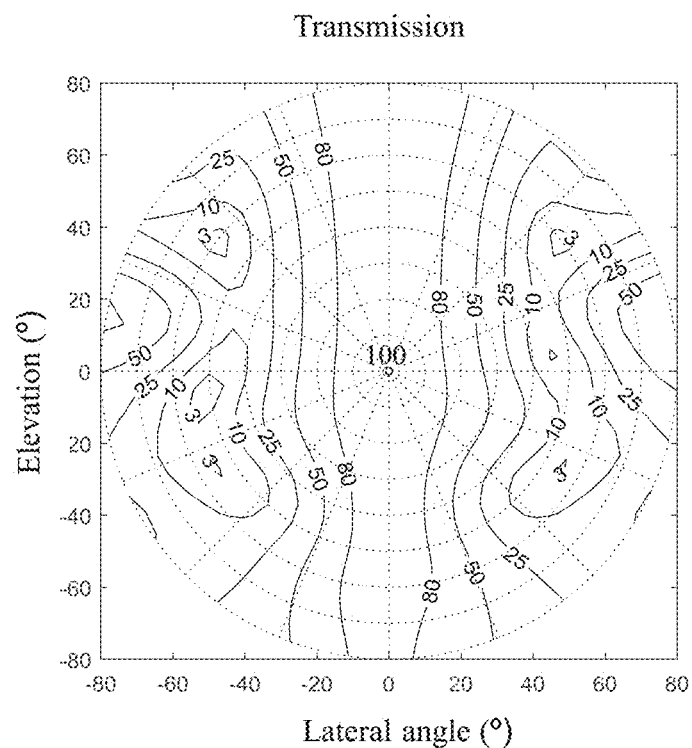
FIG. 14B is a graph illustrating the variation of output luminance with polar direction for transmitted light rays in FIG. 14A in a privacy mode.
Figure 14C:
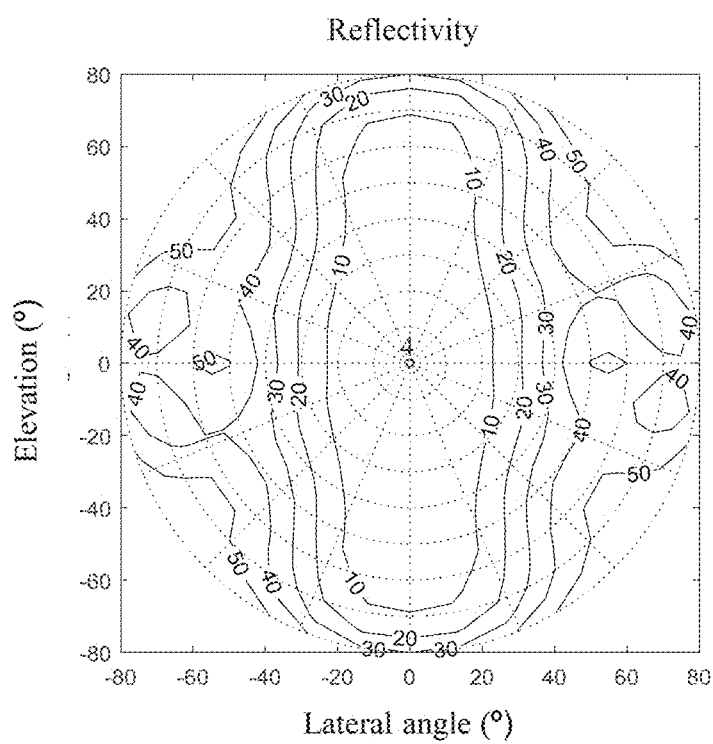
FIG. 14C is a graph illustrating the variation in reflectivity with polar direction for reflected light rays in FIG. 14A in a privacy mode.

FIG. 14A is a schematic diagram illustrating in perspective side view an arrangement of a switchable retarder in a privacy mode of operation comprising crossed A-plate passive retarders 330A, 330B and homeotropically aligned switchable liquid crystal retarder 301. FIG. 14B is a schematic graph illustrating the variation of output luminance with polar direction for transmitted light rays in FIG. 14A in a privacy mode of operation; and FIG. 14C is a schematic graph illustrating the variation in reflectivity with polar direction for reflected light rays in FIG. 14A in a privacy mode of operation. Features of the arrangements of FIGS. 14A-C not discussed in further detail may be assumed to correspond to the features with equivalent reference numerals as discussed above, including any potential variations in the features.

TABLE 4B

| | | Active LC retarder | | | | |
|---|---|---|---|---|---|---|
| FIG. | Mode | Alignment layers | Pretilt/ deg | Δn.d/ nm | Δε | Voltage/ V |
| 13D, 13E | Public | Homogeneous | 1 | 900 | +15 | 0 |
| 13A, 13B, 13C | Privacy | Homogeneous | 1 | | | 2.4 |

Figure 14D:
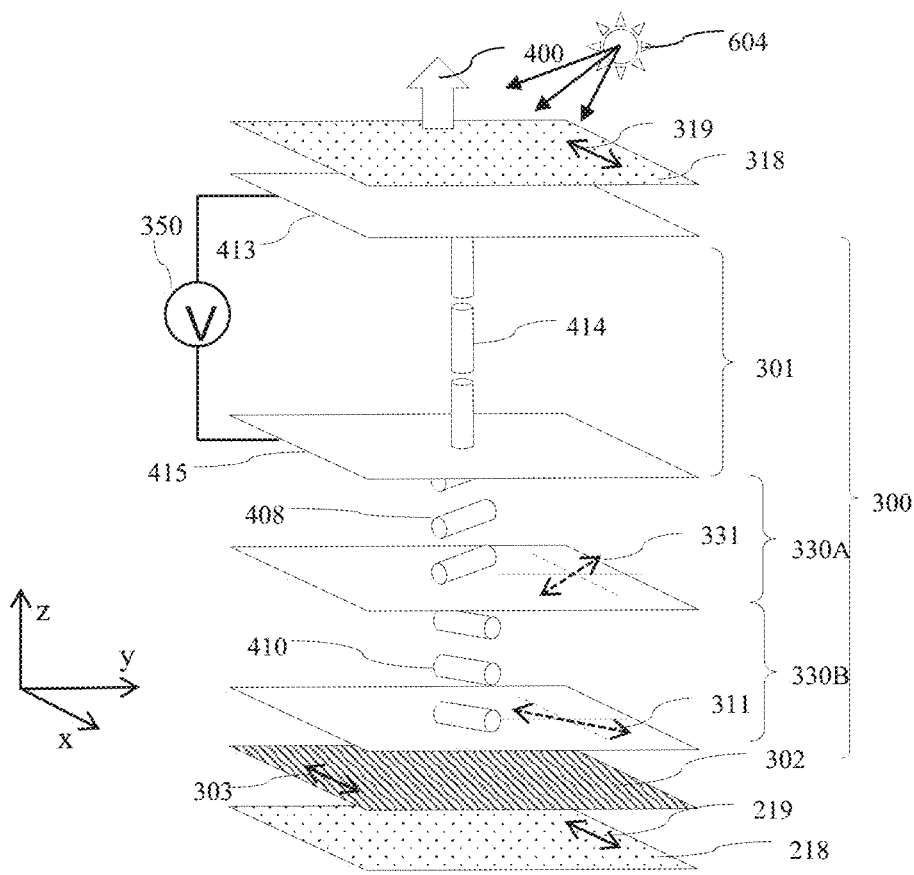
FIG. 14D is a diagram illustrating in perspective side view an arrangement of a switchable retarder in a public mode comprising crossed A-plate passive retarders and homeotropically aligned switchable LC retarder.
Figure 14E:
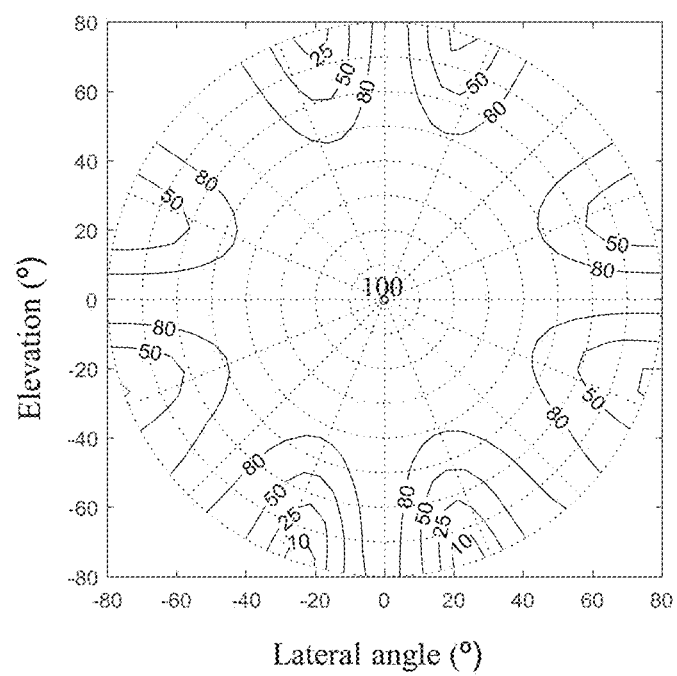
FIG. 14E is a graph illustrating the variation of output luminance with polar direction for transmitted light rays in FIG. 14D in a public mode.
Figure 14F:
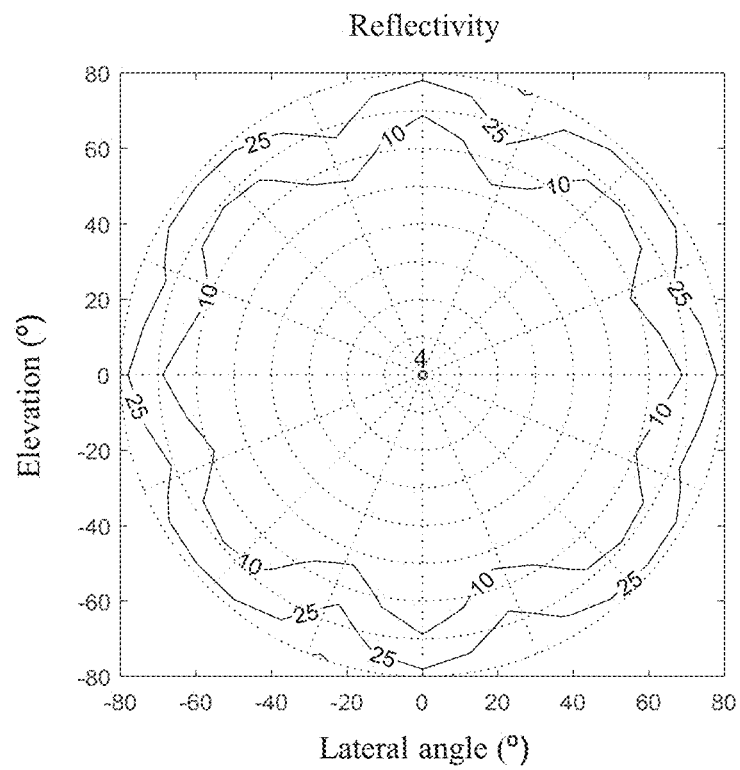
FIG. 14F is a graph illustrating the variation in reflectivity with polar direction for reflected light rays in FIG. 14D in a privacy mode.

The switchable liquid crystal retarder 301 comprises two surface alignment layers disposed adjacent to the layer of FIG. 14D is a schematic diagram illustrating in perspective side view an arrangement of a switchable retarder in a public mode of operation comprising crossed A-plate passive retarders and homeotropically aligned switchable liquid crystal retarder. FIG. 14E is a schematic graph illustrating the variation of output luminance with polar direction for transmitted light rays in FIG. 14D in a public mode of operation; and FIG. 14F is a schematic graph illustrating the variation in reflectivity with polar direction for reflected light rays in FIG. 14D in a public mode of operation. Features of the arrangements of FIGS. 14D-F not discussed in further detail may be assumed to correspond to the features with equivalent reference numerals as discussed above, including any potential variations in the features.

Thus the passive polar control retarder 330 comprises a pair of retarders 330A, 330B which have optical axes in the plane of the retarders that are crossed. The pair of retarders 330A, 330B have optical axes that each extend at +/−45° with respect to an electric vector transmission direction of the output polariser. The pair of retarders 330A, 330B each comprise a single A-plate. An illustrative embodiment is described in TABLE 5.

Figure 15A:
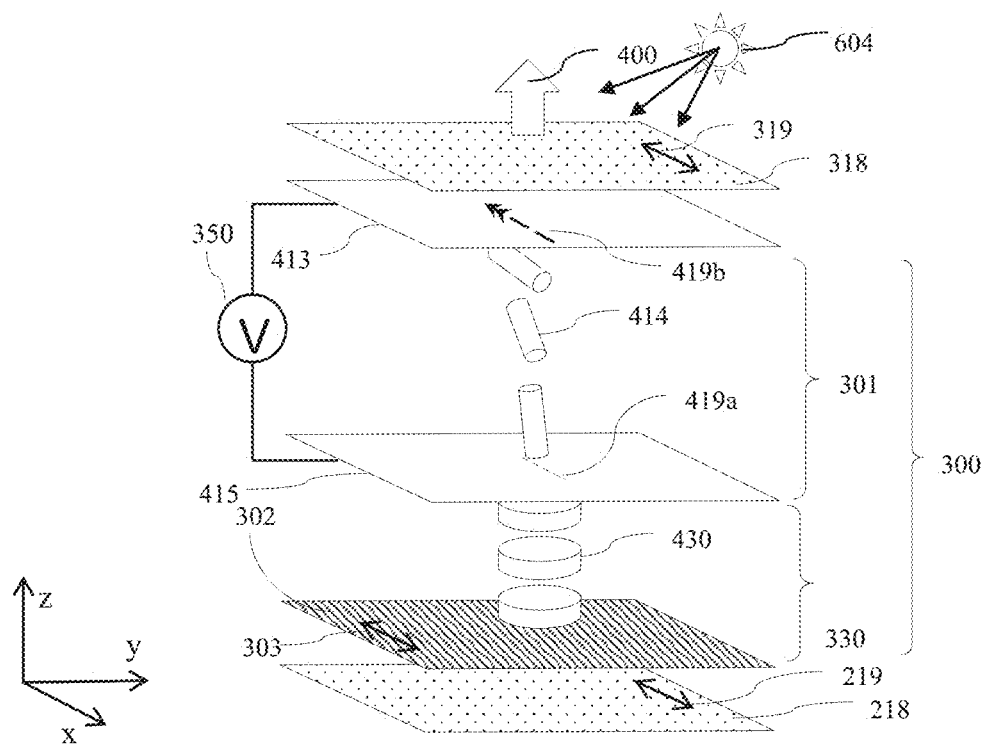
FIG. 15A is a diagram illustrating in perspective side view an arrangement of a switchable retarder in a privacy mode comprising a homogeneously and homeotropically aligned switchable LC retarder and a passive negative C-plate retarder.
Figure 15B:
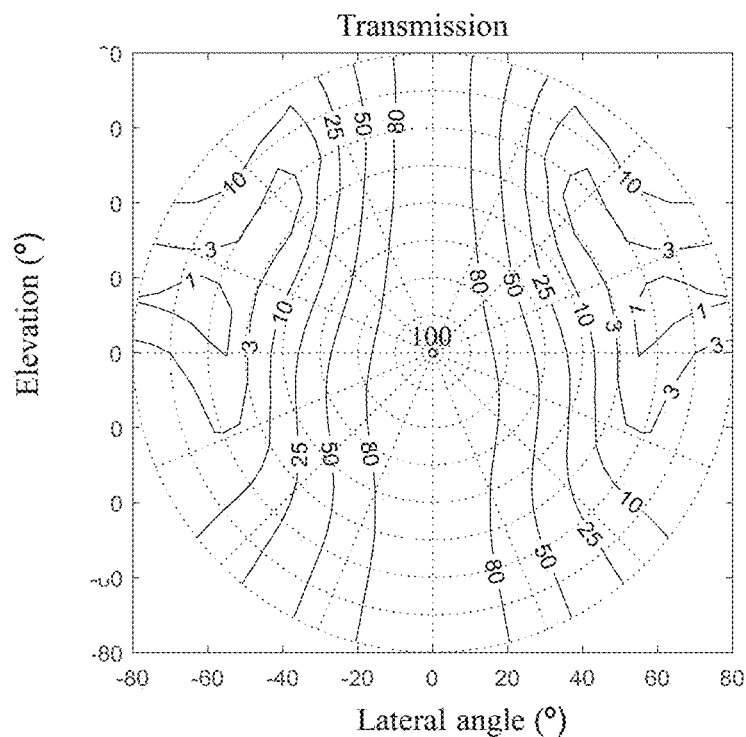
FIG. 15B is a graph illustrating the variation of output luminance with polar direction for transmitted light rays in FIG. 15A in a privacy mode.
Figure 15C:
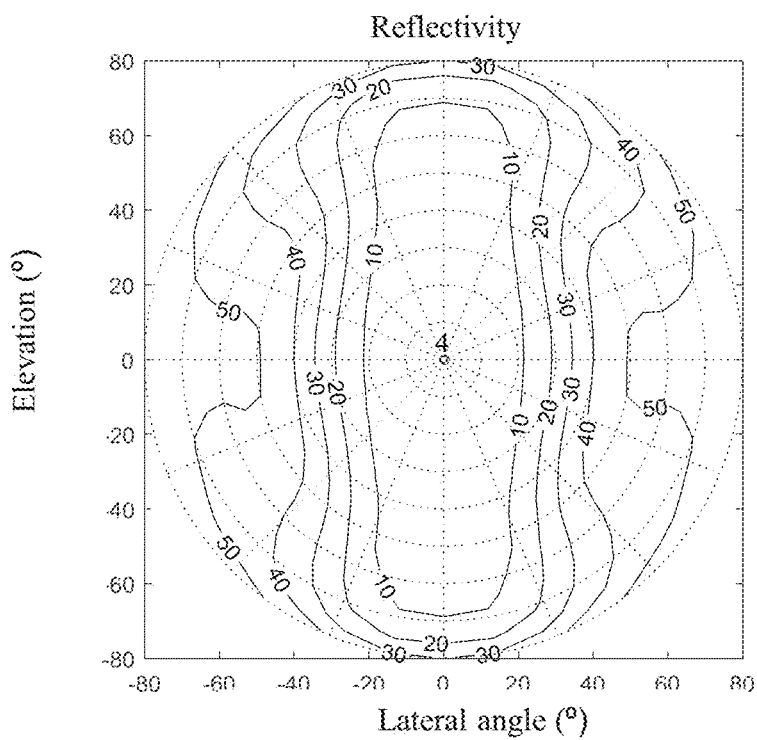
FIG. 15C is a graph illustrating the variation in reflectivity with polar direction for reflected light rays in FIG. 15A in a privacy mode.
Figure 15D:
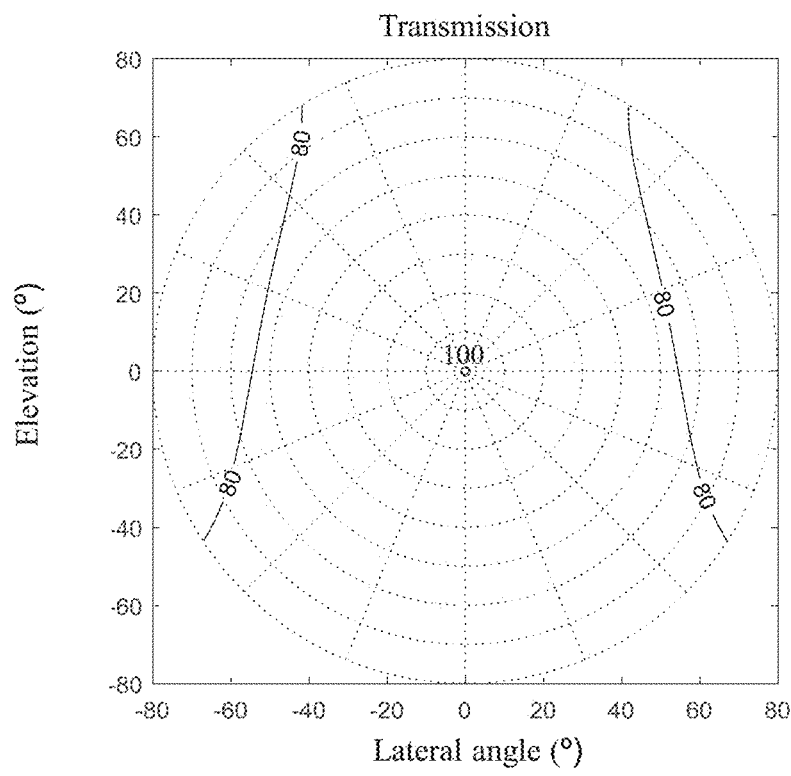
FIG. 15D is a graph illustrating the variation of output luminance with polar direction for transmitted light rays in FIG. 15A in a public mode.
Figure 15E:
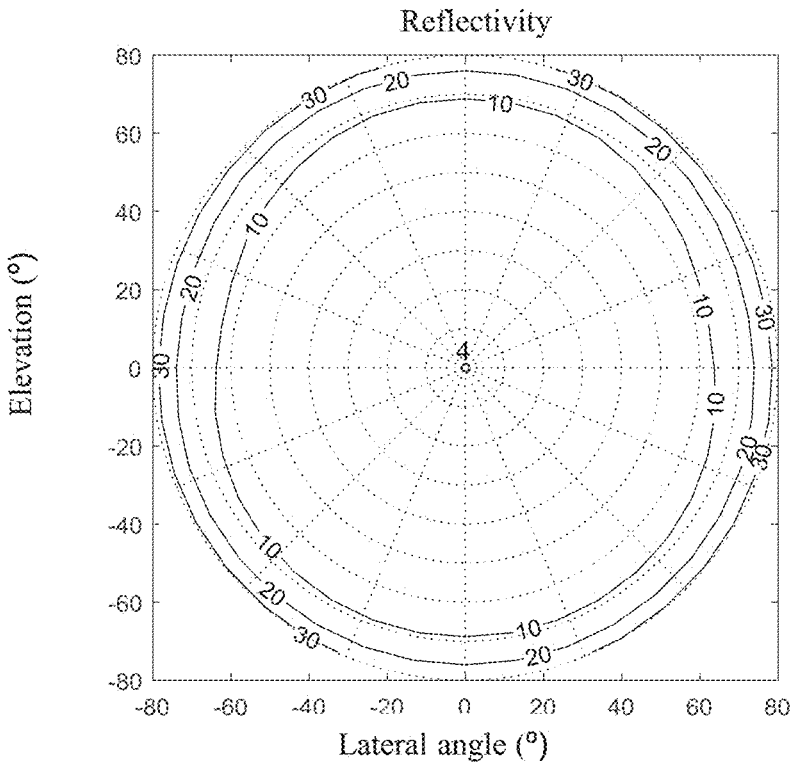
FIG. 15E is a graph illustrating the variation in reflectivity with polar direction for reflected light rays in FIG. 15A in a public mode.

FIG. 15A is a schematic diagram illustrating in perspective side view an arrangement of a switchable retarder in a privacy mode of operation comprising a homogeneously and homeotropically aligned switchable liquid crystal retarder 301 comprising liquid crystal material 423 and a passive negative C-plate retarder 330. FIG. 15B is a schematic graph illustrating the variation of output luminance with polar direction for transmitted light rays in FIG. 15A in a privacy mode of operation; and FIG. 15C is a schematic graph illustrating the variation in reflectivity with polar direction for reflected light rays in FIG. 15A in a privacy mode of operation. FIG. 15D is a schematic graph illustrating the variation of output luminance with polar direction for transmitted light rays in FIG. 15A in a public mode of operation; and FIG. 15E is a schematic graph illustrating the variation in reflectivity with polar direction for reflected light rays in

TABLE 5

| | | Passive polar control retarder(s) | | | Active LC retarder | | | |
|---|---|---|---|---|---|---|---|---|
| FIG. | Mode | Type | Δn.d/ nm | Alignment layers | Pretilt/ deg | Δn.d/ nm | Δε | Voltage/ V |
| 14D, 14E, 14F | Public | Crossed A | +650 @ 45° | Homeotropic | 88 | 810 | −4.3 | 0 |
| 14A, 14B, 14C | Privacy | | +650 @ −45° | Homeotropic | 88 | | | 2.3 |

The switchable liquid crystal retarder 301 comprises two surface alignment layers disposed on electrodes 413, 415 and adjacent to the layer of liquid crystal material 414 and on opposite sides thereof and each arranged to provide homeotropic alignment in the adjacent liquid crystal material 414. The layer of liquid crystal material 414 of the switchable liquid crystal retarder 301 comprises a liquid crystal material with a negative dielectric anisotropy. The layer 314 of liquid crystal material has a retardance for light of a wavelength of 550 nm in a range from 500 nm to 1000 nm, preferably in a range from 600 nm to 900 nm and most FIG. 15A in a public mode of operation. Features of the arrangements of FIGS. 15A-E not discussed in further detail may be assumed to correspond to the features with equivalent reference numerals as discussed above, including any potential variations in the features.

An embodiment of the arrangement of hybrid alignment comprising both homeotropic and homogeneous alignment layers in combination with a passive retarder, are illustrated in TABLE 6.

TABLE 6

| | | Passive polar control retarded(s) | | | Active LC retarder | | | |
|---|---|---|---|---|---|---|---|---|
| FIG. | Mode | Type | Δn.d/ nm | Alignment layers | Pretilt/ deg | Δn.d/ nm | Δε | Voltage/ V |
| 15D, 15E | Public | Negative C | −1100 | Homogeneous | 2 | 1300 | +4.3 | 15.0 |
| 15B, 15C | Privacy | | | Homeotropic | 88 | | | 2.8 | preferably in a range from 700 nm to 850 nm. The retarder 301 further comprises a pair of passive retarders which have optical axes in the plane of the retarders that are crossed, each passive retarder of the pair of passive retarders having a retardance for light of a wavelength of 550 nm in a range from 300 nm to 800 nm, preferably in a range from 500 nm to 700 nm and most preferably in a range from 550 nm to 675 nm.

Advantageously high reflectivity may be provided over a wide field of view in privacy mode. A-plates may be more conveniently manufactured at lower cost than for the C-plate retarders.

Hybrid aligned liquid crystal retarders 301 will now be described.

The switchable liquid crystal retarder 301 comprises two surface alignment layers 419a, 419b disposed adjacent to the layer 314 of liquid crystal material 414 and on opposite sides thereof, one of the surface alignment layers 419a being arranged to provide homeotropic alignment in the adjacent liquid crystal material 414 and the other of the surface alignment layers 419b being arranged to provide homogeneous alignment in the adjacent liquid crystal material 414.

In comparison to embodiments with two homeotropic or two homogeneous alignment layers, the design of passive polar control retarder 330 may be different if placed on the side of the homeotropic alignment layer 419a or placed on the side of the homogeneous alignment layer 419b.

When the surface alignment layer 419b arranged to provide homogeneous alignment is between the layer 314 of liquid crystal material 414 and the polar control retarder 330, the liquid crystal retarder 301 has a retardance for light of a wavelength of 550 nm in a range from 700 nm to 2000 nm, preferably in a range from 1000 nm to 1500 nm and most preferably in a range from 1200 nm to 1500 nm. The polar control retarder 300 may further comprise a passive polar control retarder 330 having its optical axis perpendicular to the plane of the retarder, the passive polar control retarder 330 having a retardance for light of a wavelength of 550 nm in a range from −400 nm to −1800 nm, preferably in a range from −700 nm to −1500 nm and most preferably in a range from −900 nm to −1300 nm.

The C-plate of FIG. 15A may be replaced by crossed A-plates. When the polar control retarder 300 further comprises a pair of passive retarders which have optical axes in the plane of the retarders that are crossed, each retarder of the pair of retarders having a retardance for light of a wavelength of 550 nm in a range from 400 nm to 1800 nm, preferably in a range from 700 nm to 1500 nm and most preferably in a range from 900 nm to 1300 nm.

When the surface alignment layer 419a arranged to provide homeotropic alignment is between the layer 314 of liquid crystal material 414 and the polar control retarder 330, the liquid crystal retarder 301 has a retardance for light of a wavelength of 550 nm in a range from 500 nm to 1800 nm, preferably in a range from 700 nm to 1500 nm and most preferably in a range from 900 nm to 1350 nm. The polar control retarder 300 may further comprise a passive polar control retarder 330 having its optical axis perpendicular to the plane of the retarder 330, the passive polar control retarder 330 having a retardance for light of a wavelength of 550 nm in a range from −300 nm to −1600 nm, preferably in a range from −500 nm to −1300 nm and most preferably in a range from −700 nm to −1150 nm; or the retarder 330 may further comprise a pair of passive retarders which have optical axes in the plane of the retarders that are crossed, each retarder of the pair of retarders having a retardance for light of a wavelength of 550 nm in a range from 400 nm to 1600 nm, preferably in a range from 600 nm to 1400 nm and most preferably in a range from 800 nm to 1300 nm.

Advantageously, hybrid alignment of FIG. 15A achieves increased polar angular range over which reflectivity from reflective polariser 302 is increased.

Further display structures will now be described, comprising multiple optical stacks to achieve control of field of view of a privacy or low stray light display apparatus.

Figure 16:
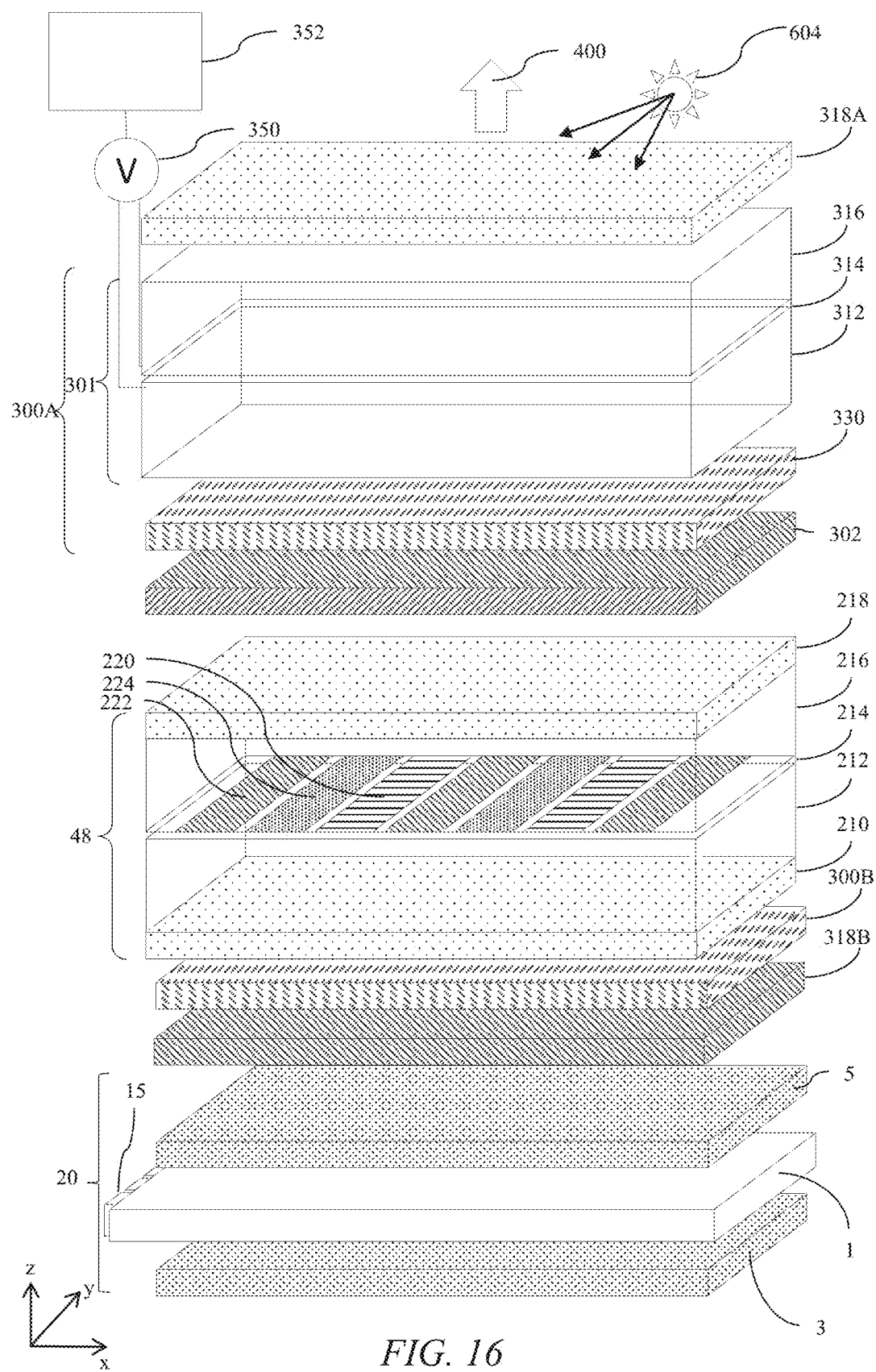
FIG. 16 is a diagram illustrating in side perspective view a switchable privacy display for use in ambient illumination comprising a non-collimating backlight, a passive retarder arranged between a reflective recirculation polariser and a transmissive SLM, a reflective polariser, a compensated switchable retarder and additional polariser.

FIG. 16 is a schematic diagram illustrating in side perspective view a switchable privacy display 100 for use in ambient illumination comprising a non-collimating backlight 20, a further passive polar control retarder 300B arranged between a reflective recirculation polariser 318B and the transmissive SLM 48, a reflective polariser 302, polar control retarder 300A and additional polariser 318A. Thus in comparison to the display of FIG. 1A, FIG. 16 further comprises a further passive polar control retarder 300B arranged between the input polariser 210 of the transmissive SLM 48 and the further additional polariser 318B. A further additional polariser 318B is provided by reflective polariser 318B arranged to recirculate light in the backlight 20 and advantageously increase efficiency in a similar manner to the reflective polariser 208 of FIG. 1A.

Advantageously the field of view of the display is modified by the further additional polariser 318B to reduce off-axis luminance from the SLM 48. Stray light is reduced and visual security level to a snooper is increased. The additional polariser 318B may be a reflective polariser. This is different to reflective polariser 302. Additional reflective polariser 318B provides light recirculation in the backlight 20, and does not increase front reflection in privacy mode. Advantageously efficiency is increased.

Figure 17A:
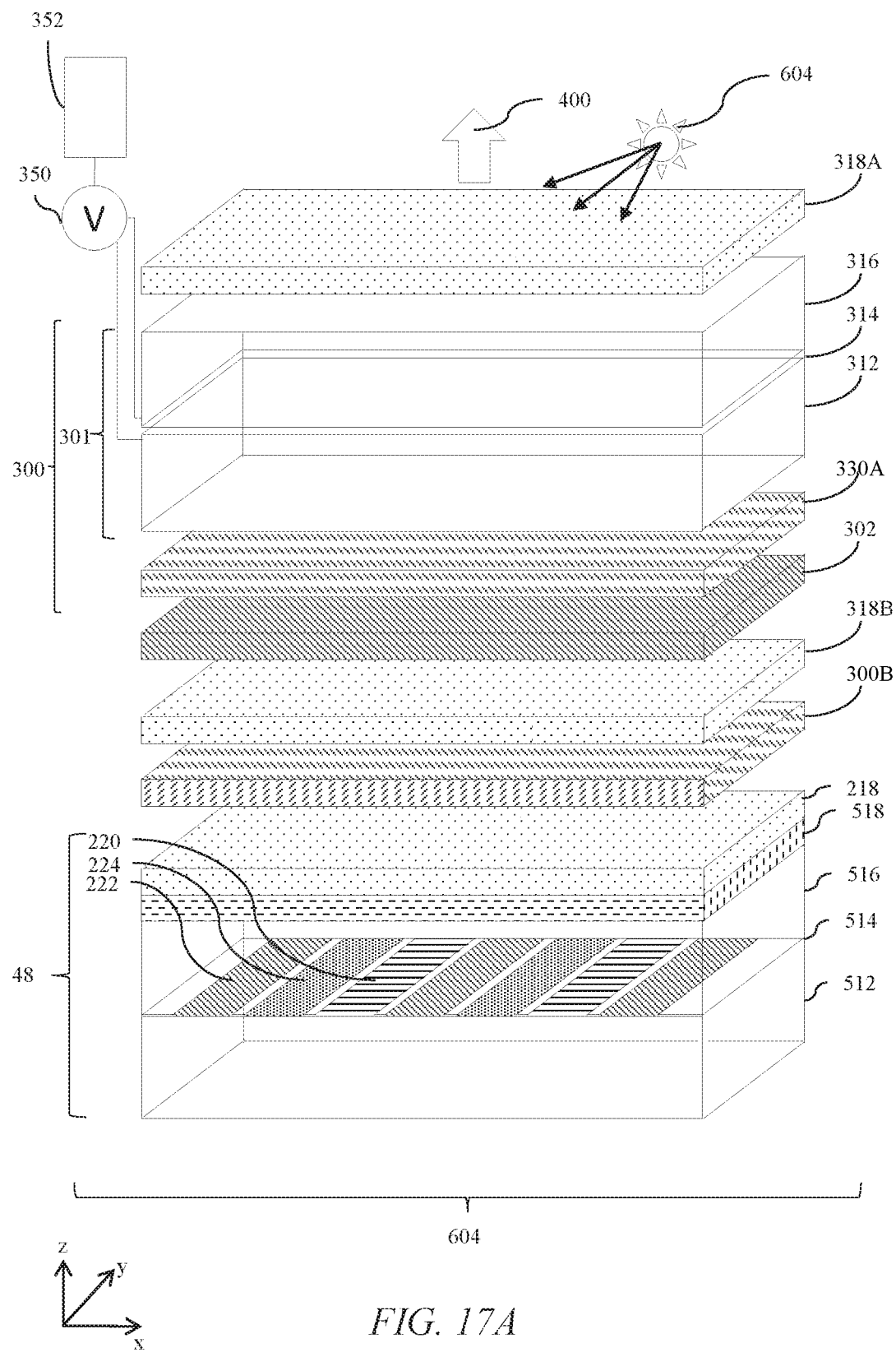
FIG. 17A is a diagram illustrating in side perspective view a switchable privacy display for use in ambient illumination comprising an emissive SLM, a passive control retarder, a further additional polariser, a reflective polariser, a compensated switchable retarder and an additional polariser.

FIG. 17A is a schematic diagram illustrating in side perspective view a switchable privacy display for use in ambient illumination comprising an emissive SLM 48, a passive control retarder 300B, a further additional polariser 318B, a reflective polariser 302, plural retarders 300 and an additional polariser 318A. A further polar control retarder 300B is arranged between the output polariser 218 and the reflective polariser 302. A further additional polariser 318A is arranged between the further polar control retarder 300B and the reflective polariser 302.

Figure 17B:
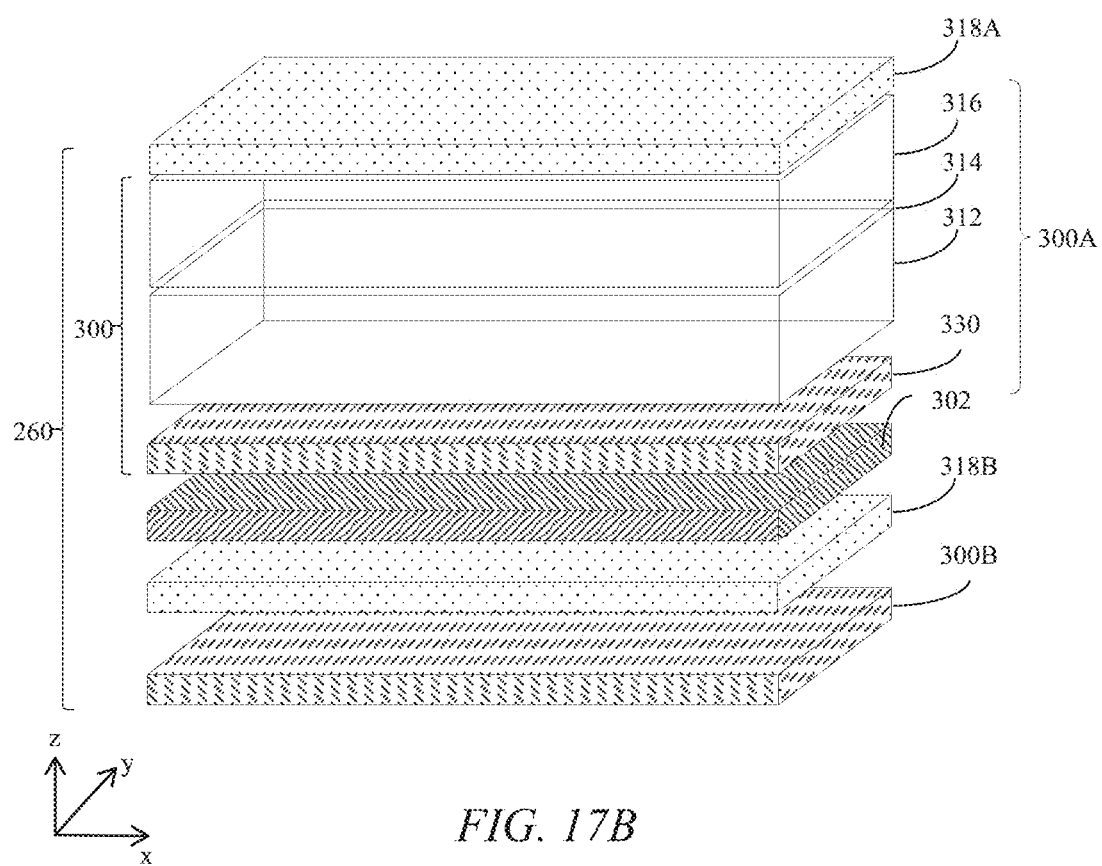
FIG. 17B is a diagram illustrating in side perspective view a view angle control element comprising a passive control retarder, a first additional polariser, a reflective polariser, a passive polar control retarder, a switchable LC retarder and a second additional polariser.

FIG. 17B is a schematic diagram illustrating in side perspective view a view angle control element 260 for an emissive display.

In operation, light from the display output polariser 218 has a field-of-view modification from the passive polar control retarder 300B and further additional polariser 318B. Advantageously, the field of view from the emissive display is reduced. The reflective polariser 302, plural polar control retarders 300A and an additional polariser 318A provide switching between a public mode that is determined by the SLM 48, retarder 300B and further additional polariser 318B and a privacy mode with high off-axis reflectivity and reduced off-axis luminance in comparison to that achieved by the display 100 of FIG. 1B.

In comparison to the display of FIG. 1B, FIG. 17A further comprises a further polar control retarder 300B and a further additional polariser 318B, wherein the further polar control retarder 300B is arranged between the first-mentioned additional polariser and the further additional polariser 318B.

It would be desirable to provide a public mode with high image visibility for off-axis viewing and a privacy mode with high visual security level. Embodiments of switchable privacy displays comprising further plural retarders and further additional polarisers will now be described.

Figure 18A:
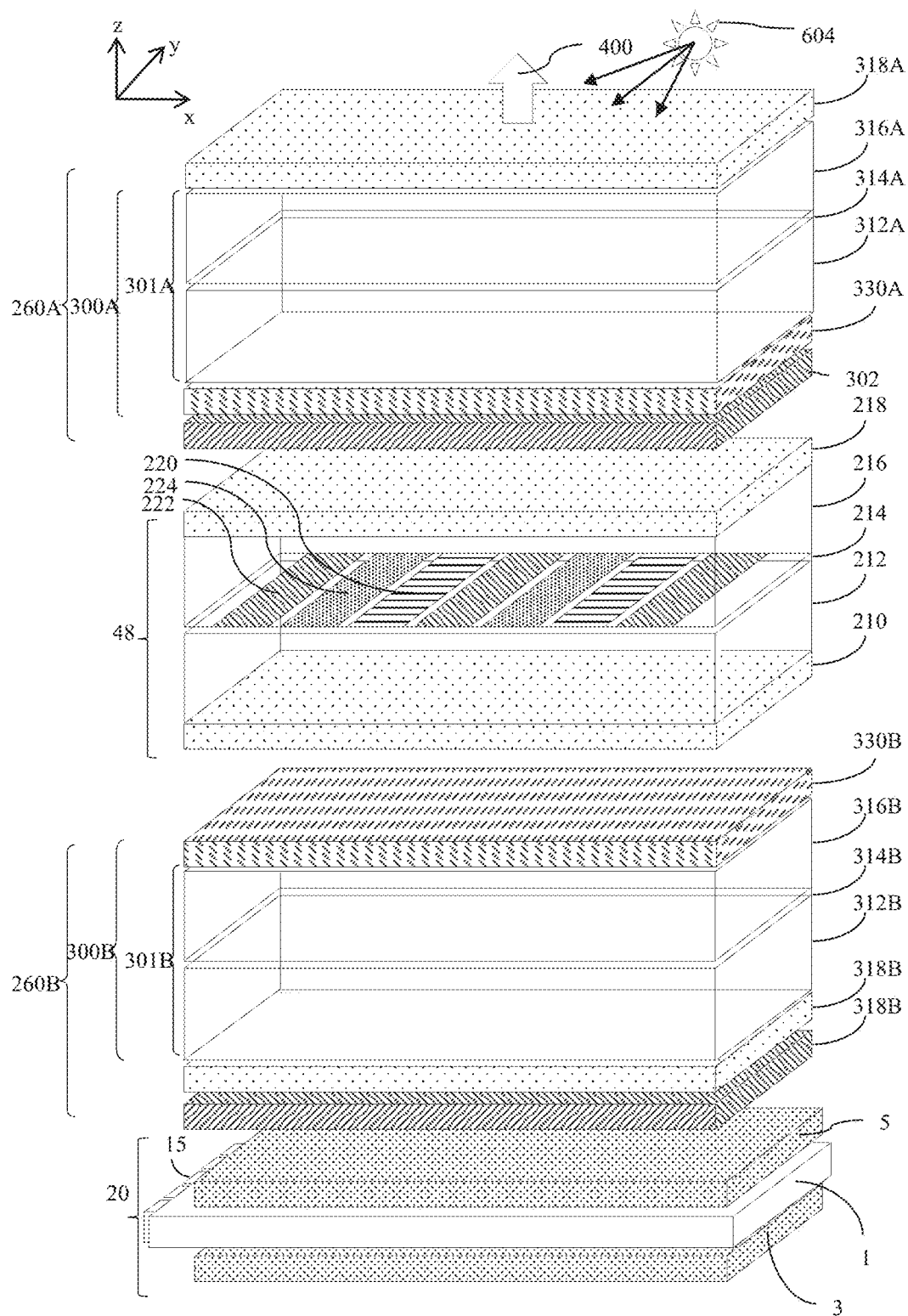
FIG. 18A is a diagram illustrating in side perspective view a switchable privacy display for use in ambient illumination comprising a wide angle backlight wherein first plural retarders are arranged between backlight and the SLM and further plural retarders are arranged to receive light from the SLM.

FIG. 18A is a schematic diagram illustrating in side perspective view a switchable privacy display 100 for use in ambient illumination 604 comprising a wide angle backlight 20 wherein first polar control retarder 300A is arranged between the backlight 20 and the SLM 48 and further polar control retarder 300B is arranged to receive light from the SLM 48. Features of the arrangements of FIGS. 16-18B not discussed in further detail may be assumed to correspond to the features with equivalent reference numerals as discussed above, including any potential variations in the features.

FIG. 18A has a similar structure to FIG. 1A with view angle control element 260A provided to receive light from the output polariser 218 of the SLM.

By way of comparison, the backlight 20 may be provided by a wide angle backlight 20, as described elsewhere rather than a directional backlight. The SLM 48 is a transmissive SLM arranged to receive output light 400 from the backlight 20, and the SLM 48 further comprises an input polariser 210 arranged on the input side of the SLM 48, the input polariser 210 being a linear polariser. A further additional polariser 318B is arranged on the input side of the input polariser 210, the further additional polariser 318B being a linear polariser. At least one further polar control retarder 300B is arranged between the further additional polariser 318B and the input polariser 210.

The first-mentioned at least one polar control retarder 300A comprises a first switchable liquid crystal retarder 301A comprising a first layer 314A of liquid crystal material, and the at least one further polar control retarder 300B comprises a second switchable liquid crystal retarder 301B comprising a second layer 314B of liquid crystal material.

Polar control retarder 300A comprises passive polar control retarder 330A and switchable liquid crystal retarder 301A. Further polar control retarder 300B comprises passive polar control retarder 330B and switchable liquid crystal retarder 301B. The polar control retarder 300B provides a modification of output transmission polar luminance profile and the polar control retarder 300A provides a modification of output transmission polar luminance and reflectivity profiles as described elsewhere herein.

In comparison to FIG. 16, increased off-axis luminance is achieved in public mode as the backlight 20 has higher luminance for off-axis polar locations so the image visibility is increased for off-axis users by control of both liquid crystal layers 314A, 314B. In privacy mode, the visual security level is increased for off-axis snoopers because the off-axis luminance is reduced by two multiplicative luminance control polar control retarder 300A. 300B and respective additional polarisers 318A, 318B. Further high reflectivity is provided for off-axis users.

Advantageously the reflective recirculation polariser with operation as described with reference to FIG. 1A (that is different in function to reflective polariser 302) may provide the further additional polariser 318B, to further achieve high efficiency and reduced field of view for privacy operation.

The arrangement of FIG. 18A has a single view angle control element 260A on the front surface of the SLM 48. Advantageously the front of screen thickness may be reduced. Further diffusers may be arranged on the front surface of the polariser 318 or between the view angle control element 260A and output polariser 218. Advantageously the visibility of front surface reflections may be reduced. Further the view angle control element 260B may be conveniently provided between the SLM 48 and backlight 20. Cost and complexity of assembly may be reduced. The number of surfaces between the pixel layer 214 and the display user 26 may be reduced advantageously achieving increased image contrast.

An arrangement similar to FIG. 18A wherein the passive retarders 330A, 330B each comprise a pair of passive plural retarders will now be described.

Figure 18B:
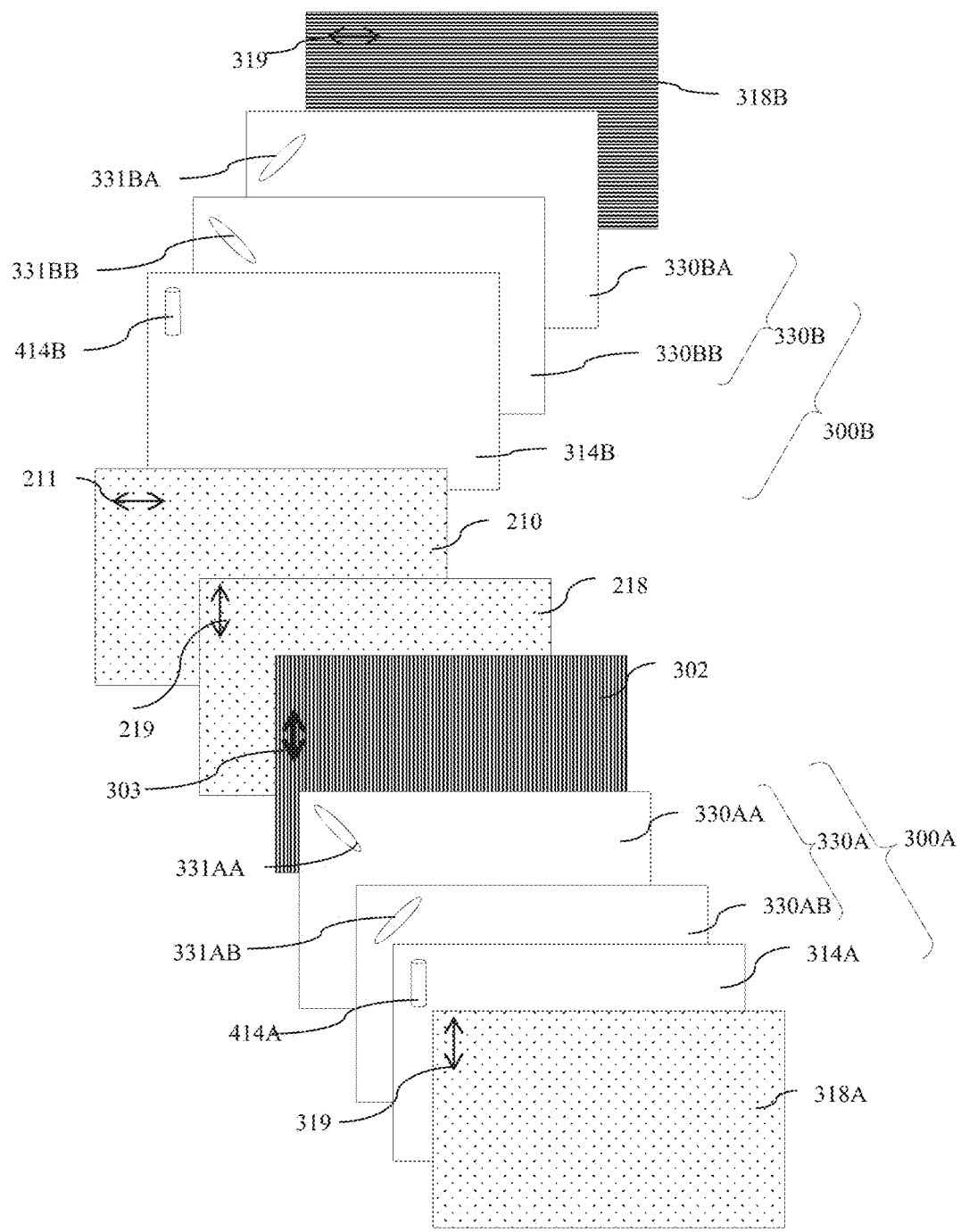
FIG. 18B is a diagram illustrating in front view alignment of optical layers of an optical stack comprising plural retarders arranged between a reflective polariser and an additional polariser and further plural retarders arranged between the input polariser and a further additional polariser of a transmissive SLM wherein plural retarders and further plural retarders each comprise crossed A-plates.

FIG. 18B is a schematic diagram illustrating in front view alignment of optical layers of an optical stack comprising polar control retarder 300A arranged between a reflective polariser 302 and an additional polariser 318A and further polar control retarder 300B arranged between the input polariser 210 and a further additional polariser 318B of a transmissive SLM 48 wherein the polar control retarder 300A and further polar control retarder 300B each comprise crossed A-plates. An illustrative embodiment is provided in TABLE 7 and TABLE 8A.

TABLE 7

Active LC retarder

| Alignment layers | Pretilt/ deg | Δn.d/ nm | Δε | Voltage/V |
|---|---|---|---|---|
| Homogeneous | 2 | 600 | 16.4 | 10 |
| Homogeneous | 2 | | | 2.0 |

TABLE 8A

| Layer | Orientation/° | Retarder | Retardance/nm |
|---|---|---|---|
| Polariser 318B | 90 | — | — |
| Retarder 330BA | 45 | A-plate | +450 |
| Retarder 330BB | 135 | A-plate | +450 |
| Switchable LC 314B | 0 | | See TABLE 7 |
| Polariser 210 | 90 | — | — |
| Polariser 218 | 0 | — | — |
| Reflective polariser 302 | 0 | — | — |
| Retarder 330AA | 135 | A-plate | +450 |
| Retarder 330AB | 45 | A-plate | +450 |
| Switchable LC 314A | 0 | | See TABLE 7 |
| Polariser 318A | 0 | — | — |

In comparison to the embodiment of FIG. 1A, the embodiment of FIGS. 18A-F comprise either a transmissive SLM 48 that has high luminance at wide field of view and a wide angle backlight 20, or an emissive SLM 48.

Further the embodiments include polar control retarder 300A, additional polariser 318A, further polar control retarder 300B and further additional polariser 318B. The transmission profiles of such arrangements are multiplicative. Thus, very low luminance may be achieved at design polar angles, such as at a lateral angle of +/−45 degrees and elevation of 0 degrees. However, the high luminance from the backlight or emissive SLM at higher angles than the design polar angle provides increased light levels and reduced reflectivity. Visual security level may be reduced for high angle snoopers. The at least one further polar control retarder 300B comprises at least one further passive retarder, in the embodiment of FIG. 18B two crossed passive polar control retarders 330BA, 330BB are provided.

It may be desirable to provide designs that are tuned for minima that are at lateral angles greater than 45 degrees, for example between 50 degrees and 65 degrees. In arrangements with further polar control retarder 300B, the layers 314A, 314B of liquid crystal material 414 of the switchable liquid crystal retarders 301A, 301B may each have a retardance for light of a wavelength of 550 nm in a range from 450 nm to 850 nm, preferably in a range from 500 nm to 750 nm and most preferably in a range from 550 nm to 650 nm.

The first-mentioned plural retarders and the further plural retarders may each comprise a pair of passive retarders which have optical axes in the plane of the retarders that are crossed wherein each passive retarder of the first-mentioned pair of passive retarders 330A, 330B has a retardance for light of a wavelength of 550 nm in a range from 300 nm to 800 nm, preferably in a range from 350 nm to 650 nm and most preferably in a range from 400 nm to 550 nm.

Advantageously the luminance and reflectivity at high angles may be reduced and the visual security level may be increased for snoopers at a high viewing angle. The reduction of colour asymmetry in switchable privacy display will now be discussed.

Figure 18C:
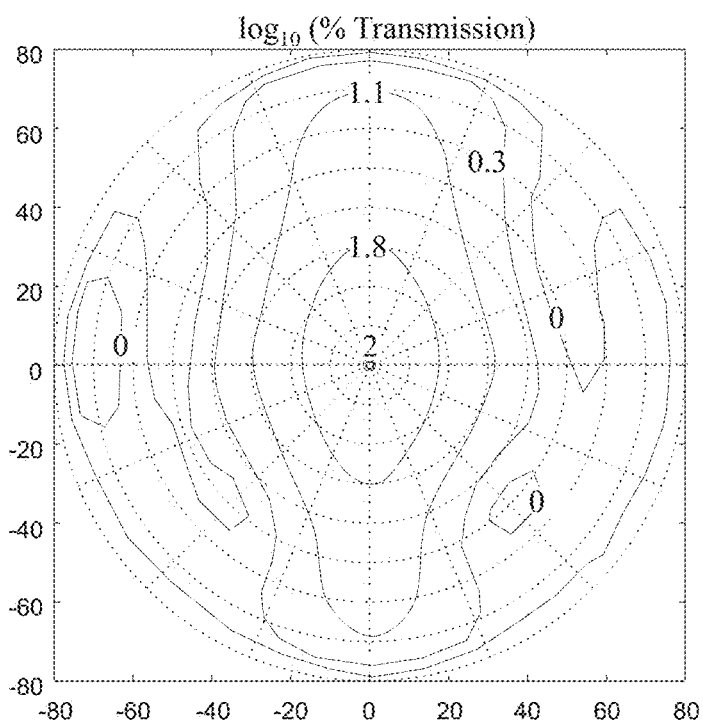
FIG. 18C is a graph illustrating the variation of logarithmic output luminance with polar direction for transmitted light rays of plural retarders comprising crossed passive A-plates and a homogeneously aligned switchable LC retarder.
Figure 18D:
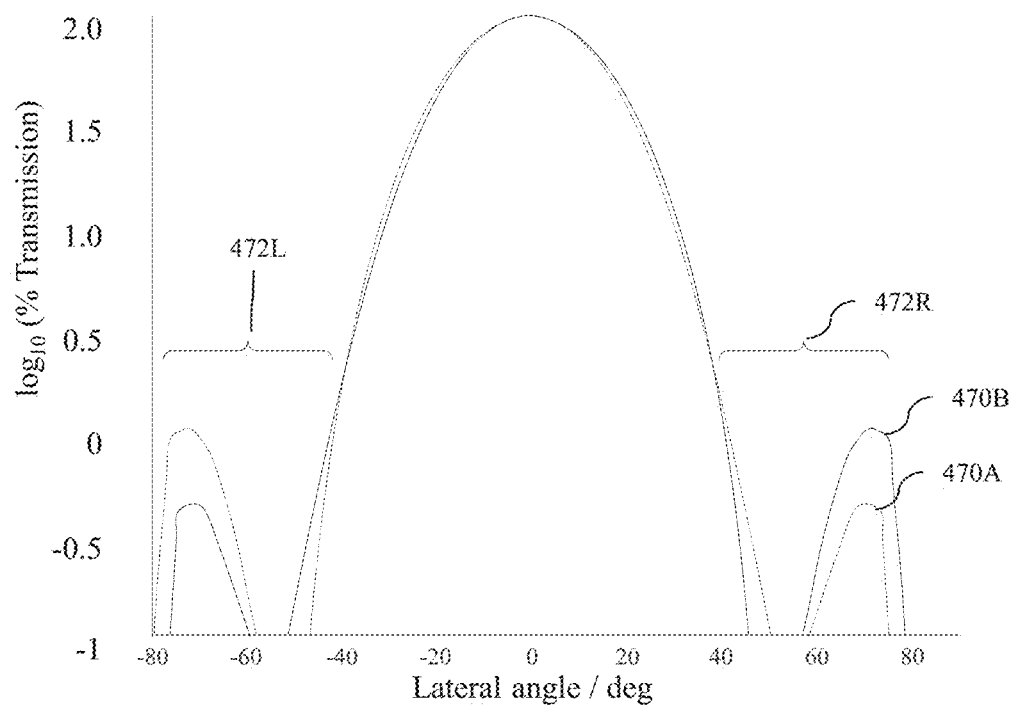
FIG. 18D is a graph illustrating in a lateral direction the variation of logarithmic output luminance with lateral viewing angle for transmitted light rays of plural retarders comprising crossed passive A-plates and a homogeneously aligned switchable LC retarder.

FIG. 18C is a schematic graph illustrating the variation of logarithmic output luminance with polar direction for transmitted light rays of plural retarders comprising crossed passive A-plates and a homogeneously aligned switchable liquid crystal retarder for one of the polar control retarder 300B comprising crossed A-plate retarders 330AA, 330AB and liquid crystal layer 314A of TABLE 8A, and FIG. 18D is a schematic graph illustrating in a lateral direction the variation 470A of logarithmic output luminance with lateral viewing angle for transmitted light rays of plural retarders comprising crossed passive A-plates and a homogeneously aligned switchable liquid crystal retarder for one of the polar control retarder 300B comprising retarders 330AA, 330AB, 314A of TABLE 8B.

FIG. 18C and FIG. 18D illustrate that there is some luminance asymmetry that is provided by the sequence of the crossed A-plates 330AA, 330AB. As the luminance profiles are wavelength dependent, in operation such asymmetry may provide a noticeable colour change that has a different appearance on either side of the display, as illustrated in angular regions 472L, 472R. In the arrangement of FIG. 11A, such colour shift is not typically very visible due to the low luminance of the collimated backlight 20. However, with increased backlight 20 luminance at high angles, or for emissive SLMs then the asymmetry is more clearly visible. It would be desirable to provide an asymmetric colour appearance.

Returning to FIG. 18B, the first-mentioned polar control retarder 300A comprises a pair of passive retarders 330AA, 330AB which have optical axes 331AA, 331AB in the plane of the retarders 330AA, 330AB that are crossed, wherein the first of the pair of passive retarders 330AA has an optical axis 331AA that extends at 45° with respect to an electric vector transmission direction 219 of the output polariser 218, and the second of the pair of passive retarders 331AB has an optical axis 331AB that extends at 1350 with respect to the electric vector transmission direction 219 of the output polariser 218.

The at least one further polar control retarder 300B comprises a further pair of passive retarders 330BA, 330BB which have optical axes 331BA, 331BB in the plane of the retarders 330BA, 330BB that are crossed, wherein the first of the further pair of passive retarders 330BA has an optical axis 331BA that extends at 1350 with respect to an electric vector transmission direction 219 of the output polariser 218, and the second of the further pair of passive retarders 330BB has an optical axis 331BB that extends at 45° with respect to an electric vector transmission direction 219 of the output polariser 218. The second retarder 330AB, 330BB of each pair of passive retarders is arranged to receive light from the first retarder 330AA, 330BA of the respective pair of passive polar control retarder 330A, 330B. Thus, the passive retarder 330 AA of the first pair and the passive retarder 330BB of the further pair that are closest to each other have respective optical axes 331AA and 331AB that extend in the same direction.

For the present disclosure the rotation direction of the passive retarder optical axes may be clockwise or anti-clockwise, such that either one of the optical axis within each pair of passive retarders extend at 45° and 135°, respectively. In the illustrative example the rotation direction is clockwise.

Returning to FIG. 18D, the luminance profile of the crossed A-plates 330BA, 330BB and liquid crystal retarder 314B is illustrated by profile 470B. In combination, the profiles 470A, 470B are multiplicative. The arrangement of retarders of FIG. 18B thus achieves an averaging of the two luminance profiles and further achieves colour symmetry. Advantageously angular uniformity is improved.

Optionally, in the example of FIGS. 18A and 18B, the reflective polariser 318B may be omitted. In that case, the reflective polariser 318B may optionally be replaced by a dichroic absorbing polariser (not shown).

Another arrangement of polar control retarder 300A, and further polar control retarder 300B will now be given.

Figure 18E:
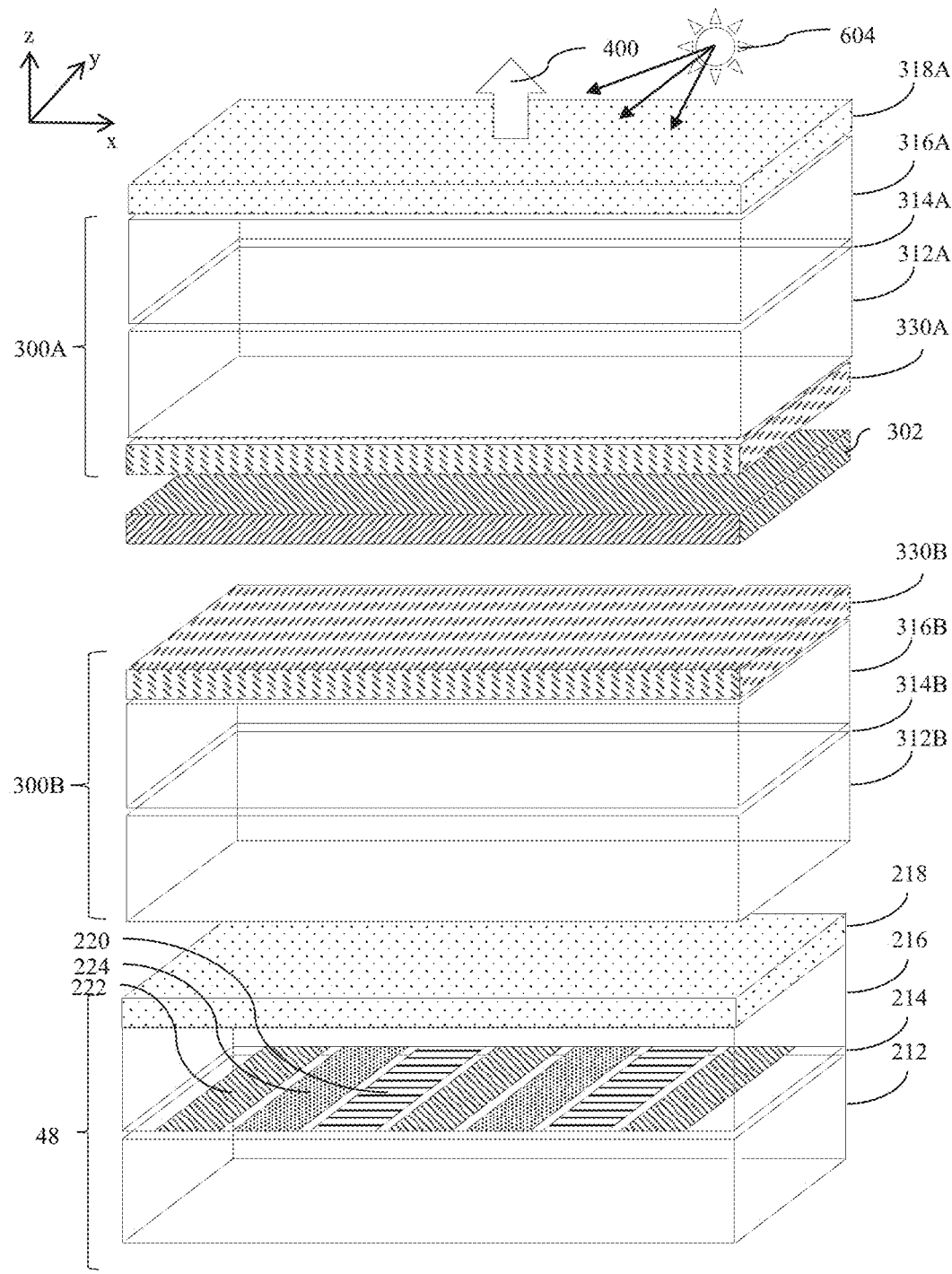
FIG. 18E is a diagram illustrating in side perspective view a switchable privacy display for use in ambient illumination comprising an emissive SLM, a first compensated switchable LC retarder, a first additional polariser, a reflective polariser, a second compensated switchable LC retarder and a second additional polariser.
Figure 18F:
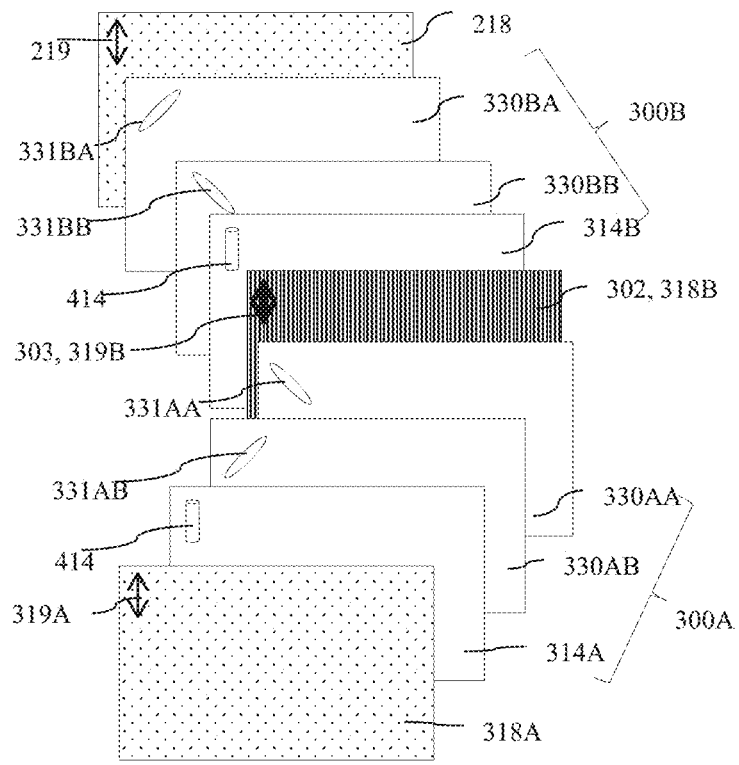
FIG. 18F is a diagram illustrating in front view alignment of optical layers of an optical stack comprising plural retarders arranged between a reflective polariser and an additional polariser and further plural retarders arranged between the output polariser and a further additional polariser which is the reflective polariser wherein the plural retarders and further plural retarders each comprise crossed A-plates.

FIG. 18E is a schematic diagram illustrating in side perspective view a switchable privacy display for use in ambient illumination comprising an emissive SLM 48, a first polar control retarder 300A, a first additional polariser 318A, a reflective polariser 302, a second polar control retarder 300B and a second additional polariser 318B; and FIG. 18F is a schematic diagram illustrating in front view alignment of optical layers of an optical stack comprising polar control retarders 300A arranged between an additional light absorbing polariser 318A and a further additional polariser 318B that is a reflective polariser 302 and further polar control retarders 300B arranged between the output polariser 218 and the further additional polariser 318B, 302 wherein the polar control retarders 300A and further plural retarders 300B each comprise crossed A-plates 330AA, 330AB, 330BA and 330BB.

An illustrative embodiment is provided in TABLE 8B.

TABLE 8B

| Layer | Orientation/° | Retarder | Retardance/nm |
|---|---|---|---|
| Polariser 218 | 0 | — | — |
| Retarder 330AA | 45 | A-plate | +450 |
| Retarder 330AB | 135 | A-plate | +450 |
| Switchable LC 314A | 0 | | See TABLE 7 |
| Reflective polariser 302 | 0 | — | — |
| Retarder 330BA | 135 | A-plate | +450 |
| Retarder 330BB | 45 | A-plate | +450 |
| Switchable LC 314B | 0 | | See TABLE 7 |
| Polariser 318B | 0 | — | — |

In comparison to the arrangement of FIG. 18A, reduced luminance for off-axis viewing locations may be advantageously provided as scatter from the SLM 48 does not modify the field of view of the luminance profile from the view angle control element 260B. Further a single optical component stack may be provided for convenient after-market or factory fitting.

The embodiment of FIGS. 18E-F further illustrate that the reflective polariser 302 may further provide the additional polariser 318B of the further plural retarders 300B. Advantageously the cost and thickness is reduced, and the efficiency is increased.

Embodiments of luminance controlling displays with symmetric colour and luminance output will now be described.

Figure 18G:
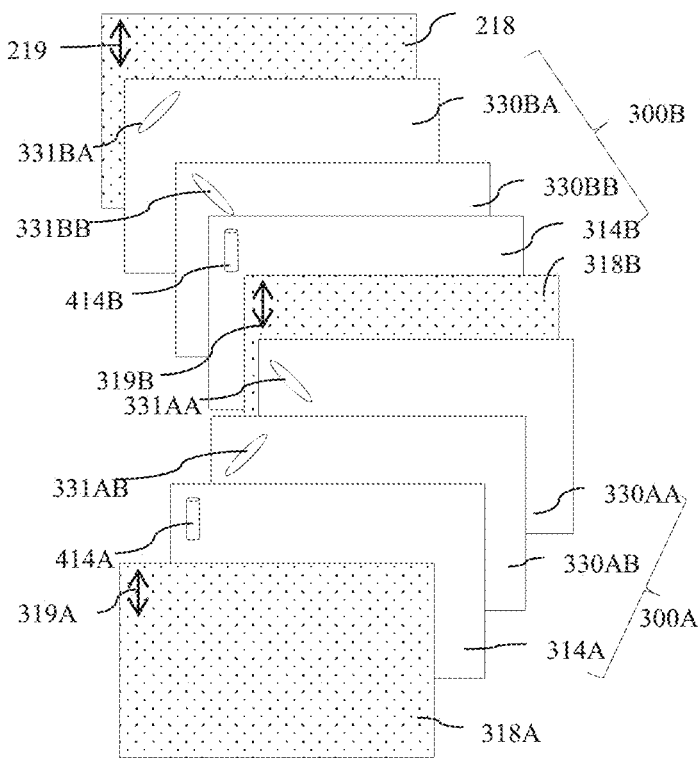
FIG. 18G is a diagram illustrating in front view alignment of optical layers of an optical stack comprising plural retarders arranged between a further additional light absorbing polariser and an additional polariser and further plural retarders arranged between the output polariser and the further additional polariser wherein plural retarders and further plural retarders each comprise crossed A-plates.

FIG. 18G is a schematic diagram illustrating in front view alignment of optical layers of an optical stack comprising polar control retarders 300A arranged between an additional light absorbing polariser 318A and a further additional polariser 318B and further polar control retarders 300B arranged between the output polariser 218 and the further additional polariser 318B wherein the polar control retarders 300A and further plural retarders 300B each comprise crossed A-plate retarders 330AA, 330AB, 330BA and 330BB.

A display device thus comprises: a SLM 48; a display polariser arranged on at least one side of the SLM, the display polariser being a linear polariser; a first additional polariser 318A arranged on the same side of the SLM 48 as one of the at least one display polarisers, the first additional polariser 318A being a linear polariser; and first polar control retarders 300A arranged between the first additional polariser 318A and the one of the at least one display polarisers; a further additional polariser 318B arranged on the same side of the SLM as said one of the at least one display polarisers, outside the first additional polariser 318A, the further additional polariser 318B being a linear polariser; and further polar control retarders 300B arranged between the first additional polariser 318A and the further additional polariser 318B, wherein the first polar control retarders comprise a pair of passive retarders 330AA, 330AB which have optical axes 331AA, 331AB in the plane of the retarders that are crossed and extend at 45° and 135°, respectively, with respect to an electric vector transmission direction of the output polariser 218, the further polar control retarders comprise a further pair of passive retarders 330BA, 330BB which have optical axes 331BA, 331BB in the plane of the retarders that are crossed and extend at 45° and 135°, respectively with respect to an electric vector transmission direction of the output polariser 218, and the optical axes 331BB, 331AA of the one of the first pair of passive polar control retarders and the one of the further pair of passive polar control retarders that are closest to each other extend in the same direction.

The first polar control retarders 300A and further polar control retarders 300B each further comprise a switchable liquid crystal retarder 301A. 301B comprising a layer 314A, 314B of liquid crystal material 414A, 414B, the first polar control retarders 300A and the further polar control retarders 300B each being arranged, in a switchable state of the switchable liquid crystal retarder 301A, 301B, simultaneously to introduce no net relative phase shift to orthogonal polarisation components of light passed by said one of the at least one display polarisers along an axis along a normal to the plane of the polar control retarders and to introduce a net relative phase shift to orthogonal polarisation components of light passed by said one of the at least one display polarisers along an axis inclined to a normal to the plane of the polar control retarders.

The example of FIG. 18G is the same as that of FIGS. 18E and 18F, except that the reflective polariser 302 is replaced by the further additional polariser 318B. Advantageously a luminance controlling display with symmetric colour and luminance output in the lateral direction may be achieved, in the same manner as illustrated by FIGS. 18C-D. Further, the reflectivity of reflective polariser 302 is eliminated for environments where high off-axis reflectivity is undesirable.

Figure 18H:
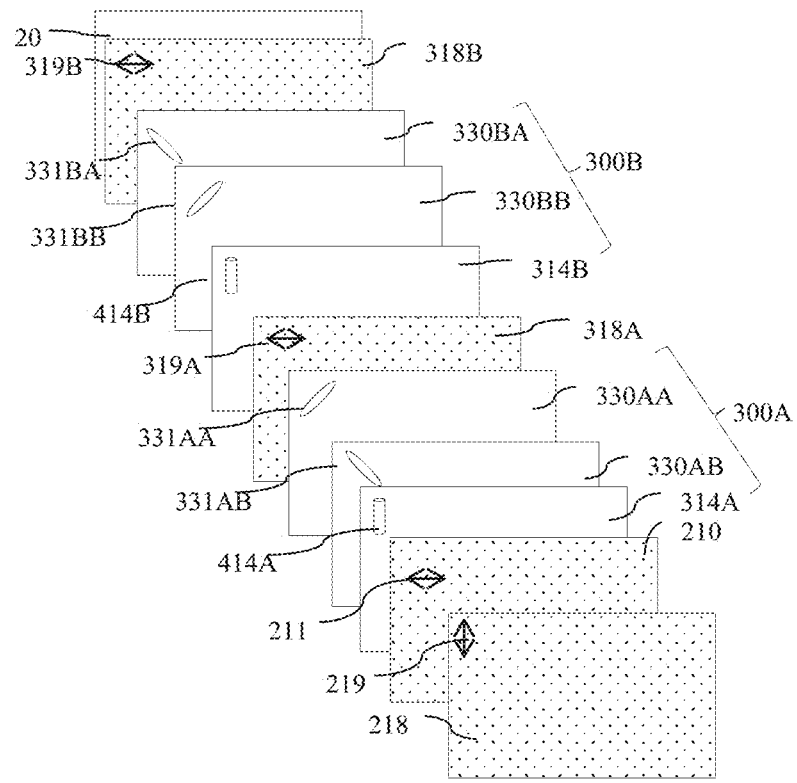
FIG. 18H is a diagram illustrating in front view alignment of optical layers of an optical stack for a transmissive SLM comprising plural retarders arranged between a further additional light absorbing polariser and an additional polariser and further plural retarders arranged between the input polariser and the further additional polariser wherein the plural retarders and further plural retarders each comprise crossed A-plates.

FIG. 18H is a schematic diagram illustrating in front view alignment of optical layers of an optical stack for a transmissive SLM 48 comprising further plural retarders 300B arranged between a further additional light absorbing polariser 318B and an additional polariser 318A and plural retarders 300A arranged between the input polariser 210 and the additional polariser 318A wherein the plural retarders 300A and further plural retarders 300B each comprise crossed A-plates.

The example of FIG. 18H is the same as that of FIG. 18G, except that the optical stack is arranged on the input side of a SLM and between the backlight 20 and the SLM 48. Advantageously the front-of-screen thickness is reduced, and increased diffusion may be provided on the front surface without blurring pixels. Further image contrast may be increased.

Figure 18I:
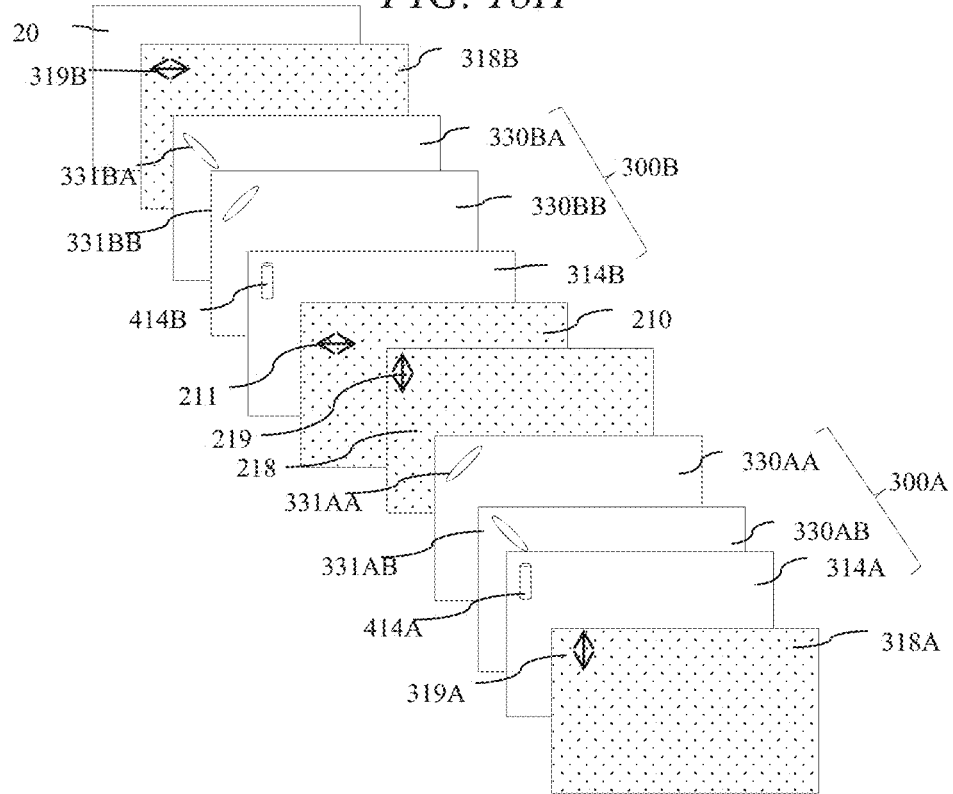
FIG. 18I is a diagram illustrating in front view alignment of optical layers of an optical stack for a transmissive SLM comprising plural retarders arranged between a further additional polariser and the input polariser of a transmissive SLM and plural retarders arranged between the output polariser and an additional polariser wherein the plural retarders and further plural retarders each comprise crossed A-plates.

FIG. 18I is a schematic diagram illustrating in front view alignment of optical layers of an optical stack for a transmissive SLM 48 comprising further plural retarders 300B arranged between a further additional polariser 318B and the input polariser 210; and plural retarders 300A arranged between the output polariser 218 and an additional polariser 318A wherein the plural retarders 300A, 300B and further plural retarders each comprise crossed A-plates 330AA, 330AB, 330BA, 330BB.

A display device comprises: a backlight 20 arranged to output light a transmissive SLM 48 arranged to receive output light from the backlight 20; an input polariser 210 arranged on the input side of the SLM 48 and an output polariser 218 arranged on the output side of the SLM 48, the input polariser 210 and the output polariser 218 being linear polarisers; a first additional polariser 318A arranged on the output side of output polariser 218, the first additional polariser 318A being a linear polariser; and first polar control retarders 300A arranged between the first additional polariser 318A and the output polariser 218; a further additional polariser 318B arranged between the backlight 20 and input polariser 210, the further additional polariser 318B being a linear polariser; and further polar control retarders 300B arranged between the input polariser 210 and the further additional polariser 318B; wherein the first polar control retarders 300A comprise a pair of passive retarders 330AA, 330AB which have optical axes 331AA, 331AB in the plane of the retarders that are crossed and extend at 45° and 135°, respectively, with respect to an electric vector transmission direction of the output polariser 218, the further polar control retarders 300B comprise a further pair of passive retarders 330BA, 330BB which have optical axes 331BA, 331BB in the plane of the retarders that are crossed and extend at 45° and 135°, respectively with respect to an electric vector transmission direction of the output polariser 218, and the optical axes 331BB, 331AA of the one of the first pair of passive polar control retarders and the one of the further pair of passive polar control retarders that are closest to each other extend in the same direction.

The example of FIG. 18I is the same as that of FIG. 18H, except that the optical stack is arranged on both sides of a SLM 48 and between the backlight 20 and the SLM 48. Advantageously scatter from the SLM does not provide stray light to the snooper and higher visual security level may be achieved.

Figure 18J:
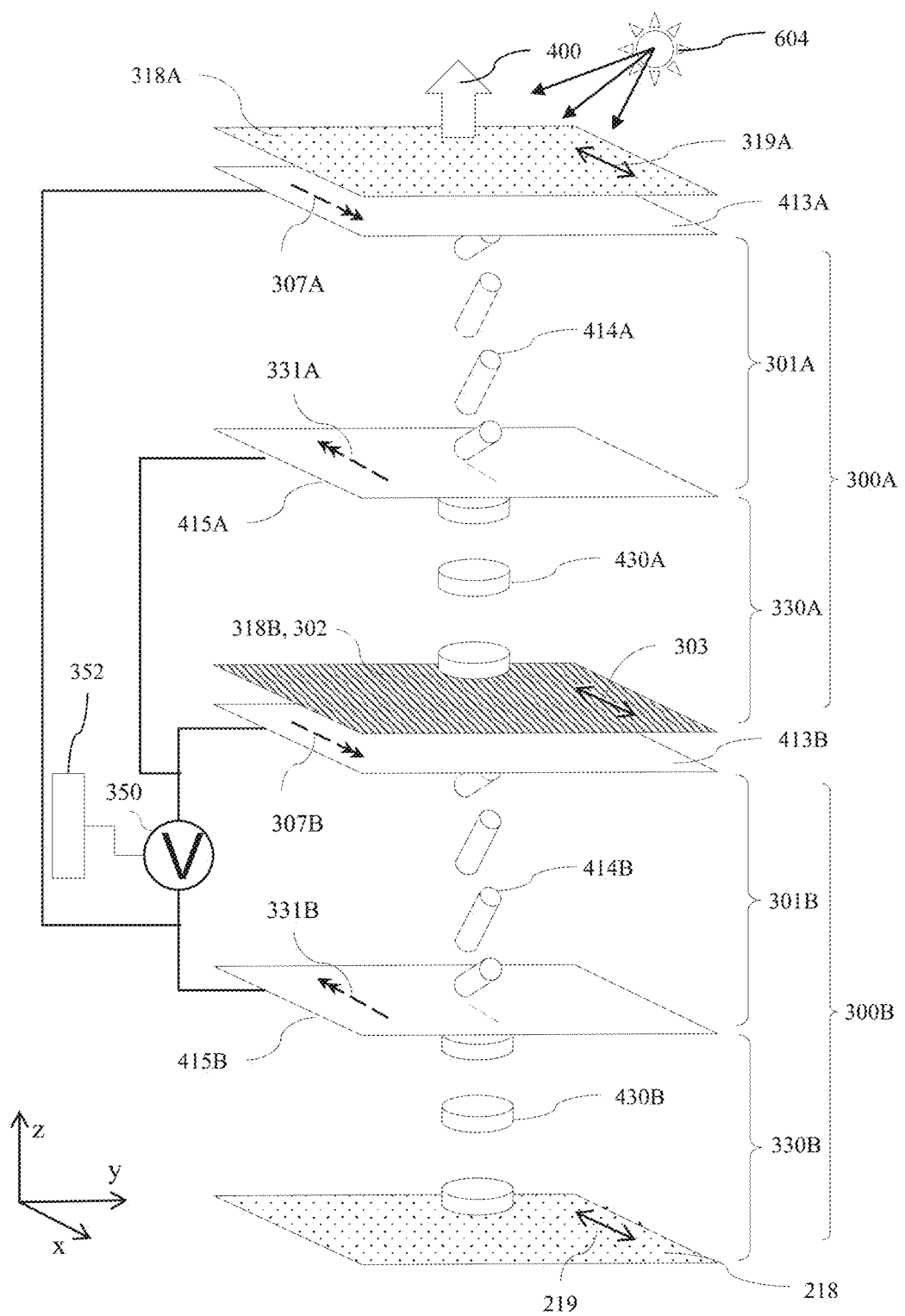
FIG. 18J is a diagram illustrating in perspective side view an arrangement of a switchable retarder in a privacy mode comprising a first negative C-plate passive retarder and first homogeneously aligned switchable LC retarder arranged between the output polariser and a reflective polariser; and a second negative C-plate passive retarder and second homogeneously aligned switchable LC retarder arranged between the reflective polariser and a further additional polariser.

FIG. 18J is a schematic diagram illustrating in perspective side view an arrangement of a switchable retarder in a privacy mode of operation comprising a negative C-plate passive polar control retarder 330A and homogeneously aligned switchable liquid crystal retarder 301A arranged between the output polariser 218 and reflective polariser 302 and a negative C-plate passive polar control retarder 330B and homogeneously aligned switchable liquid crystal retarder 301B arranged between the absorptive polariser 318 and reflective polariser 302 in a privacy mode of operation. Thus the display device may further comprise a retardance control layer 300A arranged between the output polariser 218 and the reflective polariser 302. The retardance control layer 300A may comprise a further switchable liquid crystal retarder 301A arranged between the output polariser 218 and the reflective polariser 302.

The first-mentioned polar control retarder 300B comprises a first switchable liquid crystal retarder 301B comprising a first layer of liquid crystal material 414B, and the further polar control retarder 300A comprises a second switchable liquid crystal retarder 301A comprising a second layer of liquid crystal material 414A. The further switchable liquid crystal retarder 301A comprises a surface alignment layer 307A disposed adjacent the liquid crystal material 414A having a pretilt having a pretilt direction with a component in the plane of the layer of liquid crystal material that is aligned parallel or antiparallel or orthogonal to the reflective polariser.

The pretilt directions 307A, 331A of the alignment layers of the further switchable liquid crystal retarder 301A may have a component in the plane of the liquid crystal layer 314A that is aligned parallel or antiparallel or orthogonal to the pretilt directions of the alignment layers 307B. 331B of the first switchable liquid crystal retarder 301B. In a public mode of operation, both switchable liquid crystal layers 301B, 301A are driven to provide a wide viewing angle. In a privacy mode of operation, switchable liquid crystal retarders 301A, 301B may cooperate to advantageously achieve increased luminance reduction and thus improved privacy in a single axis.

The first and second liquid crystal retarders 301A, 301B may have retardances that are different. The retardation provided by the first liquid crystal retarder 301B and further liquid crystal layer 314A may be different. The control system 352 may be arranged to control apply a common voltage across the first and second switchable liquid crystal retarders 301A, 301B. The liquid crystal material 414B of the first liquid crystal retarder 301B may be different from the liquid crystal material 414A of the second liquid crystal layer 301A. Chromatic variation of the polar luminance profiles illustrated elsewhere herein may be reduced, so that advantageously off-axis colour appearance is improved.

Alternatively, switchable liquid crystal retarders 301A, 301B may have orthogonal alignments so that reduced luminance is achieved in both horizontal and vertical directions, to advantageously achieve landscape and portrait privacy operation.

The retardance control layer 300A may comprise a passive polar control retarder 330A arranged between the output polariser 218 and the reflective polariser 302. More generally, the switchable liquid crystal retarder 301A may be omitted and a fixed luminance reduction may be provided by passive retarders 330A. For example, luminance reduction in viewing quadrants may be provided by means of layer 330A alone. Advantageously polar region for luminance reduction may be achieved.

FIG. 18J further illustrates that the reflective polariser 302 may provide the further additional polariser 318B and that the dichroic polariser 318B of FIG. 18F for example may be omitted. Advantageously increased efficiency and reduced thickness may be achieved.

Figure 18K:
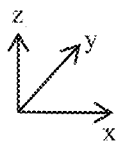
FIG. 18K is a diagram illustrating in side perspective view a view angle control element comprising a first compensated switchable LC retarder, a first additional polariser, a reflective polariser, a second compensated switchable LC retarder, and a second additional polariser.
Figure 18K:
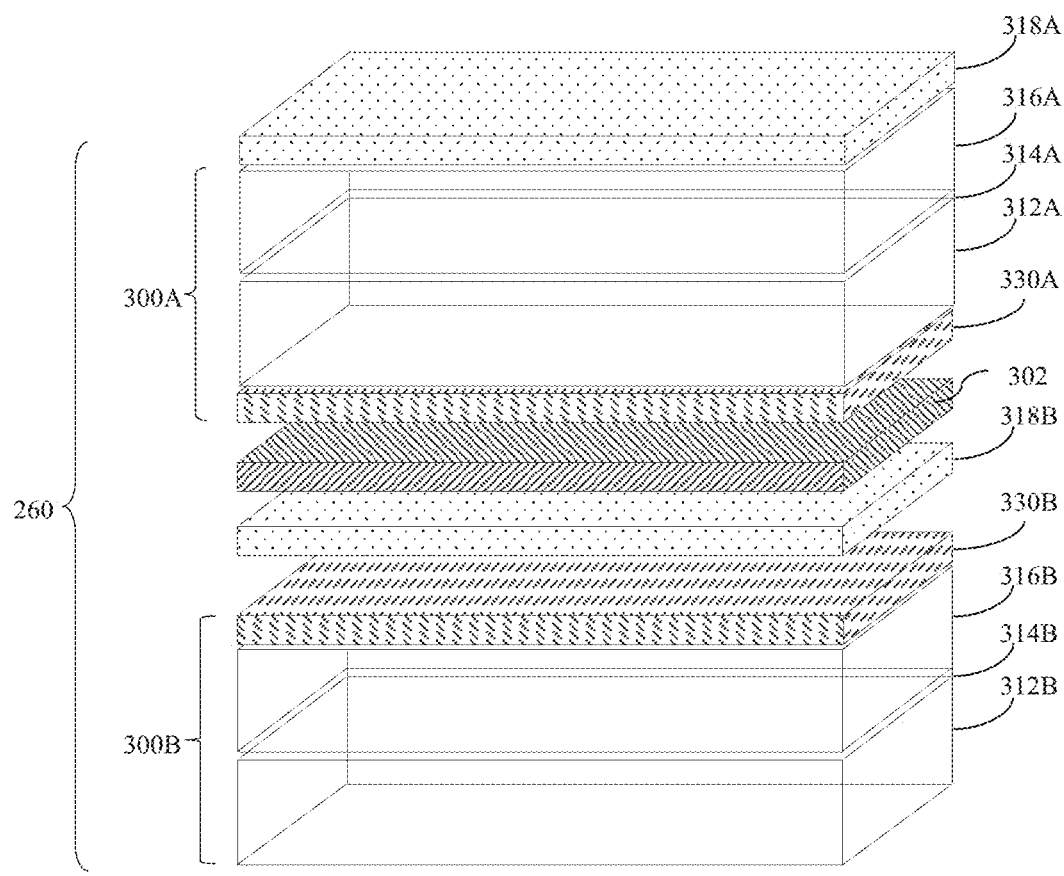

FIG. 18K is a schematic diagram illustrating in side perspective view a view angle control element 260 comprising a first polar control retarder 300A a first additional polariser 318A, a reflective polariser 302, a second polar control retarder 300B and a second additional polariser 318B. Advantageously, an after-market privacy control element and/or stray light control element may be provided that does not require matching to the panel pixel resolution to avoid Moiré artefacts. View angle control optical element 260 may be further provided for factory fitting to SLM 48. Features of the arrangements of FIGS. 18E-H not discussed in further detail may be assumed to correspond to the features with equivalent reference numerals as discussed above, including any potential variations in the features.

It may be desirable to provide both entertainment and night-time modes of operation in an automotive vehicle.

Figure 19A:
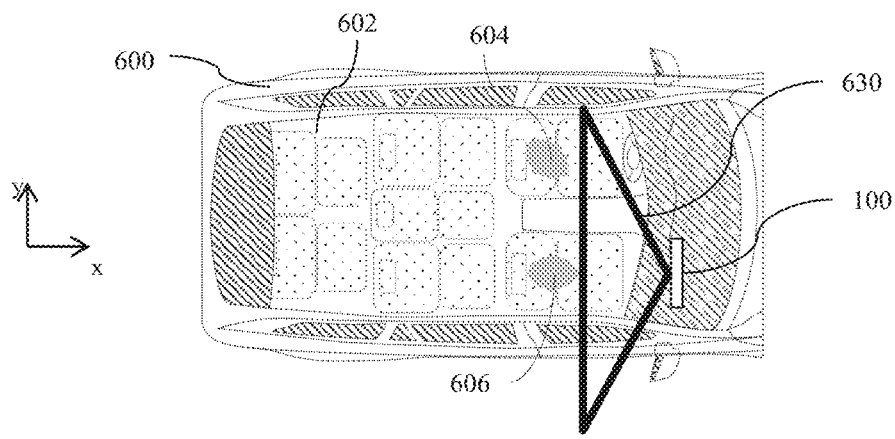
FIG. 19A is a diagram illustrating in top view an automotive vehicle with a switchable directional display arranged within the vehicle cabin for day-time and/or sharing modes.
Figure 19B:
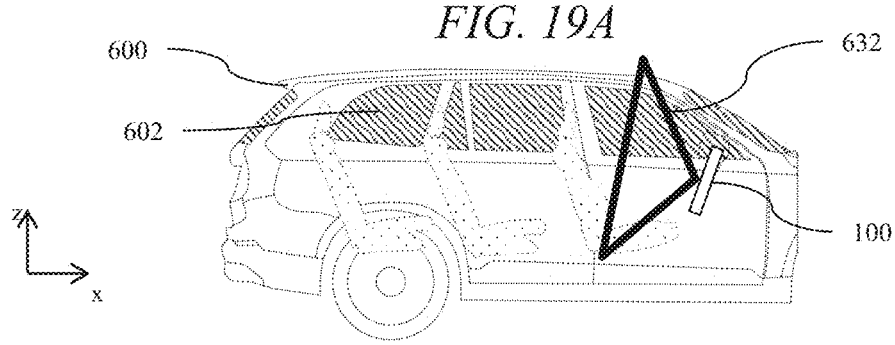
FIG. 19B is a diagram illustrating in side view an automotive vehicle with a switchable directional display arranged within the vehicle cabin for day-time and/or sharing modes.

FIG. 19A is a schematic diagram illustrating in top view an automotive vehicle with a switchable directional display such as that illustrated in FIGS. 19A-B arranged within the vehicle cabin 602 for day-time and/or sharing modes of operation; and FIG. 19B is a schematic diagram illustrating in side view an automotive vehicle with a switchable directional display arranged within the vehicle cabin 602 for day-time and/or sharing modes of operation. Light cone 630, 632 is provided with a wide angular field of view and thus the display is advantageously visible by multiple occupants with low reflectivity.

Figure 19C:
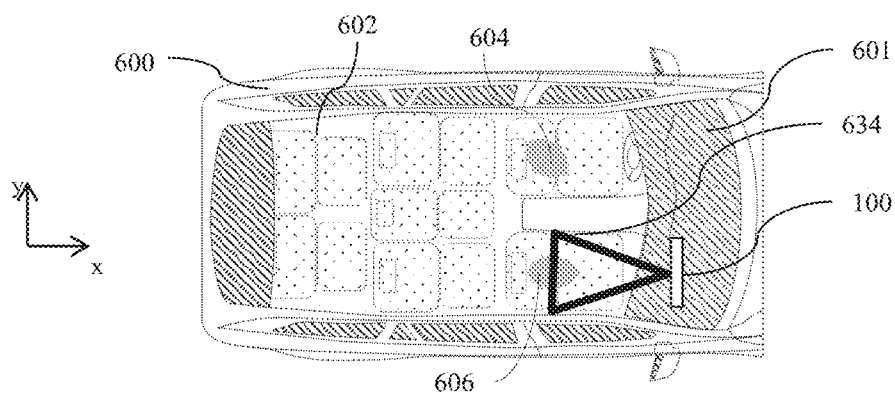
FIG. 19C is a diagram illustrating in top view an automotive vehicle with a switchable directional display arranged within the vehicle cabin for night-time and/or entertainment modes.
Figure 19D:
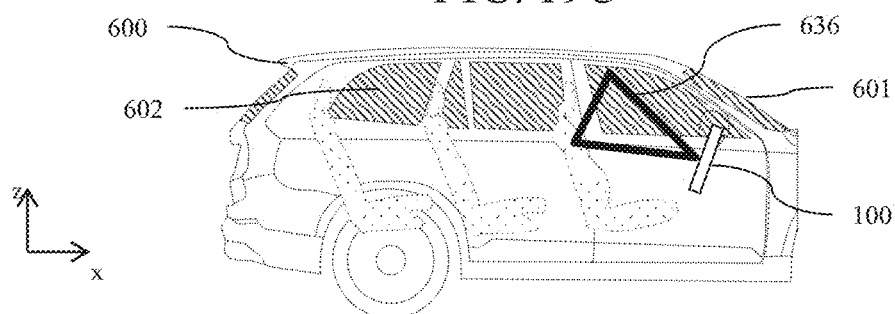
FIG. 19D is a diagram illustrating in side view an automotive vehicle with a switchable directional display arranged within the vehicle cabin for night-time and/or entertainment modes.

FIG. 19C is a schematic diagram illustrating in top view an automotive vehicle with a switchable directional display such as that illustrated in FIGS. 19A-B arranged within the vehicle cabin 602 for night-time and/or entertainment modes of operation; FIG. 19D is a schematic diagram illustrating in side view an automotive vehicle with a switchable directional display arranged within the vehicle cabin 602 for night-time and/or entertainment modes of operation. Light cone 634, 636 is provided with a narrow angular field of view and thus the display is advantageously visible only by a single occupant. Off-axis occupants further see increased reflections from the display, reducing visibility. Advantageously stray light for night-time operation is reduced, increasing driver safety. Further, reflections of the display from windscreen 601 are reduced, minimising distraction to the driver 604. Features of the arrangements of FIGS. 19A-D not discussed in further detail may be assumed to correspond to the features with equivalent reference numerals as discussed above, including any potential variations in the features.

Displays 100 comprising polar control retarders 300 that are passive retarders 272 and comprising reflective polariser 302 and additional polariser 318 will now be further described.

Figure 20A:
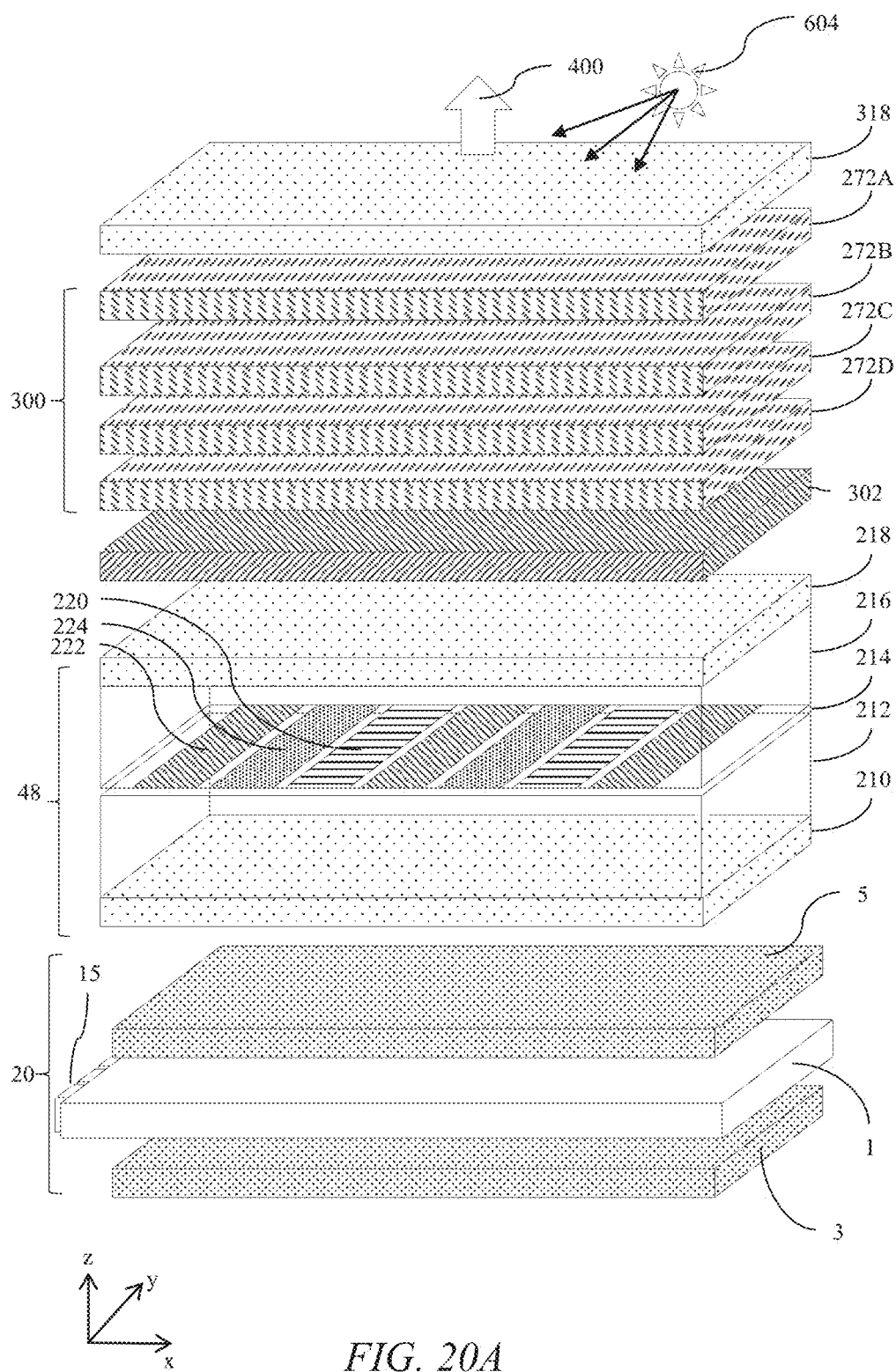
FIG. 20A is a diagram illustrating in side perspective view a privacy display for use in ambient illumination comprising a backlight, a transmissive SLM, a reflective polariser, a retarder stack and an additional polariser.
Figure 20B:
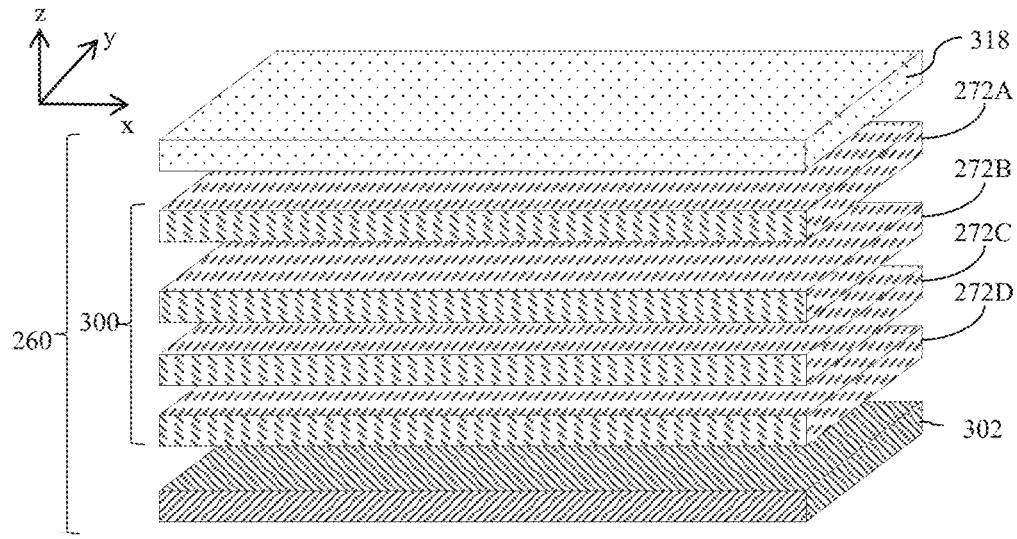
FIG. 20B is a diagram illustrating in side perspective view a view angle control element comprising a reflective polariser, a retarder stack and an additional polariser.

FIG. 20A is a schematic diagram illustrating in side perspective view a privacy display 100 for use in ambient illumination 604 comprising a backlight 20, a transmissive SLM 48, a reflective polariser 302, passive polar control retarders 300 comprising passive retarders 272A, 272B, 272C and 272C; and additional polariser 318; and FIG. 20B is a schematic diagram illustrating in side perspective view a view angle control element comprising a reflective polariser 302, passive polar control retarders 300 and an additional polariser 318.

The operation of such a display is described below with reference to FIGS. 22A-B. Advantageously a low cost privacy or other type of low stray light display may be provided. Further the complexity and thickness of the display is reduced in comparison to switchable displays 100.

Figure 20C:
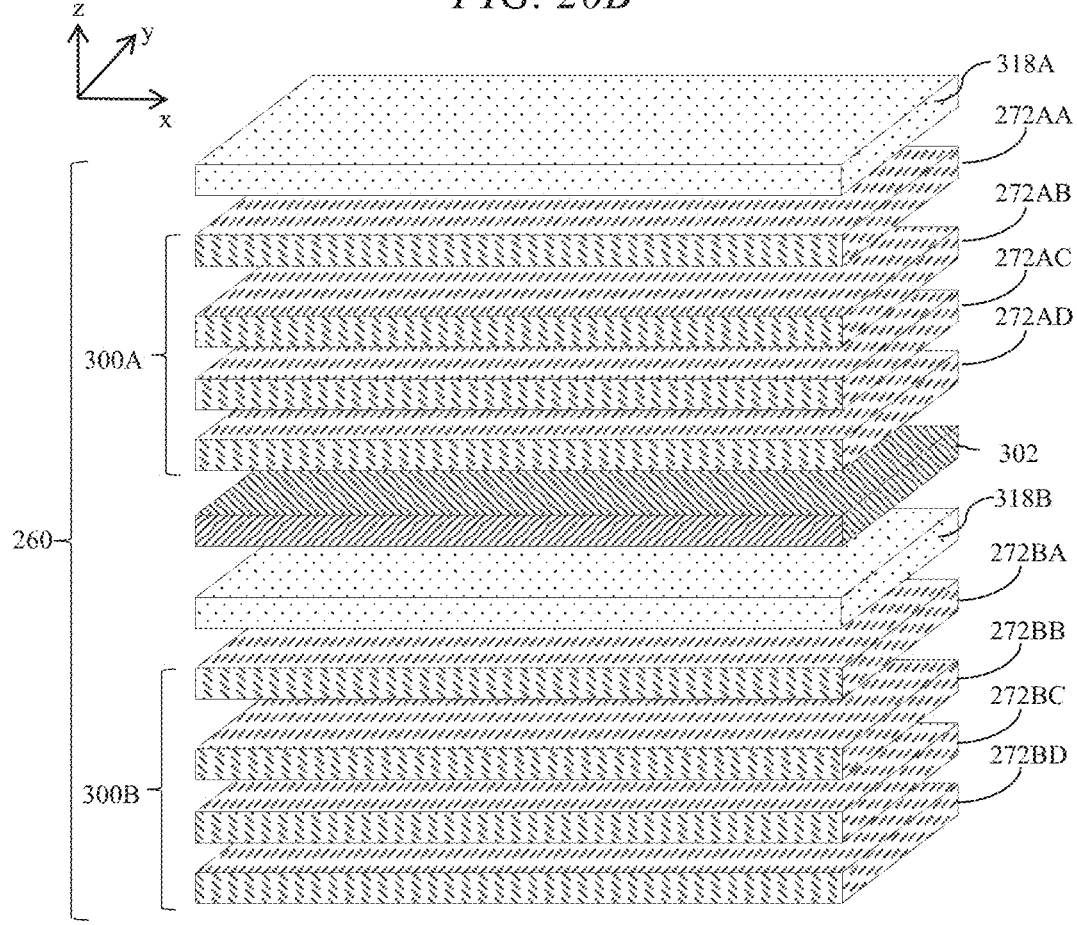
FIG. 20C is a diagram illustrating in side perspective view a view angle control element comprising a first retarder stack and an additional polariser; a reflective polariser; a second retarder stack and a further additional polariser.

FIG. 20C is a schematic diagram illustrating in side perspective view a view angle control element 260 comprising passive polar control retarders 300A comprising passive retarders 272AA, 272AB, 272AC, 272AD arranged between an additional polariser 318A and a reflective polariser 302: and a further additional polariser 318B and further passive polar control retarders 300B comprising passive retarders 272BA, 272BB, 272BC, 272BD arranged on the input side of the reflective polariser 302. The additional polariser and additional In comparison to FIG. 20B, advantageously off-axis luminance may be further reduced while head-on luminance may be substantially maintained when attached to the output of a SLM.

Figure 20D:
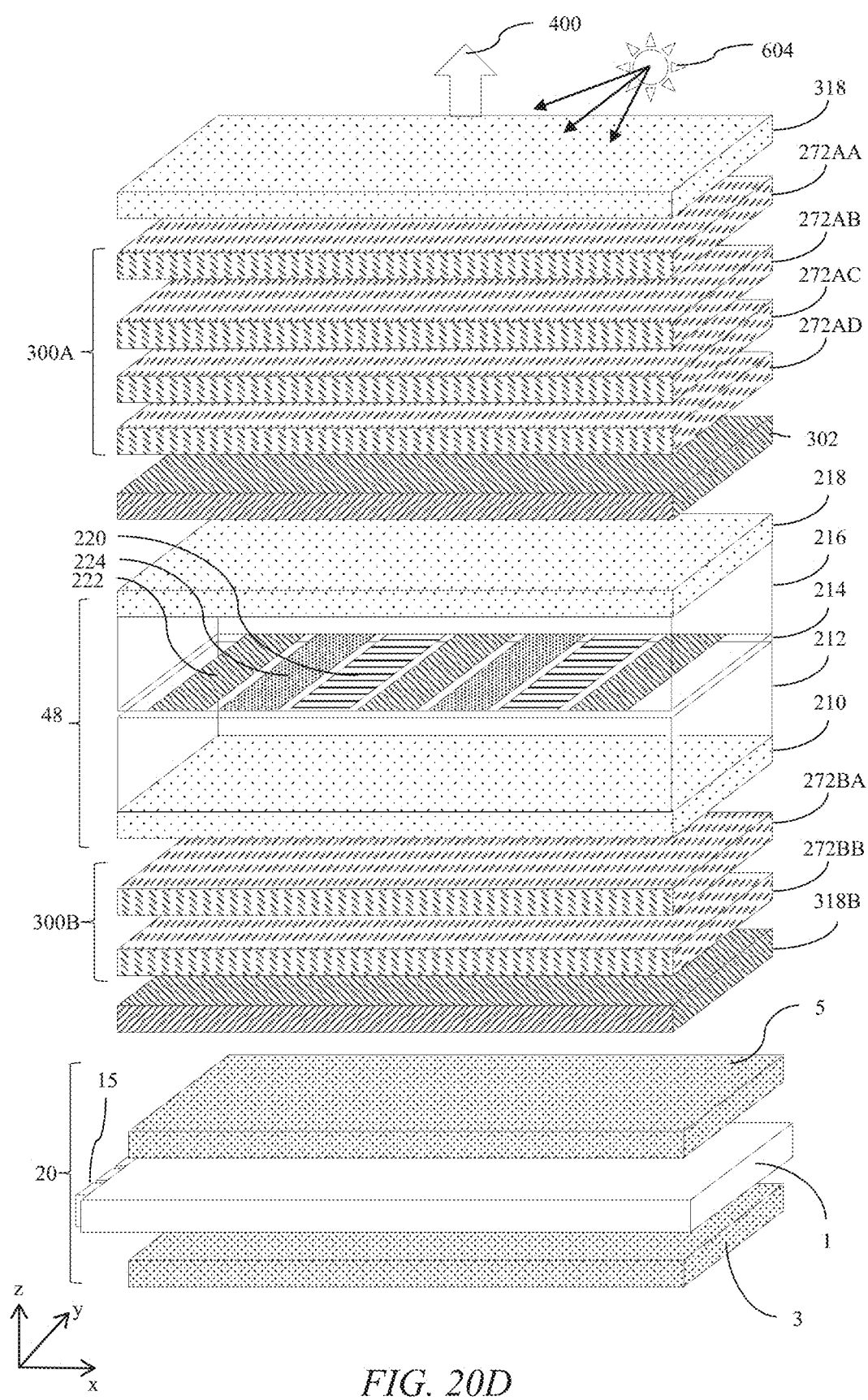
FIG. 20D is a diagram illustrating in side perspective view a privacy display for use in ambient illumination comprising a backlight, a reflective recirculation polariser, an input retarder stack, a transmissive SLM, a reflective polariser, a retarder stack and an additional polariser.

FIG. 20D is a schematic diagram illustrating in side perspective view a privacy display for use in ambient illumination. Compared to FIG. 20A, a further additional polariser 318B that is a reflective polariser, and further polar control retarders 300B comprising retarders 272BA, 272BB are arranged at the input to the SLM. The further additional polariser 318B and 300B achieve increased luminance reduction for wide angle backlights 20. Advantageously visual security level may be increased for wide angle backlights. In comparison to the switchable arrangements described elsewhere thickness and cost is reduced. Features of the arrangements of FIGS. 20A-D not discussed in further detail may be assumed to correspond to the features with equivalent reference numerals as discussed above, including any potential variations in the features.

The embodiments of FIGS. 20A-D illustrate stack of passive polar control retarders 300 that comprises four passive retarders as will be illustrated in FIGS. 22A-B below. However, other types of passive retarder stacks will also be described below and may be incorporated. Various combinations of polar control retarders 300 comprising passive retarders 272 arranged between a reflective polariser 302 and additional polariser 318 will now be described.

Figure 21A:
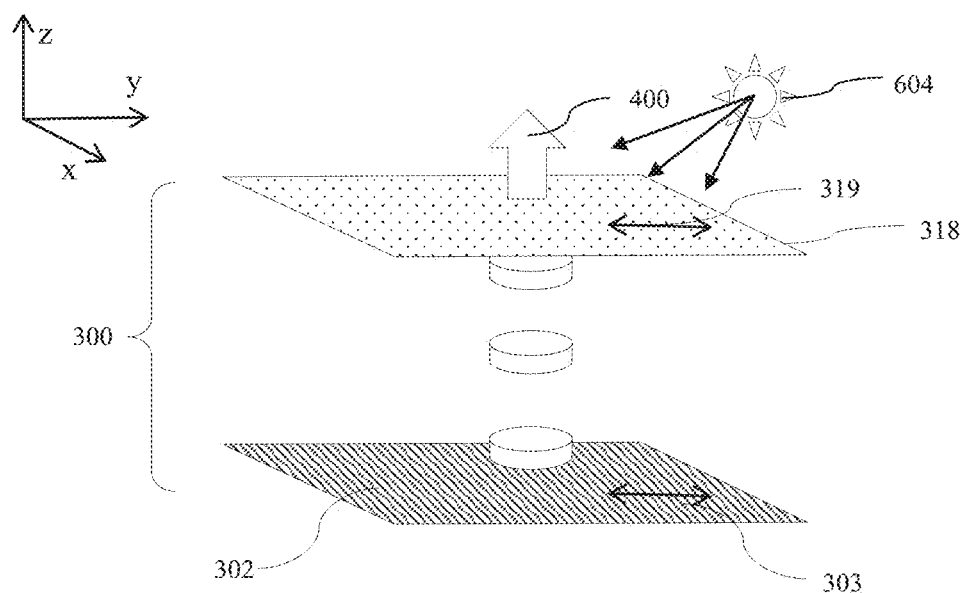
FIG. 21A is a diagram illustrating in side perspective view an optical stack of a passive retarder comprising a negative C-plate and arranged to provide field-of-view modification of a display device.
Figure 21B:
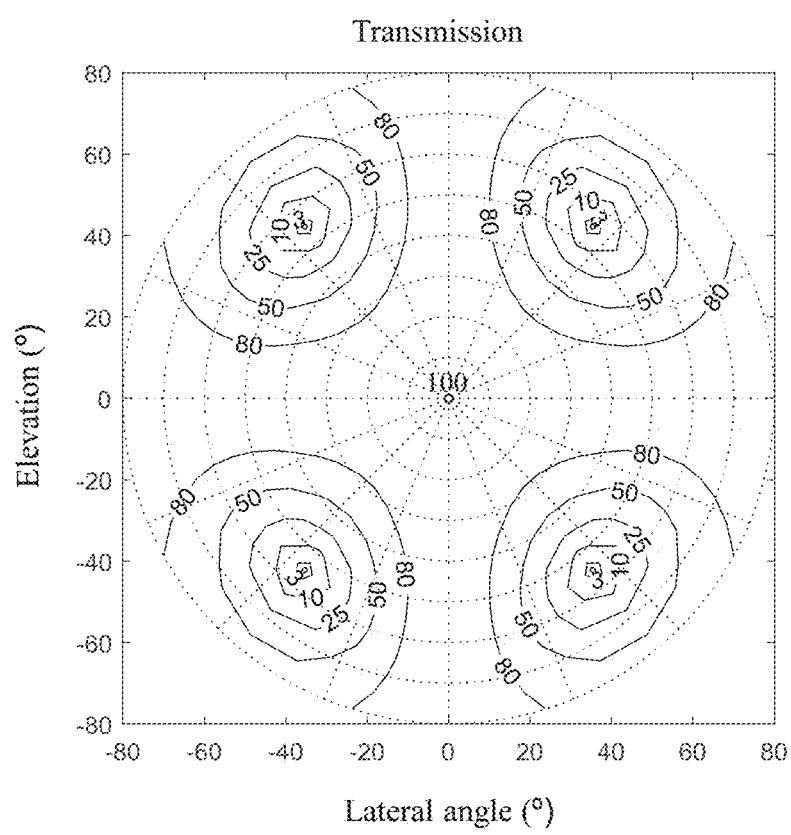
FIG. 21B is a graph illustrating the variation of output transmission with polar direction for transmitted light rays in the passive retarder of FIG. 21A.

FIG. 21A is a schematic diagram illustrating in side perspective view an optical stack of a passive retarder comprising a negative C-plate and arranged to provide field-of-view modification of a display device; and FIG. 21B is a schematic graph illustrating the variation of output transmission with polar direction for transmitted light rays in the passive retarder of FIG. 21A.

Figure 21C:
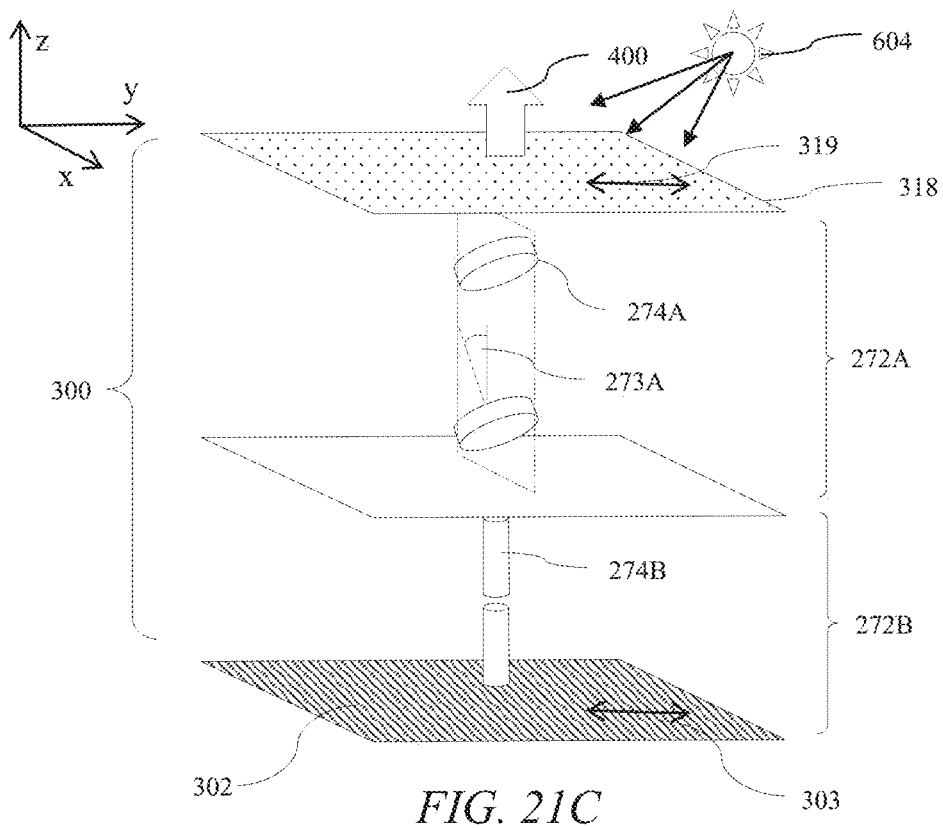
FIG. 21C is a diagram illustrating in side perspective view an optical stack of a passive retarder comprising a negative O-plate tilted in a plane orthogonal to the display polariser electric vector transmission direction and a negative C-plate and arranged to provide field-of-view modification of a display device.
Figure 21D:
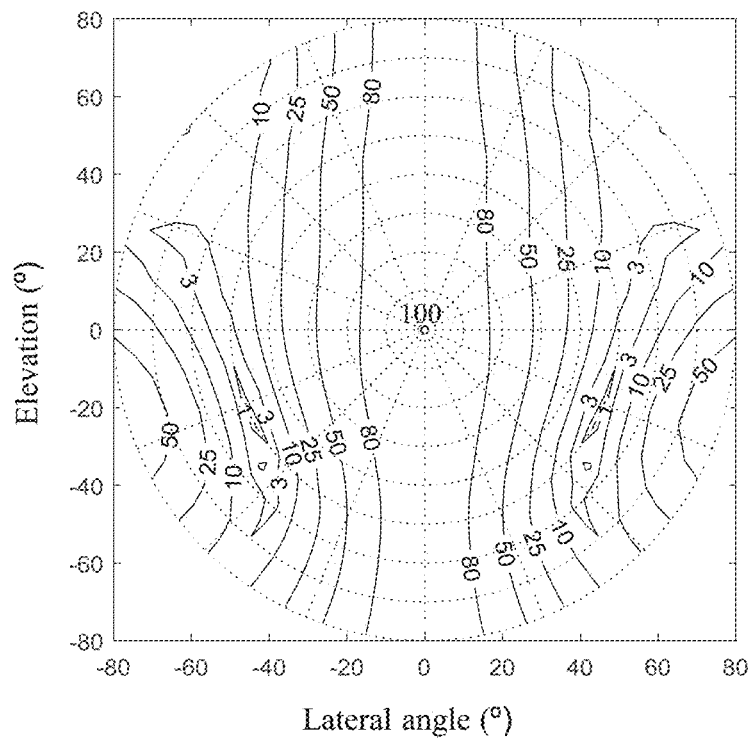
FIG. 21D is a graph illustrating the variation of output transmission with polar direction for transmitted light rays in the passive retarder of FIG. 21C.

FIG. 21C is a schematic diagram illustrating in side perspective view an optical stack of a passive retarder comprising a negative O-plate tilted in a plane orthogonal to the display polariser electric vector transmission direction and a negative C-plate and arranged to provide field-of-view modification of a display device; and FIG. 21D is a schematic graph illustrating the variation of output transmission with polar direction for transmitted light rays in the passive retarder of FIG. 21C, comprising the structure illustrated in TABLE 9A.

TABLE 9A

| | | | Passive retarder | | |
|---|---|---|---|---|---|
| FIGS. | Layer | Type | Out of plane angle/° | In plane angle/° | Δn.d/ nm |
| 21C & 21D | 272A | Negative O | 65 | 90 | −550 |
| | 272B | Positive C | 90 | 0 | +500 |

The passive polar control retarder 300B thus comprises a passive retarder 272A that is a negative O-plate which has an optical axis with a component in the plane of the passive retarder 272A and a component perpendicular to the plane of the passive retarder 272A. Further the component in the plane of the passive retarder extends at 90°, with respect to an electric vector transmission direction that is parallel to the electric vector transmission 219 of the display polariser 218. The passive retarder 272B comprises a passive retarder having an optical axis perpendicular to the plane of the passive retarder.

Advantageously luminance may be reduced for lateral viewing directions. A mobile display may be comfortably rotated about a horizontal axis while achieving privacy for off-axis snoopers in a lateral direction.

Figure 21E:
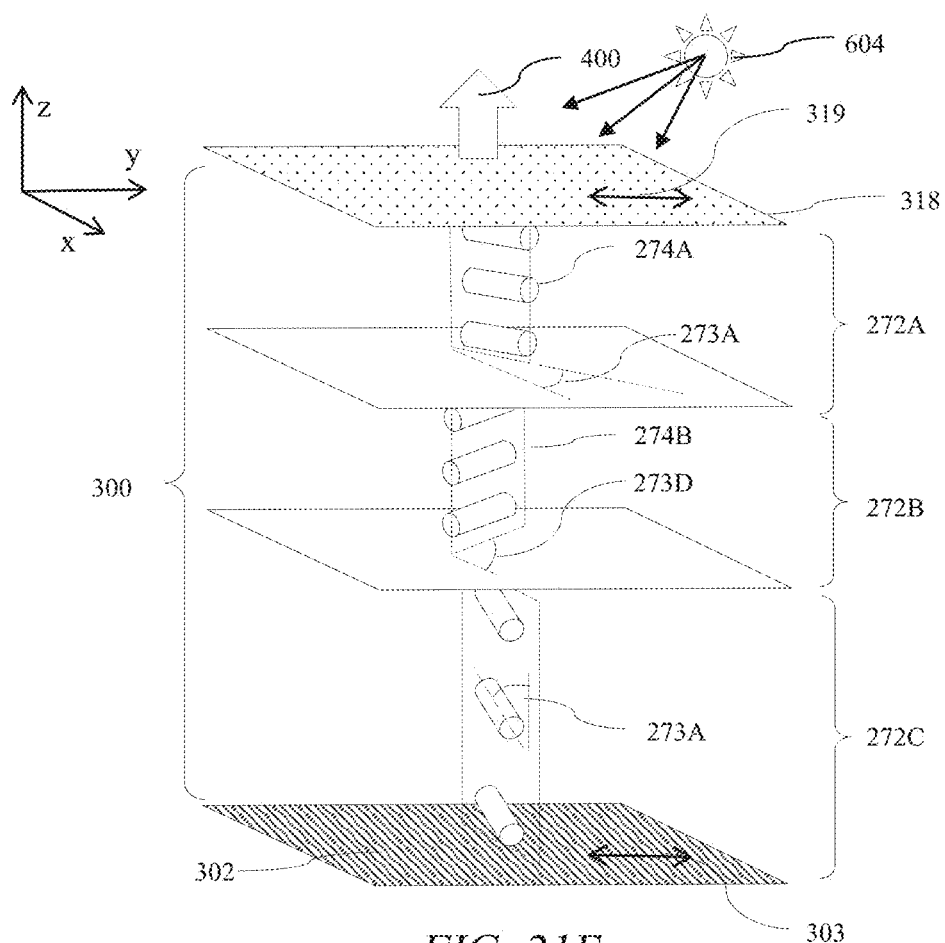
FIG. 21E is a diagram illustrating in side perspective view an optical stack of a passive retarder comprising a positive O-plate tilted in a plane orthogonal to the display polariser electric vector transmission direction and crossed A-plates and arranged to provide field-of-view modification of a display device.
Figure 21F:
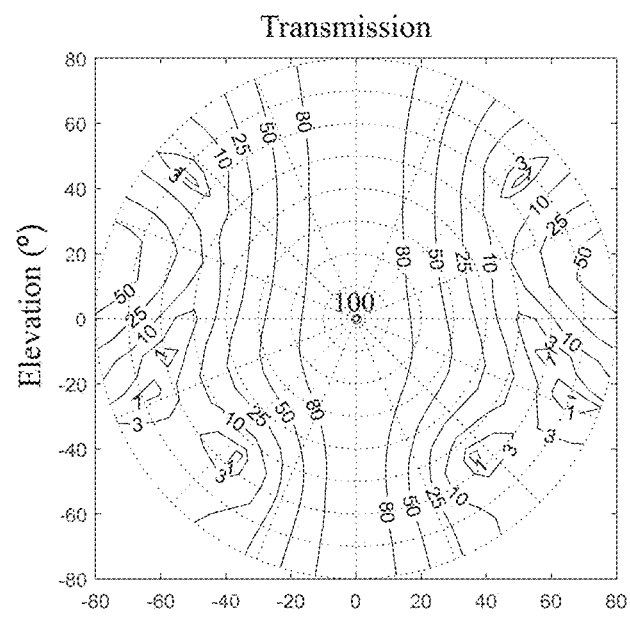
FIG. 21F is a graph illustrating the variation of output transmission with polar direction for transmitted light rays in the passive retarder of FIG. 21E.

FIG. 21E is a schematic diagram illustrating in side perspective view an optical stack of a passive retarder comprising crossed A-plates and a positive O-plate; and FIG. 21F is a schematic graph illustrating the variation of output transmission with polar direction for transmitted light rays in the passive retarder of FIG. 21E, comprising the structure illustrated in TABLE 9B.

TABLE 9B

| | | | Passive retarder | | |
|---|---|---|---|---|---|
| FIGS. | Layer | Type | Out of plane angle/° | In plane angle/° | Δn.d/ nm |
| 21E & 21F | 272A | Positive A | 0 | 45 | +500 |
| | 272B | Positive A | 0 | 135 | +500 |
| | 272C | Positive O | 65 | 90 | +550 |

The passive polar control retarder 300B thus comprises passive retarders 272A, 272B that are crossed A-plates and retarder 272C which has an optical axis with a component in the plane of the passive retarder 272C and a component perpendicular to the plane of the passive retarder 272C. The component in the plane of the passive retarder extends at 90°, with respect to an electric vector transmission direction that is parallel to the electric vector transmission 219 of the display polariser 218. Advantageously luminance may be reduced for lateral viewing directions. A mobile display may be comfortably rotated about a horizontal axis while achieving privacy for off-axis snoopers in a lateral direction.

It may be desirable to provide reduction of luminance in both lateral and elevation directions.

Figure 22A:
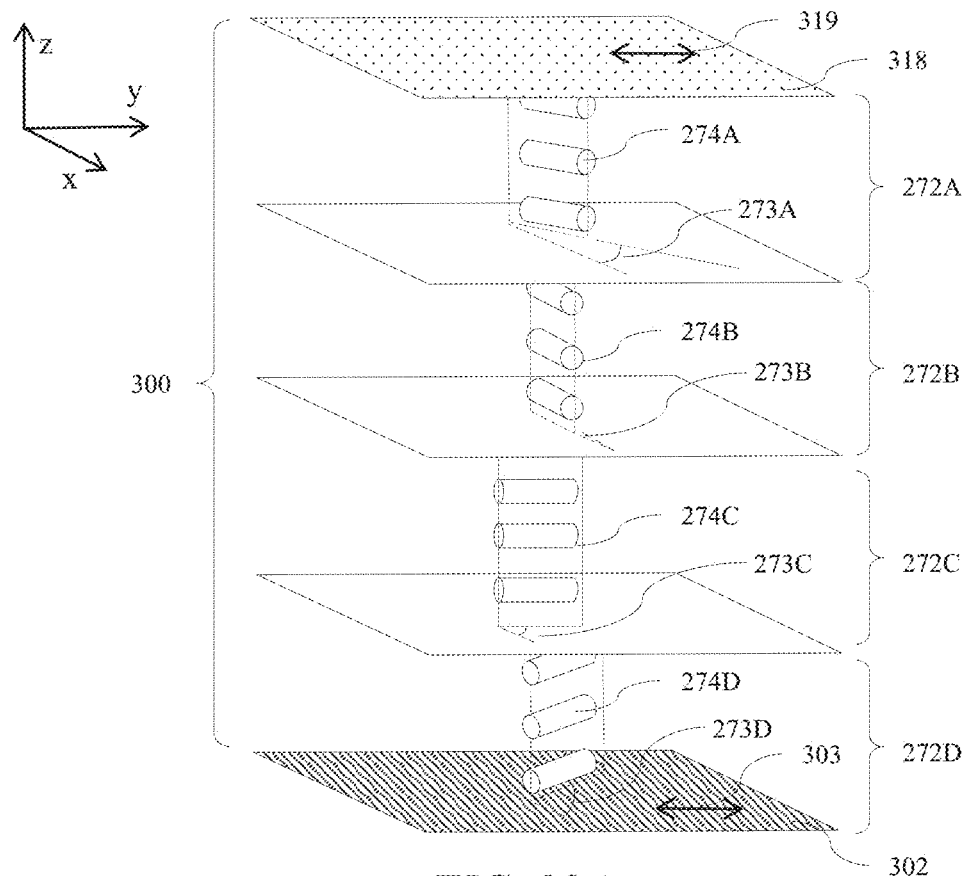
FIG. 22A is a diagram illustrating in side perspective view an optical stack arranged to provide field-of-view modification of a display device comprising two pairs of crossed A-plates.
Figure 22B:
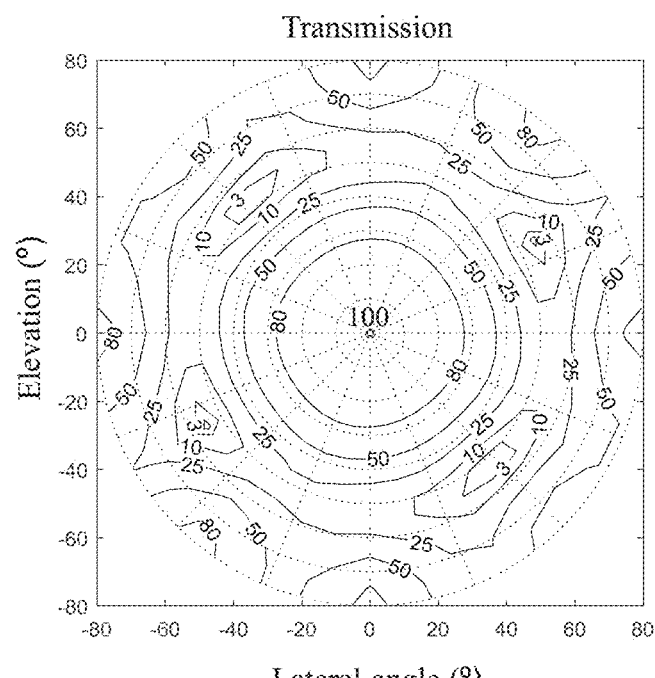
FIG. 22B is a graph illustrating the variation of output transmission with polar direction for transmitted light rays in the passive retarder of FIG. 22A.

FIG. 22A is a schematic diagram illustrating in side perspective view an optical stack of a passive retarders 272A-D comprising two pairs of crossed A-plates; and FIG. 22B is a schematic graph illustrating the variation of output transmission with polar direction for transmitted light rays in the passive retarder of FIG. 22A, comprising the structure illustrated in TABLE 10. Features of the arrangements of FIGS. 22A-22B not discussed in further detail may be assumed to correspond to the features with equivalent reference numerals as discussed above, including any potential variations in the features.

TABLE 10

| | | | Passive control retarder | | |
|---|---|---|---|---|---|
| FIGS. | Layer | Type | Out of plane angle/° | In plane angle/° | Δn.d/ nm |
| 22A, 22B | 272A | Positive A | 0 | 45 | 700 |
| | 272B | | | 90 | |
| | 272C | | | 0 | |
| | 272D | | | 135 | |

The retarder thus comprises a pair of passive retarders 272A, 272D which have optical axes in the plane of the retarders that are crossed. The pair of retarders each comprise plural A-plates having respective optical axes aligned at different angles from each other. The pair of passive retarders 272B, 272C have optical axes that each extend at 90° and 0°, respectively, with respect to an electric vector transmission direction that is parallel to the electric vector transmission 211 of the display polariser 210.

The pair of passive retarders 272A, 272D have optical axes that extend at 45° and at 135°, respectively, with respect to an electric vector transmission direction 211 that is parallel to the electric vector transmission of the display polariser 218 respectively.

The display further comprises an additional pair of passive retarders 272B, 272C disposed between the first-mentioned pair of passive retarders 272A, 272D and which have optical axes in the plane of the retarders that are crossed. The additional pair of passive retarders 272B, 272C have optical axes that each extend at 0° and at 90°, respectively, with respect to an electric vector transmission direction 211, 317 that is parallel to the electric vector transmission of the display polariser 210, 316.

The retardance of each A-plate for light of a wavelength of 550 nm may be in a range from 600 nm to 850 nm, preferably in a range from 650 nm to 730 nm, and most preferably in a range from 670 nm to 710 nm. The colour change of absorbed light from a central viewing location to an off-axis viewing location may be advantageously reduced.

In further illustrative embodiments, preferably the angle 273A is at least 400 and at most 50°, more preferably at least 42.5° and at most 47.5° and most preferably at least 44° and at most 46°. Preferably the angle 273D is at least 1300 and at most 140°, more preferably at least 132.5° and at most 137.5° and most preferably at least 134° and at most 136°.

In further illustrative embodiments, the inner retarder pair 272B, 272C may have looser tolerances than the outer retarder pair 272A, 272D. Preferably the angle 273B is at least −10° and at most 10°, most preferably at least −5° and at most 5 0 and most preferably at least −2° and at most 2°. Preferably the angle 273C is at least 80° and at most 100°, more preferably at least 85° and at most 95° and most preferably at least 88° and at most 92°.

The present embodiment provides a transmission profile that has some rotational symmetry. Advantageously a privacy display may be provided with reduced visibility of image from a wide field of view for lateral or elevated viewing positions of a snooper. Further, such an arrangement may be used to achieve enhanced privacy operation for landscape and portrait operation of a mobile display. Such an arrangement may be provided in a vehicle to reduce stray light to off-axis passengers, and also to reduce light falling on windscreen and other glass surfaces in the vehicle.

Figure 23A:
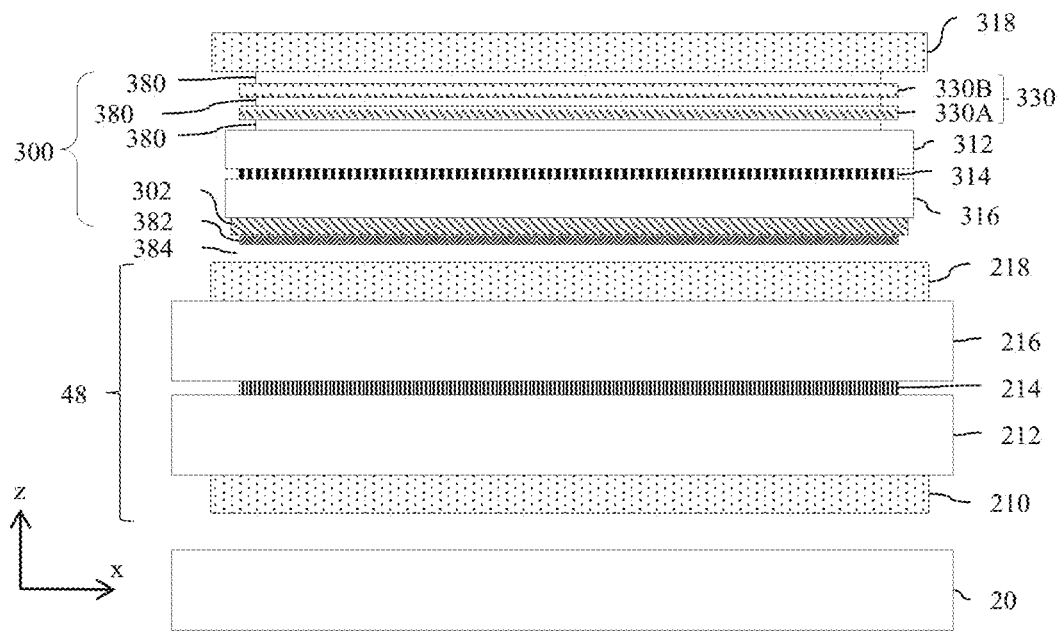
FIG. 23A and FIG. 23B are diagrams illustrating in side view a privacy display for use in ambient illumination comprising a transmissive SLM, a reflective polariser, a LC retarder, compensating retarders and an additional polariser.
Figure 23B:
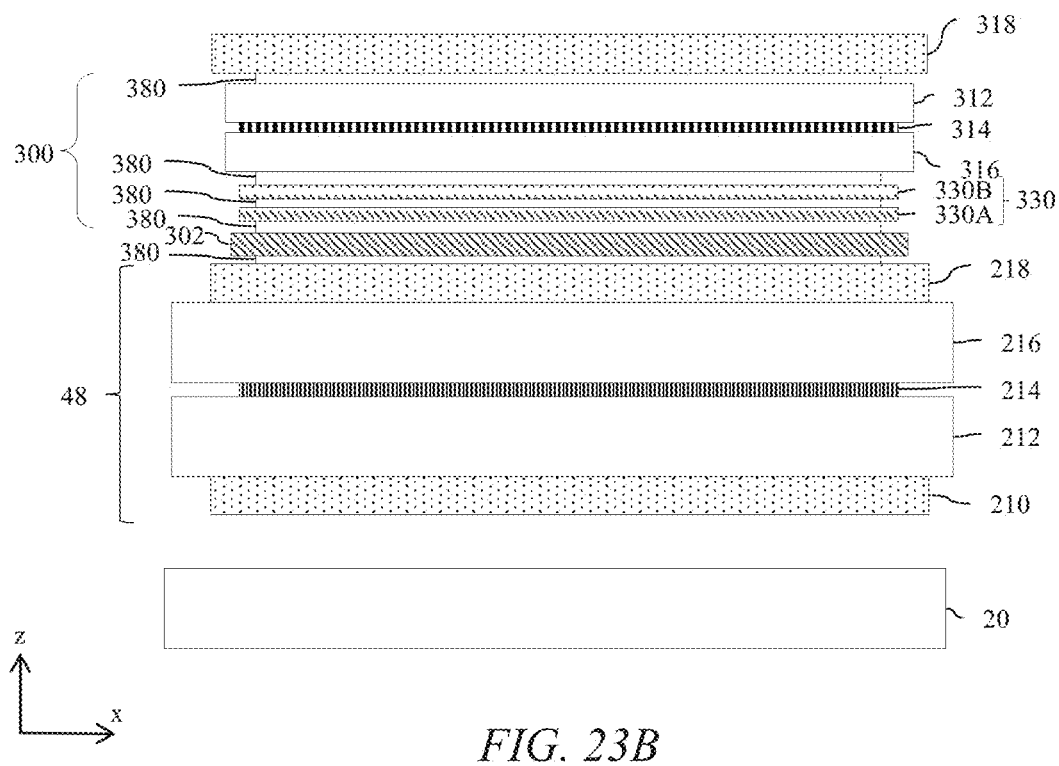

FIG. 23A-B are schematic diagrams illustrating in side views part of a display comprising a switchable compensated retarder and optical bonding layers 380. Features of the arrangements of FIGS. 23A-B not discussed in further detail may be assumed to correspond to the features with equivalent reference numerals as discussed above, including any potential variations in the features. Optical bonding layers 380 may be provided to laminate films and substrates, achieving increased efficiency and reduced luminance at high viewing angles in privacy mode. Further an air gap 384 may be provided between the SLM 48 and the polar control retarder 300. To reduce wetting of the two surfaces at the air gap 384, an anti-wetting surface 382 may be provided to at least one of the polar control retarder 300 or SLM 48.

The retarder 330 may be provided between the switchable liquid crystal layer 314 and SLM 48 as illustrated in FIG. 23B, or may be provided between the additional polariser 318 and switchable liquid crystal layer 314 as illustrated in FIG. 23A. Substantially the same optical performance is provided in both systems other than for hybrid alignment as described elsewhere herein. It would be desirable to provide reduced thickness and reduced total number of optical components.

Figure 24A:
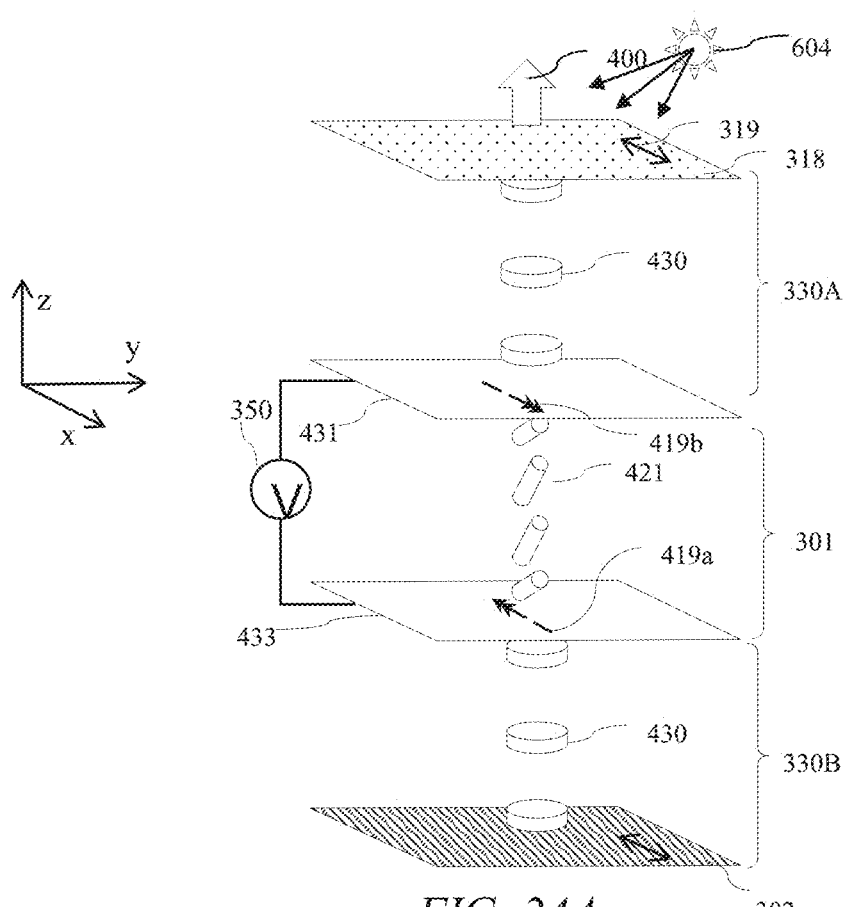
FIG. 24A is a diagram illustrating in perspective side view an arrangement of a switchable compensated retarder in a privacy mode comprising a homogeneously aligned switchable LC retarder arranged between first and second C-plate passive polar control retarders.
Figure 24B:
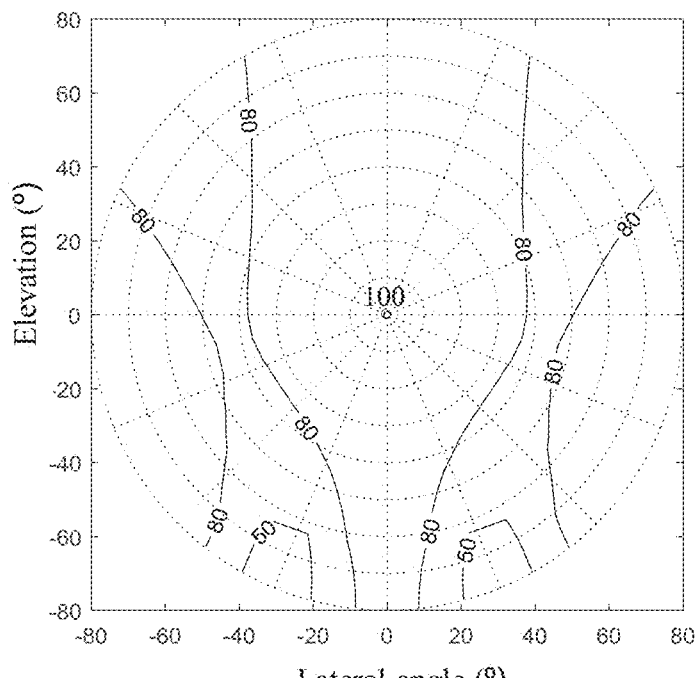
FIG. 24B and FIG. 24C are graphs illustrating the variation of output transmission with polar direction for transmitted light rays in the optical stack of FIG. 24A in a public mode and a privacy mode respectively.
Figure 24C:
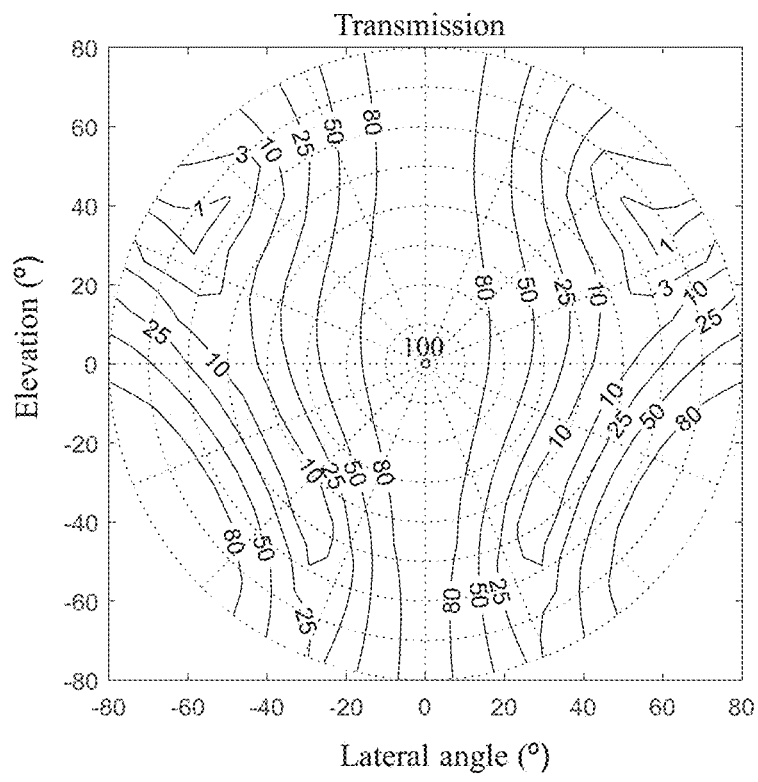
Figure 24D:
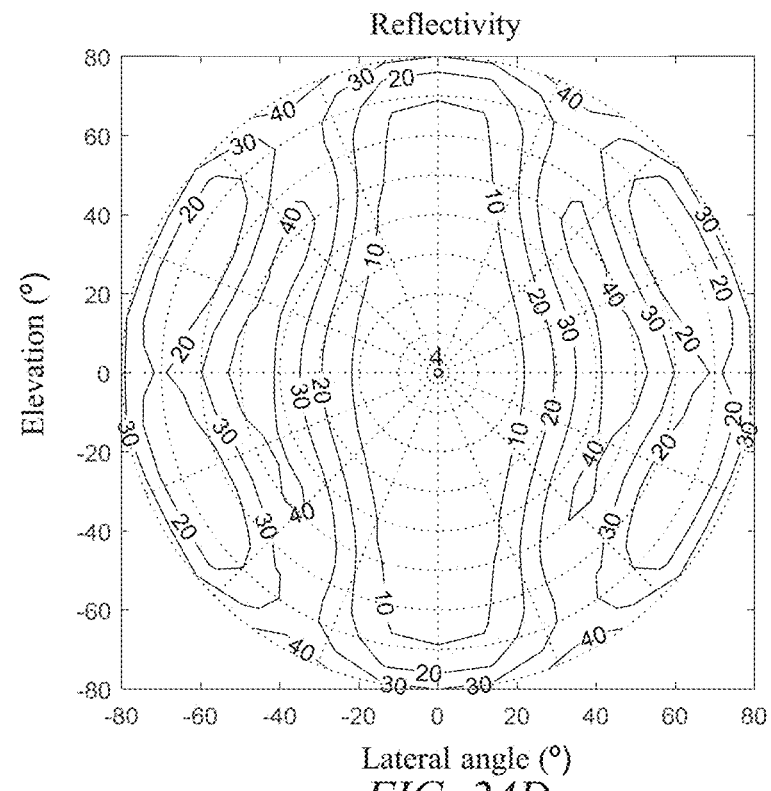
FIG. 24D is a graph illustrating the variation in reflectivity with polar direction for reflected light rays in FIG. 24A in a privacy mode.

FIG. 24A is a schematic diagram illustrating in perspective side view an arrangement of a switchable compensated retarder in a privacy angle mode of operation comprising a homeotropically aligned switchable liquid crystal retarder arranged between first and second C-plate passive polar control retarders, FIG. 24B and FIG. 24C are schematic graphs illustrating the variation of output transmission with polar direction for transmitted light rays in the optical stack of FIG. 24A in a public mode and a privacy mode of operation respectively; and FIG. 24D is a schematic graph illustrating the variation in reflectivity with polar direction for reflected light rays in FIG. 24A in a privacy mode of operation, comprising the embodiments illustrated in TABLE 11. Features of the arrangements of FIGS. 24A-D not discussed in further detail may be assumed to correspond to the features with equivalent reference numerals as discussed above, including any potential variations in the features.

TABLE 11

| FIG. | Mode | Passive polar control retarder(s) Type | Δn.d/ nm | Active LC retarder Alignment layers | Pretilt/ deg | Δn.d/ nm | Δε | Voltage/ V |
|---|---|---|---|---|---|---|---|---|
| 24B | Public | Negative C, 330A | −275 | Homogeneous | 2 | 750 | 13.2 | 5.0 |
| 24C & 24D | Privacy | Negative C, 330B | −275 | Homogeneous | 2 | | | 2.6 |
| 25D | Public | A-plate, 330A | 575 | Homogeneous | 2 | 750 | 13.2 | 5.0 |
| 25E | Privacy | A-plate, 330B | 575 | Homogeneous | 2 | | | 2.6 |

The passive polar control retarder 330 comprises first and second C-plates 330A, 330B; and the switchable liquid crystal layer 314 is provided between the first and second C-plates 330A, 330B. The switchable liquid crystal retarder comprises two surface alignment layers 419a, 419b disposed adjacent to the layer 314 of liquid crystal material 414 and on opposite sides thereof and each arranged to provide homogeneous alignment in the adjacent liquid crystal material 414. The layer of liquid crystal material 414 of the switchable liquid crystal retarder comprises a liquid crystal material 414 with a negative positive dielectric anisotropy.

The layer of liquid crystal material 314 has a retardance for light of a wavelength of 550 nm in a range from 500 nm to 1000 nm, preferably in a range from 600 nm to 900 nm and most preferably in a range from 700 nm to 850 nm. The two passive retarders each comprises a passive retarder having an optical axis perpendicular to the plane of the retarder with a total retardance for light of a wavelength of 550 nm in a range −300 nm to −700 nm, preferably in a range from −350 nm to −600 nm and most preferably −400 nm to −500 nm.

Figure 25A:
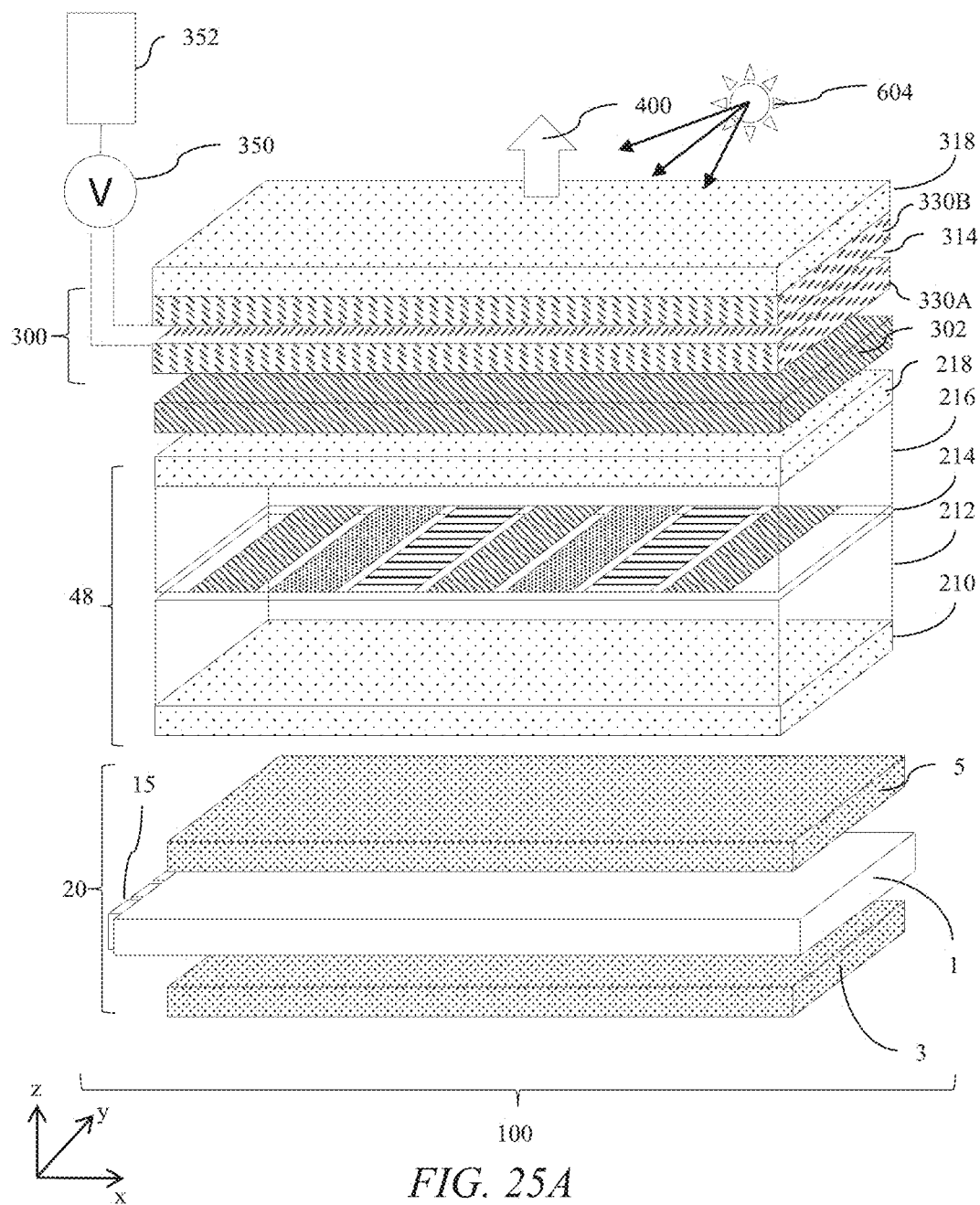
FIG. 25A is a diagram illustrating in perspective side view a display comprising a switchable compensated retarder arranged between first and second C-plate passive polar control retarder substrates.
Figure 25B:
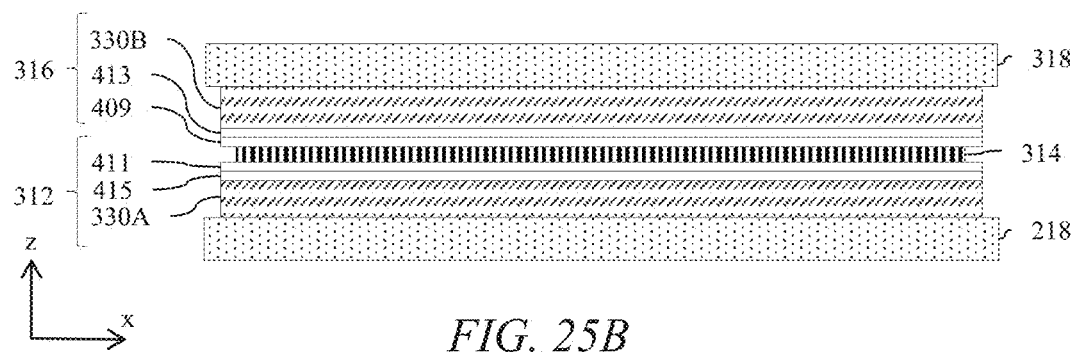
FIG. 25B is a diagram illustrating in side view part of a display comprising a switchable compensated retarder arranged between first and second C-plate passive polar control retarder substrates.

FIG. 25A is a schematic diagram illustrating in perspective side view a display comprising a switchable compensated retarder arranged between first and second C-plate passive polar control retarder substrates; and FIG. 25B is a schematic diagram illustrating in side view part of a display comprising a switchable compensated retarder arranged between first and second C-plate passive polar control retarder substrates.

The polar control retarder 300 comprises two passive retarders 330A, 330B, and a switchable liquid crystal retarder 301 comprising a layer 314 of liquid crystal material provided between the two passive retarders 330A, 330B. The display device 100 further comprises a transmissive electrodes 413, 415 and liquid crystal surface alignment layers 409, 411 formed on a side of each of the two passive retarders 330A, 330B adjacent the switchable liquid crystal retarder layer 314. The display device 100 further comprises first and second substrates between which the switchable liquid crystal retarder layer 314 is provided, the first and second substrates each comprising one of the two passive retarders 330A, 330B.

Thus the first C-plate 330A has a transparent electrode layer 415 and liquid crystal alignment layer 411 formed on one side and the second C-plate 330B has a transparent electrode layer 413 and liquid crystal alignment layer 409 formed on one side.

The liquid crystal layer 314 is provided between first and second substrates 312, 316, and the first and second substrates 312, 316 each comprises one of the first and second C-plates 330A, 330B. The C-plates may be provided in double stretched COP films that are ITO coated to provide electrodes 413, 415 and have liquid crystal alignment layers 409, 411 formed thereon.

Advantageously, the number of layers may be reduced in comparison to the arrangement of FIG. 1, reducing thickness, cost and complexity. Further the C-plates 330A, 330B may be flexible substrates, and may provide a flexible privacy display.

It would be desirable to provide a liquid crystal layer 314 between first and second A-plate substrates.

Figure 25C:
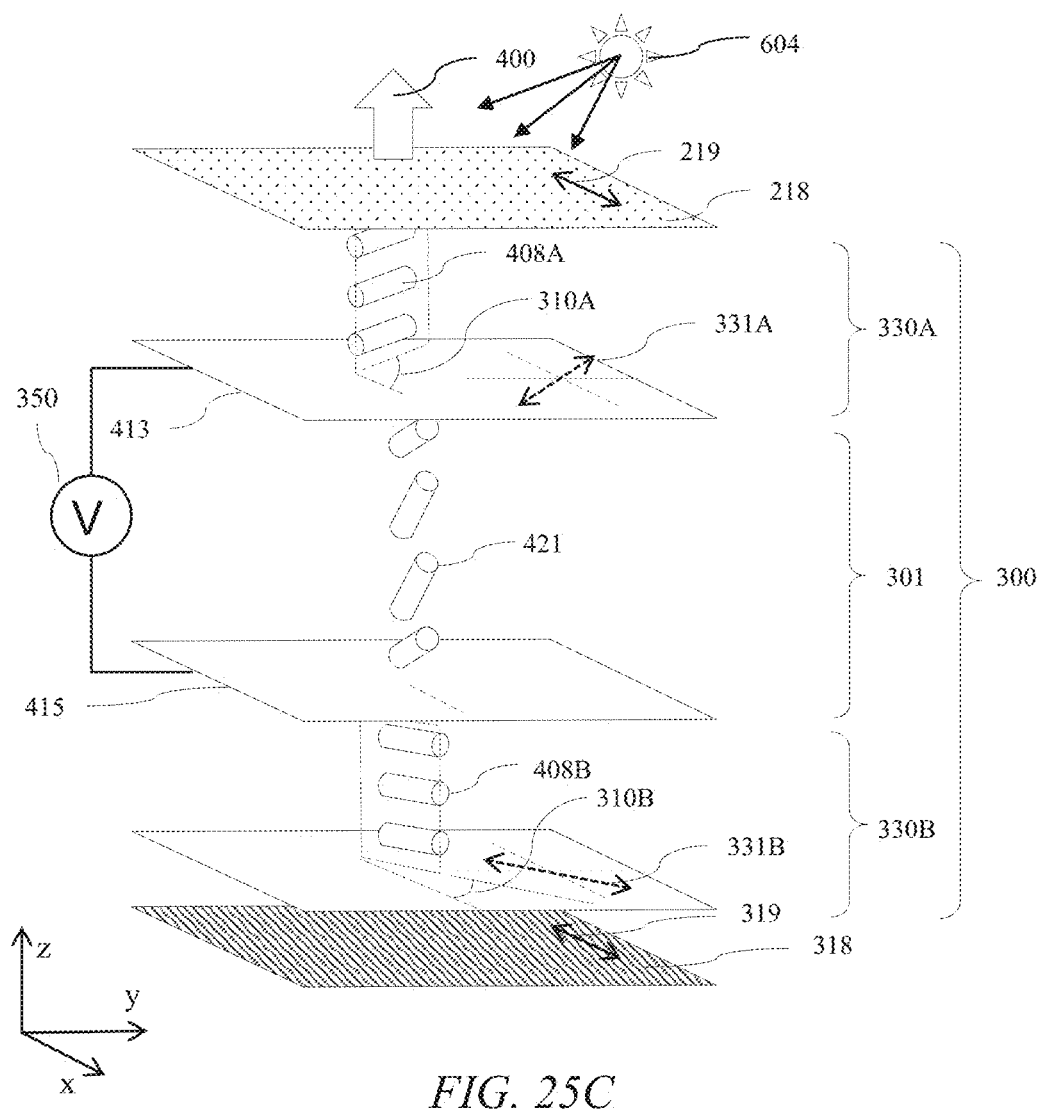
FIG. 25C is a diagram illustrating in perspective side view an arrangement of a switchable compensated retarder in a public mode comprising a homogeneously aligned switchable LC retarder arranged between first and second crossed A-plate passive polar control retarders.
Figure 25D:
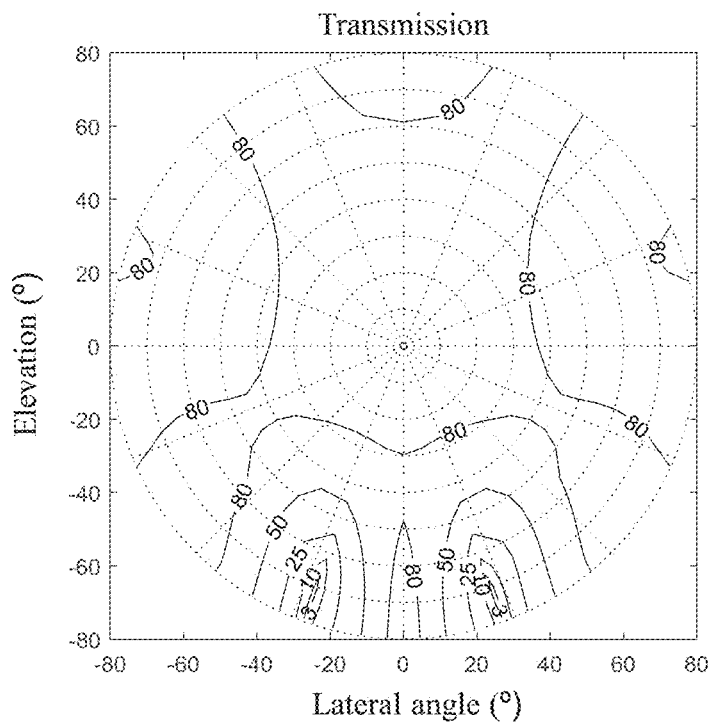
FIG. 25D and FIG. 25E are graphs illustrating the variation of output transmission with polar direction for transmitted light rays for the arrangement of FIG. 25C in wide angle and privacy modes respectively.
Figure 25E:
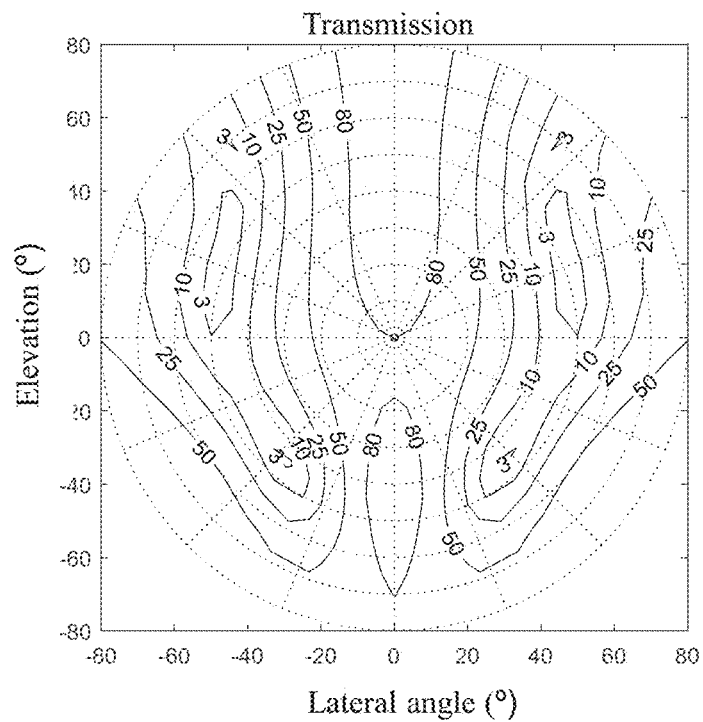

FIG. 25C is a schematic diagram illustrating in perspective side view an arrangement of a switchable compensated retarder in a public mode of operation comprising a homogeneously aligned switchable liquid crystal retarder arranged between first and second crossed A-plate passive polar control retarders; and FIG. 25D and FIG. 25E are schematic graphs illustrating the variation of output transmission with polar direction for transmitted light rays for the structure of FIG. 25C when driven in wide angle and privacy modes of operation respectively comprising the embodiments further illustrated in TABLE 11. Features of the arrangements of FIGS. 25A-E not discussed in further detail may be assumed to correspond to the features with equivalent reference numerals as discussed above, including any potential variations in the features.

The switchable liquid crystal retarder comprises two surface alignment layers 419a, 419b disposed adjacent to the layer 314 of liquid crystal material 414 and on opposite sides thereof and each arranged to provide homogeneous alignment in the adjacent liquid crystal material 414. The layer of liquid crystal material 414 of the switchable liquid crystal retarder comprises a liquid crystal material 414 with a negative positive dielectric anisotropy.

The layer of liquid crystal material 314 has a retardance for light of a wavelength of 550 nm in a range from 500 nm to 1000 nm, preferably in a range from 600 nm to 900 nm and most preferably in a range from 700 nm to 850 nm. Each of the two passive retarders has an optical axis in the plane of the passive retarder, wherein the optical axes are crossed, and each passive retarder of the pair of passive retarders having a retardance for light of a wavelength of 550 nm in a range from 150 nm to 800 nm, preferably in a range from 200 nm to 700 nm and most preferably in a range from 250 nm to 600 nm.

In comparison to the arrangement of FIG. 24A, advantageously A-plates may be manufactured at reduced cost compared to C-plates.

It would be desirable to provide improved image appearance by means of adding camouflage to the private image seen by the snooper 47 in privacy mode of operation.

FIG. 26A is a schematic diagram illustrating in perspective side view an arrangement of a switchable retarder in a privacy mode of operation comprising a negative C-plate passive retarder and homeotropically aligned switchable liquid crystal retarder further comprising a patterned electrode 415 layer. At least one of the electrodes 413, 415 may be patterned, in this example electrode 415 is patterned with regions 415a, 415b, 415c and driven by respective voltage drivers 350a, 350b, 350c with voltages Va, Vb, Vc. Gaps 417 may be provided between the electrode regions 415a, 415b, 415c. The tilt of the molecules 414a, 414b, 414c may thus be adjusted independently to reveal a camouflage pattern with different luminance levels for off-axis viewing.

Thus the switchable liquid crystal retarder 301 arranged between the reflective polariser 302 and the additional polariser 318 is controlled by means of addressing electrodes 415a, 415b, 415c and uniform electrode 413. The addressing electrodes may be patterned to provide at least two pattern regions comprising electrode 415a and gap 417.

FIG. 26B is a schematic diagram illustrating in perspective front view illumination of a primary viewer and a snooper by a camouflaged luminance controlled privacy display. Display 100 may have dark image data 601 and white background data 603 that is visible to the primary viewer 45 in viewing window 26p. By way of comparison snooper 47 may see the camouflaged image as illustrated in FIG. 26C which is a schematic diagram illustrating in perspective side view illumination of a snooper by a camouflaged luminance controlled privacy display. Features of the arrangements of FIGS. 26A-C not discussed in further detail may be assumed to correspond to the features with equivalent reference numerals as discussed above, including any potential variations in the features.

Thus in white background regions 603, a camouflage structure may be provided that has mixed luminance of the white region 603. The pattern regions of the electrodes 415a, 415b, 415c are thus camouflage patterns. At least one of the pattern regions is individually addressable and is arranged to operate in a privacy mode of operation.

The pattern regions may be arranged to provide camouflage for multiple spatial frequencies by means of control of which patterns are provided during privacy mode of operation. In an illustrative example, a presentation may be provided with 20 mm high text. A camouflage pattern with similar pattern size may be provided with a first control of an electrode pattern. In a second example a photo may be provided with large area content that is most visible to a snooper 47. The spatial frequency of the camouflage pattern may be reduced to hide the larger area structures, by combining first and second electrode regions to provide the voltage and achieve a resultant lower spatial frequency pattern.

Advantageously a controllable camouflage structure may be provided by means of adjustment of the voltages Va, Vb, Vc across the layer 892. Substantially no visibility of the camouflage structure may be seen for head-on operation. Further the camouflage image may be removed by providing Va, Vb and Vc to be the same.

Further to providing camouflage from luminance modulation of the private image, the present embodiments provide camouflaged reflection from ambient illumination 604, advantageously achieving further hiding of private images to the snooper 47 while achieving non-camouflaged reflection to the primary user 45.

The performance of retarders between parallel polarisers when arranged in series will now be described. First, the field of view of a homogeneously aligned liquid crystal retarder 301 will now be described for two different drive voltages.

Figure 27C:
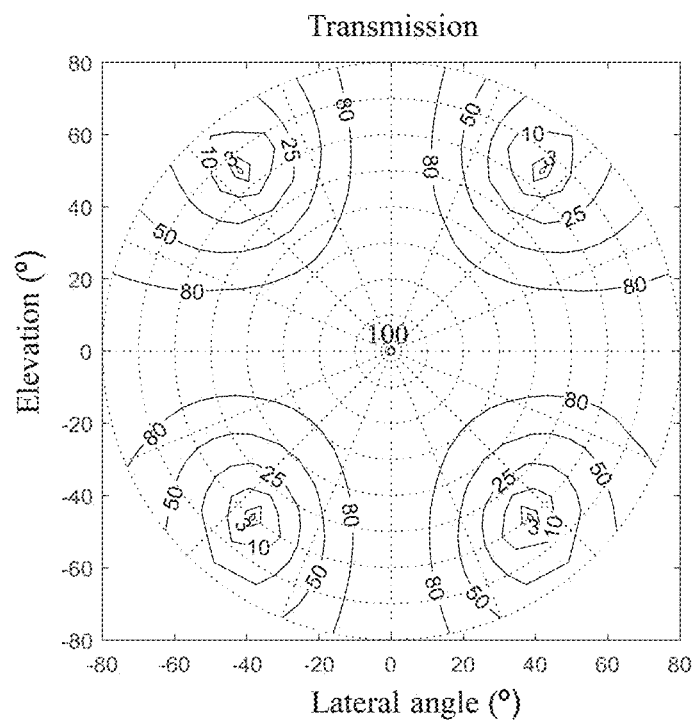
FIG. 27C is a graph illustrating the variation of output transmission with polar direction for transmitted light rays in FIG. 27A for a second applied voltage greater than the first applied voltage.

FIG. 27A is a schematic diagram illustrating in perspective side view an arrangement of a homogeneously aligned switchable liquid crystal retarder; FIG. 27B is a schematic graph illustrating the variation of output transmission with polar direction for transmitted light rays in FIG. 27A for a first applied voltage; and FIG. 27C is a schematic graph illustrating the variation of output transmission with polar direction for transmitted light rays in FIG. 27A for a second applied voltage that is greater than the first applied voltage, comprising the structure illustrated in TABLE 12.

Figure 27D:
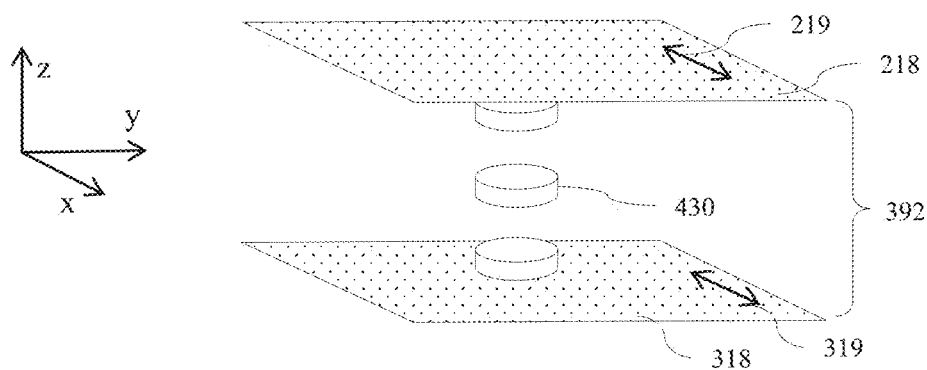
FIG. 27D is a diagram illustrating in perspective side view a C-plate arranged between parallel polarisers.
Figure 27E:
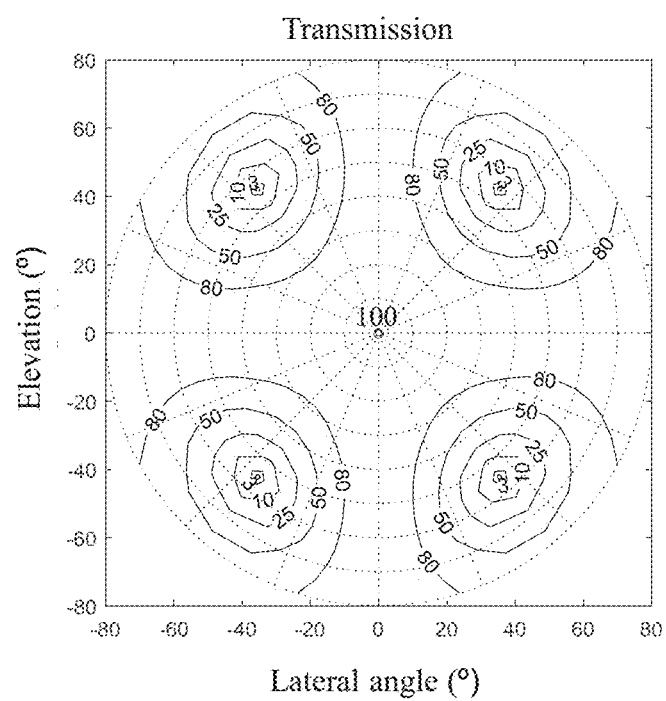
FIG. 27E is a graph illustrating the variation of output transmission with polar direction for transmitted light rays in FIG. 27D.

FIG. 27D is a schematic diagram illustrating in perspective side view a C-plate arranged between parallel polarisers; and FIG. 27E is a schematic graph illustrating the variation of output transmission with polar direction for transmitted light rays in FIG. 27D, comprising the structure illustrated in TABLE 12.

from the SLM 48. Directional illumination of the SLM 48 by directional backlights 20 will now be described.

Figure 30A:
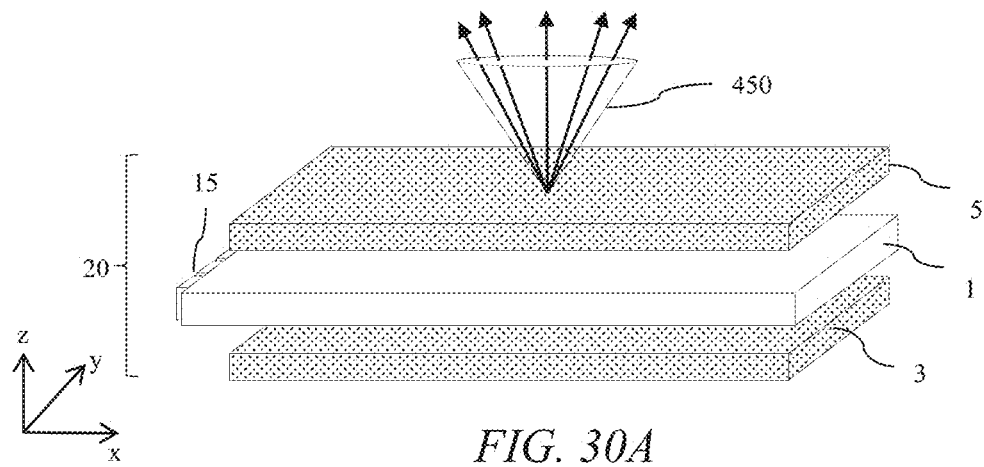
FIG. 30A is a diagram illustrating in front perspective view a directional backlight.
Figure 30B:
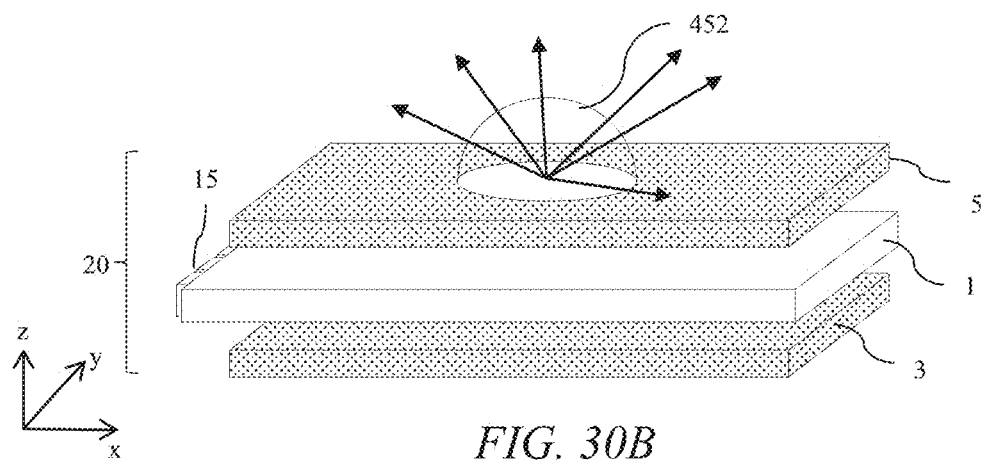
FIG. 30B is a diagram illustrating in front perspective view a non-directional backlight.

FIG. 30A is a schematic diagram illustrating in front perspective view a directional backlight 20 (or 'narrow angle' or 'collimated' backlight), and FIG. 30B is a schematic diagram illustrating in front perspective view a non-

TABLE 12

| FIG. | Passive polar control retarder(s) | | | Active LC retarder | | | |
|---|---|---|---|---|---|---|---|
| | Type | Δn.d/ nm | Central polariser? | Alignment layers | Pretilt/ deg | Δn.d/ nm | Δε | Voltage/ V |
| 27A & 27B | — | — | — | Homogeneous | 1 | 900 | +15 | 2.4 |
| 27C | | | | Homogeneous | | | | 20.0 |
| 27D & 27E | Negative C | −700 | — | — | — | — | — | — |
| 28A & 28B | Negative C | −700 | Yes | Homogeneous | 1 | 900 | +15 | 2.4 |
| 28C | | | | Homogeneous | | | | 20.0 |
| 29A & 29B | Negative C | −700 | No | Homogeneous | 1 | 900 | +15 | 2.4 |
| 29C | | | | Homogeneous | | | | 20.0 |

Figure 28A:
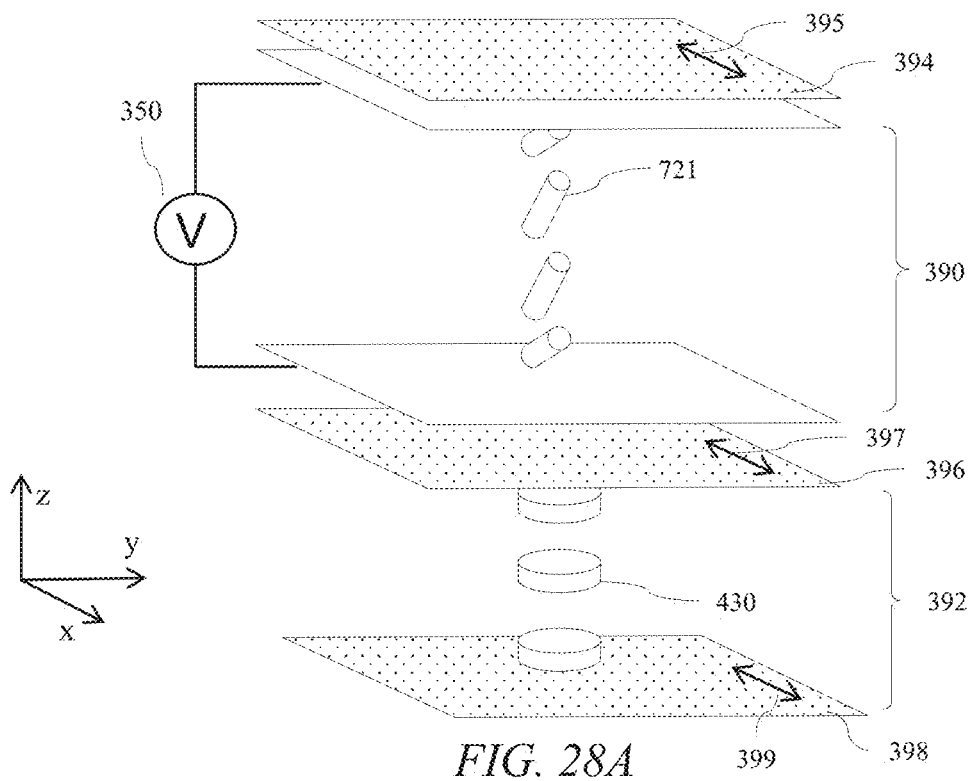
FIG. 28A is a diagram illustrating in perspective side view an arrangement of a homogeneously aligned switchable LC retarder arranged between parallel polarisers in series with a C-plate arranged between parallel polarisers.
Figure 28B:
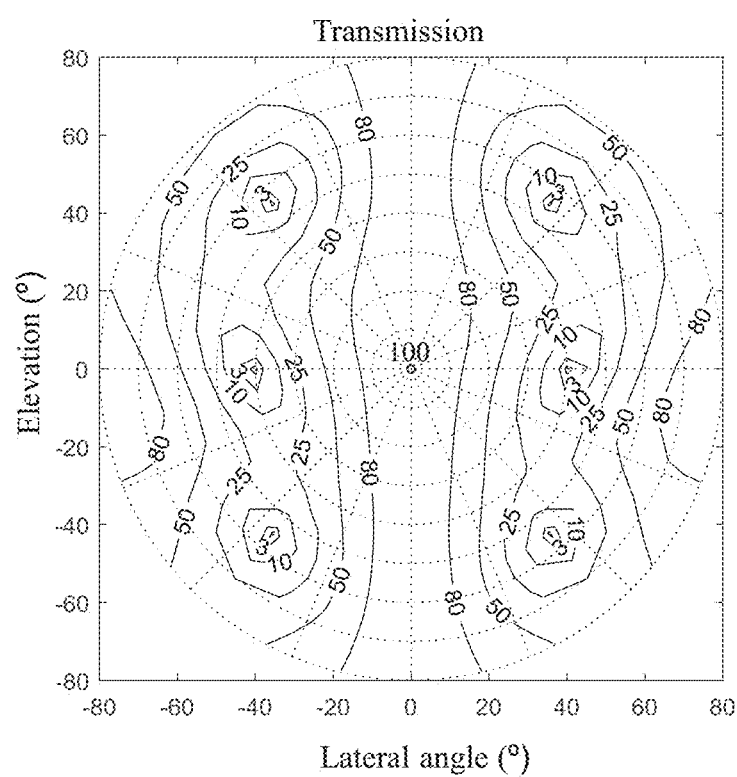
FIG. 28B is a graph illustrating the variation of output transmission with polar direction for transmitted light rays in FIG. 28A for a first applied voltage.
Figure 28C:
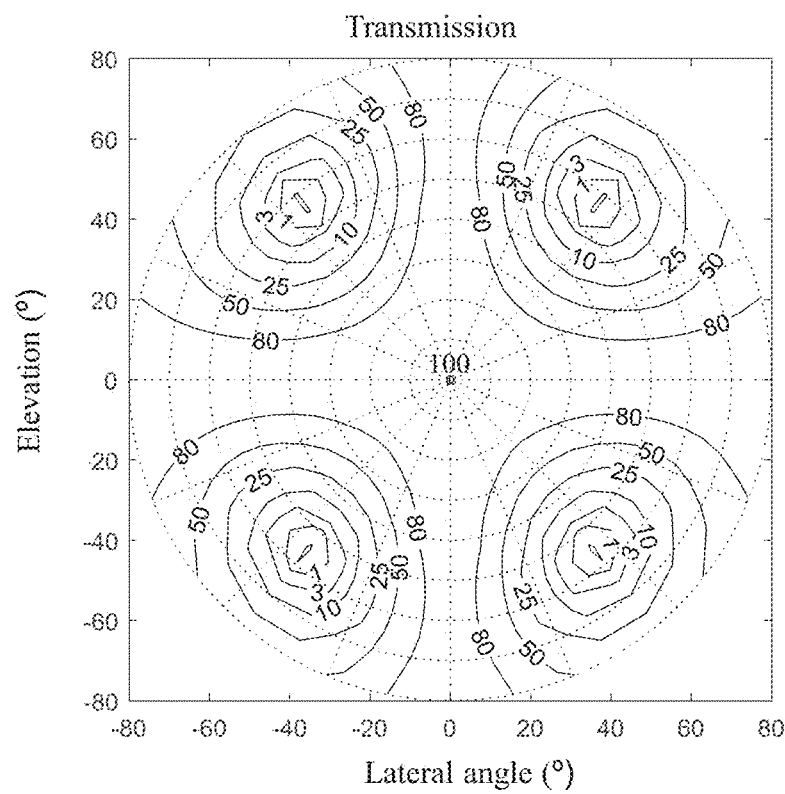
FIG. 28C is a graph illustrating the variation of output transmission with polar direction for transmitted light rays in FIG. 28A for a second applied voltage greater than the first applied voltage.

FIG. 28A is a schematic diagram illustrating in perspective side view an arrangement of a homogeneously aligned switchable liquid crystal retarder 390 arranged between parallel polarisers 394, 396 in series with a field-of-view control passive retarder comprising a C-plate retarder 392 arranged between parallel polarisers 396, 398; FIG. 28B is a schematic graph illustrating the variation of output transmission with polar direction for transmitted light rays in FIG. 28A for a first applied voltage; FIG. 28C is a schematic graph illustrating the variation of output transmission with polar direction for transmitted light rays in FIG. 28A for a second applied voltage that is greater than the first applied voltage, comprising the structure illustrated in TABLE 12.

Figure 29A:
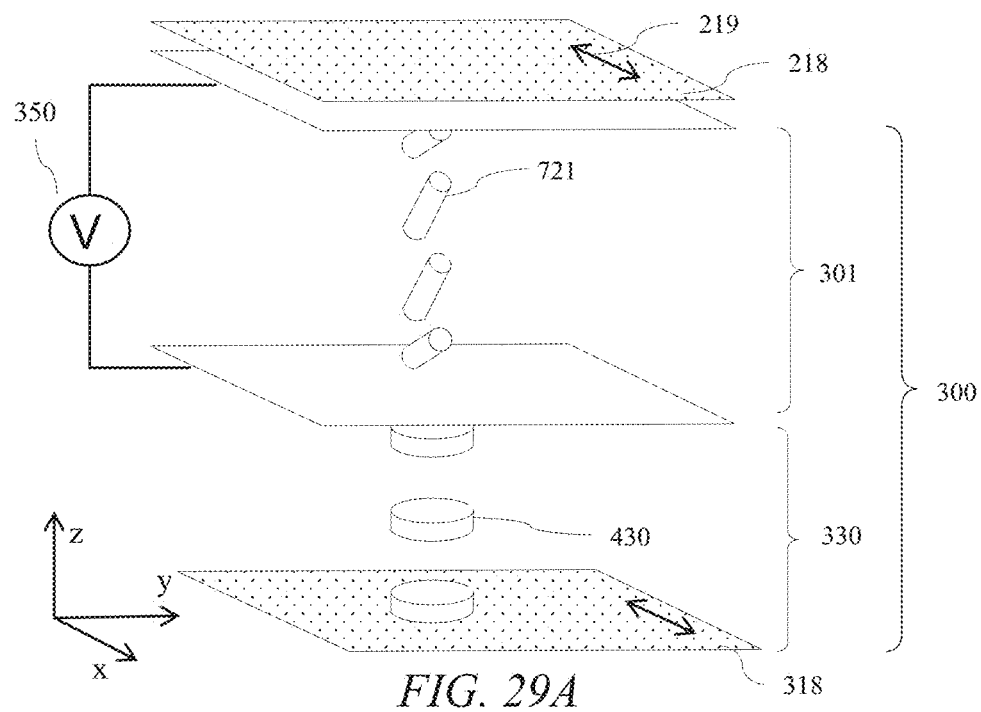
FIG. 29A is a diagram illustrating in perspective side view an arrangement of a homogeneously aligned switchable LC retarder in series with a C-plate polar control retarder wherein the homogeneously aligned switchable LC and C-plate polar control retarder are arranged between a single pair of parallel polarisers.
Figure 29B:
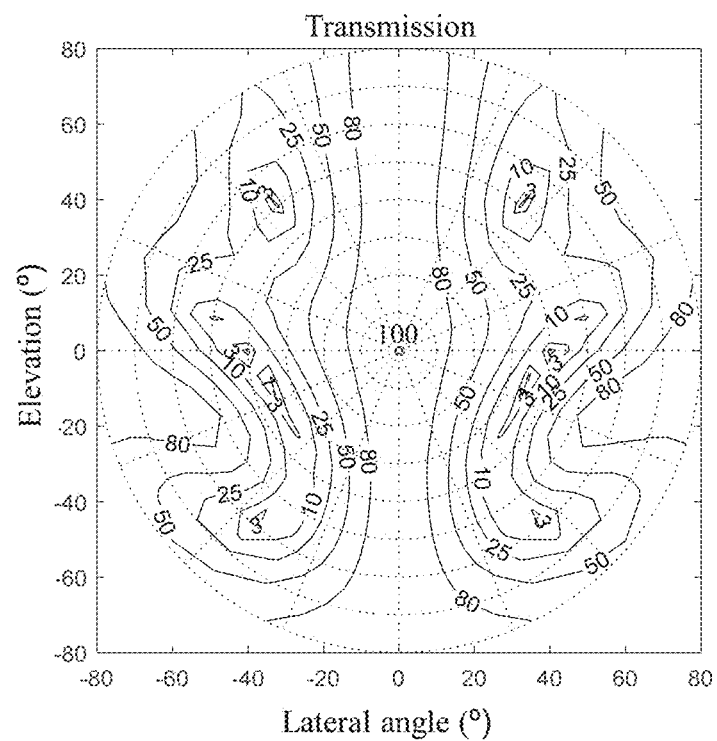
FIG. 29B is a graph illustrating the variation of output transmission with polar direction for transmitted light rays in FIG. 29A for a first applied voltage.
Figure 29C:
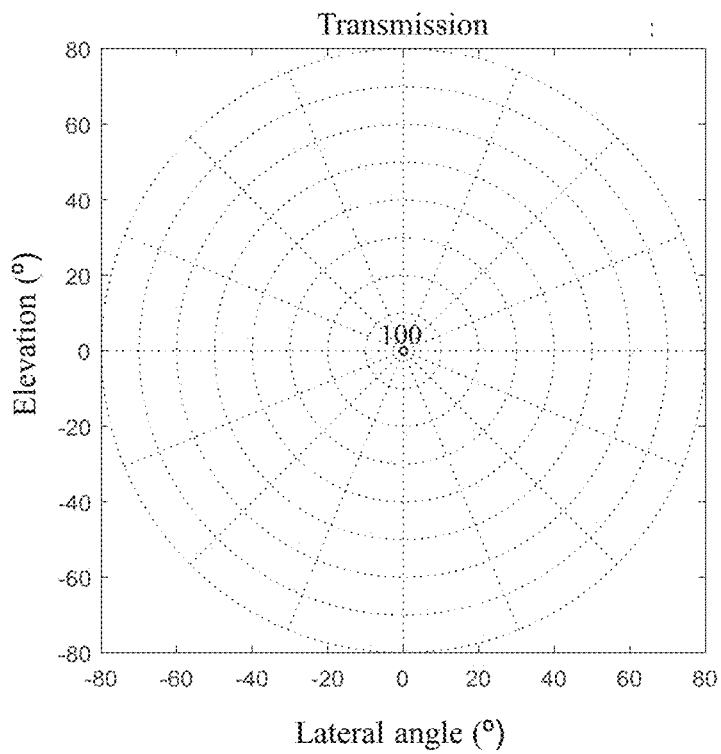
FIG. 29C is a graph illustrating the variation of output transmission with polar direction for transmitted light rays in FIG. 29A for a second applied voltage greater than the first applied voltage.

FIG. 29A is a schematic diagram illustrating in perspective side view an arrangement of a homogeneously aligned switchable liquid crystal retarder in series with a C-plate polar control retarder wherein the homogeneously aligned switchable liquid crystal and C-plate polar control retarder are arranged between a single pair of parallel polarisers; FIG. 29B is a schematic graph illustrating the variation of output transmission with polar direction for transmitted light rays in FIG. 29A for a first applied voltage; and FIG. 29C is a schematic graph illustrating the variation of output transmission with polar direction for transmitted light rays in FIG. 29A for a second applied voltage that is greater than the first applied voltage, comprising the structure illustrated in TABLE 12. Features of the arrangements of FIGS. 27A-29C not discussed in further detail may be assumed to correspond to the features with equivalent reference numerals as discussed above, including any potential variations in the features.

Unexpectedly, the optimum conditions for maximum field-of-view operation is provided by equal and opposite net retardation of the polar control retarder 330 in comparison to the switchable liquid crystal retarder layer 314 in its undriven state. An ideal polar control retarder 330 and switchable liquid crystal retarder layer 314 may achieve (i) no modification of the public mode performance from the input light and (ii) optimal reduction of lateral viewing angle for off-axis positions for all elevations when arranged to provide a narrow angle state. This teaching may be applied to all the display devices disclosed herein.

It would be desirable to provide further reduction of off-axis luminance by means of directional illumination directional backlight 20 (or 'wide-angle' backlight or 'non-collimated' backlight), either of which may be applied in any of the devices described herein. Thus a directional backlight 20 as shown in FIG. 30A provides a narrow cone 450, whereas a non-directional backlight 20 as shown in FIG. 30B provides a wide angular distribution cone 452 of light output rays.

Figure 30C:
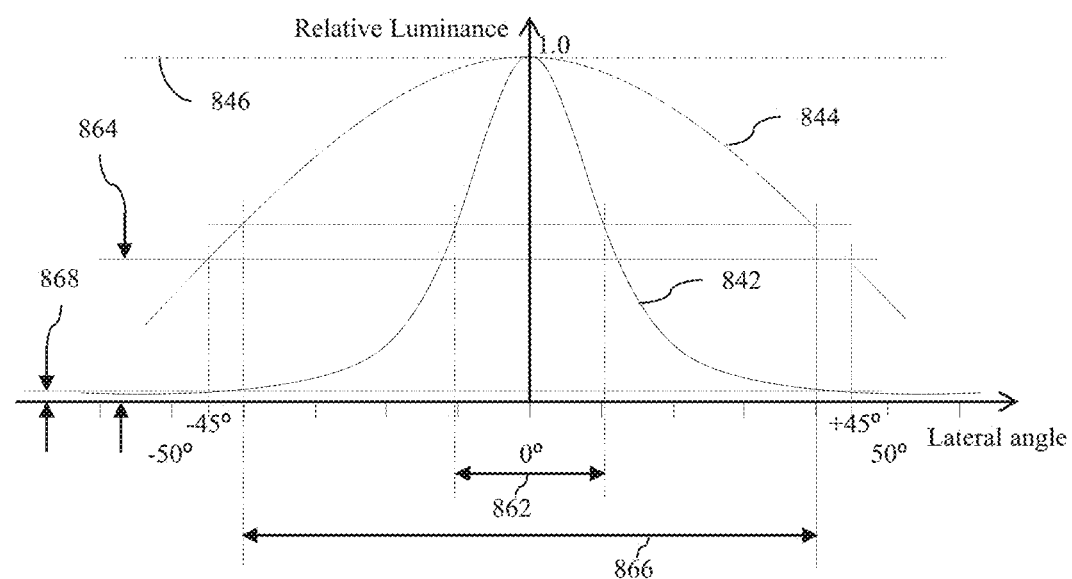
FIG. 30C is a graph illustrating variation with luminance with lateral viewing angle of displays with different fields of view.

FIG. 30C is a schematic graph illustrating variation with luminance with lateral viewing angle for various different backlight arrangements. The graph of FIG. 30C may be a cross section through the polar field-of-view profiles described herein. Features of the arrangements of FIGS. 30A-C not discussed in further detail may be assumed to correspond to the features with equivalent reference numerals as discussed above, including any potential variations in the features.

A Lambertian backlight has a luminance profile 846 that is independent of viewing angle. In the present embodiments, the backlight 20 may be arranged to provide an angular light distribution that has reduced luminance for off-axis viewing positions in comparison to head-on luminance.

A typical wide angle backlight has a roll-off at higher angles such that the full width half maximum of relative luminance may be preferably greater than 40°, more preferably greater than 60° and most preferably greater than 80°. A typical wide angle backlight has a roll-off at higher angles such that the full width half maximum 866 of relative luminance may be greater than 40°, preferably greater than 600 and most preferably greater than 800. Further the relative luminance 864 at +/−45°, is preferably greater than 7.5%, more preferably greater than 10% and most preferably greater than 20%. Advantageously a display that achieves a roll-off similar to the wide angle backlight may provide high image visibility to off-axis users.

Displays comprising wide angle backlights 20 and only one additional polariser 318 and polar control retarder 330 (not comprising further polar control retarders 300B and further additional polariser 318B) do not typically achieve desirable visual security level to off-axis users in privacy mode of operation. Desirably such displays may be provided with a directional backlight 20 as will now be described.

The backlight 20 may be a directional backlight that provides a luminance at polar angles to the normal to the SLM greater than 45 degrees in at least one azimuthal direction that is at most 30% of the luminance along the normal to the SLM, preferably at most 20% of the luminance along the normal to the SLM, and more preferably at most 10% of the luminance along the normal to the SLM. The directional backlight 20 may have a roll-off at higher angles such that the full width half maximum 862 of relative luminance may be less than 60°, preferably less than 400 and most preferably less than 200. In an illustrative example the luminance 868 at 45 degrees may be 18% of the head-on luminance from the backlight 20.

Such luminance profiles may be provided by the directional backlights 20 described below or may also be provided by wide angle backlights in combination with further additional polariser 318B and polar control retarders 300B as described elsewhere herein.

One type of a switchable backlight 20 will now be described.

Figure 31A:
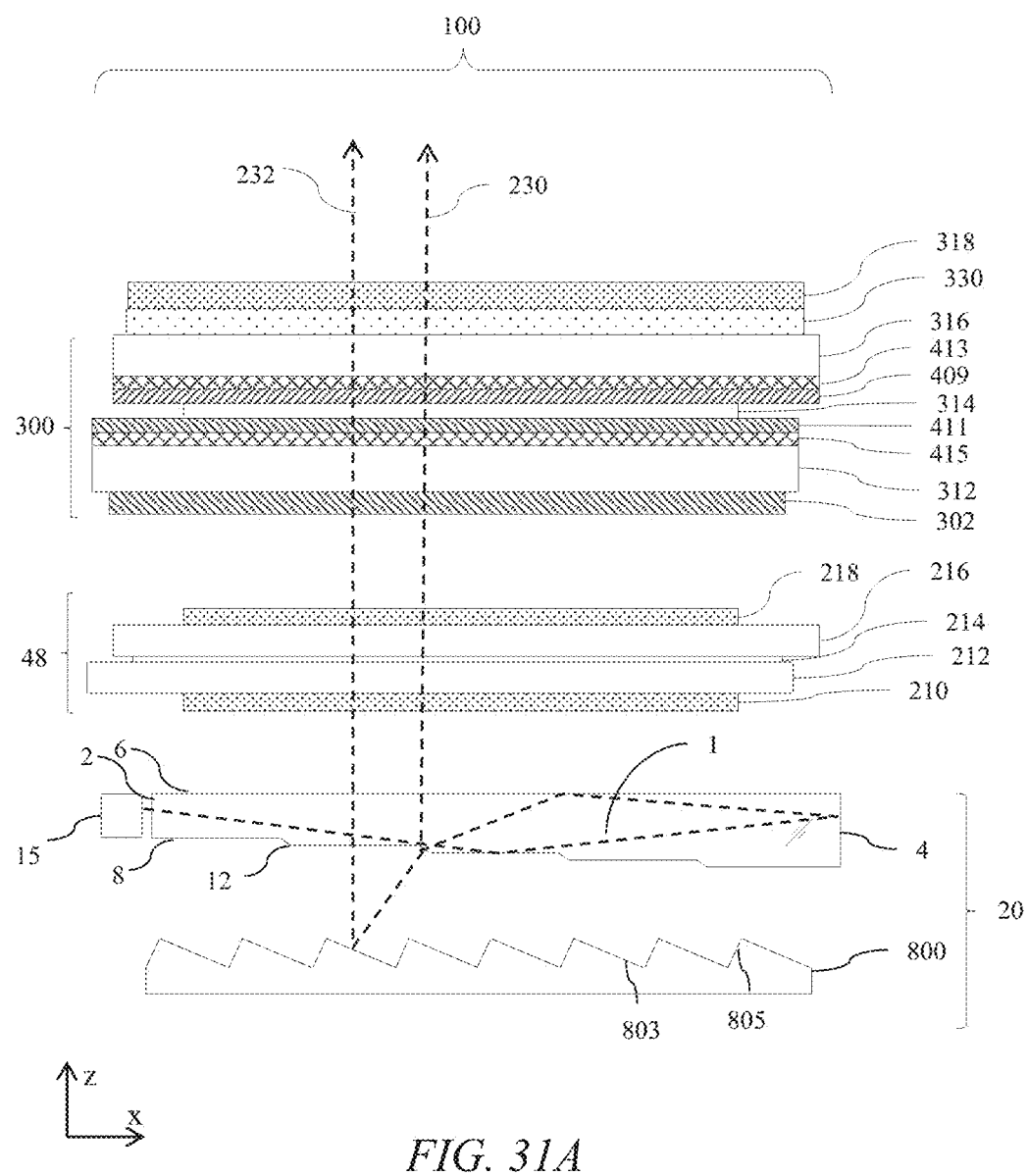
FIG. 31A is a diagram illustrating in side view a switchable directional display apparatus comprising an imaging waveguide and switchable LC retarder.
Figure 31B:
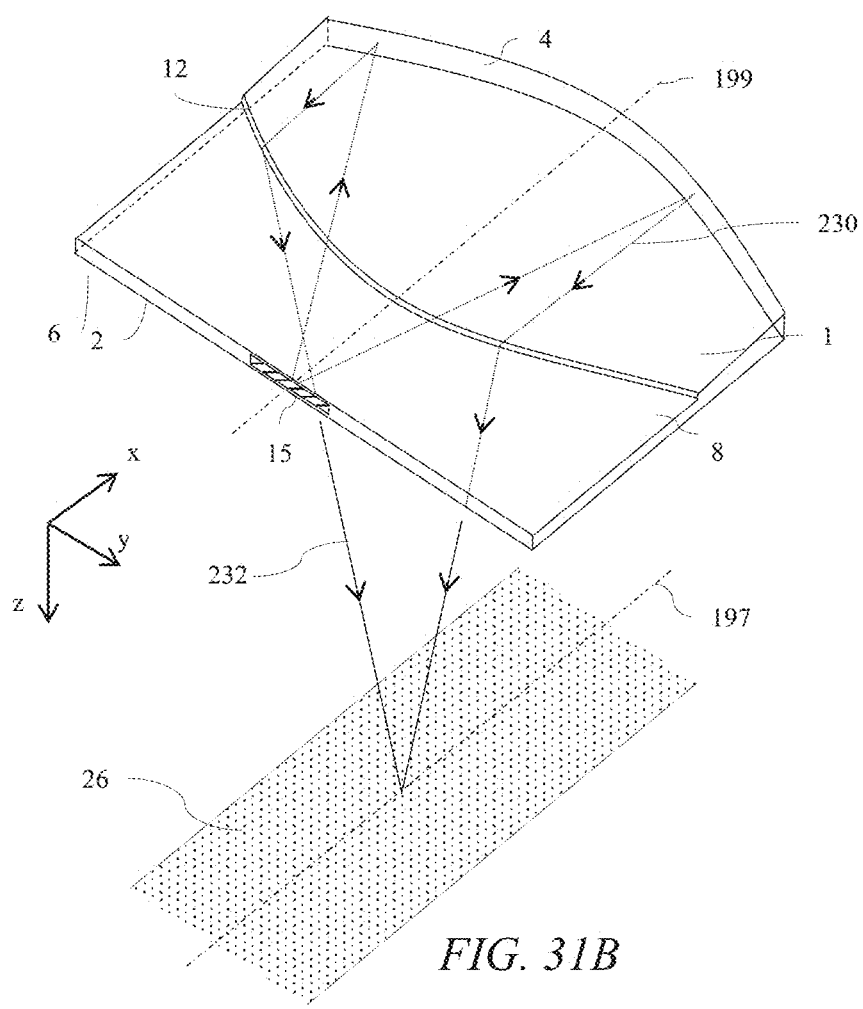
FIG. 31B is a diagram illustrating in rear perspective view operation of an imaging waveguide in a narrow angle mode.

FIG. 31A is a schematic diagram illustrating in side view a switchable directional display apparatus 100 comprising a switchable liquid crystal polar control retarder 300 and backlight 20. The backlight 20 of FIG. 31A may be applied in any of the devices described herein and which comprises an imaging waveguide 1 illuminated by a light source array 15 through an input end 2. FIG. 31B which is a schematic diagram illustrating in rear perspective view operation of the imaging waveguide 1 of FIG. 31A in a narrow angle mode of operation.

The imaging waveguides 1 is of the type described in U.S. Pat. No. 9,519,153, which is herein incorporated by reference in its entirety. The waveguide 1 has an input end 2 extending in a lateral direction along the waveguide 1. An array of light sources 15 are disposed along the input end 2 and input light into the waveguide 1.

The waveguide 1 also has opposed first and second guide surfaces 6, 8 extending across the waveguide 1 from the input end 2 to a reflective end 4 for guiding light input at the input end 2 forwards and back along the waveguide 1. The second guide surface 8 has a plurality of light extraction features 12 facing the reflective end 4 and arranged to deflect at least some of the light guided back through the waveguide 1 from the reflective end 4 from different input positions across the input end 2 in different directions through the first guide surface 6 that are dependent on the input position.

In operation, light rays are directed from light source array 15 through an input end and are guided between first and second guiding surfaces 6, 8 without loss to a reflective end 4. Reflected rays are incident onto facets 12 and output by reflection as light rays 230 or transmitted as light rays 232. Transmitted light rays 232 are directed back through the waveguide 1 by facets 803, 805 of rear reflector 800. Operation of rear reflectors are described further in U.S. Pat. No. 10,054,732, which is herein incorporated by reference in its entirety.

As illustrated in FIG. 31B, optical power of the curved reflective end 4 and facets 12 provide an optical window 26 that is transmitted through the SLM 48 and has an axis 197 that is typically aligned to the optical axis 199 of the waveguide 1. Similar optical window 26 is provided by transmitted light rays 232 that are reflected by the rear reflector 800.

Figure 31C:
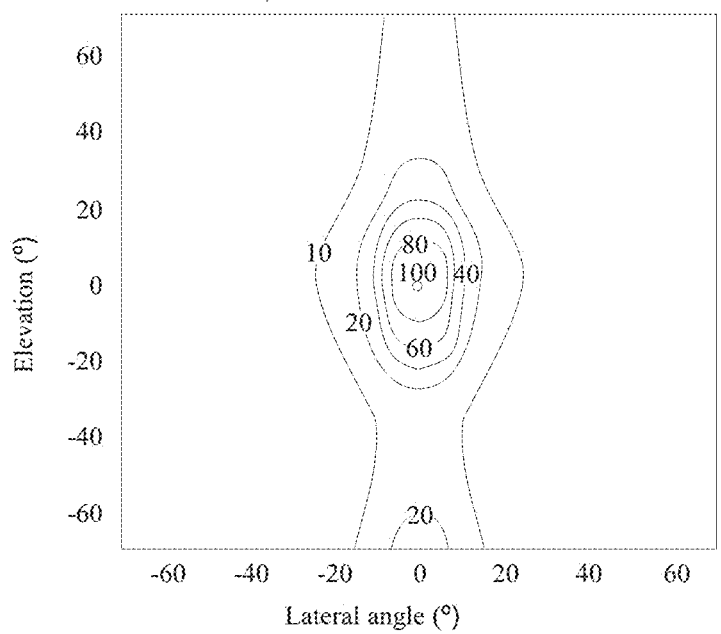
FIG. 31C is a graph illustrating a field-of-view luminance plot of the output of FIG. 31B when used in a display apparatus with no switchable LC retarder.

FIG. 31C is a schematic graph illustrating field-of-view luminance plot of the output of FIG. 31B when used in a display apparatus with no switchable liquid crystal retarder. Features of the arrangements of FIGS. 31A-C not discussed in further detail may be assumed to correspond to the features with equivalent reference numerals as discussed above, including any potential variations in the features.

Thus for off-axis viewing positions observed by snoopers 47 may have reduced luminance, for example between 1% and 3% of the central peak luminance at an elevation of 0 degrees and lateral angle of +/−45 degrees. Further reduction of off-axis luminance is achieved by the plural retarders 301, 330 of the present embodiments.

Backlight 20 may thus further comprise a switchable backlight arranged to switch the output angular luminance profile in order to provide reduced off-axis luminance in a privacy mode of operation and higher off-axis luminance in a public mode of operation.

Another type of directional backlight with low off-axis luminance will now be described.

Figure 32A:
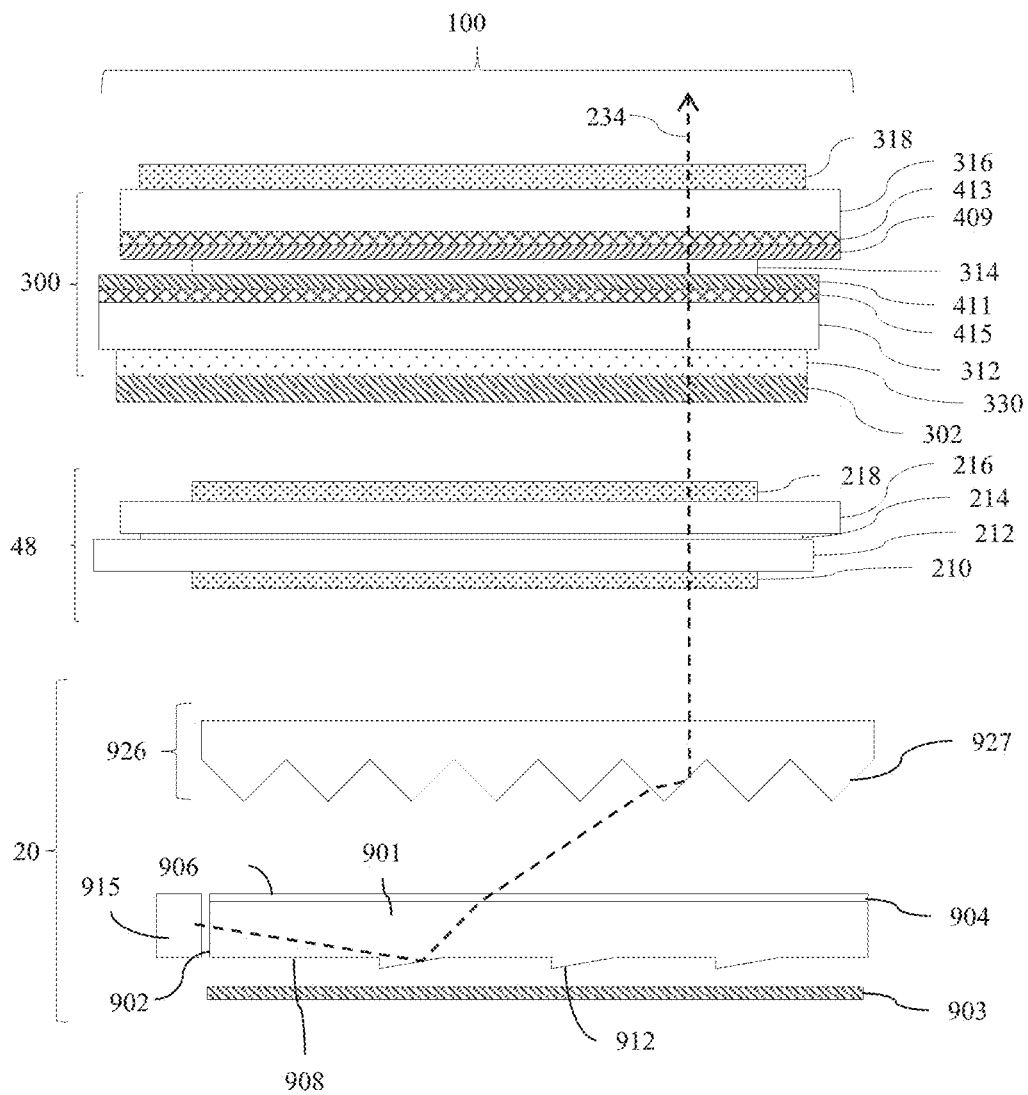
FIG. 32A is a diagram illustrating in side view a switchable directional display apparatus comprising a switchable collimating waveguide and a switchable LC retarder in a privacy mode.

FIG. 32A is a schematic diagram illustrating a side view a switchable directional display apparatus comprising a backlight 20 including a switchable collimating waveguide 901 and a switchable liquid crystal polar control retarder 300 and additional polariser 318. The backlight 20 of FIG. 32A may be applied in any of the devices described herein and is arranged as follows.

The waveguide 901 has an input end 902 extending in a lateral direction along the waveguide 901. An array of light sources 915 are disposed along the input end 902 and input light into the waveguide 1. The waveguide 901 also has opposed first and second guide surfaces 906, 908 extending across the waveguide 1 from the input end 2 to a reflective end 4 for guiding light input at the input end 2 forwards and back along the waveguide 1. In operation, light is guided between the first and second guiding surface 906, 908.

The first guiding surface 906 may be provided with a lenticular structure 904 comprising a plurality of elongate lenticular elements 905 and the second guiding surface 908 may be provided with prismatic structures 912 which are inclined and act as light extraction features. The plurality of elongate lenticular elements 905 of the lenticular structure 904 and the plurality of inclined light extraction features deflect input light guided through the waveguide 901 to exit through the first guide surface 906.

A rear reflector 903 that may be a planar reflector is provided to direct light that is transmitted through the surface 908 back through the waveguide 901.

Output light rays that are incident on both the prismatic structures 912 and lenticular elements 905 of the lenticular structure 904 are output at angles close to grazing incidence to the surface 906. A prismatic turning film 926 comprising facets 927 is arranged to redirect output light rays 234 by total internal reflection through the SLM 48 and compensated switchable liquid crystal polar control retarder 300.

Figure 32B:
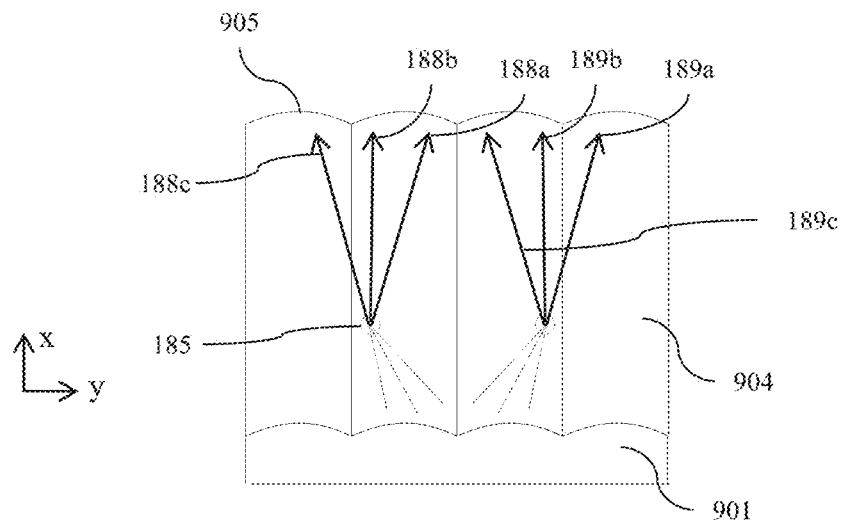
FIG. 32B is a diagram illustrating in top view output of a collimating waveguide.

FIG. 32B is a schematic diagram illustrating in top view output of the collimating waveguide 901. Prismatic structures 912 are arranged to provide light at angles of incidence onto the lenticular structure 904 that are below the critical angle and thus may escape. On incidence at the edges of a lenticular surface, the inclination of the surface provides a light deflection for escaping rays and provides a collimating effect. Light ray 234 may be provided by light rays 188a-c and light rays 189a-c, with incidence on locations 185 of the lenticular structure 904 of the collimated waveguide 901.

Figure 32C:
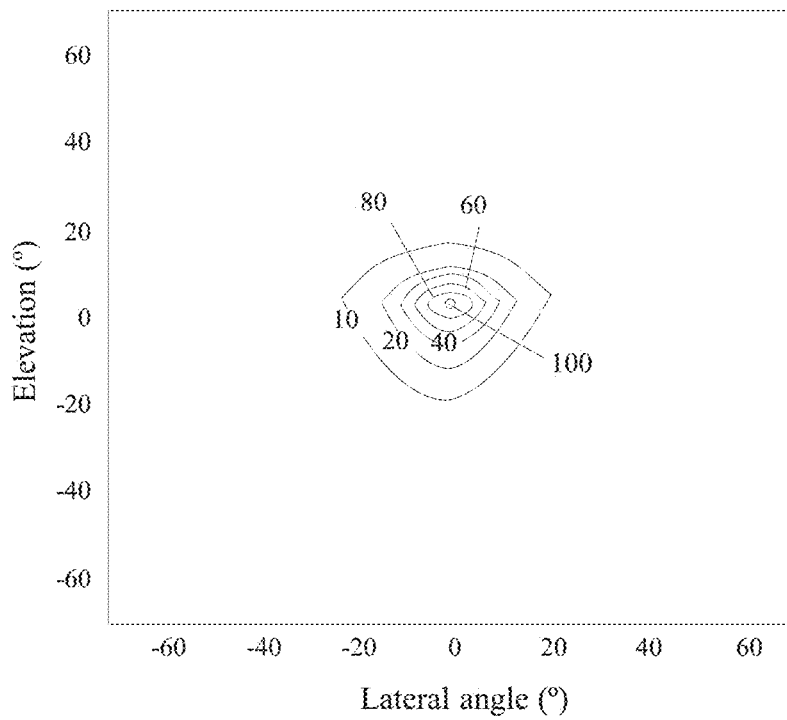

FIG. 32C is a schematic graph illustrating an iso-luminance field-of-view polar plot for the display apparatus of FIG. 32A. Thus a narrow output light cone may be provided, with size determined by the structures of the structures 904, 912 and the turning film 926. Features of the arrangements of FIGS. 32A-C not discussed in further detail may be assumed to correspond to the features with equivalent reference numerals as discussed above, including any potential variations in the features.

Advantageously in regions in which snoopers may be located with lateral angles of 45 degrees or greater for example, the luminance of output from the display is small, typically less than 2%. It would be desirable to achieve further reduction of output luminance. Such further reduction is provided by the compensated switchable liquid crystal polar control retarder 300 and additional polariser 318 as illustrated in FIG. 32A. Advantageously a high performance privacy display with low off-axis luminance may be provided over a wide field of view.

Directional backlights such as the types described in FIG. 31A and FIG. 32A together with the plural retarders 301, 330 of the present embodiments may achieve off-axis luminance of less than 1.5%, preferably less than 0.75% and most preferably less than 0.5% may be achieved for typical snooper 47 locations. Further, high on-axis luminance and uniformity may be provided for the primary user 45. Advantageously a high performance privacy display with low off-axis luminance may be provided over a wide field of view, that may be switched to a public mode by means of control of the switchable retarder 301 by means of control system 352 illustrated in FIG. 1A.

The operation of polar control retarder layers between parallel polarisers for off-axis illumination will now be described further. In the various devices described above, at least one polar control retarder is arranged between the reflective polariser 318 and the additional polariser 218 in various different configurations. In each case, the at least one polar control retarder is configured so that it does not affect the luminance of light passing through the reflective polariser 318, the at least one polar control retarder, and the additional polariser 218 along an axis along a normal to the plane of the polar control retarder(s) but it does reduce the luminance of light passing through the reflective polariser 318, the at least one polar control retarder, and the additional polariser 218 along an axis inclined to a normal to the plane of the polar control retarder(s), at least in one of the switchable states of the compensated switchable polar control polar control retarder 300. There will now be given a description of this effect in more detail, the principles of which may be applied in general to all of the devices described above.

Figure 33A:
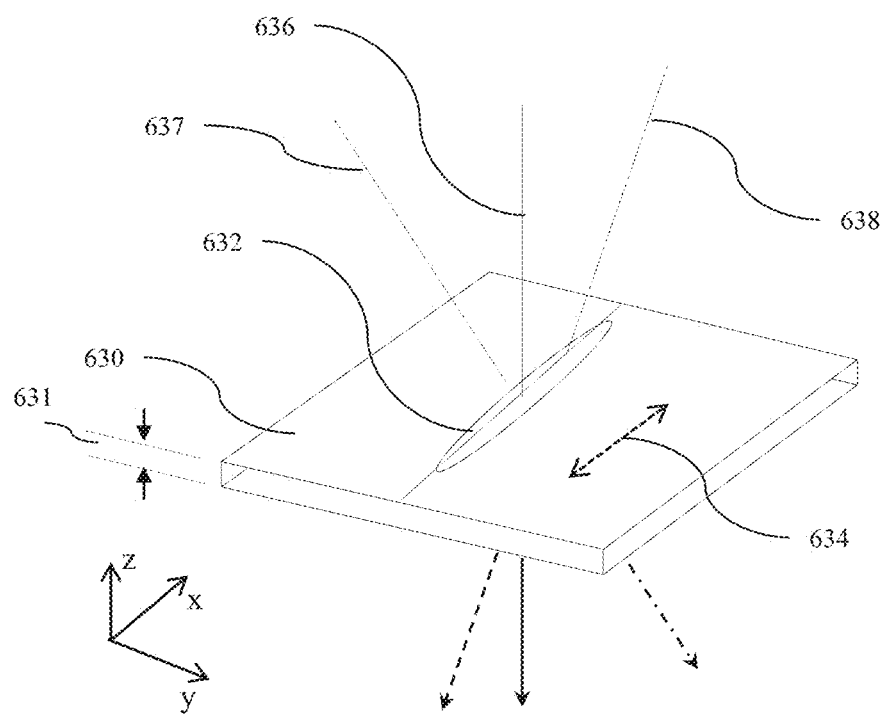

FIG. 33A is a schematic diagram illustrating in perspective view illumination of a polar control retarder layer by off-axis light. Polar control retarder 630 may comprise birefringent material, represented by refractive index ellipsoid 632 with optical axis direction 634 at 0 degrees to the x-axis, and have a thickness 631. Features of the arrangements of FIGS. 33A-35E below that are not discussed in further detail may be assumed to correspond to the features with equivalent reference numerals as discussed above, including any potential variations in the features.

Normal light rays 636 propagate so that the path length in the material is the same as the thickness 631. Light rays 637 are in the y-z plane have an increased path length; however the birefringence of the material is substantially the same as the rays 636. By way of comparison light rays 638 that are in the x-z plane have an increased path length in the birefringent material and further the birefringence is different to the normal ray 636.

The retardance of the polar control retarder 630 is thus dependent on the angle of incidence of the respective ray, and also the plane of incidence, that is rays 638 in the x-z will have a retardance different from the normal rays 636 and the rays 637 in the y-z plane.

The interaction of polarized light with the polar control retarder 630 will now be described. To distinguish from the first and second polarization components during operation in a directional backlight 101, the following explanation will refer to third and fourth polarization components.

Figure 33B:
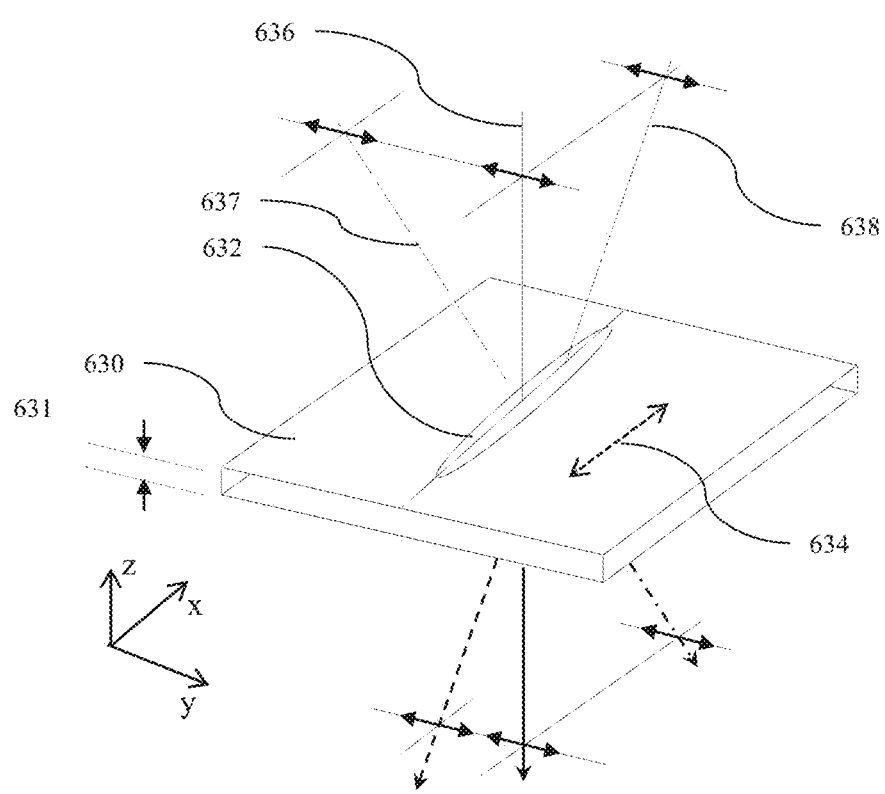
Figure 33C:
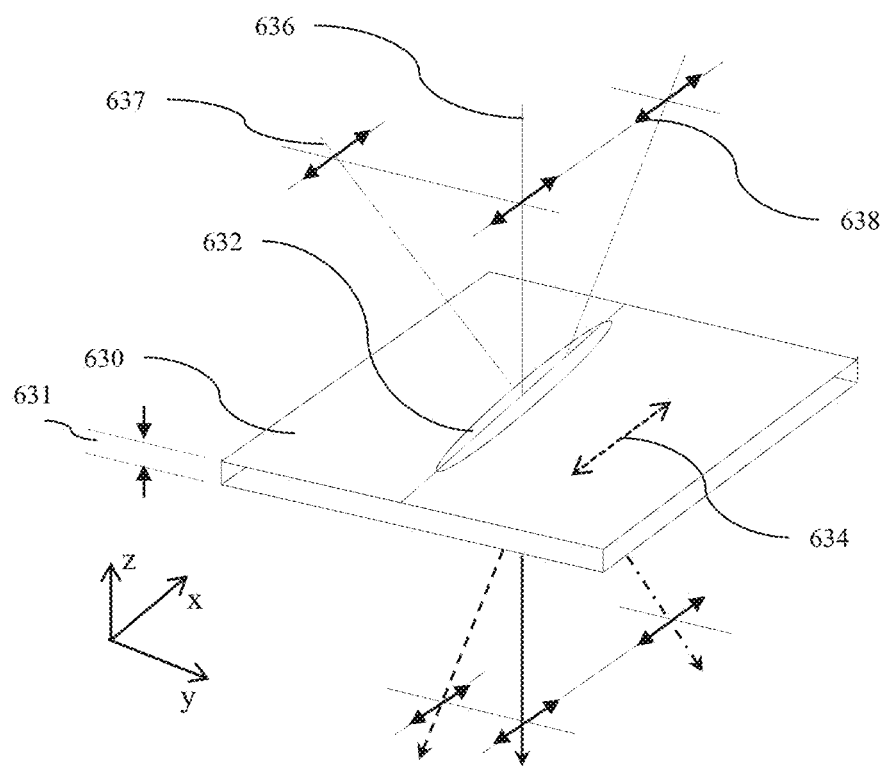

FIG. 33B is a schematic diagram illustrating in perspective view illumination of a polar control retarder layer by off-axis light of a third linear polarization state at 90 degrees to the x-axis and FIG. 33C is a schematic diagram illustrating in perspective view illumination of a polar control retarder layer by off-axis light of a fourth linear polarization state at 0 degrees to the x-axis. In such arrangements, the incident linear polarization states are aligned to the optical axes of the birefringent material, represented by ellipse 632. Consequently, no phase difference between the third and fourth orthogonal polarization components is provided, and there is no resultant change of the polarization state of the linearly polarized input for each ray 636, 637, 638. Thus, the polar control retarder 630 introduces no phase shift to polarisation components of light passed by the polariser on the input side of the polar control retarder 630 along an axis along a normal to the plane of the polar control retarder 630. Accordingly, the polar control retarder 630 does not affect the luminance of light passing through the polar control retarder 630 and polarisers (not shown) on each side of the polar control retarder 630. Although FIGS. 29A-C relate specifically to the polar control retarder 630 that is passive, a similar effect is achieved by the polar control retarders in the devices described above.

Figure 33D:
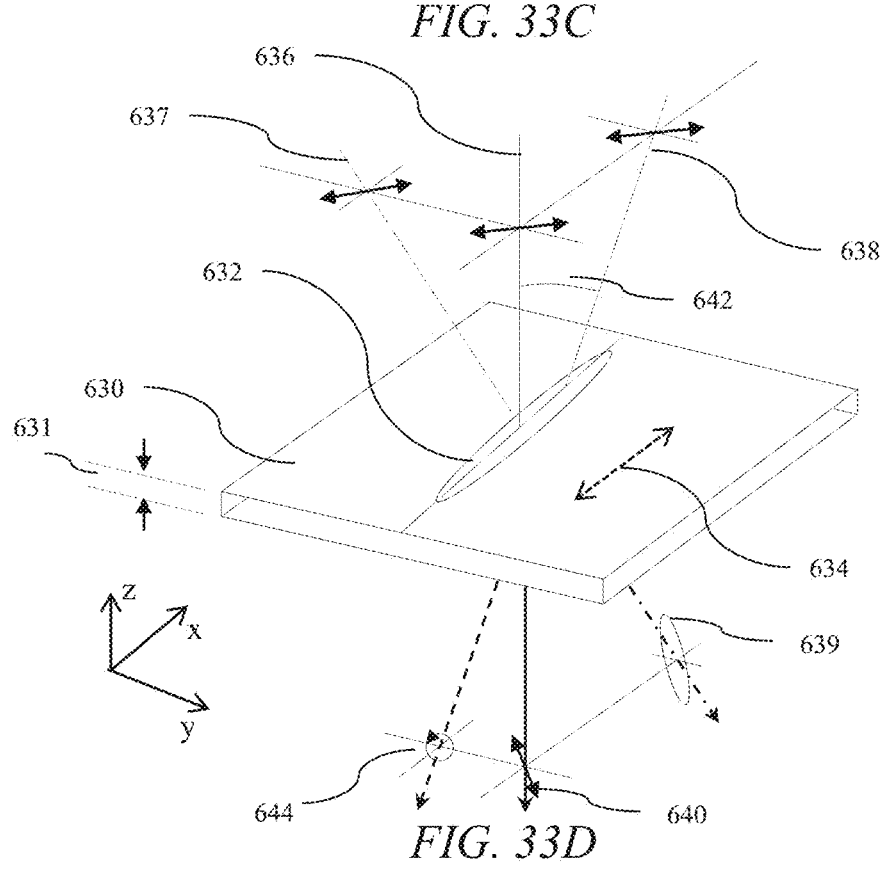

FIG. 33D is a schematic diagram illustrating in perspective view illumination of a polar control retarder 630 layer by off-axis light of a linear polarization state at 45 degrees. The linear polarization state may be resolved into third and fourth polarization components that are respectively orthogonal and parallel to optical axis 634 direction. The polar control retarder thickness 631 and material retardance represented by refractive index ellipsoid 632 may provide a net effect of relatively shifting the phase of the third and fourth polarization components incident thereon in a normal direction represented by ray 636 by half a wavelength, for a design wavelength. The design wavelength may for example be in the range of 500 to 550 nm.

At the design wavelength and for light propagating normally along ray 636 then the output polarization may be rotated by 90 degrees to a linear polarization state 640 at −45 degrees. Light propagating along ray 637 may see a phase difference that is similar but not identical to the phase difference along ray 637 due to the change in thickness, and thus an elliptical polarization state 639 may be output which may have a major axis similar to the linear polarization axis of the output light for ray 636.

By way of contrast, the phase difference for the incident linear polarization state along ray 638 may be significantly different, in particular a lower phase difference may be provided. Such phase difference may provide an output polarization state 644 that is substantially circular at a given inclination angle 642. Thus, the polar control retarder 630 introduces a phase shift to polarisation components of light passed by the polariser on the input side of the polar control retarder 630 along an axis corresponding to ray 638 that is inclined to a normal to the plane of the polar control retarder 630. Although FIG. 29D relates to the polar control retarder 630 that is passive, a similar effect is achieved by the polar control retarders described above, in a switchable state of the switchable liquid crystal polar control retarder corresponding to the privacy mode.

To illustrate the off-axis behaviour of polar control retarder stacks, the angular luminance control of C-plates 330A, 330B between an additional polariser 318 and output display polariser 218 will now be described for various off-axis illumination arrangements with reference to the operation of a C-plate between the parallel polarisers 500, 210 will now be described.

Figure 34A:
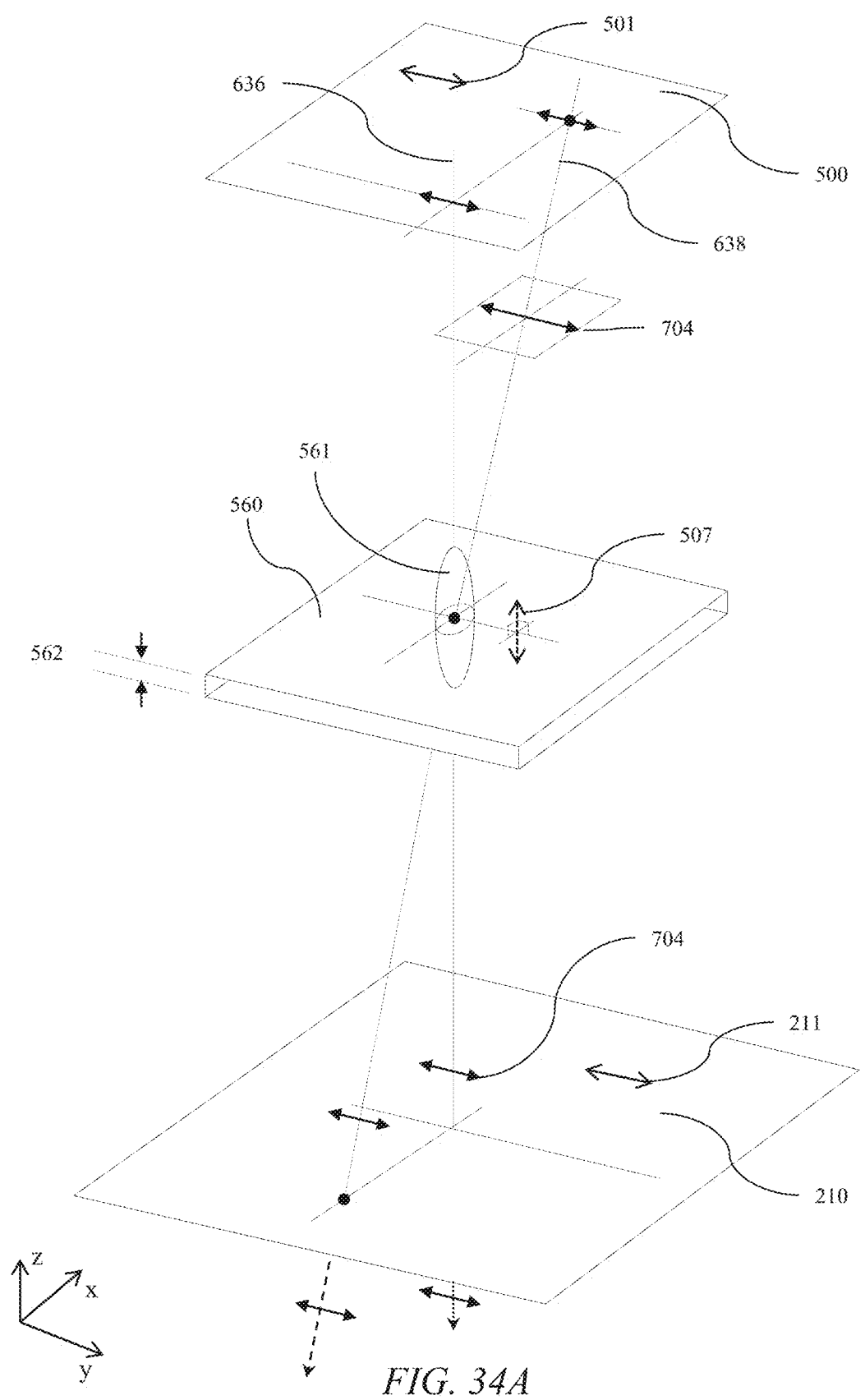

FIG. 34A is a schematic diagram illustrating in perspective view illumination of a C-plate layer by off-axis polarised light with a positive elevation. Incident linear polarisation component 704 is incident onto the birefringent material 632 of the polar control retarder 560 that is a C-plate with optical axis direction 507 that is perpendicular to the plane of the polar control retarder 560. Polarisation component 704 sees no net phase difference on transmission through the liquid crystal molecule and so the output polarisation component is the same as component 704. Thus a maximum transmission is seen through the polariser 210. Thus the polar control retarder 560 having an optical axis 561 perpendicular to the plane of the polar control retarder 560, that is the x-y plane. The polar control retarder 560 having an optical axis perpendicular to the plane of the polar control retarder comprises a C-plate.

Figure 34B:
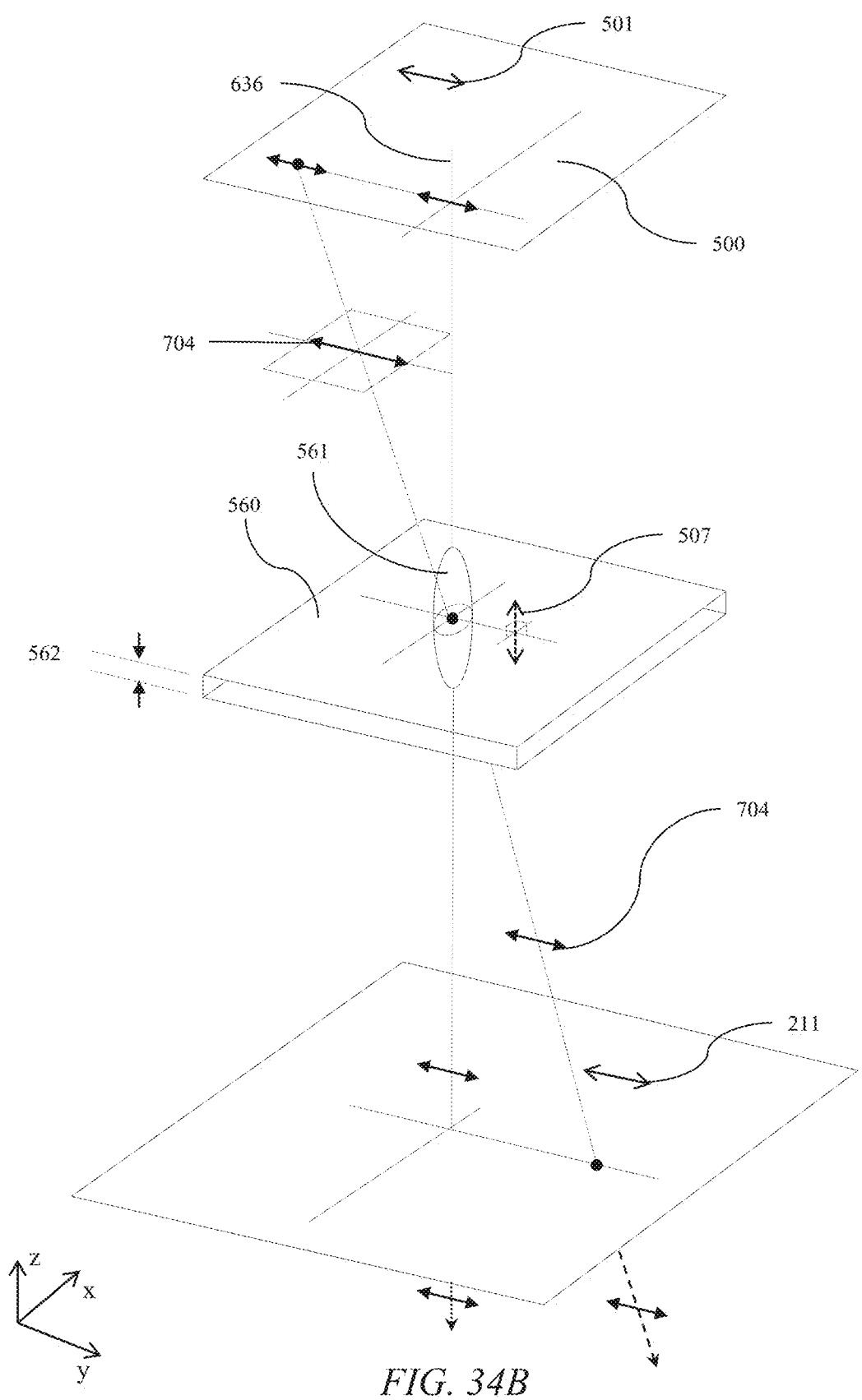

FIG. 34B is a schematic diagram illustrating in perspective view illumination of a C-plate layer by off-axis polarised light with a negative lateral angle. As with the arrangement of FIG. 34A, polarisation state 704 sees no net phase difference and is transmitted with maximum luminance. Thus, the polar control retarder 560 introduces no phase shift to polarisation components of light passed by the polariser on the input side of the polar control retarder 560 along an axis along a normal to the plane of the polar control retarder 560. Accordingly, the polar control retarder 560 does not affect the luminance of light passing through the polar control retarder 560 and polarisers (not shown) on each side of the polar control retarder 560. Although FIGS. 29A-C relate specifically to the polar control retarder 560 that is passive, a similar effect is achieved by the polar control retarders in the devices described above.

Figure 34C:
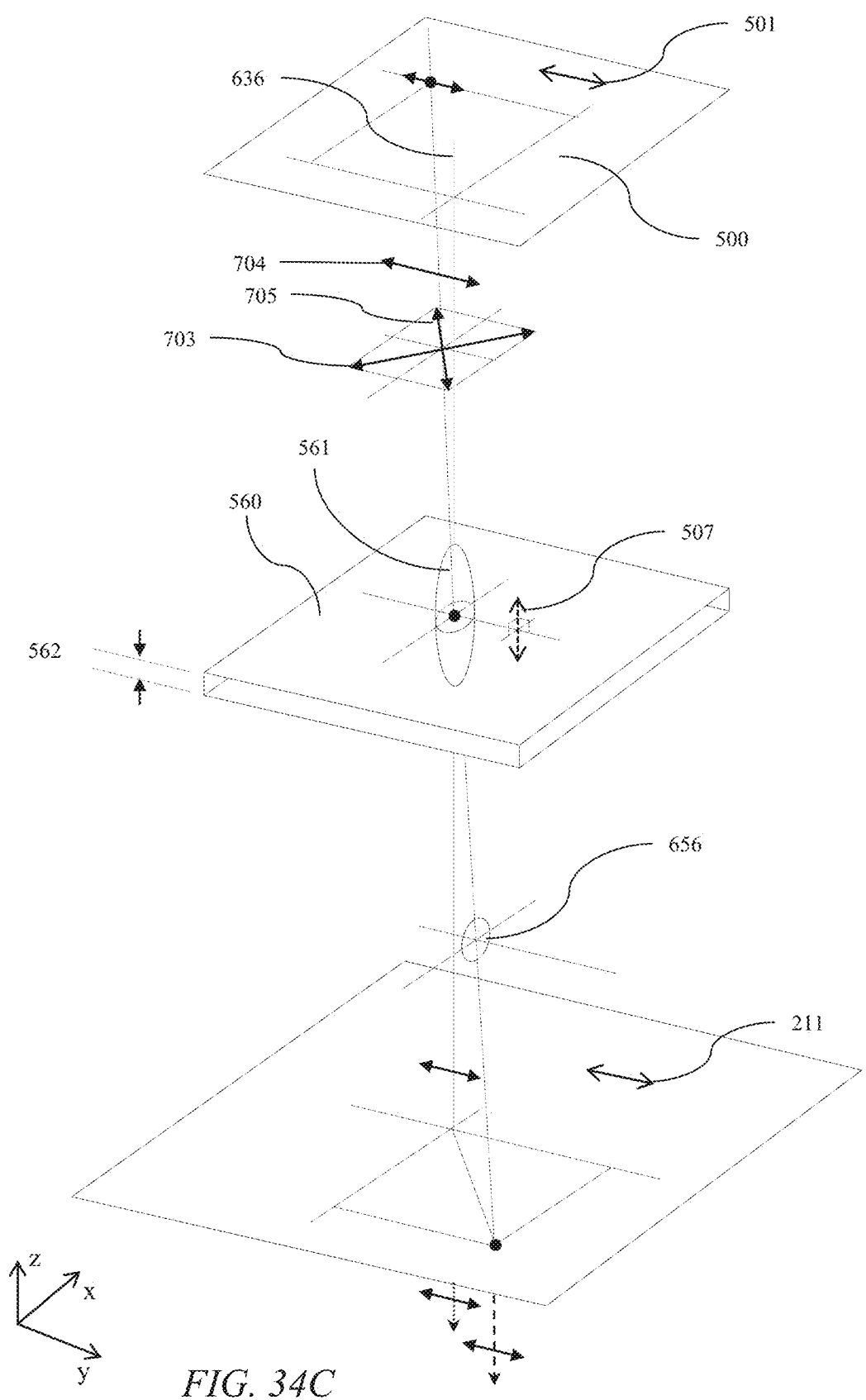

FIG. 34C is a schematic diagram illustrating in perspective view illumination of a C-plate layer by off-axis polarised light with a positive elevation and negative lateral angle. In comparison to the arrangement of FIGS. 34A-B, the polarisation state 704 resolves onto eigenstates 703, 705 with respect to the birefringent material 632 providing a net phase difference on transmission through the polar control retarder 560. The resultant elliptical polarisation component 656 is transmitted through polariser 210 with reduced luminance in comparison to the rays illustrated in FIGS. 34A-B.

Figure 34D:
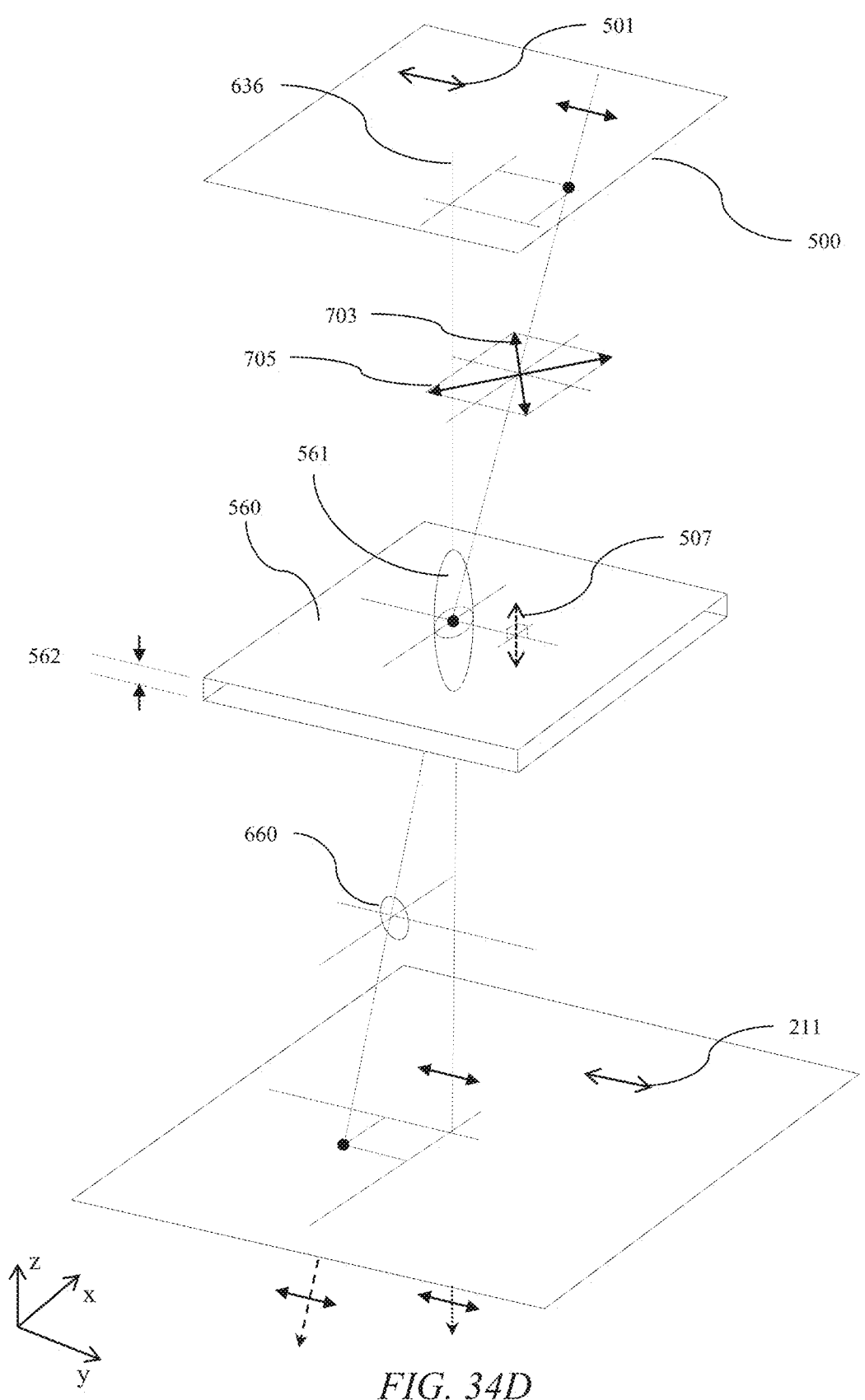

FIG. 34D is a schematic diagram illustrating in perspective view illumination of a C-plate layer by off-axis polarised light with a positive elevation and positive lateral angle. In a similar manner to FIG. 34C, the polarisation component 704 is resolved into eigenstates 703, 705 that undergo a net phase difference, and elliptical polarisation component 660 is provided, which after transmission through the polariser reduces the luminance of the respective off-axis ray. Thus, the polar control retarder 560 introduces a phase shift to polarisation components of light passed by the polariser on the input side of the polar control retarder 560 along an axis that is inclined to a normal to the plane of the polar control retarder 560. Although FIG. 29D relates to the polar control retarder 560 that is passive, a similar effect is achieved by the polar control retarders described above, in a switchable state of the switchable liquid crystal polar control retarder corresponding to the privacy mode.

Figure 34E:
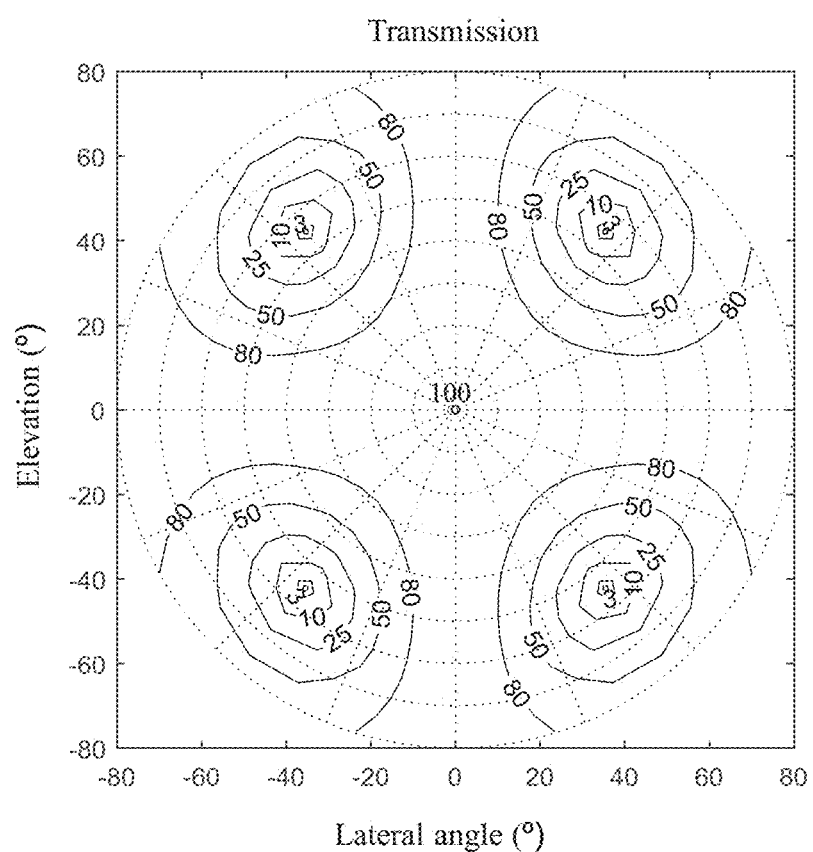

FIG. 34E is a schematic graph illustrating the variation of output transmission with polar direction for transmitted light rays in FIGS. 34A-D. Thus, the C-plate may provide luminance reduction in polar quadrants. In combination with switchable liquid crystal layer 314 described elsewhere herein, (i) removal of luminance reduction of the C-plate may be provided in a first wide angle state of operation (ii) extended polar region for luminance reduction may be achieved in a second privacy state of operation.

To illustrate the off-axis behaviour of polar control retarder stacks, the angular luminance control of crossed A-plates 330A, 330B between an additional polariser 318 and output display polariser 218 will now be described for various off-axis illumination arrangements.

FIG. 35A is a schematic diagram illustrating in perspective view illumination of crossed A-plate retarder layers by off-axis polarised light with a positive elevation. Linear polariser 218 with electric vector transmission direction 219 is used to provide a linear polarisation state 704 that is parallel to the lateral direction onto first A-plate 330A of the crossed A-plates 330A, 330B. The optical axis direction 331A is inclined at +45 degrees to the lateral direction. The retardance of the polar control retarder 330A for the off-axis angle $\theta_1$ in the positive elevation direction provides a resultant polarisation component 650 that is generally elliptical on output. Polarisation component 650 is incident onto the second A-plate 330B of the crossed A-plates 330A, 330B that has an optical axis direction 331B that is orthogonal to the optical axis direction 331A of the first A-plate 330A. In the plane of incidence of FIG. 35A, the retardance of the second A-plate 330B for the off-axis angle $\theta_1$ is equal and opposite to the retardance of the first A-plate 330A. Thus a net zero retardation is provided for the incident polarisation component 704 and the output polarisation component is the same as the input polarisation component 704.

The output polarisation component is aligned to the electric vector transmission direction of the additional polariser 318, and thus is transmitted efficiently. Advantageously substantially no losses are provided for light rays that have zero lateral angle angular component so that full transmission efficiency is achieved.

FIG. 35B is a schematic diagram illustrating in perspective view illumination of crossed A-plate retarder layers by off-axis polarised light with a negative lateral angle. Thus input polarisation component is converted by the first A-plate 330A to an intermediate polarisation component 652 that is generally an elliptical polarisation state. The second A-plate 330B again provides an equal and opposite retardation to the first A-plate so that the output polarisation component is the same as the input polarisation component 704 and light is efficiently transmitted through the polariser 318.

Thus the polar control retarder comprises a pair of retarders 330A, 330B which have optical axes in the plane of the retarders 330A, 330B that are crossed, that is the x-y plane in the present embodiments. The pair of retarders 330A, 330B have optical axes 331A, 331B that each extend at 45° with respect to an electric vector transmission direction that is parallel to the electric vector transmission of the polariser 318.

Advantageously substantially no losses are provided for light rays that have zero elevation angular component so that full transmission efficiency is achieved.

FIG. 35C is a schematic diagram illustrating in perspective view illumination of crossed A-plate retarder layers by off-axis polarised light with a positive elevation and negative lateral angle. Polarisation component 704 is converted to an elliptical polarisation component 654 by first A-plate 330A. A resultant elliptical component 656 is output from the second A-plate 330B. Elliptical component 656 is analysed by input polariser 318 with reduced luminance in comparison to the input luminance of the first polarisation component 704.

FIG. 35D is a schematic diagram illustrating in perspective view illumination of crossed A-plate retarder layers by off-axis polarised light with a positive elevation and positive lateral angle. Polarisation components 658 and 660 are provided by first and second A-plates 330A, 330B as net retardance of first and second retarders does not provide compensation.

Thus luminance is reduced for light rays that have non-zero lateral angle and non-zero elevation components. Advantageously display privacy can be increased for snoopers that are arranged in viewing quadrants while luminous efficiency for primary display users is not substantially reduced.

FIG. 35E is a schematic graph illustrating the variation of output transmission with polar direction for transmitted light rays in FIGS. 35A-D. In comparison to the arrangement of FIG. 34E, the area of luminance reduction is increased for off-axis viewing. However, the switchable liquid crystal layer 314 may provide reduced uniformity in comparison to the C-plate arrangements for off-axis viewing in the first public mode state of operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device for use in ambient illumination comprising:
   a spatial light modulator arranged to output light,
   wherein the spatial light modulator comprises a display polariser arranged on the output side of the spatial light modulator, the display polariser being a linear polariser;
   an additional polariser arranged on the output side of the display polariser, the additional polariser being a linear polariser;
   a reflective polariser arranged between the display polariser and the additional polariser, the reflective polariser being a linear polariser; and
   plural polar control retarders arranged between the reflective polariser and the additional polariser, wherein the plural polar control retarders comprise:
   a switchable liquid crystal retarder comprising: a layer of liquid crystal material with a negative dielectric anisotropy having a retardance for light of a wavelength of 550 nm in a range from 500 nm to 1000 nm; and two surface alignment layers disposed adjacent to the liquid crystal material on opposite sides thereof, wherein each of the surface alignment layers is arranged to provide homeotropic alignment in the adjacent liquid crystal material and each alignment layer has a pretilt having a pretilt direction with a component in the plane of the layer of liquid crystal material that is parallel or anti-parallel or orthogonal to the electric vector transmission direction of the reflective polariser; and
   a pair of passive retarders which have optical axes in the plane of the retarders that are crossed and extend at 45° and at 135°, respectively, with respect to an electric vector transmission direction of the display polariser, each passive retarder of the pair of passive retarders having a retardance for light of a wavelength of 550 nm in a range from 300 nm to 800 nm.

2. A display device according to claim 1, wherein the layer of liquid crystal material of the switchable liquid crystal retarder has a retardance for light of a wavelength of 550 nm in a range from 600 nm to 900 nm.

3. A display device according to claim 1, wherein the layer of liquid crystal material of the switchable liquid crystal retarder has a retardance for light of a wavelength of 550 nm in a range from 700 nm to 850 nm.

4. A display device according to claim 1, wherein each passive retarder of the pair of passive retarders has a retardance for light of a wavelength of 550 nm in a range from 500 nm to 700 nm.

5. A display device according to claim 1, wherein each passive retarder of the pair of passive retarders has a retardance for light of a wavelength of 550 nm in a range from 550 nm to 675 nm.

6. A display device according to claim 1, wherein the switchable liquid crystal retarder further comprises transmissive electrodes arranged to apply a voltage for controlling the layer of liquid crystal material.

7. A display device according to claim 6, wherein the transmissive electrodes are on opposite sides of the layer of liquid crystal material.

8. A display device according to claim 6, further comprising a control system arranged to control the voltage applied across the transmissive electrodes of the switchable liquid crystal retarder.

9. A display device according to claim 1, further comprising a backlight arranged to output light, the spatial light modulator being a transmissive spatial light modulator arranged to receive output light from the backlight.

10. A display device according to claim 9, wherein the backlight provides a luminance at polar angles to the normal to the spatial light modulator greater than 45 degrees that is at most 30% of the luminance along the normal to the spatial light modulator.

11. A display device according to claim 9, wherein the backlight provides a luminance at polar angles to the normal to the spatial light modulator greater than 45 degrees that is at most 20% of the luminance along the normal to the spatial light modulator.

12. A display device according to claim 9, wherein the backlight provides a luminance at polar angles to the normal to the spatial light modulator greater than 45 degrees that is at most 10% of the luminance along the normal to the spatial light modulator.

13. A display device according to claim 1, wherein the spatial light modulator is an emissive spatial light modulator.

14. A display device according to claim 13, wherein the spatial light modulator provides a luminance at polar angles to the normal to the spatial light modulator greater than 45 degrees that is at most 30% of the luminance along the normal to the spatial light modulator.

15. A display device according to claim 13, wherein the spatial light modulator provides a luminance at polar angles to the normal to the spatial light modulator greater than 45 degrees that is at most 20% of the luminance along the normal to the spatial light modulator.

16. A display device according to claim 13, wherein the spatial light modulator provides a luminance at polar angles to the normal to the spatial light modulator greater than 45 degrees that is at most 10% of the luminance along the normal to the spatial light modulator.

17. A switchable display device according to claim 1, wherein the components of the pretilt direction of the pretilts of each of the surface alignment layers are anti-parallel to each other.

* * * * *